United States Patent
Helmick et al.

(10) Patent No.: US 6,674,992 B2
(45) Date of Patent: *Jan. 6, 2004

(54) ON-LINE EDUCATIONAL SYSTEM FOR DOCUMENT SHARING

(75) Inventors: Robert N. Helmick, Cherry Hills Village, CO (US); Jon M. Dobrin, Denver, CO (US)

(73) Assignee: eCollege.com, Denver, CO (US)

( * ) Notice: Subject to any disclaimer, the term of this patent is extended or adjusted under 35 U.S.C. 154(b) by 311 days.

This patent is subject to a terminal disclaimer.

(21) Appl. No.: 09/879,882

(22) Filed: Aug. 13, 2001

(65) Prior Publication Data

US 2003/0008269 A1 Jan. 9, 2003

Related U.S. Application Data

(62) Division of application No. 09/384,458, filed on Aug. 27, 1999, now Pat. No. 6,470,171.

(51) Int. Cl.[7] .................................................. G09B 7/00
(52) U.S. Cl. ....................... 434/362; 434/350; 434/362; 345/751; 345/753
(58) Field of Search .................................. 434/350, 118, 434/362, 336; 345/733, 730, 731, 748, 751, 752, 753, 765; 707/512

(56) References Cited

U.S. PATENT DOCUMENTS

| 4,170,832 A | | 10/1979 | Zimmerman ..................... 35/9 |
|---|---|---|---|
| 5,008,853 A | * | 4/1991 | Bly et al. ................. 345/751 X |
| 5,395,243 A | | 3/1995 | Lubin et al. ................. 434/118 |
| 5,730,604 A | * | 3/1998 | Jay et al. ................. 434/365 X |
| 5,772,446 A | | 6/1998 | Rosen ......................... 434/307 |
| 5,779,486 A | | 7/1998 | Ho et al. ..................... 434/353 |
| 5,788,508 A | | 8/1998 | Lee et al. .................... 434/350 |
| 5,794,006 A | | 8/1998 | Sanderman ................. 395/500 |
| 5,978,648 A | * | 11/1999 | George et al. .......... 434/362 X |
| 6,024,577 A | * | 2/2000 | Wadahama et al. ..... 434/322 X |
| 6,029,043 A | * | 2/2000 | Ho et al. ................. 434/350 X |
| 6,091,930 A | * | 7/2000 | Mortimer et al. ........ 434/362 X |
| 6,146,148 A | * | 11/2000 | Stuppy .................... 434/322 X |
| 6,149,441 A | * | 11/2000 | Pellegrino et al. ...... 434/350 X |
| 6,164,974 A | * | 12/2000 | Carlile et al. ........... 434/322 X |
| 6,250,930 B1 | * | 6/2001 | Mintz ..................... 434/323 X |
| 6,266,683 B1 | * | 7/2001 | Yehuda et al. .......... 707/512 X |
| 6,470,171 B1 | * | 10/2002 | Helmick et al. ........ 434/362 X |
| 2002/0059342 A1 | * | 5/2002 | Gupta et al. ................. 707/512 |

OTHER PUBLICATIONS

Exhibit 5: Untitled document describing Real Education, Real Education, Inc. (undated).
Exhibit 6: Document entitled "How to Build and Maintain a Complete School on the Internet; 'An Opportunity for Continuing Education Providers to Establish an Entire School on the Internet,'" Real Information Systems, Inc. (undated).
Exhibit 3: Document entitled Real Education, Inc. Technical Information, Real Education, Inc. (Jun. 5, 1998).

(List continued on next page.)

*Primary Examiner*—S. Thomas Hughes
*Assistant Examiner*—Chandra L. Harris
(74) *Attorney, Agent, or Firm*—Snell & Wilmer LLP

(57) ABSTRACT

An on-line educational system including document sharing and electronic journal features. An instructor builds a course on-line containing identification of assignments and educational materials, which are compiled into an on-line electronic syllabus. Users enrolled in the course may access the electronic syllabus and perform various functions with the on-line educational system in order to participate in the on-line educational course. Users can electronically share documents with other users and the instructor, and they can include a message along with the shared documents. Users can also enter information into an electronic journal and specify which portions of the journal the instructor may view.

48 Claims, 57 Drawing Sheets

OTHER PUBLICATIONS

Exhibit 4: Untitled document describing features of System 2.7, Real Education, Inc. (undated).
Exhibit 1: Marketing/Student Sales Plan, Real Education, Inc. (Feb. 5, 1998).
Exhibit 2: Slides entitled "Online Education Technology Solutions Briefing," www.realeducation.com (undated).
Press Release, "Real Education Joins Microsoft Certified Solution Provider Program" (Dec. 10, 1997).
Press Release, "Real Education Awarded by U.S. Commerce Department's Advanced Technology Program" (Oct. 8, 1998).
Press Release, "Real Education Announces IMS Compatibility" (May 4, 1998).

* cited by examiner

500

| FIG.2A | FIG.2G | FIG.2M |
| FIG.2B | FIG.2H | FIG.2N |
| FIG.2C | FIG.2I | FIG.2O |
| FIG.2D | FIG.2J | FIG.2P |
| FIG.2E | FIG.2K | FIG.2Q |
| FIG.2F | FIG.2L | FIG.2R |

FIG.2

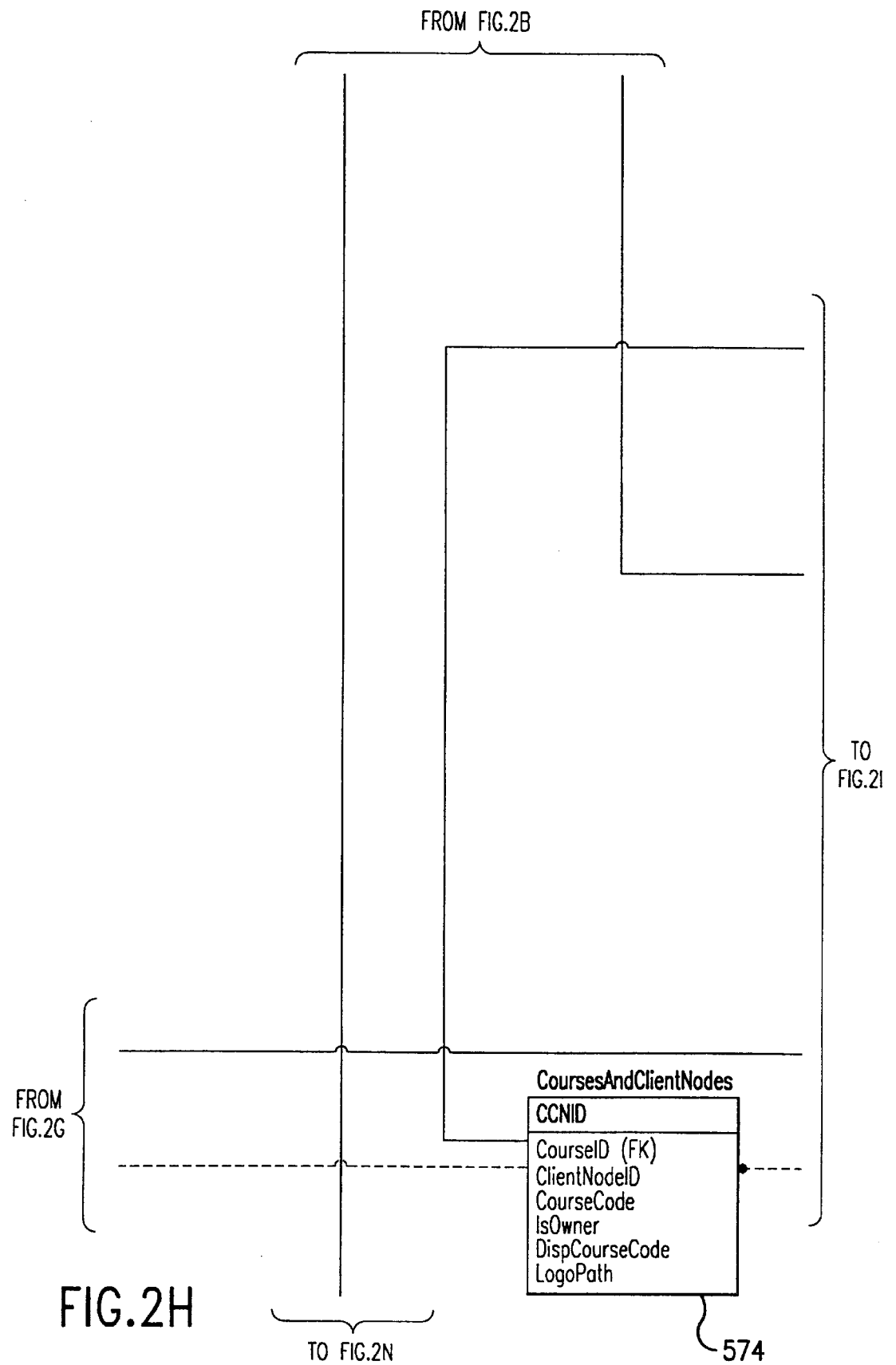

FIG. 3E

Address: http://gregu.realed.com/re/Gradebook.real?CourseID=41163&CNodeID=3406&Action=ADMINGRADEBOOK&47=28779  GO  LINKS>>

Online Gradebook     BIOL 3611 - Cell Biology

| Setup Gradebook | View/Grade Student Work | View Class Roster | Exit |

Course Home  1  2  3  4  5  6  7  8  9  10  11  12  13  14  15  16  Final Grade
— 816

Refresh Gradebook

Numeric Grades | LetterGrades
— 888                          ↙ 890

| Student | Journal Entry | Paper on Cells | Reading | Test 2 | Exam |
|---|---|---|---|---|---|
| qastudent, qastudent | 98 | 78 | 0 | 88 | 0 |
| student, student | 87 | 0 | 0 | 70 | 99 |
| student2, student2 | 0 | 0 | 0 | 90 | 69 |
| teststud1, teststud1 | 82 | 89 | 0 | 0 | 0 |

886

Put mouse over bar, click down & HOLD. Now drag mouse & bar for better viewing

Set up Gradebook
Select the learning tools and custom items that you would like to add to the gradebook and enter desired custom gradebook entries Course Learning Tools   | Assignment ▼ |   | Add to Gradable items |
Custom GradeBook Entry  |              |   | Add to Gradable items |

↙ 892

To add the chosen learning tools and custom items   To remove items, uncheck a box and click on update.
to the GradeBook, click in the checkboxes and click
on the update button.

| Update |

Gradebook Items | Course Home | 1 | 2 | 3 | 4 | 5 | 6 | 7 | 8 | 9 | 10 | 11 | 12 | 13 | 14 | 15 | 16 | Final Grade |

HOMEPAGES: Greg University / Sarah Allen / Orientation Course / Unit 5: How Do I Communicate with my P...

| Home | 1 | 2 | 3 | 4 | 5 | 6 | 7 | 8 | 9 |

— 954

Course Home Page — 816
Document
Collaboration
Email Class
Grade Book
HelpDesk
Policies & Procedures
Message Center
Online Chatroom
Student Journal
Student Notebook
Webliography
Prof Gradebook ADMIN ONLY LINKS
Course Manager
ProfHelp Thread Topics
  📄 Why are you taking an online course? — 956
▷ 📄 Have ever taken a course online before? — 958

ADD A TOPIC (ADMIN ONLY)

Have ever taken a course online before?
Keith Millner | 7.21.99 4.13.08pm — 960

More and more people are taking courses online. If you are one of the pioneering types who has been down this road before, perhaps you have experiences or advice to offer those who are now joining you in this new academic environment.

RESPOND TO THIS TOPIC  |  EDIT TOPIC (ADMIN ONLY)  |  DELETE TOPIC (ADMIN ONLY)
                           964                         966

Responses — 962
display by: TOPIC | DATES | AUTHOR — 972
                968   970
show expanded view ↳ This is great - I am... Susan Karson | 8.9.99 7:54:49 pm — 974
This is great - I am really excited about taking my course online RESPOND TO THIS POST  |  DELETE THIS POST (ADMIN ONLY)
          976                      978

FIG.3L

Time Remaining: 0 hours 29 minutes 49 seconds ← 982

1. With online courses you do not have daily contact with your professor. Does this mean all online courses are self-paced? (1 point(s)) ← 984
   ○ Yes
   ○ No

980

2. Match the following terms with the correct definition. (3 point(s)) ← 986

| | |
|---|---|
| ☐ E-mail | 1) This synchronous form of communication can take place with the entire class, a small group, or a private meeting between my professor and me. In this type of communication, everyone involved must be logged in at the same time. |
| ☐ Syllabus | 2) This is what I would use to contact a fellow student(s) and/or the professor, without the message becoming a permanent part of the course. |
| ☐ Online Classroom | 3) My instructor may use one of these to communicate due dates for the course, and other course information. |

Exam Navigation:
Click on the buttons below to switch between exam sections. Clicking on the buttons will also store your answers.
[Exam Home] [Section 1] [Section 2] [Section 3] ← 988
Store your answers frequently during exam. Submit for grading when you are finished working on the exam.
[Store Answers] [Submit Exam For Grading]
         990              992

ON-LINE EDUCATIONAL SYSTEM FOR DOCUMENT SHARING

The present application is a division of U.S. application Ser. No. 09/384,458, filed Aug. 27, 1999, now U.S. Pat. No. 6,470,171 which is incorporated herein by reference as if fully set forth.

FIELD OF THE INVENTION

The present invention relates to a method and apparatus for providing an on-line educational system.

BACKGROUND OF THE INVENTION

The Internet has permitted users with web browsers to easily exchange information over the Internet. Educational materials, for example, may be distributed to users for taking an educational course on-line. Providing on-line educational courses requires various features in order to successfully execute the course. In order for the course to successfully replace or supplement in-classroom courses, users must be provided with various features so that the online educational course provides certain benefits over in-classroom teaching.

Accordingly, a need exists for various features for an on-line educational system.

SUMMARY OF THE INVENTION

A first apparatus for document sharing for use with an on-line educational system permits users to provide a document to an instructor. The educational system includes providing on-line content concerning educational materials for a particular educational course, and providing on-line an electronic syllabus for the educational course. The apparatus receives an education-related document from a particular one of the users and associates a message with the document based upon information entered by the particular user. The apparatus stores the document with the message for accessibility by the instructor.

A second apparatus for document sharing for use with an on-line educational system permits an instructor to provide a document to users. The educational system includes providing on-line content concerning educational materials for a particular educational course, and providing on-line an electronic syllabus for the educational course. The apparatus receives an education-related document from the instructor along with an identification of a particular one of the users as an intended recipient of the document, and it associates a message with the document based upon information entered by the instructor. The apparatus stores the document with the message for accessibility by the particular user.

BRIEF DESCRIPTION OF THE DRAWINGS

FIGS. 1A–1M are flow charts of various methods for executing functions in an on-line educational system.

FIG. 1A is a flow chart of a home page method.
FIG. 1B is a flow chart of a document sharing method.
FIG. 1C is a flow chart of an e-mail class method.
FIG. 1D is a flow chart of a gradebook method.
FIG. 1E is a flow chart of a message center method.
FIG. 1F is a flow chart of an on-line chat room method.
FIG. 1G is a flow chart of a journal method.
FIG. 1H is a flow chart of a notebook method.
FIG. 1I is a flow chart of a webliography method.
FIG. 1J is a flow chart of a threaded discussion method.
FIG. 1K is a flow chart of a grading method.
FIG. 1L is a flow chart of administrative pages method.
FIG. 1M is a flow chart of a course manager method.
FIG. 3A is a diagram of a home page screen for an instructor.
FIG. 3E is a diagram of a gradebook screen for an instructor.
FIG. 3I is a diagram of a journal screen.
FIG. 3L is a diagram of a threaded discussion screen.
FIG. 3M is a diagram of a grading or exam screen.
FIG. 3O is a diagram of an enrollment status screen.
FIG. 3W is a diagram of a course manager unit screen.
FIG. 3X is a diagram of an add content screen for a course manager.

DETAILED DESCRIPTION

Overview

Figure 1:
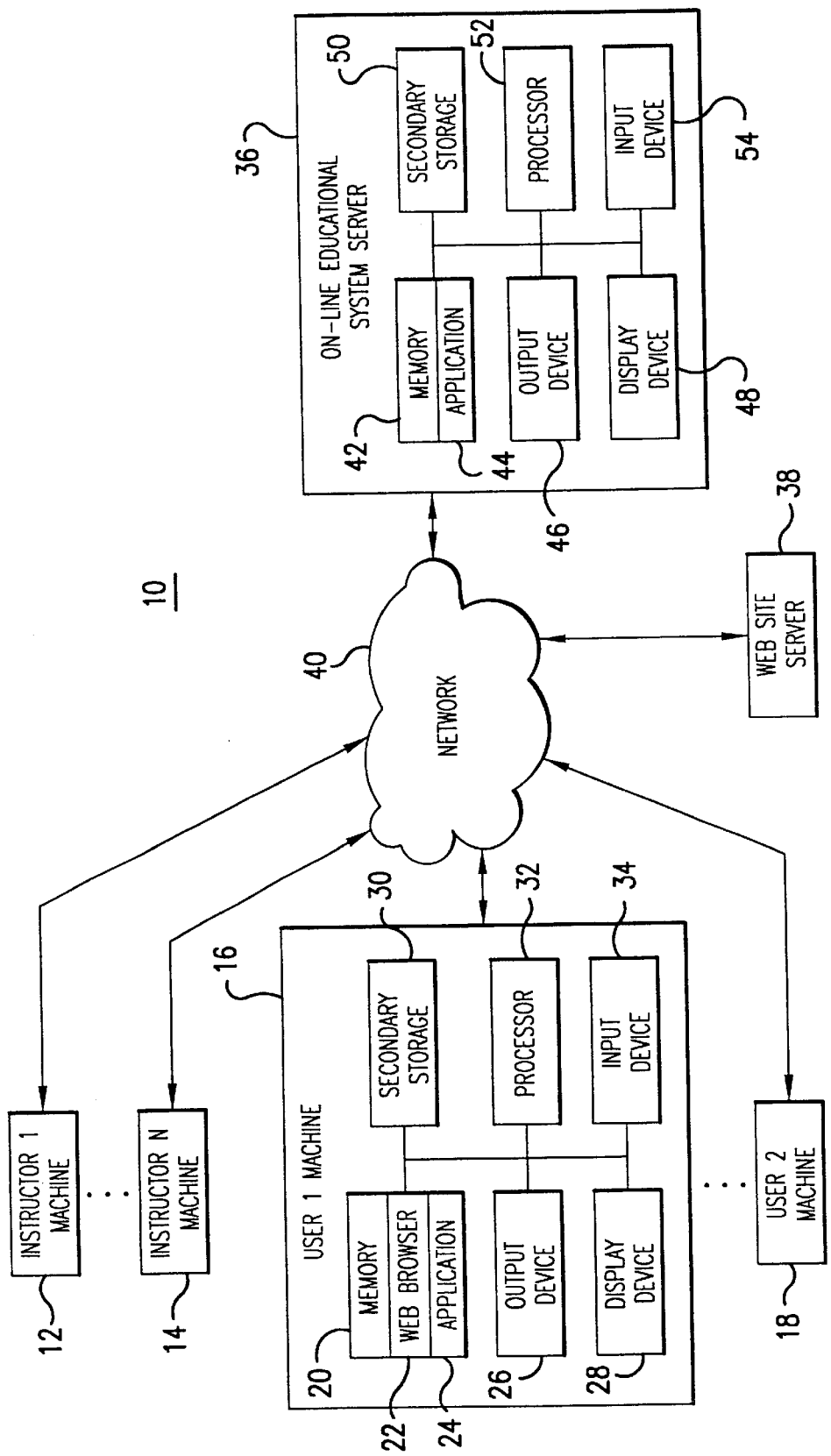
FIG. 1 is a block diagram of an on-line educational system.

An on-line educational system provides for participation in on-line educational courses. Instructors build an educational course using an application referred to as a course manager in order to generate an electronic syllabus. Examples of an electronic syllabus are provided below, and the term "electronic syllabus" refers to information electronically accessible and providing an indication of content for an on-line course or an indication of assignments for an on-line course.

The system posts the syllabus for the course on-line. Users participating in the course use web browsers or other applications on their computers to view the syllabus and participate in the on-line course. The users interact with the instructor and other users in the course, and they submit information on-line, such as completion of assignments. They also take exams on-line and receive grade information on-line for the exams or completion of the assignments.

The term "system" is used to refer to an on-line educational system, an example of which is described in the present specification. The term "database" is used to refer to a data structure for storing information for use by the system, and an example of such a data structure in described in the present specification. The term "user" refers to a person participating in an online course, and the term "instructor" refers to a person teaching or otherwise providing content or instruction for an on-line course. A person may be both a user and an instructor. The term "assignments" refers to work to be completed by a user for an on-line course, and examples of assignments are provided below. Assignments may include work to be completed by a user without requiring responsive information sent to an instructor, and they may also include work to be completed by a user requiring responsive information. Assignments may also include or use learning tools.

The on-line system removes geographical and time-based boundaries for educational courses. The users may log on to the system from any location having Internet or other network access in order to participate in the course. They may typically use the system at any time of the day in order to obtain assignments, complete the assignments, take exams on-line, and participate in on-line realtime and non-realtime discussions. Likewise, instructors may use the system from any location accessible to the Internet or other network, and at any time, in order to post assignments on-line, grade completion of assignments, and interact on-line with users in realtime or non-realtime.

The on-line educational system also increases options and tools for teaching courses and participating in the courses. Instructors may provide traditional lectures in the form of recorded video or audio information provided on-line to users, and may also provide traditional reading assignments by posting documents on-line for the users. In addition, they may provide many other types of teaching through computer-based tools. They may participate in on-line real-time discussions with users in an on-line chat room. They may interact with users in non-realtime discussions by posting topics for discussion and later posting comments on the discussion. By posting hypertext links, they may direct users to content on the Internet for research related to an educational course. Electronic journals permit users to enter information such as text related to the course, and an instructor can access the journal to review and comment on the information. Instructors and users can send e-mail messages to others in the course.

The use of multimedia content provides for additional teaching tools. Instead of viewing only static information, users may view multimedia content and potentially interact with it. Therefore, the terms "information," "message," "content," and "materials" may include a wide variety of types of information such as, for example, video, audio, graphics, text, animations, multimedia, computer simulations, slide shows, and images; it may also include combinations of such information.

The system also permits electronic administrative functions. Users through their computers can electronically enroll in courses, pay tuition, inquire about financial aid, obtain technical support, obtain transcripts, purchase text books, and visit an on-line library.

Figure 3A:
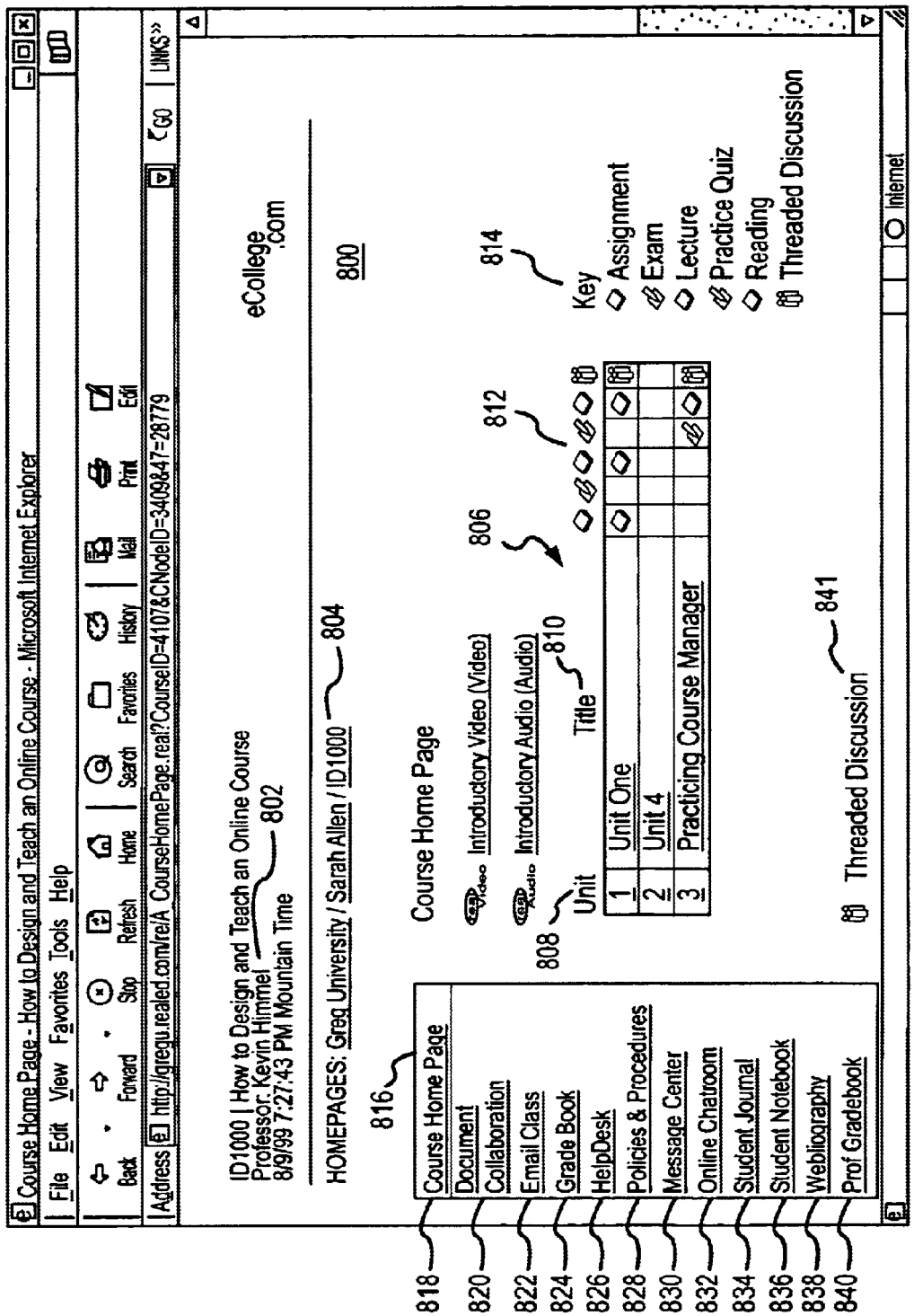
FIGS. 3A–3X are diagrams of screens permitting instructors, users, and others to interact with an on-line educational system.
Figure 3B:
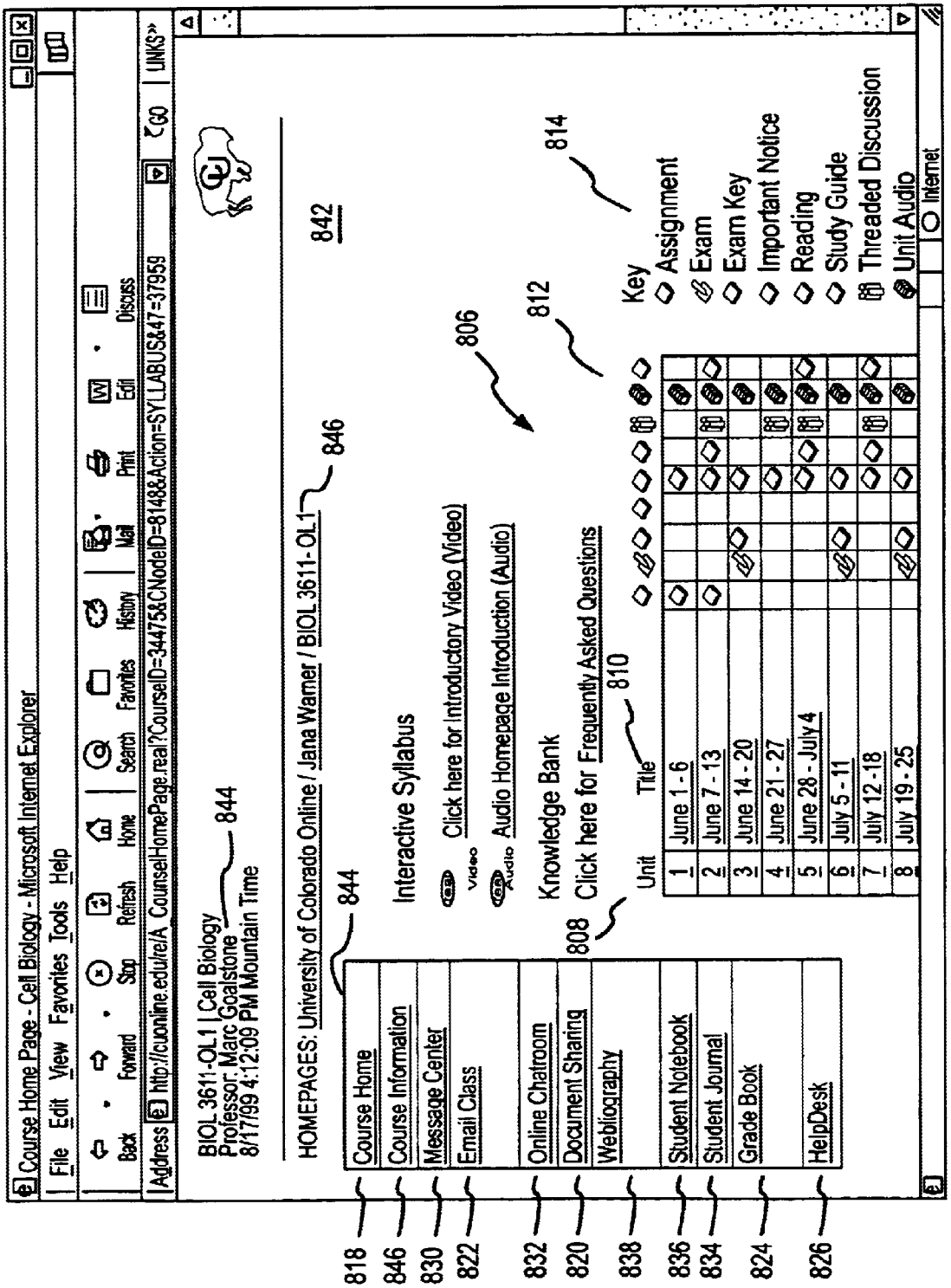
FIG. 3B is a diagram of a home page screen for a user.

The system uses, for example, a relational database supporting screens through which users and instructors interact with the system. FIGS. 3A–3X are screens illustrating how users and instructors may interact with the system, and these screens may be displayed on display devices associated with the users' and instructors' computers. The term "screen" refers to any visual element or combinations of visual elements for displaying information; examples include, but are not limited to, user interfaces on a display device or information displayed in web pages or in windows on a display device. The screens may be formatted, for example, as web pages in HyperText Markup Language (HTML), or in any other suitable form for presentation on a display device depending upon applications used by instructors and users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by a using a cursor-control device to "click on" or "double click on" the section; alternatively, sections may be selected by entering a series of key strokes or in other ways such as through voice commands or use of a touch screen. In addition, although the screens shown in FIGS. 3A–3X illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

The processing to support the screens in FIGS. 3A–3X is shown in the flow charts of FIGS. 1A–1M. The processing may be implemented in software, such as software modules, for execution by computers or other machines. The exemplary database structure to store information received through the screens and to display information in the screens is shown in the database map of FIGS. 2A–2R, which illustrate a relational database structure providing a particular arrangement of tables and associations between them. FIG. 2 illustrates arrangement of FIGS. 2A–2R for the database map. Appendix A contains a data element dictionary explaining the structure of the relational database shown in FIGS. 2A–2R. FIG. 1 illustrates exemplary hardware components to implement the system processing, screens, and database structure.

On-line System

FIG. 1 illustrates an exemplary system 10 for implementing an on-line educational system. System 10 includes instructor machines 12 and 14 connected with a network 40 such as the Internet or other network such as any wide-area or local-area network. Instructors at instructor machines 12 and 14 may enter information to build and develop an on-line educational course and provide teaching for the course through interaction with their machines and a server 36. User machines 16 and 18 are also connected with network 40. Users or students at user machines 16 and 18 interact with one or more instructors at instructor machines 12 and 14, with users at other user machines, and with server 36 in order to participate in one or more on-line educational courses.

Server 36 is connected with network 40 and may be used by instructor machines 12 and 14, and user machines 16 and 18, to store information for educational courses and provide content or other information for the courses. System 10 may also include the ability to access one or more web site servers 38 in order to obtain content from the World Wide Web for use with educational courses. Only two instructor machines and user machines are shown for illustrative purposes only; system 10 may include many instructor machines and user machines and may be scalable to add or delete instructor or user machines to or from the network.

User machine 16 illustrates typical components of a user or instructor machine. User machine 16 typically includes a memory 20, a secondary storage device 30, a processor 32, an input device 34, a display device 28, and an output device 26. Memory 20 may include random access memory (RAM) or similar types of memory, and it may store one or more applications 24, and a web browser 22, for execution by processor 32. Secondary storage device 30 may include a hard disk drive, floppy disk drive, CD-ROM drive, or other types of non-volatile data storage. Processor 32 may execute applications or programs stored in memory 20 or secondary storage 30, or received from the Internet or other network 40. Input device 34 may include any device for entering information into machine 16, such as a microphone, digital camera, video recorder or camcorder, keyboard, cursor-control device, or touch-screen. Display device 28 may include any type of device for presenting visual information such as, for example, a computer monitor or flat-screen display. Output device 26 may include any type of device for presenting a hard copy of information, such as a printer, and other types of output devices include speakers or any device for providing information in audio form.

Web browser 22 is used to access information for an on-line educational course and display it in web pages, and examples of those pages are shown in the screens provided in FIGS. 3A–3X. Examples of web browsers include the Netscape Navigator program and the Microsoft Internet Explorer program. Any web browser or other application capable of retrieving content from a network and displaying pages or screens may be used.

Instructor machines 12 and 14, and user machine 18, may include the same components as user machine 16. Therefore, examples of user or instructor machines for interacting with an on-line educational system include personal computers, laptop computers, notebook computers, palm top computers, network computers, or any processor-controlled device capable of executing a web browser or other type of application for interacting with the system.

Server 36 typically includes a memory 42, a secondary storage device 50, a processor 52, an input device 54, a display device 48, and an output device 46. Memory 42 may include random access memory (RAM) or similar types of memory, and it may store one or more applications 44 for execution by processor 32. Secondary storage device 50 may include a hard disk drive, floppy disk drive, CD-ROM drive, or other types of non-volatile data storage. Processor 52 may execute one or more applications or programs stored in memory 42 or secondary storage 50, or received from the Internet or other network 40. Input device 54 may include any device for entering information into server 36, such as a microphone, digital camera, video recorder or camcorder, keyboard, cursor-control device, or touch-screen. Display device 48 may include any type of device for presenting visual information such as, for example, a computer monitor or flat-screen display. Output device 46 may include any type of device for presenting a hard copy of information, such as a printer, and other types of output devices include speakers or any device for providing information in audio form.

Server 36 stores a database structure in secondary storage 50, for example, for storing and maintaining information for on-line educational courses. An example of that database structure is the relational database shown in FIGS. 2A–2R. Although a relational database is shown, other types of database structures may be used, such as an object-oriented database. Processor 52 may execute one or more applications 44 in order to provide the functions shown in the flow charts of FIGS. 1A–1M and to provide the web pages shown in the screens of FIGS. 3A–3X. Although only one server is shown, system 10 may use multiple servers as necessary or desired to support the users and instructors and may also use back-up or redundant servers to prevent network downtime in the event of a failure of a particular server.

Examples of servers include, but are not limited to, Intel-based Hewlett-Packard servers configured into clusters, or a clone utilizing Intel processors and motherboards. Examples of systems for implementing and managing the relational database of FIGS. 2A–2R include, but are not limited to, the Microsoft SQL server and storage products by I.I.S. Intelligent Information Systems Limited.

Although machines 16 and server 36 are depicted with various components, one skilled in the art will appreciate that these machines and the server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as machine 16 and server 36, to perform a particular method.

Home Page

Figure 1A:
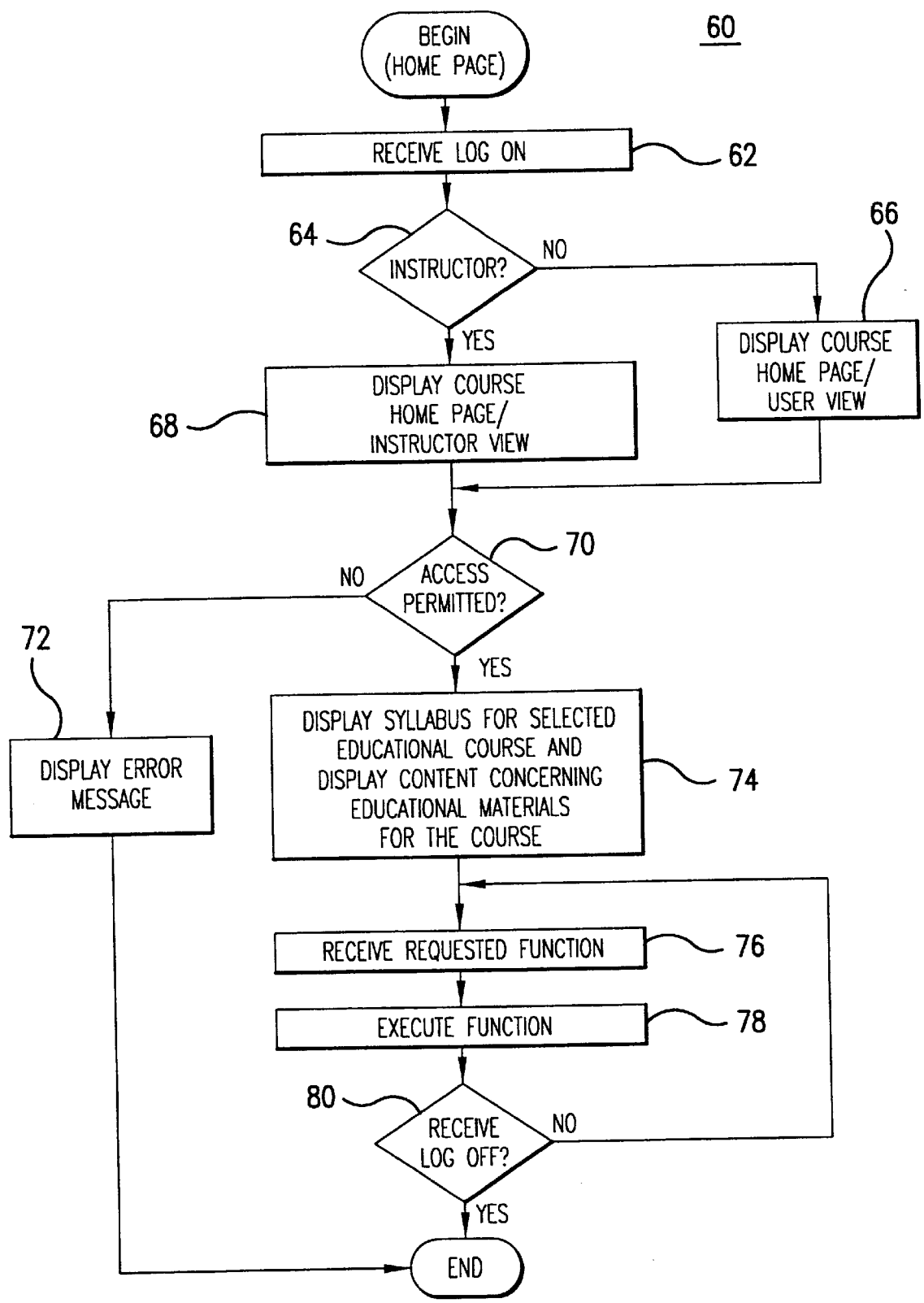

FIG. 1A is a flow chart of a home page method 60 for an on-line educational system. FIG. 3A is a diagram of a home page screen 800 for an instructor, and FIG. 3B is a diagram of a home page screen 842 for a user, both of which support home page method 60.

As shown in FIG. 3A, home page screen 800 includes an identification 802 of an instructor, and identification of users 804 enrolled in a particular course. A syllabus section 806 specifies an on-line electronic syllabus, and it identifies units in a units section 808 for a particular course, titles in a titles section 810 for the units, and assignments or content in a content section 812 for the units. A key section 814 identifies the type of content or assignments in content section 812; as shown, key section 814 may use icons or other symbols for identifying the assignments or content for particular units in units section 808. Content identified in content section 812 may provide an indication of educational materials, possibly including assignments, for a course. The indication may be provided in a number of ways such as through use of icons, as shown, or alternatively by displayed text, links, graphics, multimedia, or any type of displayed information. Also, the indication need not be in the electronic syllabus as shown; it may alternatively be provided elsewhere on a particular screen. Although an electronic syllabus is shown in syllabus section 806, an electronic syllabus may be accessed and presented in other ways such as, for example, through selection of a icon, in one or more pull-down menus, within a displayed window, or in a separate screen.

An index section 816 permits an instructor or other person to select other screens and functions by selecting the appropriate link. For example, index section 816 includes the following selections, all which are further explained below.

A course home page selection 818 provides a typical starting or home page for viewing upon logging on by an instructor. A document collaboration selection 820 provides for document sharing or collaboration, which involves the ability of users and instructors to exchange documents and include messages when exchanging the documents. An e-mail class selection 822 provides for the ability to send e-mail messages to other users or instructors or both.

A gradebook selection 824 provides for access to an on-line gradebook, which is a screen accessible on-line and providing grade information. The gradebook includes a user view in which users view only grade information for their respective assignments. The term "grade information" refers to information relating to an instructor's or other person's evaluation of completion of assignments by users or other information submitted by users as part of an on-line course. Grade information may include, but is not limited to, comments, evaluations, letter grades, points, and scores. Grade information may include or incorporate any of the types of information identified above.

A message center selection 830 provides for the capability to send messages to users. In particular, the term "message center" refers to a screen available to administrative or other authorized persons permitting them to electronically send messages to users for particular courses at a course-level or to users for multiple courses at a university-level.

An on-line chat room selection 832 provides for users and instructors to interact in a chat room. The term "chat room" refers to a screen in which a group of users and/or instructors may electronically post messages for viewing in realtime by other members of the group.

A user journal selection 834 provides the ability of users to store information concerning assignments for viewing by an instructor. Thus a journal (or user journal) is an area in which a user may electronically store information concerning the assignments or related to a course, the information being electronically accessible to an instructor so that the instructor may view the information and potentially include comments about it. The journal typically includes textual information; however, a user may enter any type of information identified above for viewing by an instructor.

A notebook selection 836 provides users to access areas in which they may electronically enter information such as notes concerning a course. A notebook feature is similar to the journal except that the notebook is intended, for example, as an area where users may keep notes or other information for their own purposes and not necessarily for viewing by the instructor.

A webliography selection 838 provides a webliography feature. This feature, as explained below, permits users and instructors to save links to information concerning particular topics. It essentially involves a way for users and instructors to collectively compile research or other information.

An instructor gradebook selection 840 provides access to an instructor view of the gradebook by instructors or others granted access to it. This view provides grade information for all users in a particular course. In addition, instructors may enter grade information in the gradebook for viewing by the users who submitted completion of assignments to the instructor for a particular course.

A threaded discussion selection 841 provides access to a threaded discussion feature. This feature permits non-realtime discussion of topics. An instructor may enter a topic for discussion, and users may enter comments about the topic in non-realtime for further comment by other users or the instructor.

Index section 816 also includes a help desk selection 826 and a policies and procedures selection 828. Help desk selection 826 may provide a on-line connection with a help desk for receiving technical or other assistance in using the system. Policies and procedures selection 828 may provide information concerning policies governing use of the system or procedures for using the system.

FIG. 3B is a diagram of a home page screen 842 for a user. Home page screen 842 includes an identification 844 of an instructor for a particular course, and an identification 846 for a user and course. Home page screen 842 also includes syllabus section 806 with units in units section 808, titles in titles section 810, and assignments or content in content section 812 for a particular educational course, as shown also in home page screen 800. The content of syllabus section 806 may change depending upon each particular course. Home page screen 842 also includes an index section 844 having selections as identified above in index section 816, except that home page screen 842 may not necessarily have all selections available to instructors. For example, as shown, index section 844 does not include an instructor gradebook selection 840 so that users do not have access to grade information of other users. Home page screen 842 may also include a threaded discussion selection 841. Selections available to instructors and users may vary depending upon particular system requirements.

In method 60 (FIG. 1A), the system receives a log-on request by a user (step 62). The log-on request may include, for example, a user's or instructor's name or other identifying information along with an optional password. The system determines if the log-on is from an instructor or from a user, which may be determined by comparing information in the log-on request with information the database identifying authorized users and instructors (step 64). If an instructor logs on, the system displays an instructor view of a course home page such as home page screen 800 (step 68). Otherwise, the system displays a user view of a course home page such as home page screen 842 (step 66). The home page is typically presented in a web browser on a user or instructor machine and constitutes a main page for an on-line educational system from which a user or instructor may execute various functions.

The system determines if the instructor user is permitted access to the on-line educational system (step 70). If access if not permitted, the system may display an error message (step 72). Otherwise, if the instructor or user is permitted access, the system displays an electronic syllabus in syllabus section 806 for a selected educational course and also displays an indication of content concerning educational materials for the course (step 74). The system may optionally permit unlimited access, or permit any user to access the syllabus but restrict access to other online content. Also, the system may alternatively restrict access at an instructor's or user's request 20 to log on to the system. Information stored in the database, as identified in the data element dictionary provided in Appendix A, may be used to restrict access to particular items in the system such as the electronic syllabus or portions of it.

The system then receives a requested function or feature by the user or instructor (step 76). The system executes the function (step 78). The system continually executes functions entered by the user or instructor as they interact with the system until it detects a log-off request (step 80). Upon receiving the log-off, the system may close the course home page. Since the system uses a relational database, for example, an instructor or user may interact with the system in a variety of different ways. FIGS. 1B–M illustrate various functions that the system may execute upon request by an instructor or user.

Document Sharing

A document sharing feature of the on-line educational system permits users to provide a document to an instructor. The educational system includes providing on-line content concerning educational materials for a particular educational course, and providing on-line an electronic syllabus for the educational course. The apparatus receives an education-related document from a particular one of the users and associates a message with the document based upon information entered by the particular user. The apparatus stores the document with the message for accessibility by the instructor. An education-related document is any document used as part of an on-line course.

Another document sharing feature of the on-line educational system permits an instructor to provide a document to users. The educational system includes providing on-line content concerning educational materials for a particular educational course, and providing on-line an electronic syllabus for the educational course. The apparatus receives an education-related document from the instructor along with an identification of a particular one of the users as an intended recipient of the document, and it associates a message with the document based upon information entered by the instructor. The apparatus stores the document with the message for accessibility by the particular user.

The document sharing features may include additional aspects. They may notify the instructor or the particular user of the document. They may also display an identification of the document and an indication of a source of the document, such as a name of the user or instructor who posted the document. The received document may include text, audio, video, graphics, or multimedia information. The apparatus may also receive a command related to manipulation of the document and execute the command. The commands may include, for example, sorting the received document or restricting particular access to it.

A document sharing screen electronically displays information for use by users in sharing a document in the on-line educational system. The screen includes an index section for selecting a home page screen having a content section identifying on-line content concerning educational materials for a particular educational course and having a syllabus section for providing an electronic syllabus for the educational course. A receive section in the screen receives an education-related document from a particular one of the users and associates a message with the document based upon information entered by the particular user. A store section in the screen indicates storage of the document with the message for accessibility by an intended recipient of the document. The document sharing screen may also include a notify section for use in notifying the intended recipient of the document when the screen is accessed by the intended recipient.

Figure 3C:
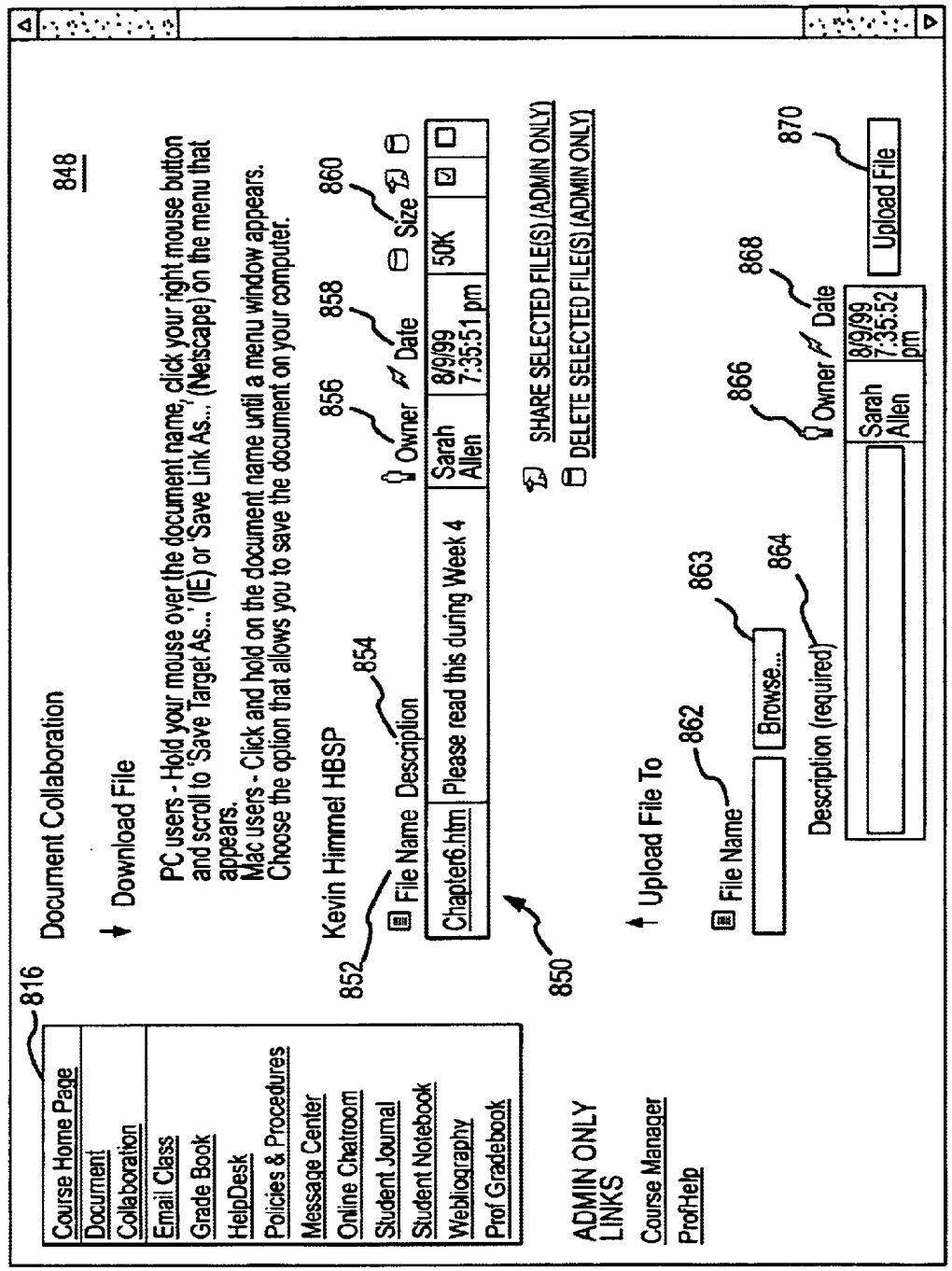
FIG. 3C is a diagram of a document sharing screen.

FIG. 3C is a diagram providing an example of a document sharing screen 848. Document sharing screen 848 has index section 816 as explained above. It also include a store or notify section 850 for providing an indication of and downloading a document to be shared. Store section 850 includes a name section 852 identifying the document or file name, a message section 854 specifying a message for the document, a section 856 identifying the sender or source of the document, a date section 858 identifying a date of posting the document, and a section 860 identifying the document size. Document sharing screen 848 also includes sections for sharing a document, including a receive section 862 for identifying a document or file to be shared, a browse section 863 for use in identifying a document or file to be shared, a message section 864 for entering a message for the document, a section 866 specifying the originator of the document, and a date section 868 specifying a date for the document. By selecting upload section 870, the user posts the document for sharing with an intended recipient. The intended recipient is the user who shared the document identified in section 850, or a user may enter identification of an intended recipient.

Figure 1B:
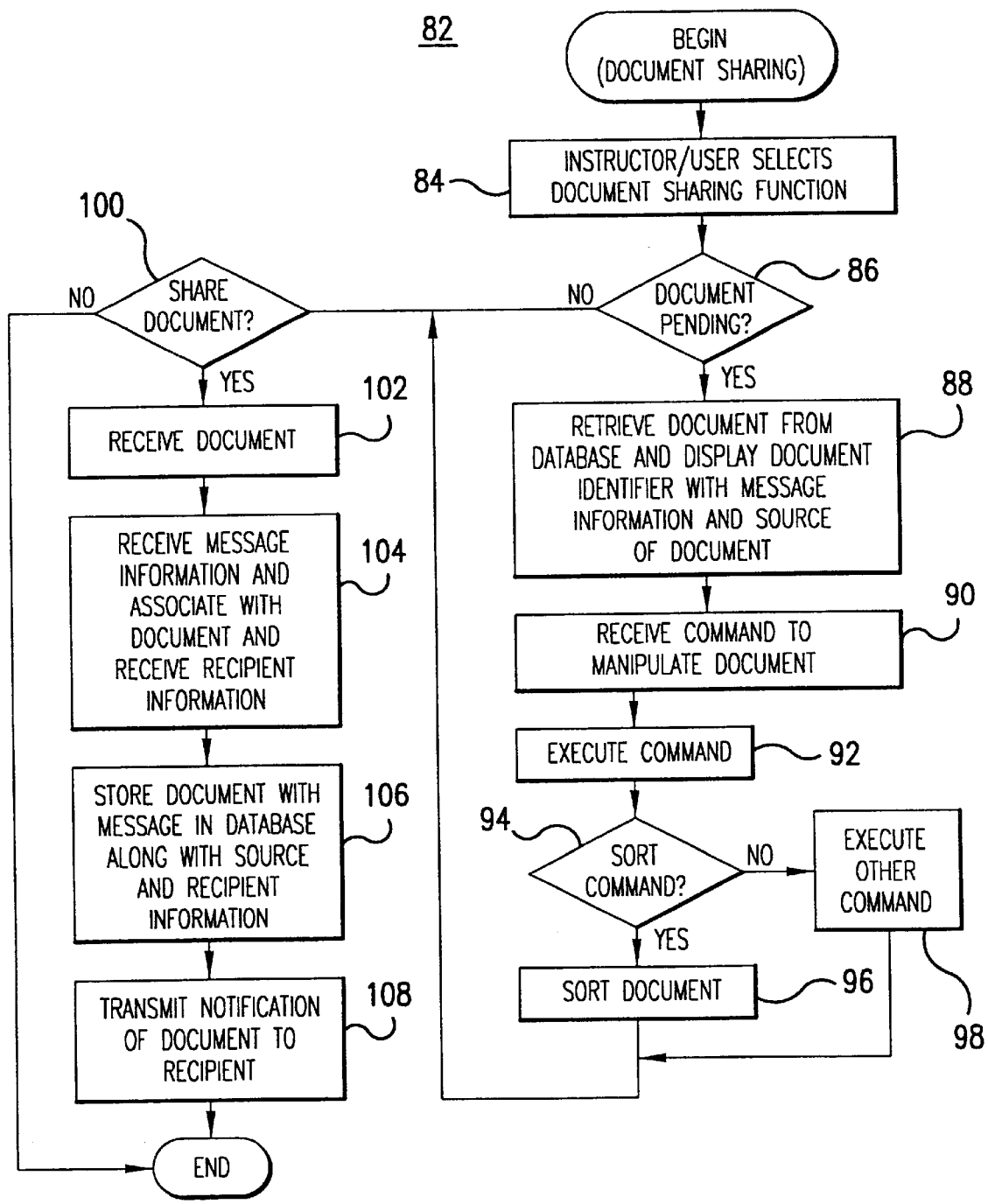

FIG. 1B is a flow chart of a document sharing method 82, using document sharing screen 848, for an on-line educational system. Document sharing method 82 may use at least the Table 690 in the database. Document sharing permits an instructor and user to share documents relating to an on-line educational course. An instructor or user selects document sharing selection 820 from the home page (step 84). The system determines if a document is pending for the instructor or user (step 86). If a document is pending, the system retrieves the document from the database and displays a document identifier such as is shown in store section 850 with any 20 message information and the source of the document such as is shown in message section 854 and section 856 (step 88). The source of the document is an identification of the user or instructor who provided it for sharing or collaboration. The document identifier may be represented by an icon or other information for selection by the instructor or user. The source of the document typically constitutes the identification of the instructor or user who stored the document for sharing.

The system may then receive a command by the instructor or user to manipulate the document (step 90). The system executes the command and determines if it is a sort command (steps 92 and 94). If it is a sort command, the system sorts the document (step 96). Sorting may include organizing the document among a plurality of stored or shared documents according to particular criteria, such as alphabetizing them. Otherwise, the system executes the other command entered (step 98). Other commands may include, for example, opening the document. In addition, a user or instructor may locally store the document.

The system also determines if the instructor or user desires to share a document (step 100). The system receives the document or an identification of it in receive section 862 (step 102). A user or instructor may identify a document or file to be shared by selecting browse section 863, which may display a section or window listing files such as files saved by the user or instructor who desires to share a document. The user or instructor may then select a displayed document using a conventional open document command, for example, after which a path to the storage location of the selected document appears in receive section 862.

The system also receives any message information in message section 864 such as is shown in message section 854 and associates the message information with the document (step 104). The user or instructor may enter message information in message section 864 by entering a text message using a keyboard or by entering any other type of information using an input device; message section 864 may contain the actual message or an indication of it. The message may be associated with the document in a number of ways. It may be incorporated in the document, attached to the document, stored with the document, identified by a link or address, or identified in connection with the document.

The system also receives recipient information identifying the instructor or user with whom the document is to be shared (step 104). The recipient information may by default be the instructor and all users for the course; alternatively, a recipient information may be selected from a menu or section listing users and instructors in the course, or the recipient may be the user or instructor who shared a previous document as identified in section 856.

The system stores the document with the message information in the database along with source and recipient information (step 106). As the system knows the identification of the instructor or user who entered the document, the system may associate that information with the document or document identifier. The system receives the share request through selection of upload section 870, and it transmits the identification of the document to the recipient(s) so that the recipient(s) may detect when the document is pending (step 108).

E-mail Class

Figure 3D:
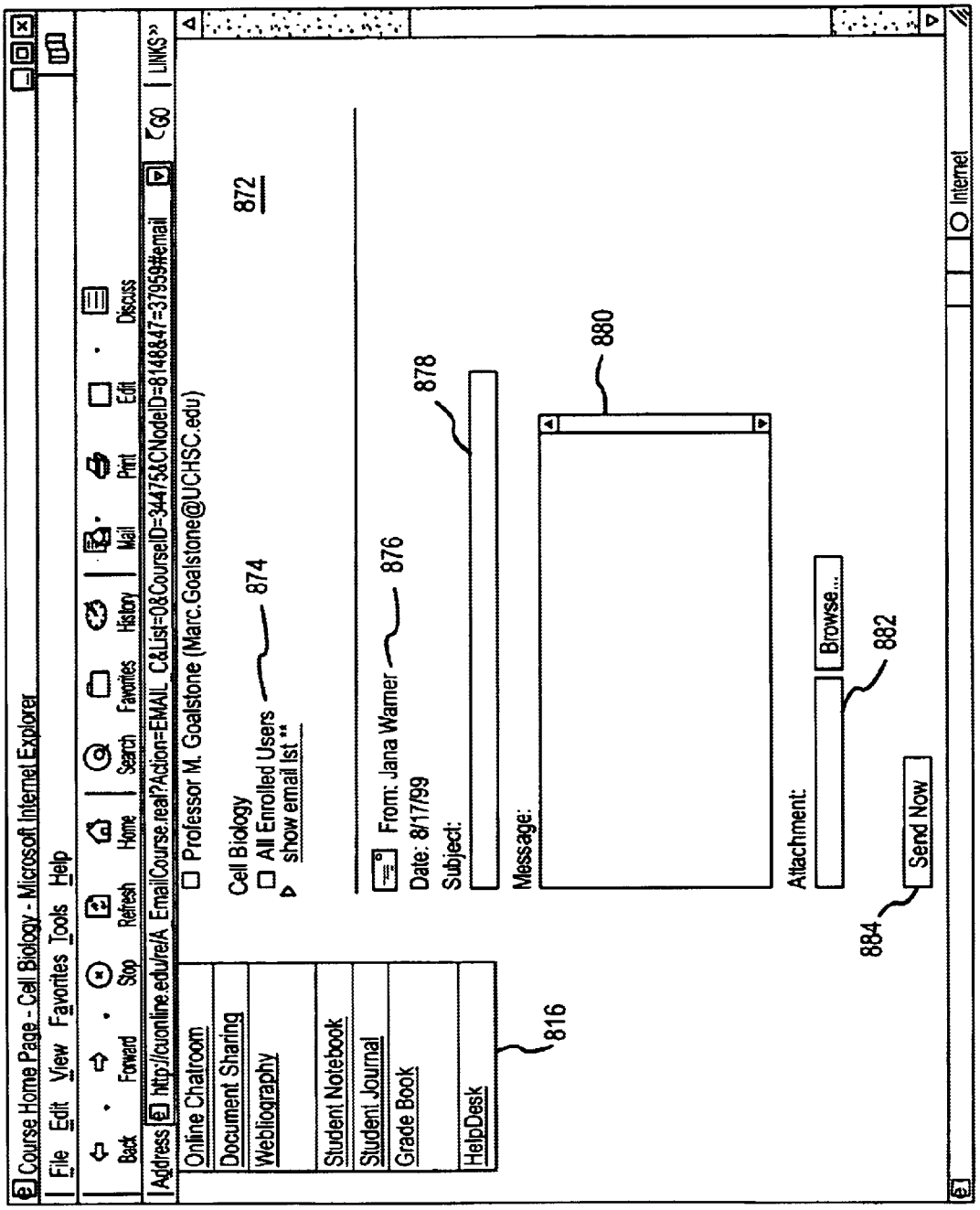
FIG. 3D is a diagram of an e-mail class screen.

FIG. 3D is a diagram of an e-mail class screen 872. E-mail class screen 872 includes index section 816 as described above and also includes sections for typical e-mail functions. In particular, e-mail class screen 872 includes a section 874 for identifying intended recipients of an e-mail message such as all users for a particular course or selected users identified by retrieving a menu listing the users. E-mail class screen 872 also includes a section 876 identifying the sender of the e-mail message. The sender may use a subject section 878 to enter a subject for the e-mail message, a message section 880 to enter the message, and an attachment section 882 to identify an attached file. By selecting a send section 884, the system sends the e-mail message, if required information was entered.

Figure 1C:
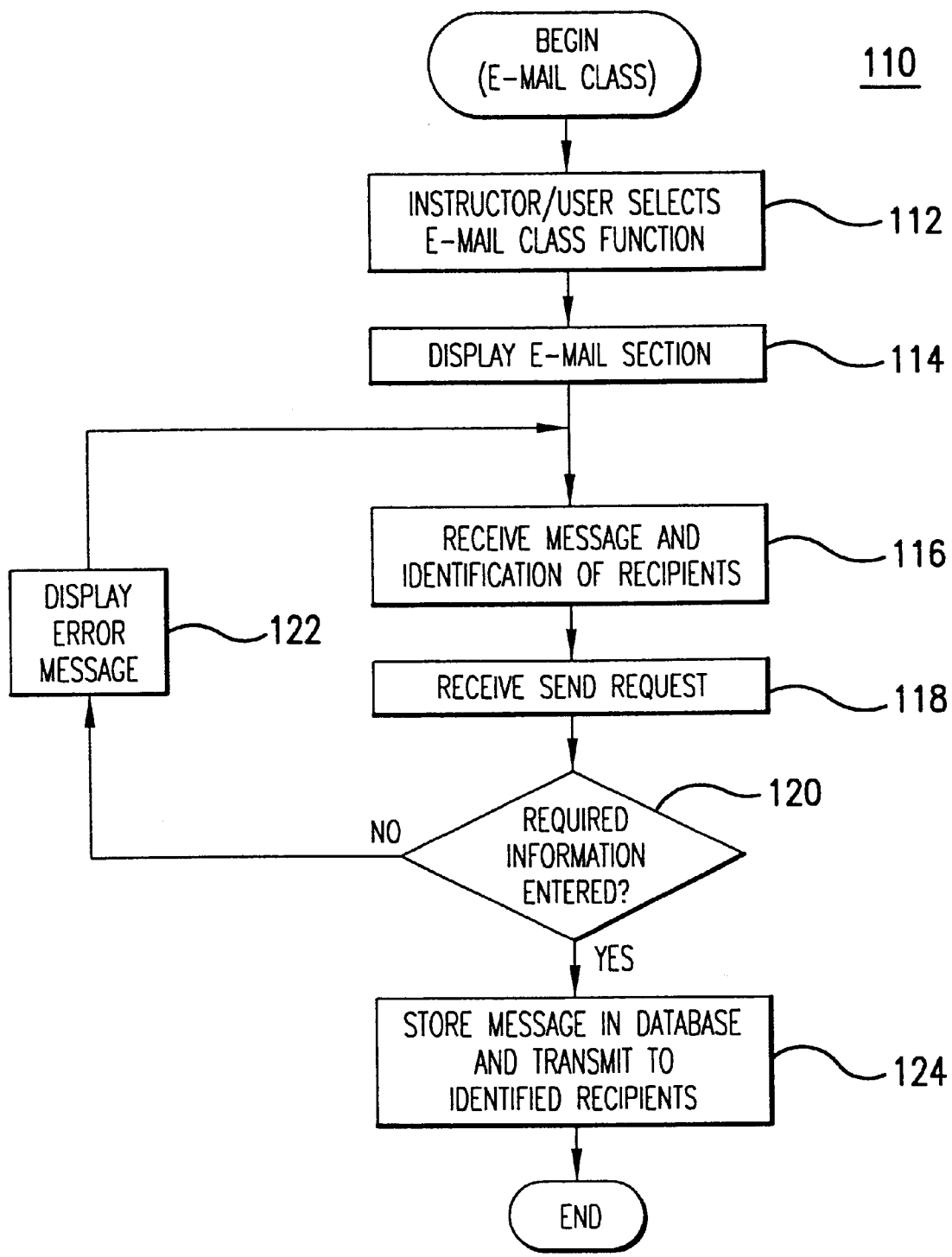

FIG. 1C is a flow chart of an e-mail class method 110, using e-mail class screen 872, for an on-line educational system. E-mail class method 110 may use at least Tables 542 and 598 in the database. In method 110, the system detects that the instructor or user selects e-mail class selection 822 in the course home page (step 112). The system displays an e-mail section such as screen 872, permitting the user or instructor to enter an e-mail message in subject section 878 and message section 880, along with the intended recipient (s) in section 874 (step 114). The system receives message information and identification of a recipient, possibly with an attachment identified in attachment section 882 (step 116). It also receives a send request by selection of send section 884 (step 118).

The system determines if the required information is entered such as identification of at least one recipient (step 120); if not, it may display an error message (step 122) and allow the user or instructor to enter the required information. Otherwise, the system stores the message in the database and transmits the identification of the message to the recipients (step 124). The recipients may thus upon logging onto the system detect that a message is pending for them.

On-line Gradebook

An on-line gradebook feature of the on-line educational system permits instructor posting of and users' access to on-line grade information. The educational system includes providing on-line content concerning educational materials for a particular educational course, and providing on-line an electronic syllabus for the educational course. The apparatus receives from the instructor grade information relating to users' assignments for the educational course and posts the grade information in an on-line gradebook.

The on-line gradebook feature may include other aspects as well. For example, it may permit each user to access the on-line gradebook and restrict each user's access of information in the on-line gradebook to information corresponding to each particular user's completion of the assignments. The on-line gradebook also may selectively restrict each user's access to the grade information concerning each particular user's completion of the assignments. The gradebook may also be presented in varying types of views on a display device. An instructor view of the on-line gradebook provides the instructor with access to the grade information for all of the users. A user view provides each user the access to their particular grade information.

A gradebook screen electronically displays information for use by an instructor in providing an on-line gradebook in the on-line educational system. The screen includes an index section for selecting a home page screen having a content section identifying on-line content concerning educational materials for a particular educational course and having a syllabus section for providing an electronic syllabus for the educational course. A receive section in the screen receives from the instructor grade information relating to users' assignments for the educational course, and a gradebook section in the screen posts the grade information in an on-line gradebook.

The gradebook screen may also include a grade information section for permitting each user to access the on-line gradebook and for use in restricting each user's access of information in the on-line gradebook to information corresponding to their completion of the assignments.

FIG. 3E is a diagram providing an example of a gradebook screen 886 for an instructor. Gradebook screen 886 includes index section 816, in this example only including a selection to return to home page screen 800. Gradebook screen 886 also includes a user section 888 identifying users for a particular course. A gradebook section 890 permits an instructor to enter and post grade information for the users' assignments. In particular, each column in gradebook section 890 represents an assignment, as identified, and each row includes grade information for the assignments for a particular user. Gradebook screen 886 also includes a set up section 892 permitting the instructor to set up the gradebook by adding assignments and entries.

Figure 3F:
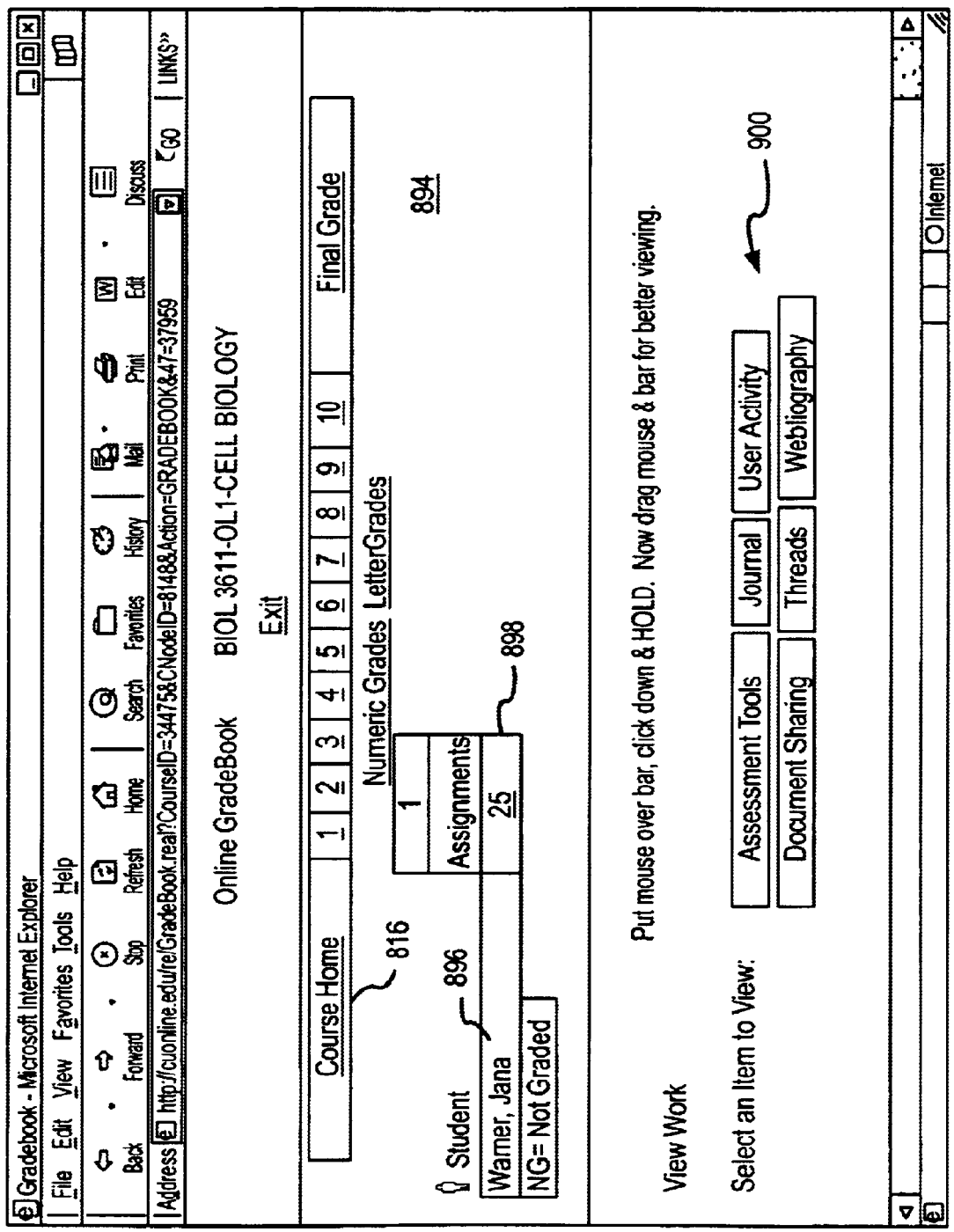
FIG. 3F is a diagram of a gradebook screen for a user.

FIG. 3F is a diagram of a user gradebook screen 894 for a particular user. Unlike gradebook screen 886 for an instructor, users typically only have access to grade information concerning their own completion of assignments. Therefore, user gradebook screen 894 includes a user section 896 identifying the particular user, and a grade information section 898 identifying grade information for the user's assignments. Although only one assignment is shown, grade information section 898 may identify multiple assignments and corresponding grade information. Sections 900 permits the user to select their work in other areas. Also, user gradebook screen 894 includes index section 816 for selection by the user to return to home page screen 842.

Figure 1D:
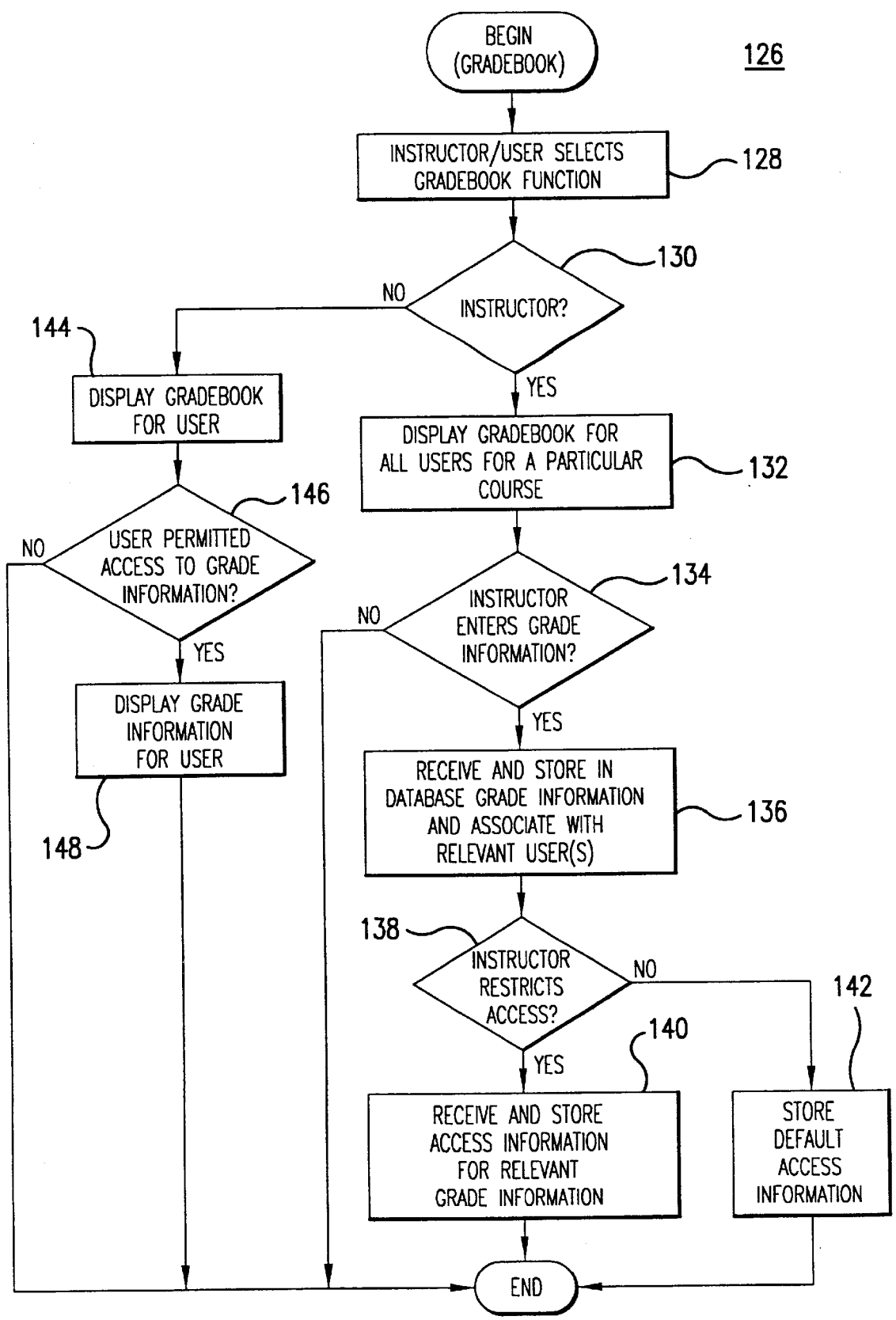

FIG. 1D is a flow chart of a gradebook method 126, using gradebook screen 886 and user gradebook screen 894, for an on-line educational system. Gradebook method 126 may use at least the following tables in the database: Tables 580, 612, 622, 642, 644, 646, 648, 650, 674, 678, and 684. In method 126, the instructor or user selects gradebook selection 824 or 840 in the course home pages (step 128). The system determines if an instructor selected the gradebook selection (step 130). If so, the system displays gradebook screen 886 for all users for a particular course (step 132).

The system detects whether the instructor enters grade information into the gradebook such as in gradebook section 890 (step 134). The grade information typically relates to user's completion of assignments for a particular educational course. Upon receiving grade information, the system receives and stores in the database grade information and associates it with the relevant users as shown in gradebook section 890 (step 136). By storing the grade information, the system posts the grade information in an on-line gradebook for access by users as shown in grade information section 898 for one particular user. The system also detects whether the instructor enters information restricting access to the grade information (step 138). If the instructor enters access information, the system receives and stores the access information for the relevant grade information and restricts access accordingly (step 142). Otherwise, the system may store default access information (step 142).

With access restrictions, an instructor may identify particular grade information for which access is restricted, and an instructor may want to restrict access during particular time periods of the course. The system may restrict the access by storing in the database an indication of the limitation on access associated with the restricted information. Default access may include, for example, providing users with access to the grade information for the completion of their assignments when it is posted by the instructor.

If a user had selected gradebook selection 824 (step 130), the system displays user gradebook screen 894 for the user (step 144). The system determines if the user is permitted access to the grade information (step 146). If permitted access, the system displays grade information for the particular user as shown in grade information section 898 (step 148). Grade information section 898 is typically configured to only retrieve and display grade information corresponding to the user accessing gradebook screen 894, and the system thus may restrict each user's access in gradebook screen 894 to only grade information concerning their own completion of assignments. If not permitted access, the system may selectively withhold from grade information section 898 the restricted information.

Message Center/Administrative Message Center

A course-level message center feature of the on-line educational system permits the posting of on-line messages to users for particular courses. The educational system includes providing on-line content concerning educational materials for a particular educational course, and providing on-line an electronic syllabus for the educational course. The apparatus receives a message concerning the educational course and posts an indication of the message for on-line accessibility of the message by the users.

An administrative message center feature of the on-line educational system permits the posting of messages to users for multiple courses. The educational system includes providing on-line content concerning educational materials for a plurality of educational courses, and providing on-line a plurality of electronic syllabuses for the educational courses. The apparatus receives a message concerning the plurality of educational courses and posts an indication of the message for on-line accessibility of the message by all of the users.

A message center screen electronically displays information for use in providing messages to users for the on-line educational system. The screen includes an index section for selecting a home page screen having a content section identifying on-line content concerning educational materials for a particular educational course and having a syllabus section for providing an electronic syllabus for the educational course. An input section in the screen receives a message concerning the educational course, and a message section in the screen posts an indication of the message for on-line accessibility of the message by the users.

Figure 3G:
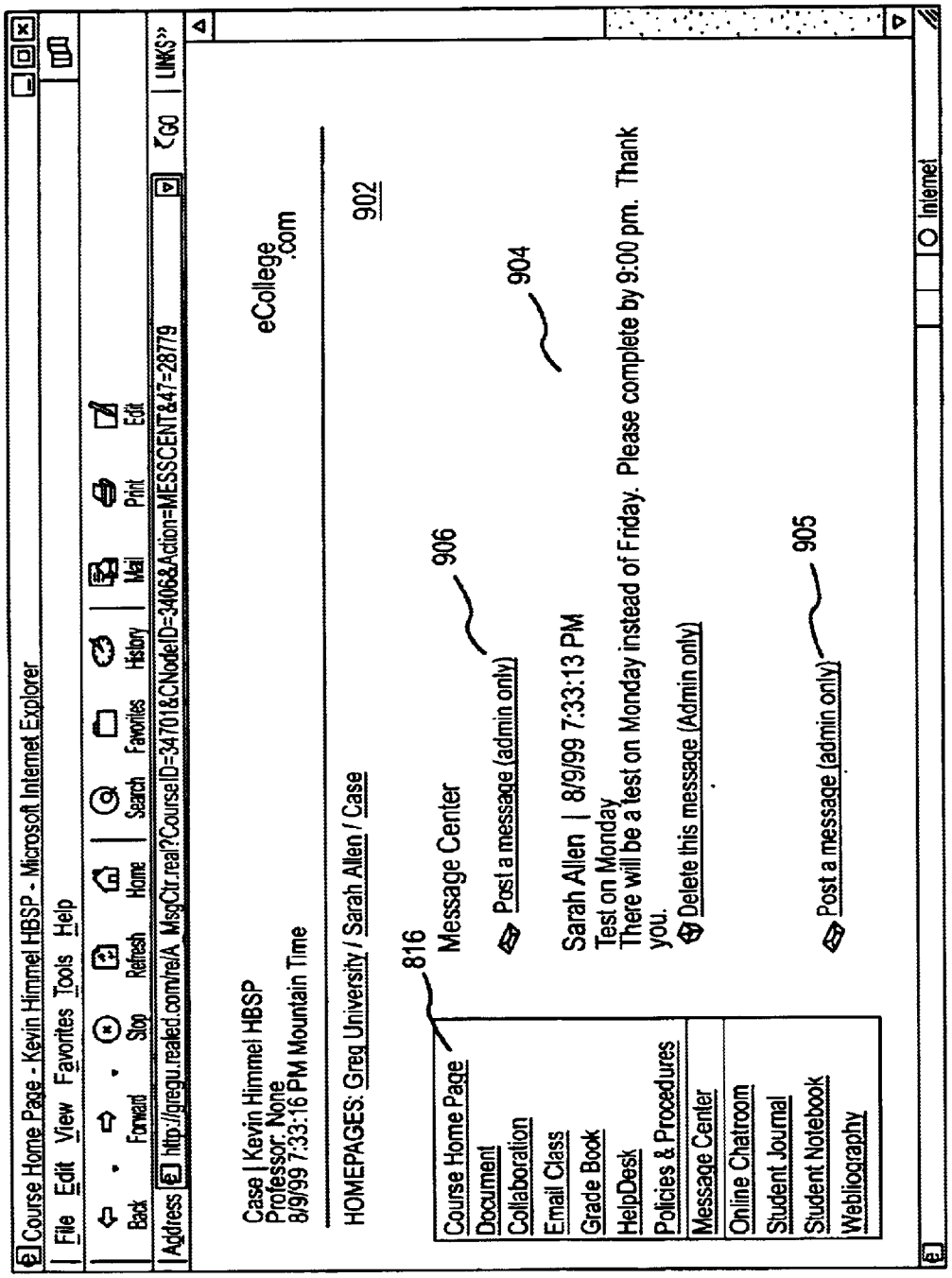
FIG. 3G is a diagram of a message center screen.

FIG. 3G is a diagram providing an example of a message center screen 902. Message center screen 902 includes index section 816 as explained above. Message center screen 902 also includes a message section 904 for a user to receive a message, and message section 904 may include an indication of a message for retrieval by the user or the actual message. A post section 906 permits posting of a message in the message center by those authorized to do so. The message center is typically used only by an instructor or an authorized administrative person post messages at a course-level for all or selected users in a course or at a university-level for all users in all courses or for selected users among selected courses.

Figure 1E:
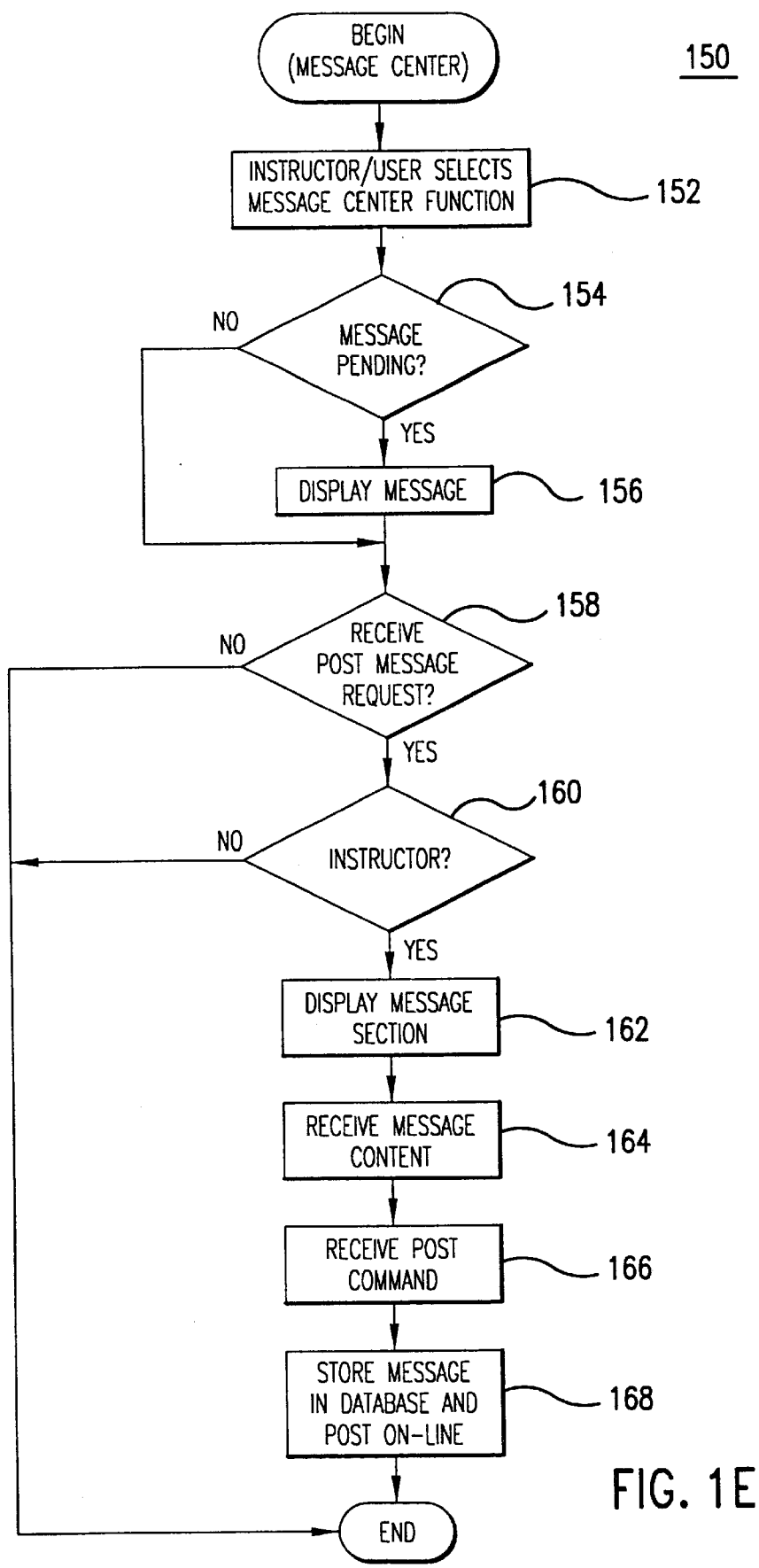

FIG. 1E is a flow chart of a message center method 150, using message center screen 902, for an on-line educational system. The message center permits posting of messages for users in a particular course or users among multiple courses. Message center method 150 may use at least Tables 542 and 598 in the database. In method 150, an instructor or user selects message center selection 830 in the course home page (step 152). The system determines if a message is pending (step 154) and, if so, if retrieves the message from the database and displays the message or an indication of it in message section 904 (step 156). The system determines if it receives a post message request through selection of post section 906 (step 158) and whether an instructor or other authorized person requested to post a message (step 160). The system may store in the database a list of authorized persons and compare an identification of the person requesting to post a message with the list in order to determine whether to allow the person to post a message.

In this exemplary embodiment, only instructors or other authorized persons are permitted to use the message center to post a message. However, users may optionally be provided access to that function as well. If an instructor or other authorized person requested to post a message, the system displays an input section, permitting the instructor to enter information for posting of a message (step 162). The input section may be similar to sections 874, 876, 878, and 880 in email screen 872, or it may be a section such as message section 904.

The system receives message content and the post message command (steps 164 and 166). It may receive the content for the message and identification of the recipients in the same manner as described with respect to sections 874, 876, 878, and 880 for sending an e-mail message. A command to post a message may be entered through selection of a post section 905. The system stores the message in the database and posts an indication of the message on-line for access by the users in the particular course or among multiple courses (step 168). The indication may include an icon or other identify, or it may include the message itself.

On-line Chat Room

Figure 3H:
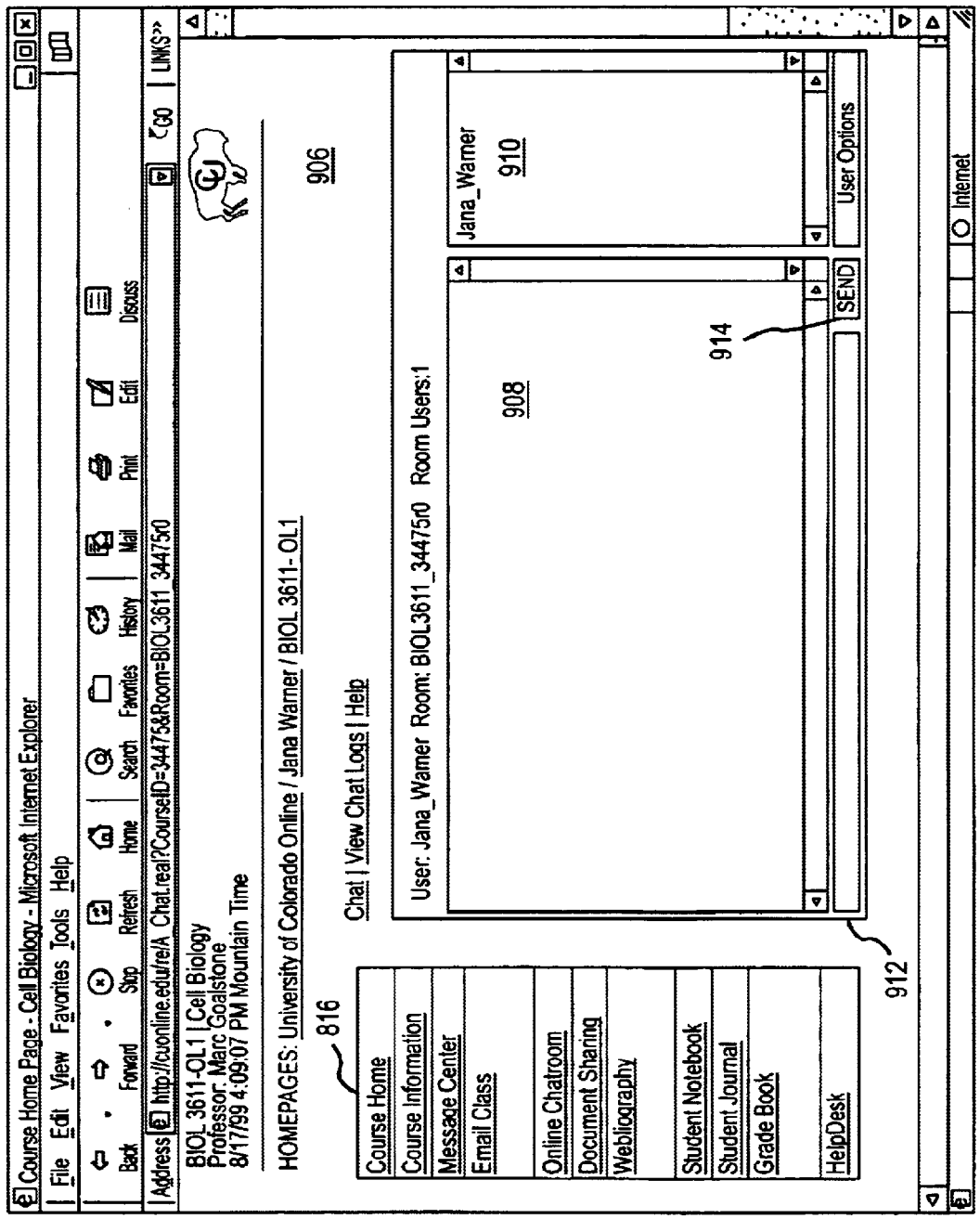
FIG. 3H is a diagram of a chat room screen.
Figure 31:
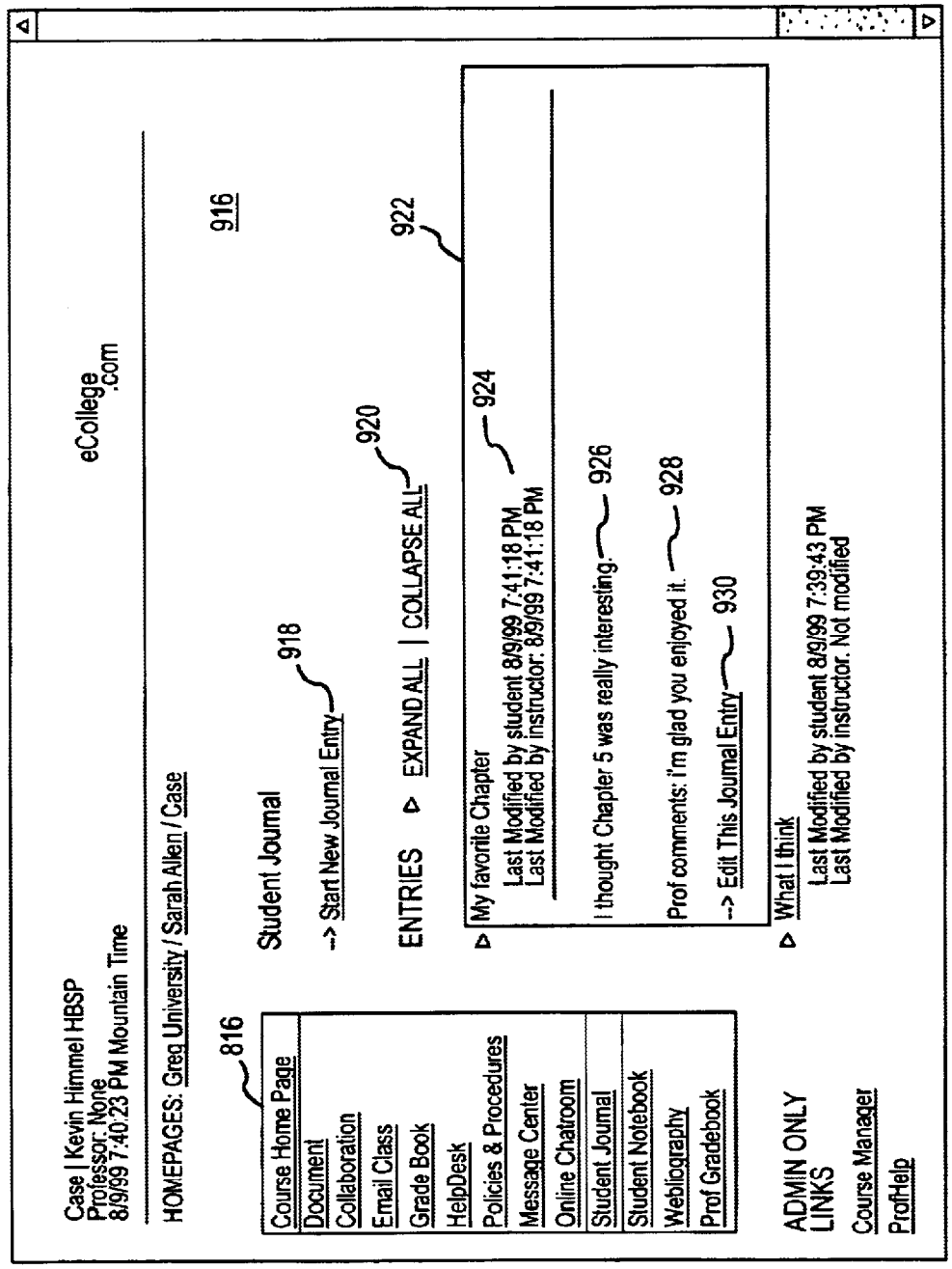

FIG. 3H is a diagram of a chat room screen 906. Chat room screen 906 has index section 816 as explained above. Chat room screen 906 also has a message section 908 for a user to view messages entered into a chat room, essentially in realtime. A member section 910 identifies members of the chat room permitted to view and enter messages appearing in message section 908. A user may enter a message in an input section 912 and post the message in message section 908 by selecting a send section 914.

Figure 1F:
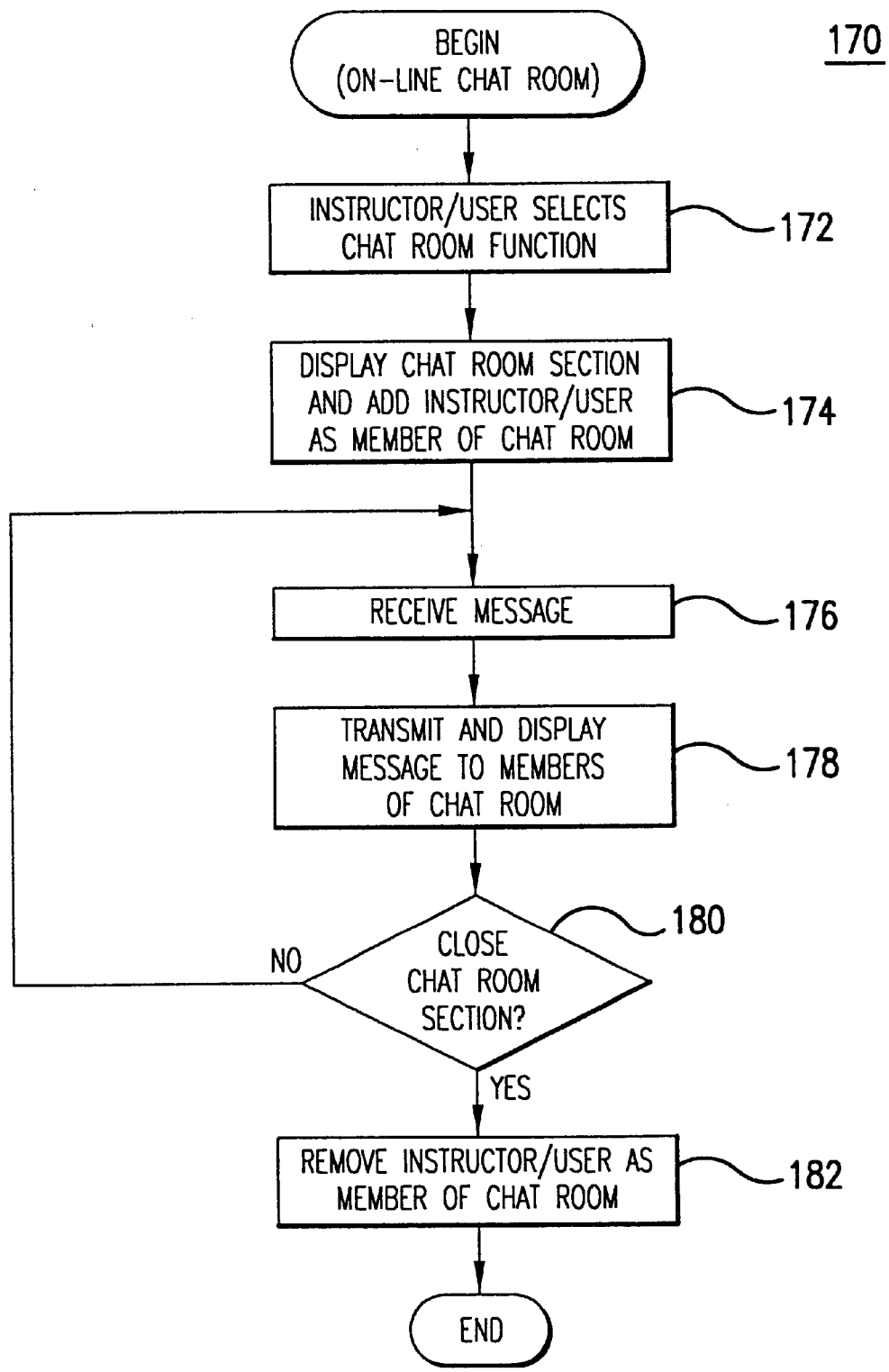

FIG. 1F is a flow chart of an on-line chat room method 174, using chat room screen 906, for an on-line educational system. In method 170, the chat room provides functions for users to interact in realtime by transmitting messages into common message section 908 for presentation in chat room screen 906 displayed to each member of the chat room as identified in member section 910. An instructor or user selects chat room selection 832 in the course home page (step 172). In response, the system displays chat room screen 906 and adds the instructor or user as a member of the chat room in member section 910 (step 174).

The system then receives messages and transmits and displays the messages to members of the chat room as the chat room is displayed to them in chat room screen 906 (steps 176 and 178). The system continually receives and posts the messages until a particular instructor or user closes chat room screen 906 or message section 908 (step 180). In response to the instructor or user closing the chat room section, the system removes the instructor or user as a member of the chat room in member section 910 displayed to the remaining members of the chat room (step 182).

User Journal

An electronic journal feature of the on-line educational system permits a user to enter information relating to a particular course for optional review by an instructor. The educational system includes providing on-line content concerning educational materials for a particular educational course, and providing on-line an electronic syllabus for the educational course. The apparatus provides an electronic journal for a particular one of the users permitting the particular user to enter information into the electronic journal. The apparatus also permits the instructor to enter information into the electronic journal for viewing by the particular user.

The electronic journal feature may include additional aspects. For example, it may permit the user to selectively identify permitted access to the electronic journal by the instructor. If the user identifies permitted access, it selectively provides access to the electronic journal by the instructor based upon the particular user's identification of permitted access. The user may group the information entered into the electronic journal into particular entries, identify permitted access by the instructor for each of the entries, and display an indication of at least one of the entries. The user may enter various types of information into the journal, or edit previously-entered information, and such information may include text, audio, video, graphics, or multimedia information. The journal may also provide for displaying an indication of the instructor-entered information in order to distinguish it from the user-entered information. For example, it may be displayed in a different color, font, or background color, or with other distinguishing characteristics such as displaying it in a box.

A journal screen electronically displays information for use in providing an electronic journal to users in the on-line educational system. The screen includes an index section for selecting a home page screen having a content section identifying on-line content concerning educational materials for a particular educational course and having a syllabus section for providing an electronic syllabus for the educational course. A journal section in the screen provides an electronic journal for a particular one of the users permitting the particular user to enter information concerning the educational course. A comment section in the screen permits 20. the instructor to enter information into the electronic journal for viewing by the particular user.

The journal screen may also include an access section, associated with the journal section, permits the user to selectively identify permitted access to the electronic journal by the instructor and selectively provides access to the electronic journal by the instructor based upon the particular user's identification of permitted access.

FIG. 3I is a diagram providing an example of a journal screen 916. Journal screen 916 has index section 816 as explained above. Journal screen 916 has sections for providing an electronic journal. Selection of a section 918 permits a user to start a new entry for the journal. An entry is a definable portion of the journal. For example, each time a user enters new information in the journal, a new entry may be created identifying the entered information by a date and time the user entered it. Alternatively, a user may modify previous entries, or create entries based upon other criteria, such as creating a new entry every week, for different topics, or for different assignments.

Selection of sections 920 permits the user to view an expanded or collapsed view of the journal entries. Entry section 922 displays a particular one of the journal entries. Section 924 indicates when the entry displayed in entry section 922 was last modified. A section 926 permits a user to enter information into the entry, and a comment section 928 permits the instructor to enter information into the entry. Selection of an edit or access section 930 permits editing of the entry content or access to it. As shown, section 926 and comment section 928 may be combined together with the instructor's comments identified, or separate displayed sections may be used for the user's and instructor's entered information.

Figure 1G:
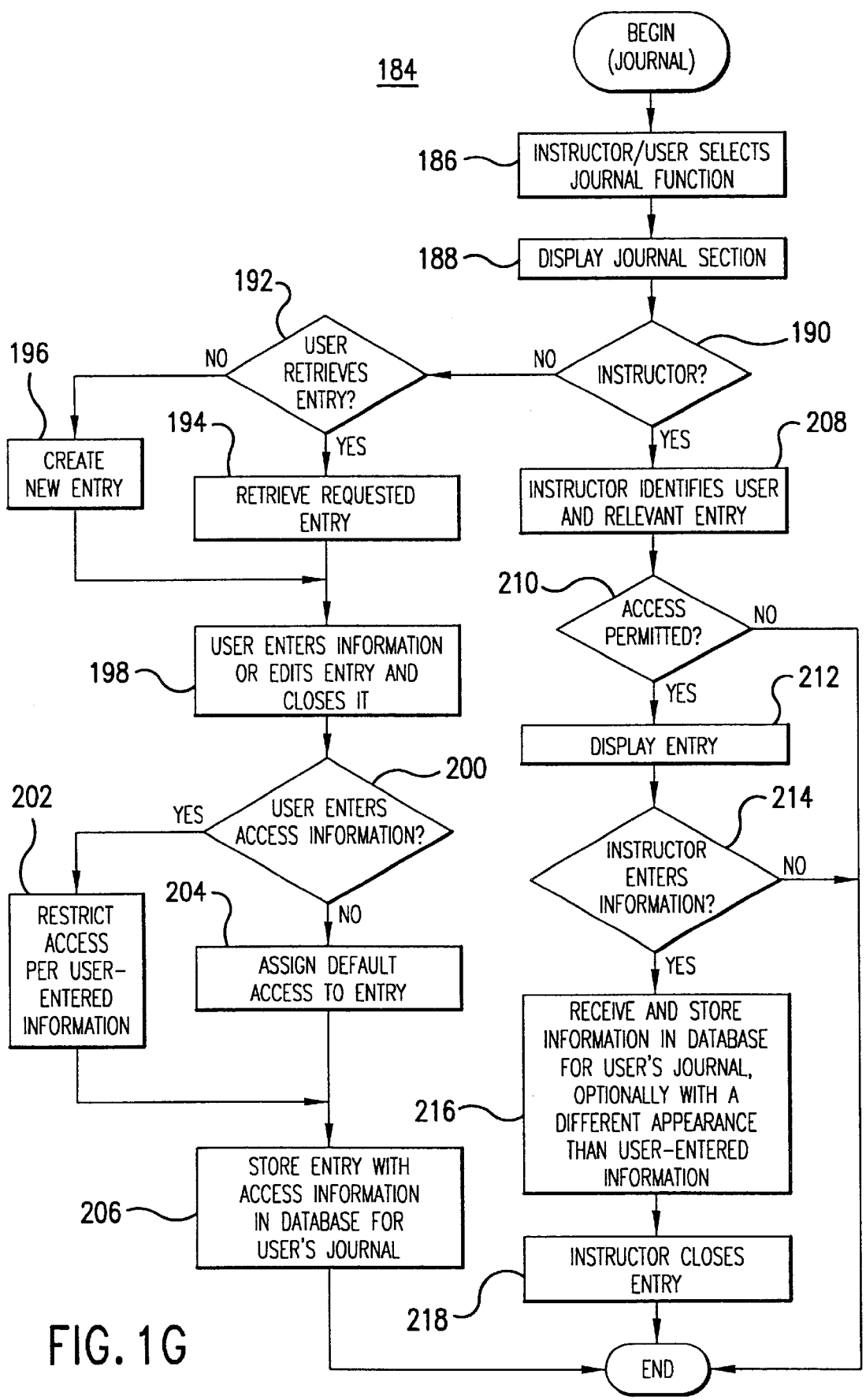

FIG. 1G is a flow chart of a journal method 184, using journal screen 916, for an on-line educational system. Journal method 184 may use at least the following tables in the database: Tables 634, 636, 638, and 640. The journal permits the user to enter information, possibly as required or requested by an instructor or an on-line course, and in additional permits the instructor to access the information in order to provide the user with coaching or feedback, or otherwise monitor and evaluate the user's progress.

In method 184, an instructor or user selects journal selection 834 in the course home page (step 186). In response, the system displays a journal section such as is shown in journal screen 916 (step 188). The system determines if an instructor requested the journal function (step 190). If so, the instructor identifies a particular user and relevant journal entry and enters that information (step 208). A section, such as section 804 in the home page, may be displayed in order to permit an instructor to select identification of a user.

The system determines if the instructor is permitted access to the requested journal entry (step 210). If permitted access, the system displays the entry such as is shown in entry section 922 (step 212). The system also detects whether the instructor enters information into the user's journal (step 214) and, if so, the system receives and stores the entered information in the database for the user's journal such as is shown in comment section 928, optionally with a different appearance than the user-entered information (step 216). The instructor then closes the entry (step 218).

The instructor-entered information may be identified in a number of ways. It may be preceded by an indication of instructor-entered information. It may have a different appearance in comparison to the user-entered information such as by using reverse video, a different color, font, underlining, bold, italics, or highlighting. Also, it may be enclosed within a box or have other distinguishing environmental features. If the instructor entered multimedia information, the information may be distinguishable from the user information based upon audio or video features, for example.

If a user had requested journal selection 834 (step 190), the system displays journal screen 906 and determines if the user retrieves an existing entry by manipulating section 920 to view and select an entry (step 192). If not, the system creates a new journal entry through the user's selection of section 918 (step 196); otherwise, the system retrieves the requested entry from the database (step 194). The user may then enter information into the journal entry in entry section 922 or edit previously-entered information and close the entry (step 198).

The system also detects whether the user enters particular access information through edit section 930, for example (step 200). The system receives the access information and restricts access to the journal entry according to the user-entered information (step 202). Otherwise, if the user does not enter access information, the system may assign default access to the journal entry in entry section 922 (step 204). The system stores the journal entry with the access information in the database for the user's journal (step 206). With access restrictions, a user may identify particular entries for which access is restricted, and the user may want to restrict access during particular time periods of the course. The system may restrict the access by storing in the database an indication of the limitation on access associated with the restricted information. Default access may include, for example, providing an instructor with access to the content of a journal entry when it is created and saved by the user.

Notebook

Figure 3J:
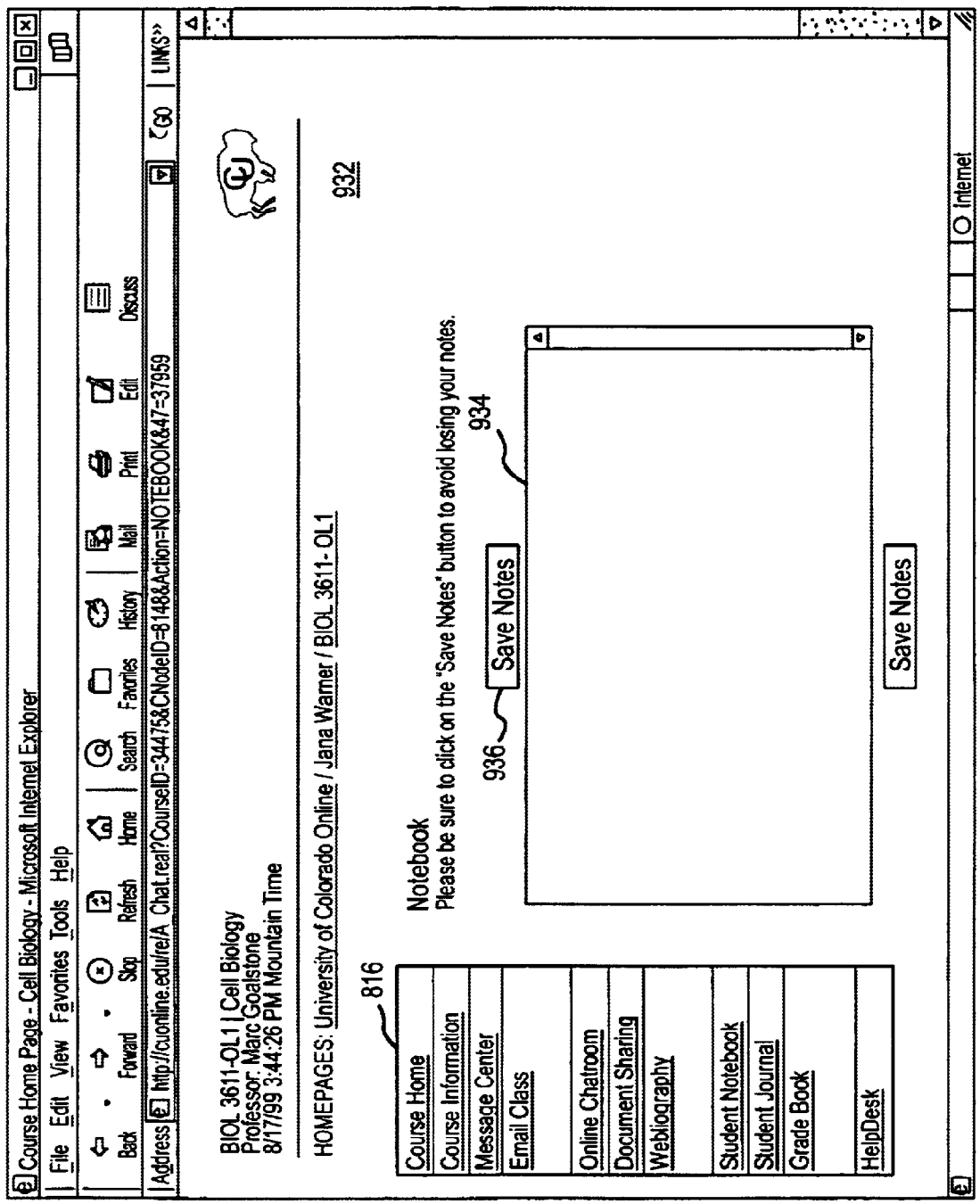
FIG. 3J is a diagram of a notebook screen.

The notebook is similar to the electronic journal except that an instructor typically does not have access to the notebook and it is provided as an area where the users may enter notes or other information for their own use. FIG. 3J is a diagram of a notebook screen 932. Notebook screen 932 has index section 816 as explained above. A entry section 934 permits a user to enter notes or other information, and the notes or information are saved in the user's notebook upon selection of section 936.

Figure 1H:
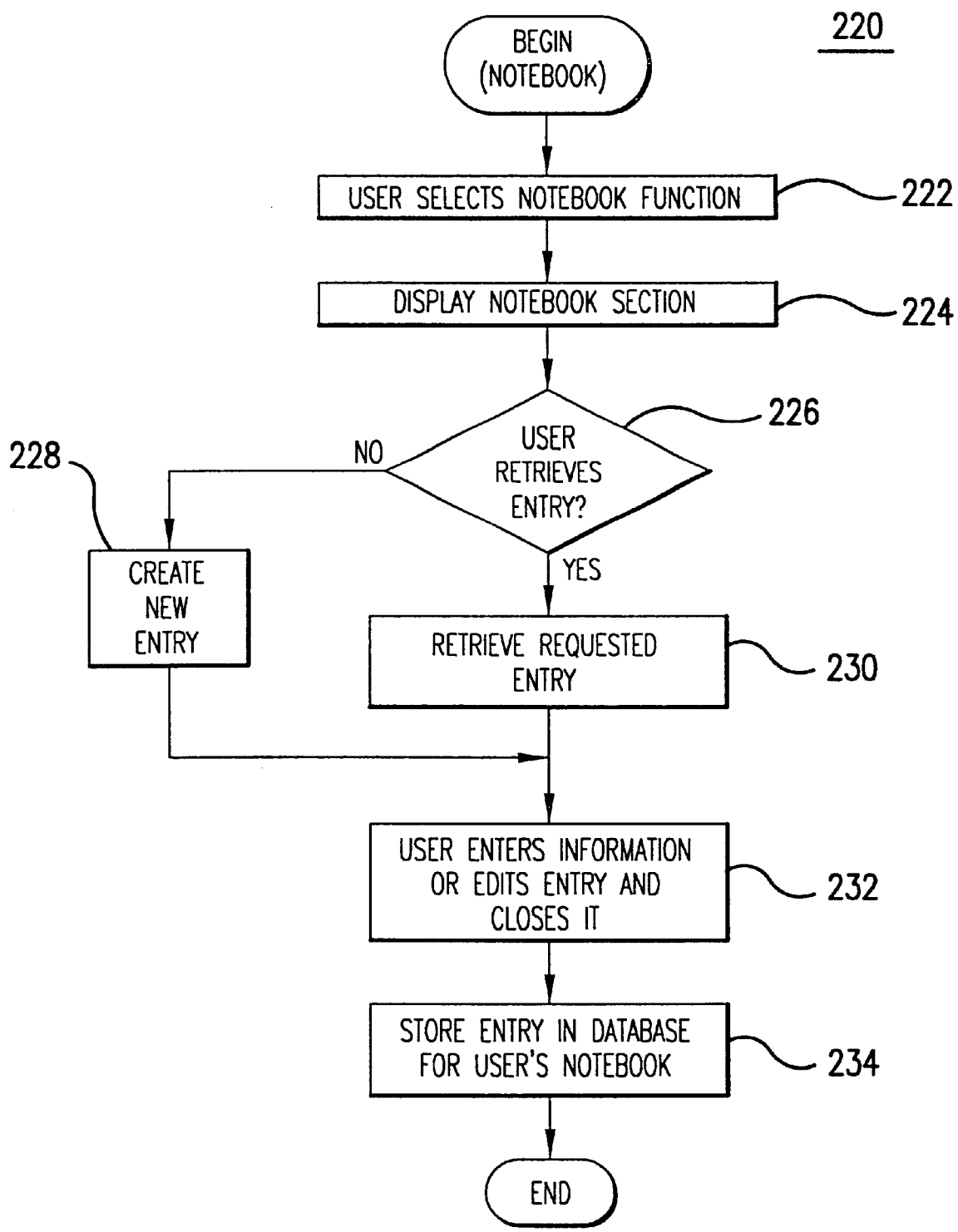
Figure 11:
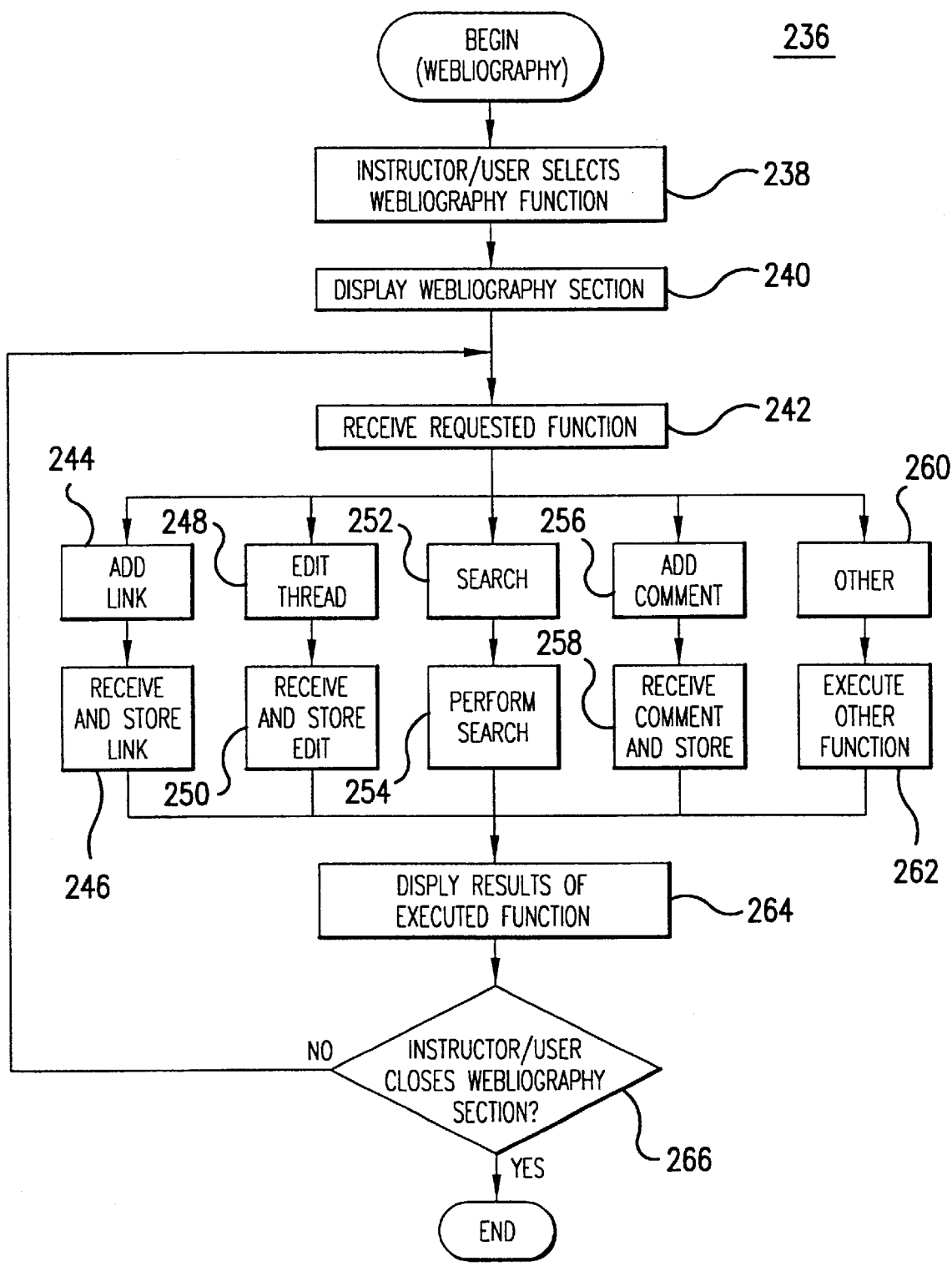

FIG. 1H is flow chart of a notebook method 220, using notebook screen 932, for an online educational system. Notebook method 220 may use at least Table 620 in the database. In method 220, the user selects notebook selection 836 in the course home page (step 222). In response, the system displays a notebook section such as notebook screen 932 (step 224). The system detects whether the user retrieves an existing entry (step 226); if not, the system creates a new entry (step 228). Otherwise, if the user had retrieved an existing entry, the system retrieves the requested entry from the database and displays it such as is shown in entry section 934 (step 230). The user may then enter information or edit previously-entered information and close the notebook entry (step 232). The system stores the entry in the database for the user's notebook (step 234). The notebook may generate entries in the same manner as the electronic journal described above; alternatively, a user may create or delineate their own notebook entries.

Webliograph<sup>SM</sup> Feature

The webliography feature permits the display and exchange of research information from the Internet or other sources. For example, users may exchange various hypertext links illustrating sources of information relevant to an on-line educational course. The term "webliography" is a service mark of eCollege.com.

Figure 3K:
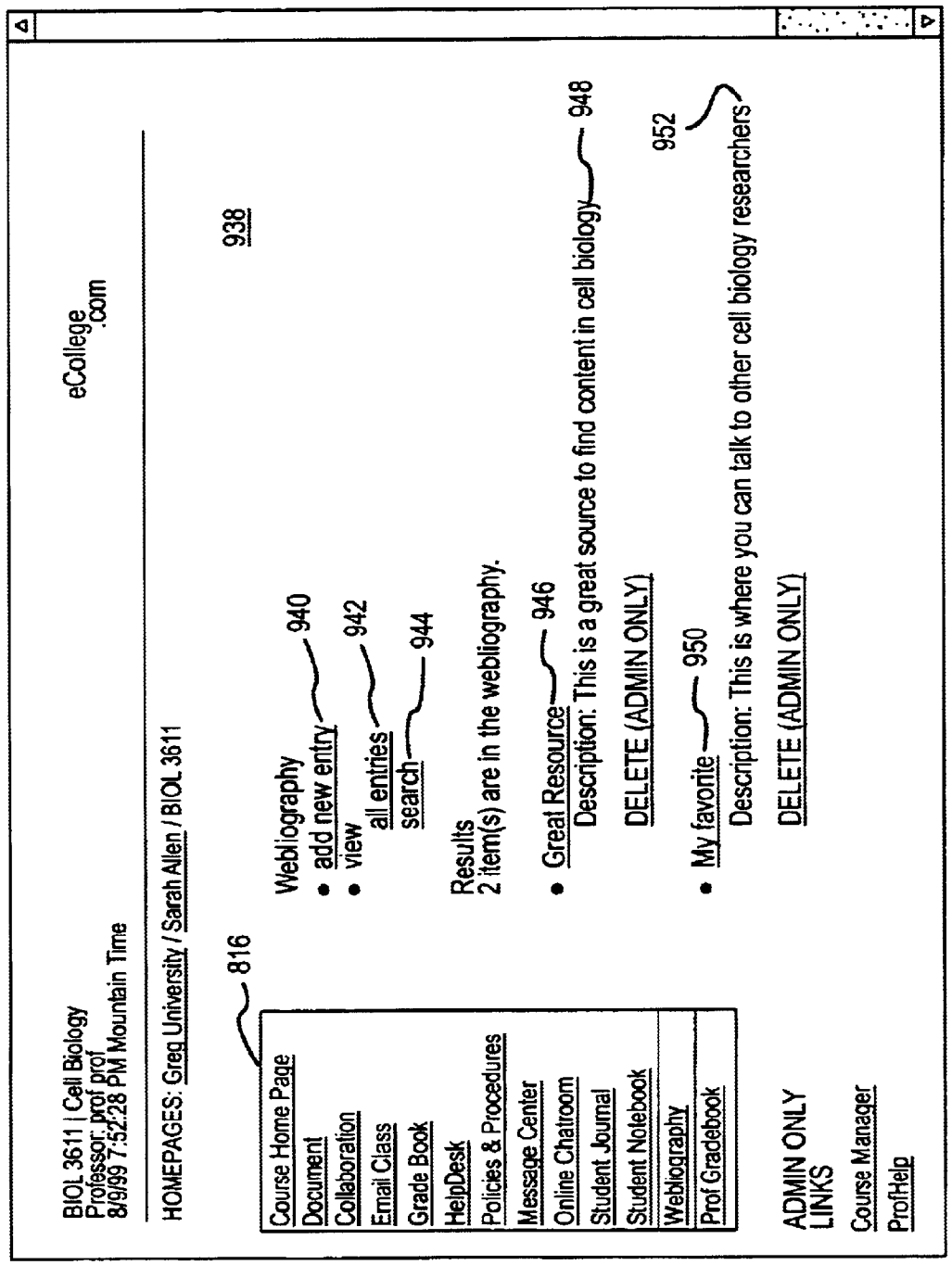
FIG. 3K is a diagram of a webliography screen.

FIG. 3K is a diagram of a webliography screen 938. Webliography screen 938 includes 20 index section 816 as explained above. Webliography screen 938 also has a number of sections for viewing entries for the webliography feature, adding entries, and searching for entries. Selection of an add section 940 permits a user to add an entry, selection of an entry section 942 permits the user to view all entries, and selection of a search section 944 permits the user to search for entries. Upon searching or requesting to view entries, the system displays entries as follows, for example: a section 946 identifies a first entry and a section 948 provides a description for the first entry; and a section 950 identifies a second entry and a section 948 provides a description for the second entry.

FIG. 1I is a flow chart of a method 236, using webliography screen 938, for implementing a webliography feature for an on-line educational system. Webliography method 236 may use at least Tables 686 and 688 in the database. In method 236, the instructor or user selects webliography selection 838 in the course home page (step 238). In response, the system displays a webliography section such as webliography screen 938 (step 240). The system then receives a requested function from the user or instructor (step 242).

For example, the following functions may be provided for the webliography feature. If the system receives an add link function through selection of add section 940 (step 244), it receives and stores the entered link (step 246). A link may be a hypertext link providing a network address of particular content. If the system receives an edit thread function through selection of entry section 942 (step 248), it receives and stores the information to edit the thread. If the system receives a search function through selection of search section 944 (step 252), it performs the requested search (step 254). If the system receives an add comment function through selection of an entry (step 256), it receives and stores a particular comment (step 258). The system may also receive other functions (step 260) and execute those functions (step 262).

After receiving and executing the requested function, the system displays the results of the executed function (step 264). The system may repeatedly execute functions for instructor or user until it detects that the instructor or user has closed the webliography section or screen 938 (step 266).

Threaded Discussion

A threaded discussion permits instructors and users to maintain an on-line discussion in non-realtime by posting messages responding to particular topics and viewing the posted messages. For example, an instructor may enter a particular topic for discussion, and users when they log on to the system may enter information for that topic and continue the discussion.

FIG. 3L is a diagram of a threaded discussion screen 954. Threaded discussion screen 954 has index section 816 as explained above. Sections 956 and 958 identify topics for discussion, typically entered by an instructor. A message section 960 provides a message for topic 958. Users may respond to the topic by selecting a response section 962. Users may display responses to topics according to a particular topic by selecting a topic section 968. Responses to topics may be displayed according to date by selecting a date section 970. Responses to topics may be displayed according to author by selecting an author section 972. A section 974 provides an example of a response to a topic, and a user may respond to the topic by selecting section 976 and entering a response in a corresponding section. Authorized personnel may edit a topic by selecting a section 964, delete the topic by selecting a section 966, and delete a posted response by selecting section 978.

Figure 1J:
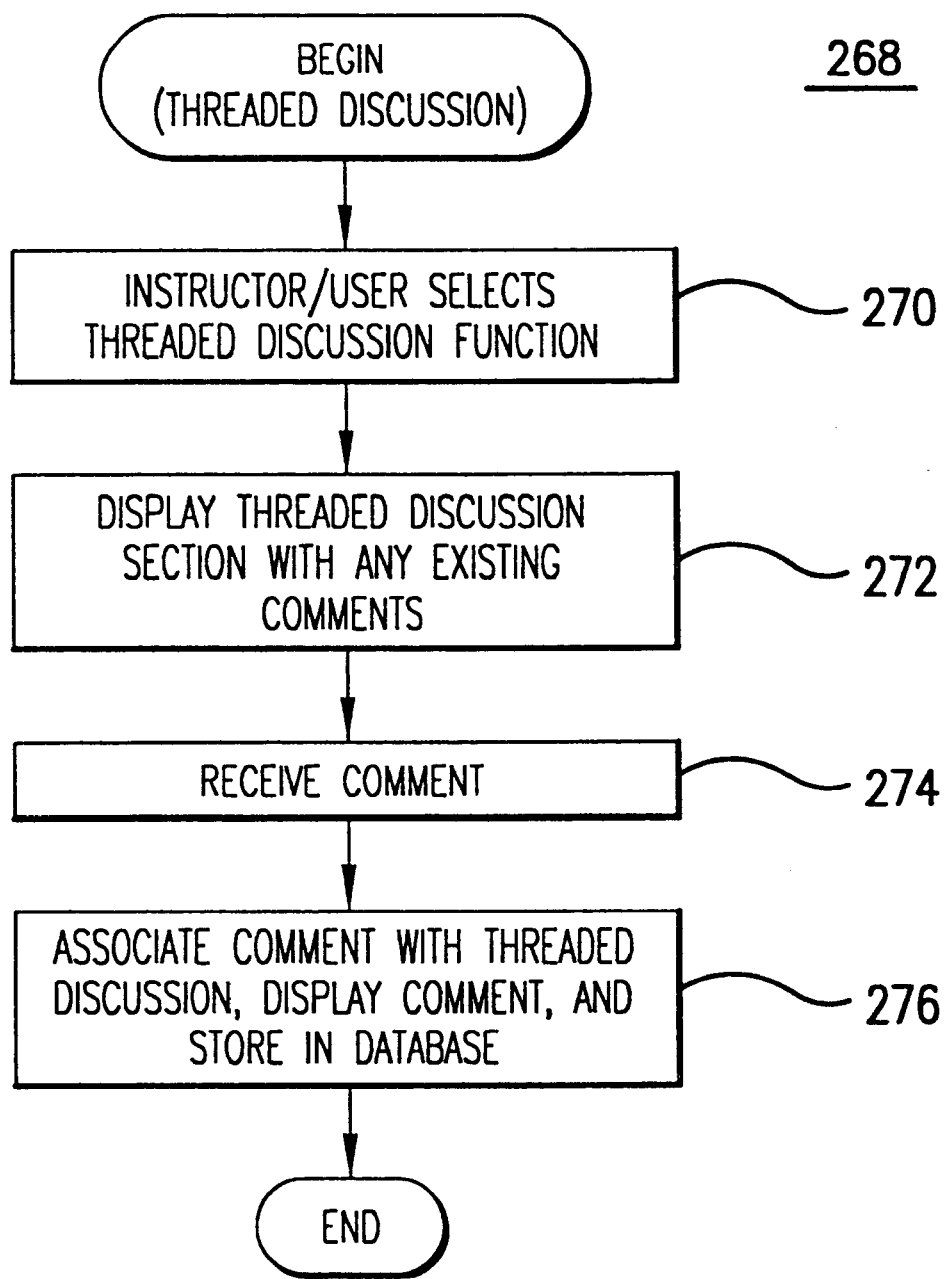

FIG. 1J is a flow chart of a threaded discussion method 268, using threaded discussion screen 954, for an on-line educational system. Threaded discussion method 268 may use at least Table 700 in the database. In method 268, an instructor or user selects threaded discussion selection 841 in the course home page (step 270). In response, the system displays a threaded discussion section such as threaded discussion screen 954 with existing comments such as is shown in message section 960 (step 272). The instructor or user may then enter a comment and the system receives the comment (step 274). The system associates the comment with the threaded discussion, displays the comment and stores it in the database for access by other users in the course (step 276).

Grading

An exam question feature of the on-line educational system provides for on-line testing of users. The educational system includes providing on-line content concerning educational materials for a particular educational course, and providing on-line an electronic syllabus for the educational course. The apparatus provides on-line to the users exam questions with multimedia content, and receives on-line answers to the exam questions. An on-line exam includes any type of on-line way to evaluate a user taking an on-line course. The exam may include both objective and subjective questions, as explained below.

The exam question feature may include various other aspects. For example, it may automatically grade the answers to generate corresponding grade information, and it may store the grade information in an on-line gradebook. The users may be selectively provided with access to the grade information in the on-line gradebook. If the answers require manual grading by an instructor, the apparatus transmits the answers to the instructor or at least the answers requiring manual grading, and it receives from the instructor grade information for the answers. The instructor may also include comments concerning the grade information. The instructor's grade information and comments generated through manual grading may also be included in the on-line gradebook with access selectively provided to the corresponding users.

A grading screen electronically displays information for use in providing exam questions to users for the on-line educational system. The screen includes an index section for selecting a home page screen having a content section identifying on-line content concerning educational materials for a particular educational course and having a syllabus section for providing an electronic syllabus for the educational course. An exam question section in the screen provides on-line to the users exam questions with multimedia content and receives on-line answers to the exam questions.

FIG. 3M is a diagram providing an example of a grading or exam screen 980. Exam screen 980 provides an example of how a user may take an on-line exam. Exam screen 980 includes a timer section 982 displaying a time remaining for the exam. Two exemplary questions are shown for the exam. An exam question section 984 displays a true/false type question, and an exam question section 986 displays a section requiring the matching of words with the correct definitions. A user may select sections 988 to view and complete additional portions of the exam. The user stores the enter answers by selecting a store section 990, and submits the answers for grading by selecting a submit section 992.

The on-line exam in screen 980 may include both objective and subjective questions. For example, objective questions may include the following: true/false questions such as the type shown in exam question section 984; matching questions such as the type shown in exam question section 986; and multiple choice questions. Subjective questions may include essay 20 questions; fill in the blank questions; and short answer questions. Answers to the objective questions may be automatically graded by the system by comparing the answers to stored correct answers, and answers to the subjective questions may be transmitted to an instructor for manual grading. On-line exams may be created using a course manager feature as described below.

Figure 1K:
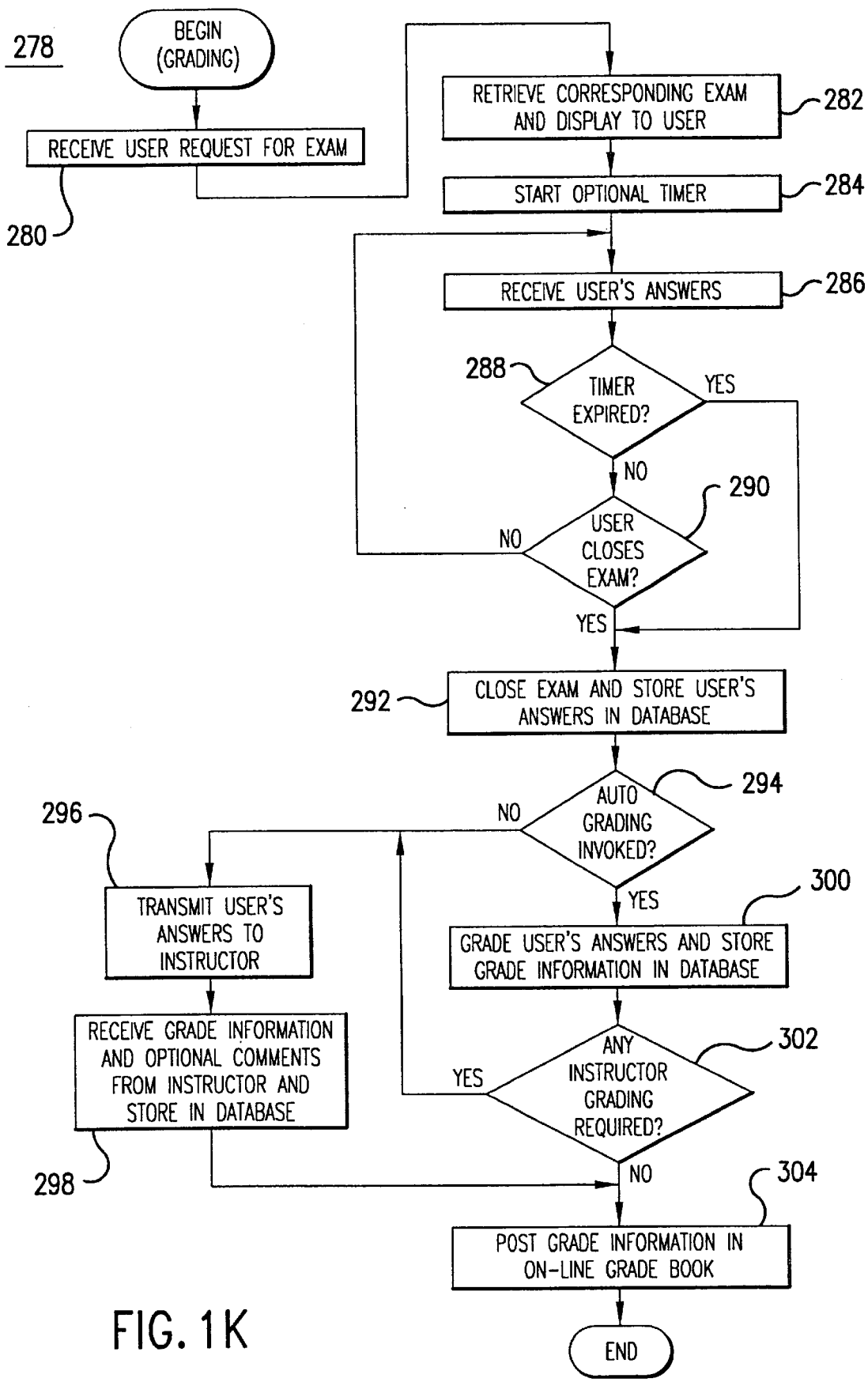

FIG. 1K is a flow chart of a grading method 278, using exam screen 980, for an on-line educational system. Grading method 278 may use at least the following tables in the database: Tables 684, 694, 696, 698, 702, 706, 708, 710, 712, and 716. On-line grading for an on-line educational system permits users to take exams on-line and those exams may be graded automatically or sent to instructors for grading. The system receives a user's request for an exam (step 280). A user may request an exam by selecting one in the electronic syllabus in syllabus section 806 after having been posted by an instructor. The system retrieves the corresponding exam and displays it to the user such as is shown in exam screen 980 (step 282). Also, the system may start an optional timer to limit the amount of time the user is permitted to take the exam and display the time remaining in timer section 982 (step 284).

The system receives the user's answers to the exam, such as through exam question sections 984 and 986 (step 286). It permits the user to continue entering answers until the timer has expired (step 288) or the user closes the exam (step 290). Upon detecting one of the events ending the exam such as a time-out or selection of submit section 992, the system closes the exam and stores the user's answers in the database (step 292).

The system determines if automatic grading has been invoked (step 294). For example, for multiple choice exams, the system may automatically grade the exam. If automatic grading 20 has been invoked, the system grades the user's answers and scores the grade information in the database (step 300). It also determines if any instructor grading is required for the user's answers (step 302). If not, the system posts the grade information in the on-line gradebook (step 304).

If automatic grading is not invoked or if any portion of the exam requires instructor grading, the system transmits the user's answers to the instructor for grading (step 296). The system receives grade information from the instructor along with optional comments and stores that information in the database (step 298) and then posts the grade information in the on-line gradebook (step 304).

Administrative Pages/Functions

An administrative pages feature of the on-line educational system provides on-line administrative functions for users. The educational system includes providing on-line content concerning educational materials for a particular educational course, and providing on-line an electronic syllabus for the educational course. The apparatus provides information, accessible on-line by the users, concerning administrative functions related to the educational course. Administrative pages are screens providing for administrative functions on-line courses. Administrative functions are procedural or other matters relating an on-line course but not necessarily relating to the substantive content of the course. Examples of administrative functions are provided below.

The administrative pages feature may include various other aspects. For example, the information available via the administrative pages may include an enrollment for a particular user, a registration history for a particular user, payment by a particular user, a report having information identifying a particular user, and a report having information identifying a particular course. The administrative pages may also provide for searching for information related to a particular user based upon user-entered information.

An administrative screen electronically displays information for use in providing administrative pages for the on-line educational system. The screen includes an index section for selecting a home page screen having a content section identifying on-line content concerning educational materials for a particular educational course and having a syllabus section for providing an electronic syllabus for the educational course. An administrative section in the screen provides information, accessible on-line by users of the system, concerning administrative functions related to the educational course.

Figure 3N:
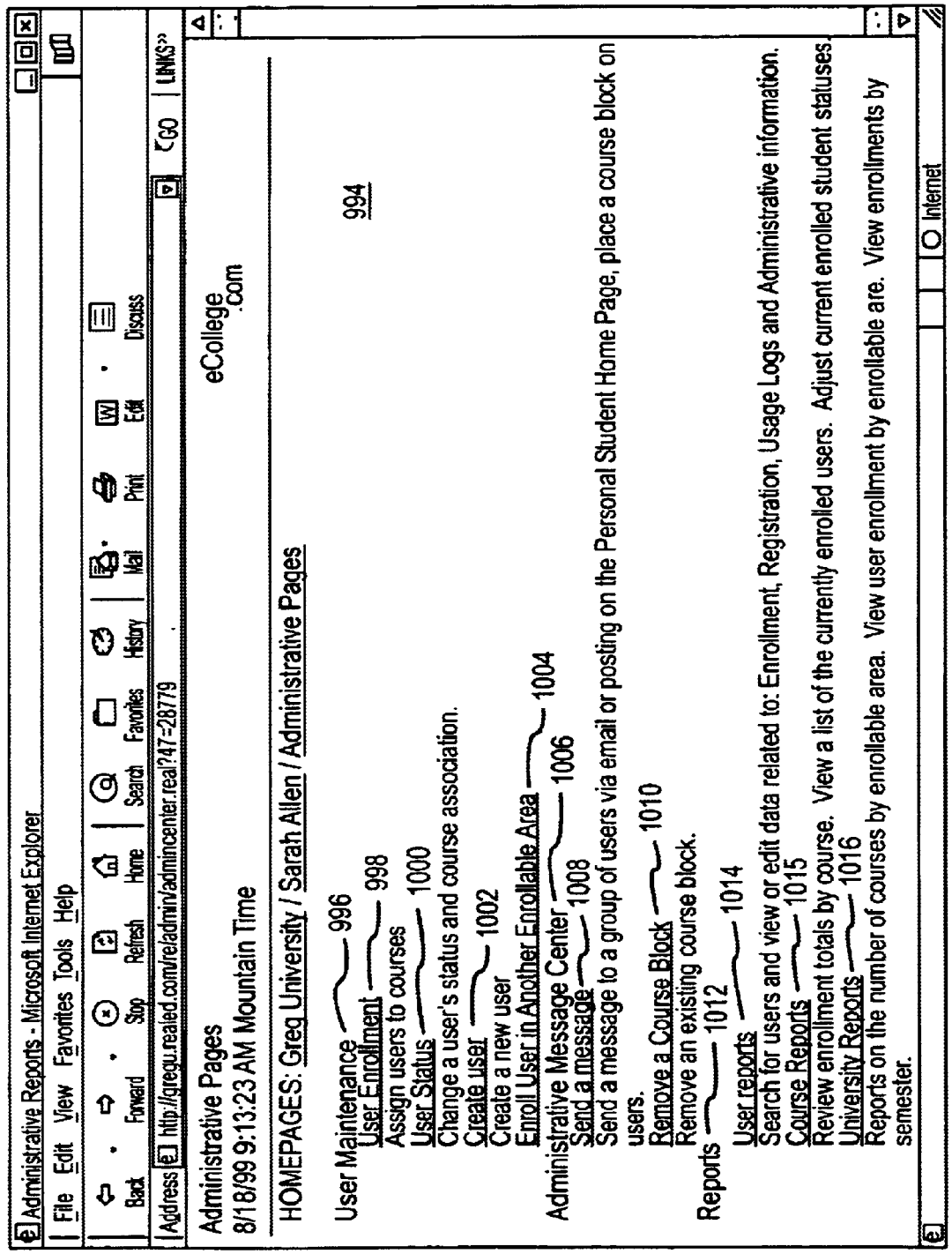
FIG. 3N is a diagram of an administrative pages screen.
Figure 30:
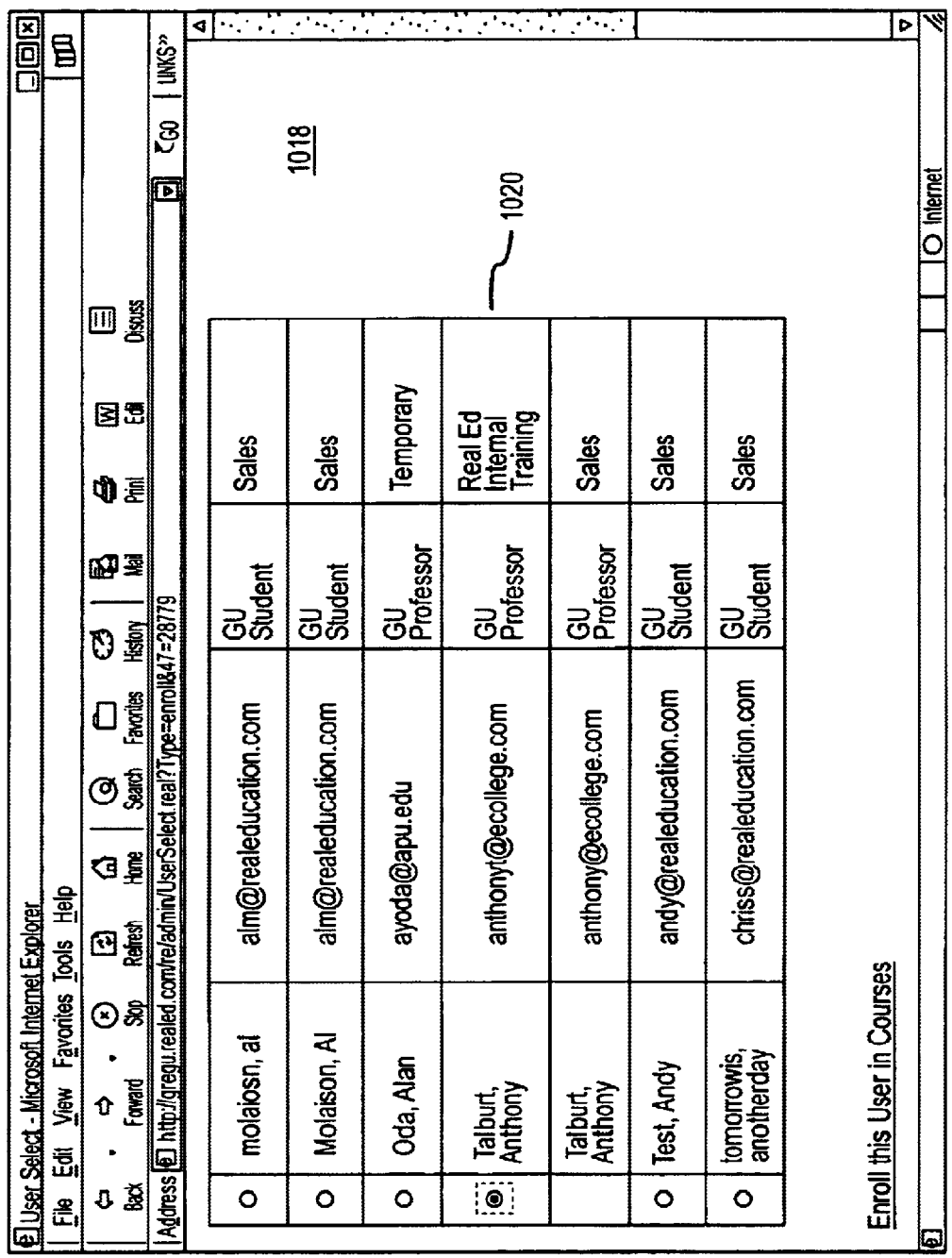
Figure 3P:
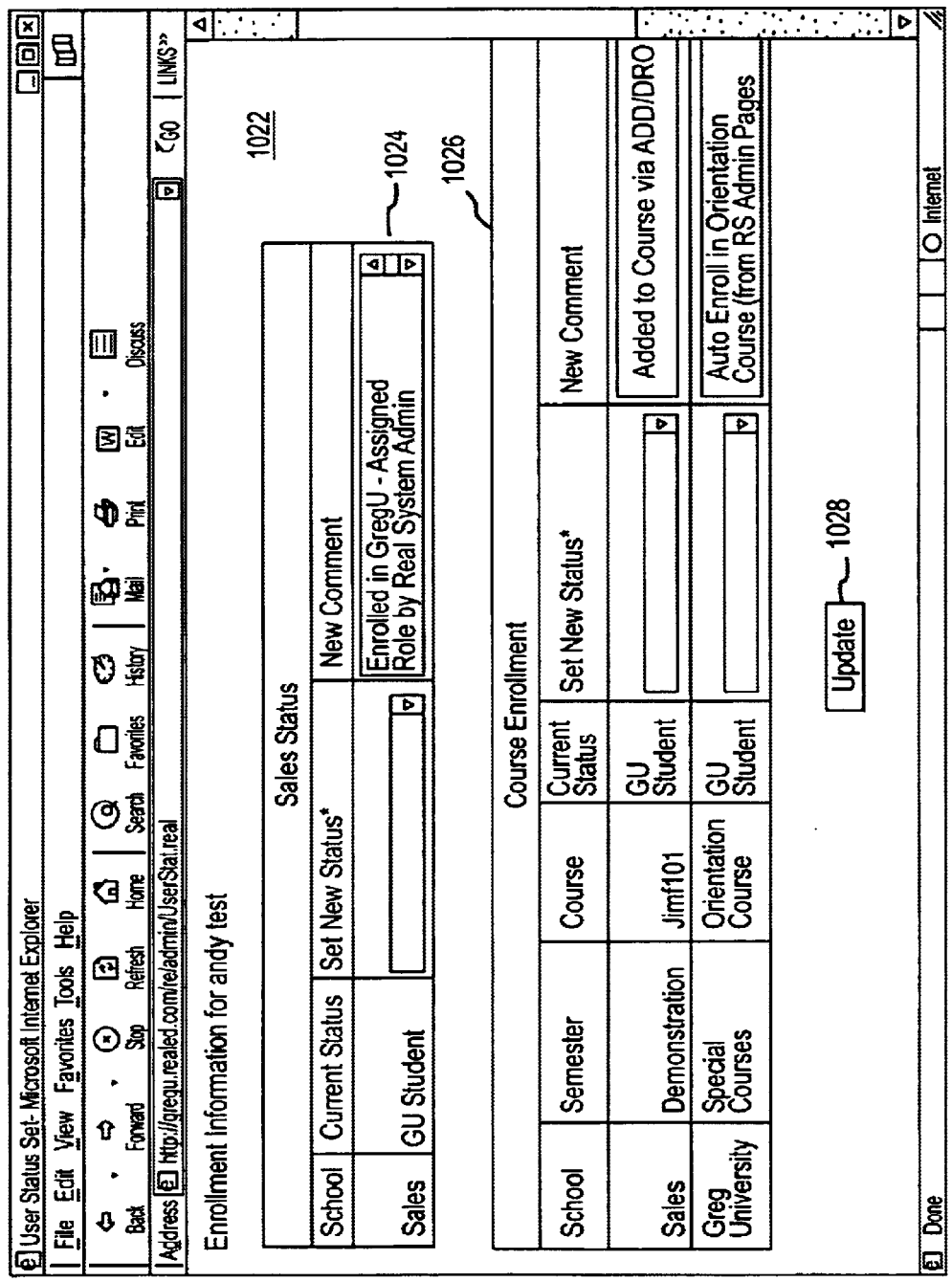
FIG. 3P is a diagram of a user status screen.
Figure 3Q:
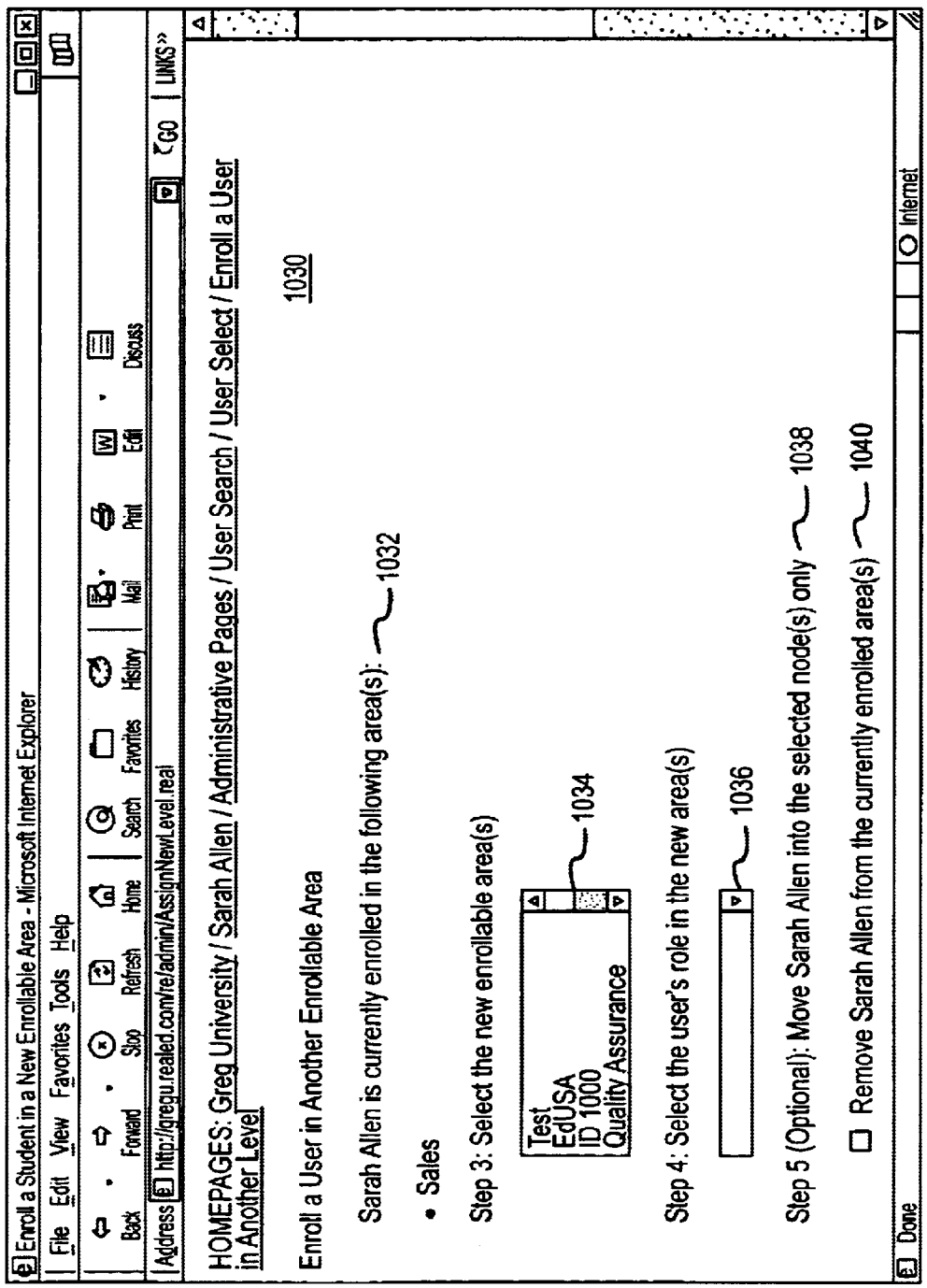
FIG. 3Q is a diagram of an enrollment screen.

FIG. 3N is a diagram providing an example of an administrative pages screen 994. Administrative pages screen 994 lists various administrative functions in administrative sections 996, 1006, and 1012 for selection by a user or other person in order to access additional screens. For example, administrative section 996 lists user maintenance selections, including a user enrollment selection 998, a user status selection 1000, a create user selection 1002, and an enrollment selection 1004. Administrative section 1006 lists administrative message center selections, including a send message selection 1008 and a remove course block selection 1010. Administrative section 1012 lists reports selections, including a user reports selection 1014, a course reports selection 1015, and a university reports selection 1016.

A user may select selections 998, 1000, 1002, and 1004 to access additional screens relating to user maintenance. User enrollment selection 998 produces a screen 1018, shown in FIG. 3O, providing a section 1020 listing user enrollment. Status selection 1000 produces a screen 1022, shown in FIG. 3P, including a section 1024 listing status of a particular user selected from a section 1026 listing enrollment of users. Screen 1022 also includes a section 1028 for a user to select in order to update entered information. Enrollment selection 1004 produces a screen 1030, shown in FIG. 3Q, including sections for enrolling a user in another area. In particular, screen 1030 includes a section 1032 identifying a user's enrollment; a section 1034 to select a new enrollable area for the user; a section 1036 to select the user's roll in the new area; a section 1038 to move the user into the selected area only; and a section 1040 to remove the user from the currently enrolled areas.

Figure 3R:
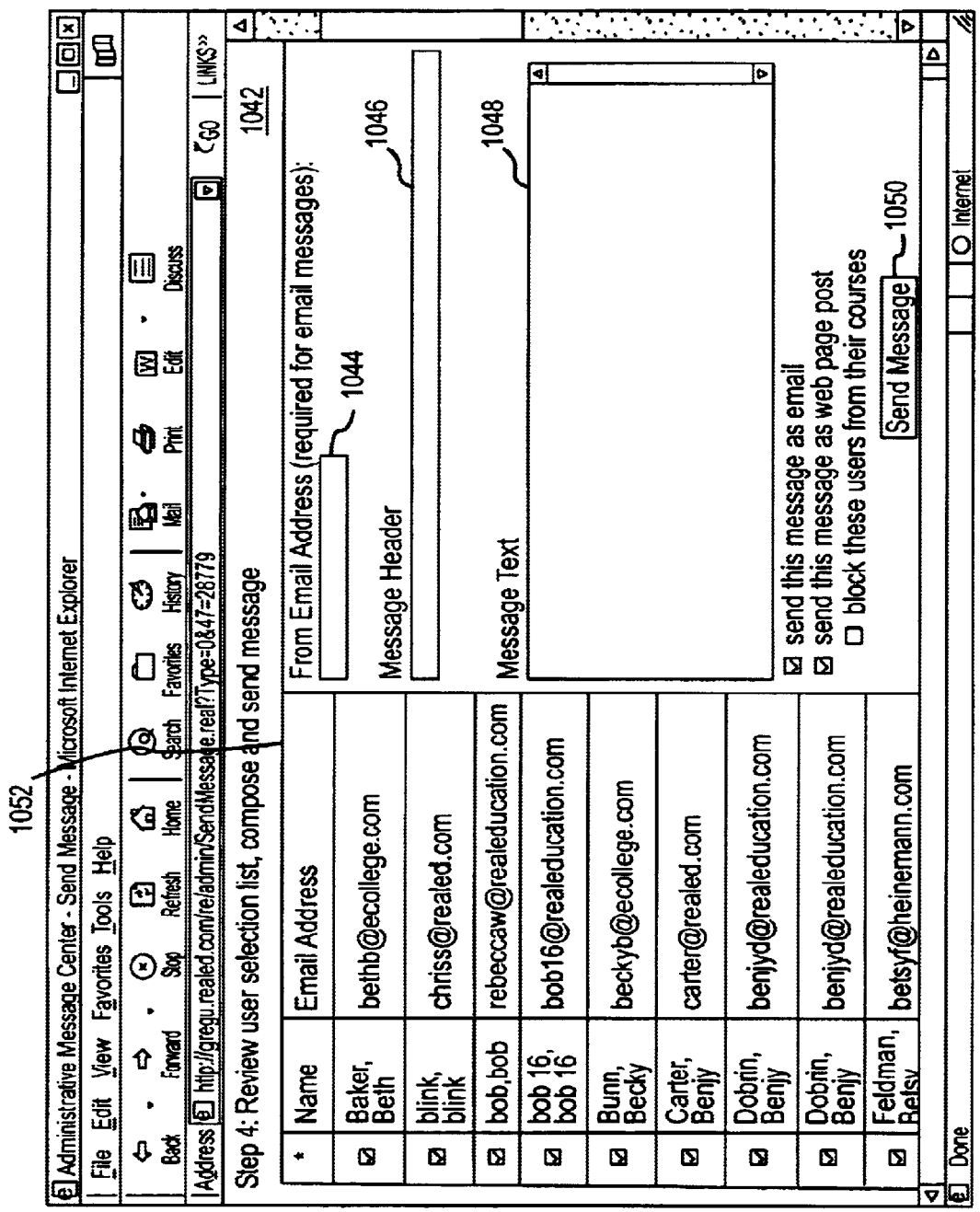
FIG. 3R is a diagram of a message screen.

A user may select section 1008 to access a screen 1042, shown in FIG. 3R, for an administrative message center. An authorized person may use screen 1042 in order to send a message to various users among multiple courses. Section 1044 is used to enter an e-mail address of the sender. Section 1046 is used to enter a message subject. Section 1048 is used to enter an e-mail message. The sender may select recipients of the e-mail message by selecting users listed in section 1052, and the message is transmitted to the selected users by selecting section 1050. Section 1052 typically lists all users in all courses.

A user may select selections 1014, 1015, and 1016 to access additional screens relating to reports. Selection 1014 produces a screen 1054, shown in FIG. 3S, including a section 1056 providing a report for a particular user. Selection 1015 produces a screen 1058, shown in FIG. 3T, including a section 1060 providing status of a particular course and a section 1062 providing a course report. Selection 1016 produces a screen 1064, shown in FIG. 3U, including a section 1066 providing a university report.

The home page may include a link to the administrative pages for selection by an instructor, user, or other person. In addition, sending messages to users among multiple courses may be accomplished with the message center described with respect to FIGS. 1E and 3G, or with the administrative message center shown in screen 1042 (FIG. 3R).

Use of administrative pages is further explained in the Administrative Pages Guide included in Appendix B.

Figure 1L:
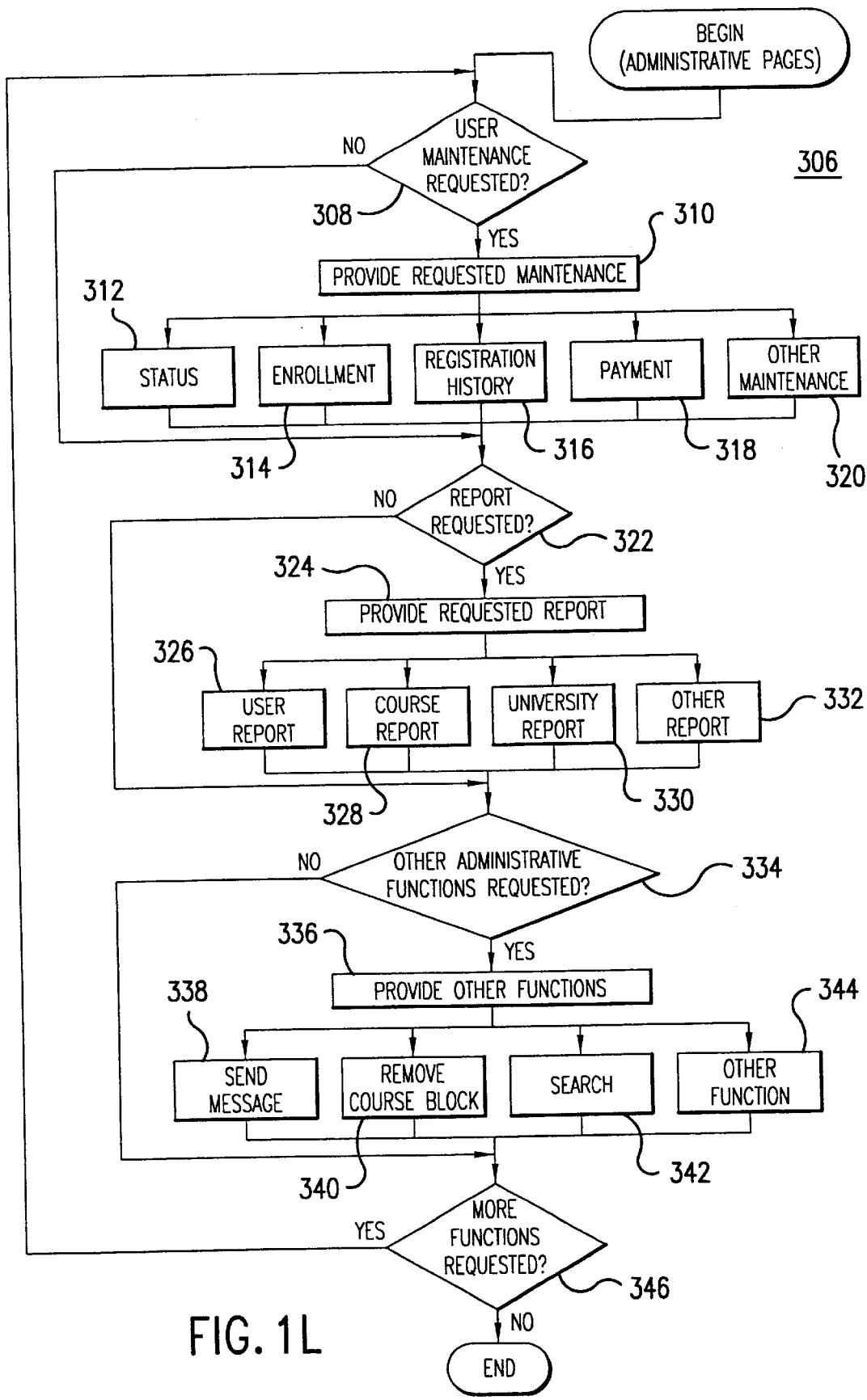

FIG. 1L is a flow chart of an administrative pages method 306, using the screens shown in FIGS. 3N–3U, for an on-line educational system. Administrative pages method 306 may use at least the following tables in the database: Tables 508, 512, 528, and 574. In method 306, the system detects whether user maintenance is required (step 308). If user maintenance is required, the system provides the requested maintenance (step 310), which may include the following: status information (step 312); enrollment information (step 314); registration history information (step 316); payment information (step 318); or other type of maintenance information (step 320). FIGS. 3O–3Q are screens for providing maintenance information as follows: FIG. 3O is a diagram of an enrollment status screen 1018; FIG. 3P is a diagram of a user status screen 1022; and FIG. 3Q is a diagram of an enrollment screen 1030.

Figure 3S:
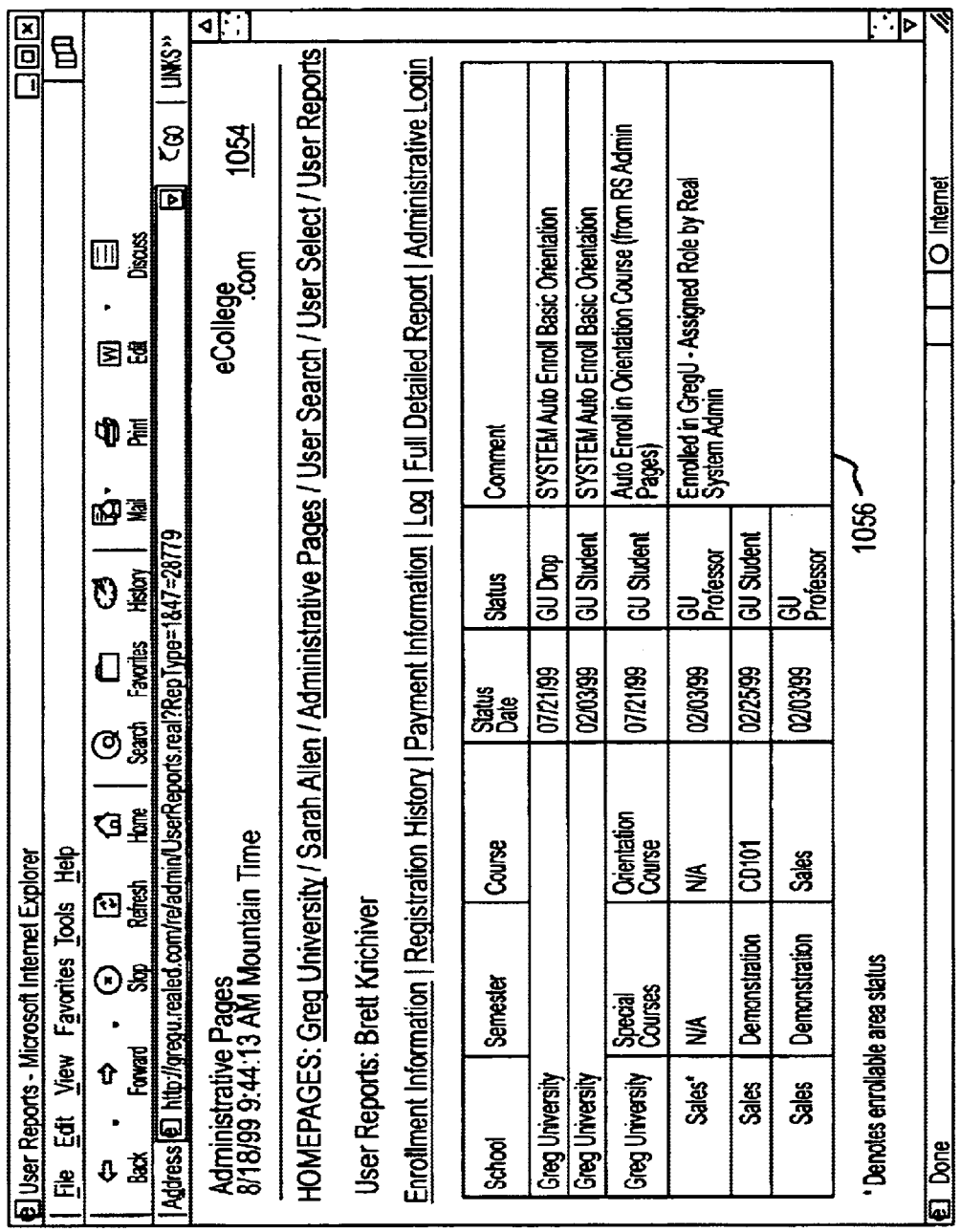
FIG. 3S is a diagram of a user reports screen.
Figure 3T:
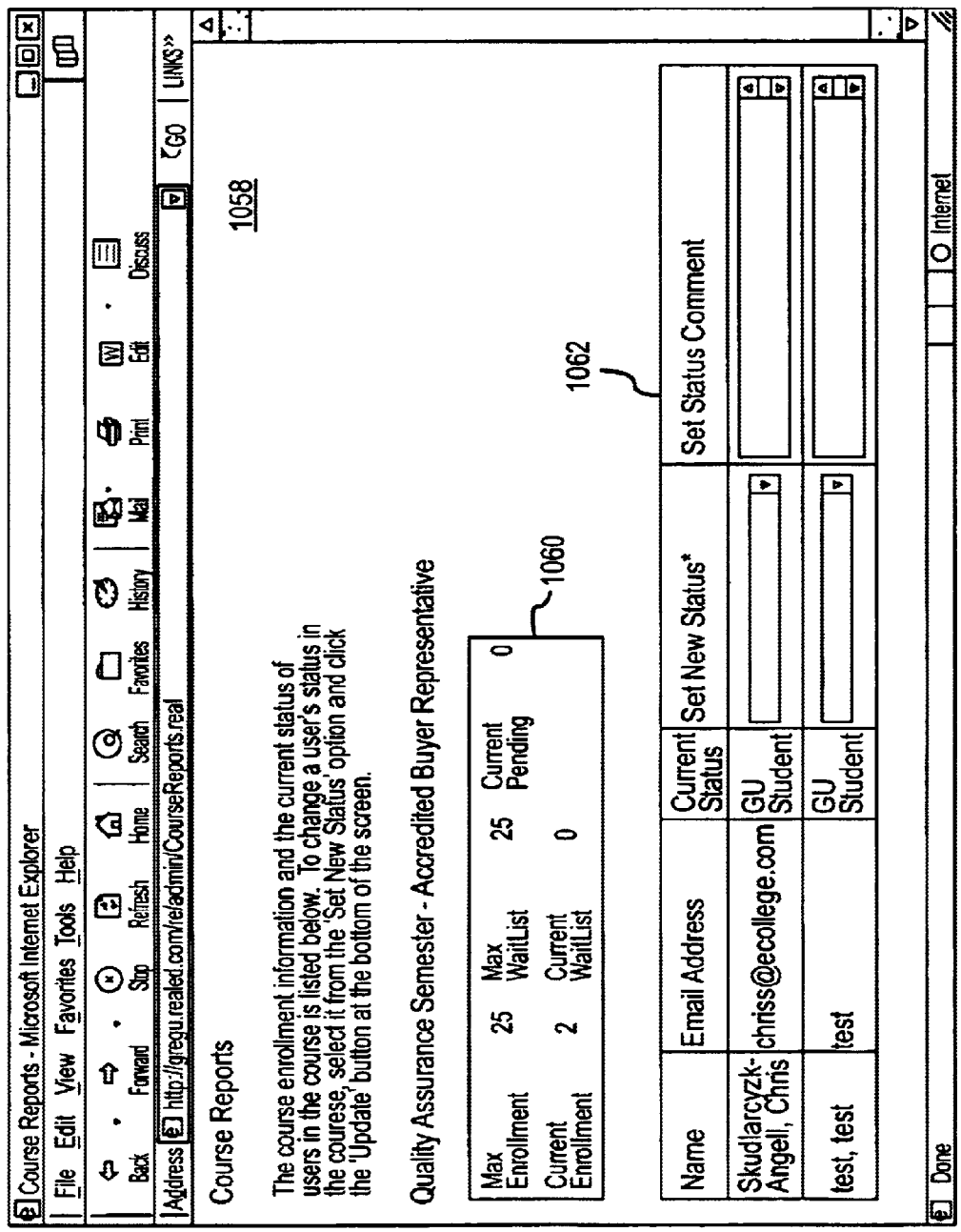
FIG. 3T is a diagram of a course reports screen.
Figure 3U:
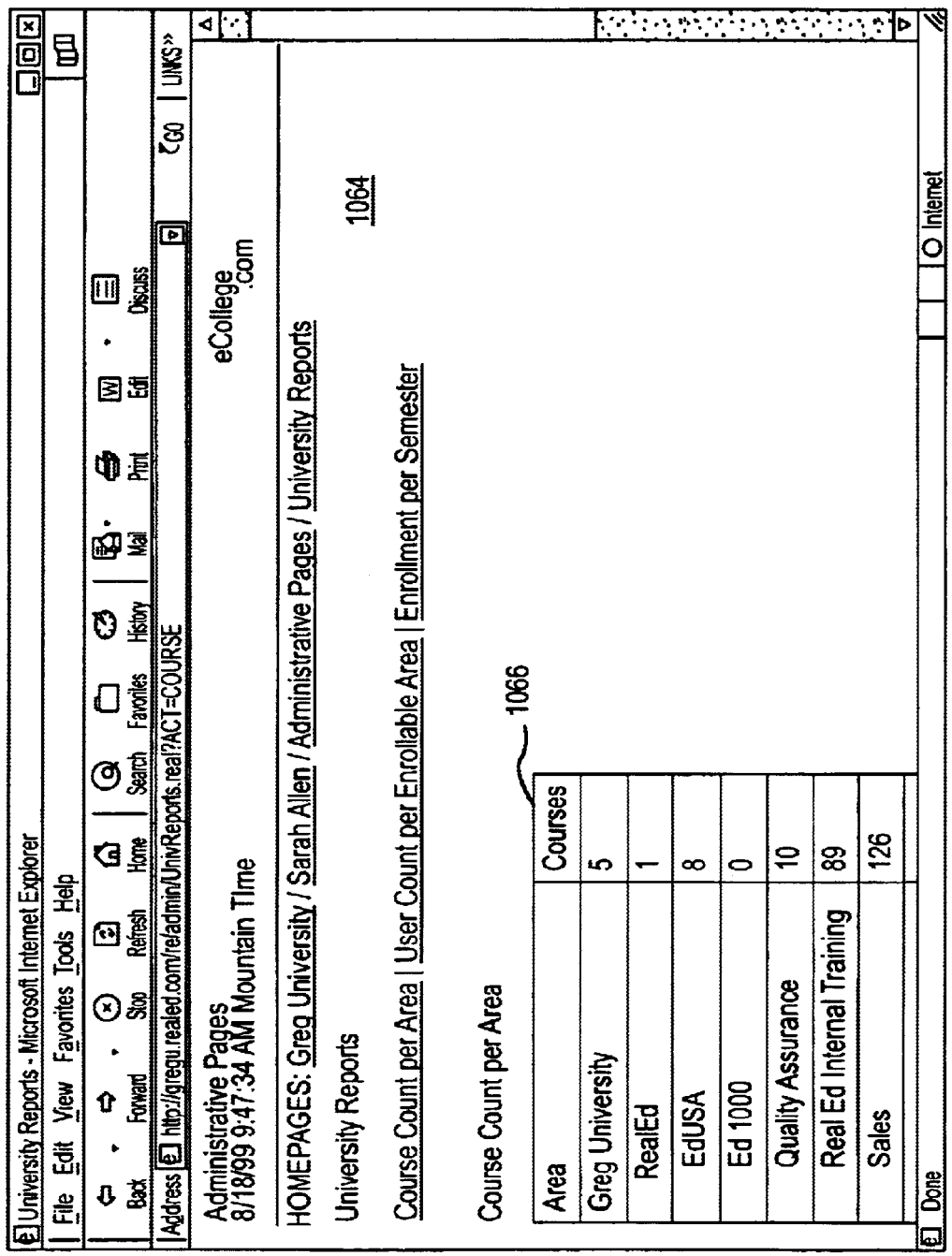
FIG. 3U is a diagram of a university reports screen.

The system also detects whether a report is requested (step 322). If the report is requested, the system provides the requested report (step 324), which may include the following: a user report (step 326); a course report (step 328); a university report (step 330); or other type of report (step 332). FIGS. 3S–3U are screens for report information as follows: FIG. 3S is a diagram of a user report screen 1054; FIG. 3T is a diagram of a course report screen 1058; and FIG. 3U is a diagram of a university report screen 1064.

The system also detects whether other types of administrative functions are requested (step 334). If so, it provides the other requested functions (step 336), which may include the following: send message function (step 338); remove course block function (step 340); a search function (step 342); or other function (step 334). FIG. 3R is a diagram of an administrative message screen 1042 for sending a message in step 338 as described above. The system also determines whether more functions have been requested (step 346) and, if so, may repeat method 306.

Course Manager

A course manager feature permits an instructor to develop an on-line course for the online educational system. The apparatus receives from the instructor an identification of units each representing portions of an educational course, an identification of assignments for the units, and an identification of educational materials for the units. The apparatus compiles the units, the assignments, and the educational materials into an on-line electronic syllabus for the educational course.

The course manager feature may include various other aspects. For example, an instructor may enter the following for assignments: a threaded discussion assignment; a reading assignment; a lecture assignment; an indication of a file to be downloaded; an address identifying a network location of additional content for the educational course; a journal assignment; and a webliography assignment. The educational materials entered by the instructor may include audio, video, multimedia information, or any of the types of information identified above. The instructor may also enter on-line exams to be taken by users enrolled in the course. In addition, the instructor edit the identification of the units, the identification of the assignments, or the identification of the educational materials in preparing the electronic syllabus. The course manager may also permit selectively providing on-line access to the electronic syllabus by the users.

A course manager screen electronically displays information for use in permitting an instructor to develop an on-line course for the on-line educational system. The screen includes a unit section for receiving an identification of units each representing portions of an educational course, an assignment section for receiving an identification of assignments for the units, and a content section for receiving an identification of educational materials for the units. A syllabus section in the screen illustrates a compilation of the units, the assignments, and the educational materials into an on-line electronic syllabus for the educational course. The syllabus section may include icons identifying the assignments. The course manager screen may also include an access section for selectively providing on-line access to the electronic syllabus by the users.

Figure 3V:
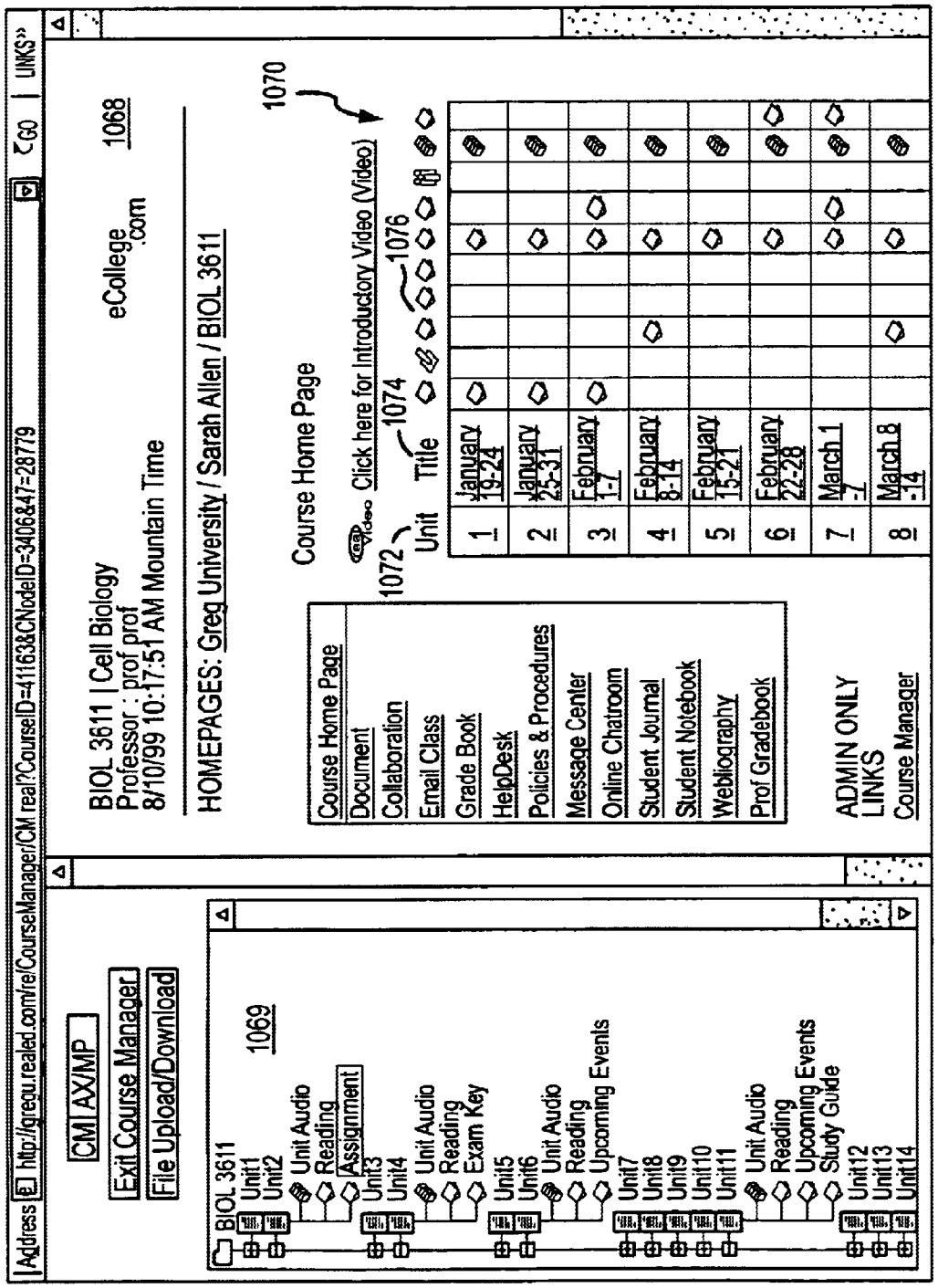
FIG. 3V is a diagram of a course manager screen.
Figure 3W:
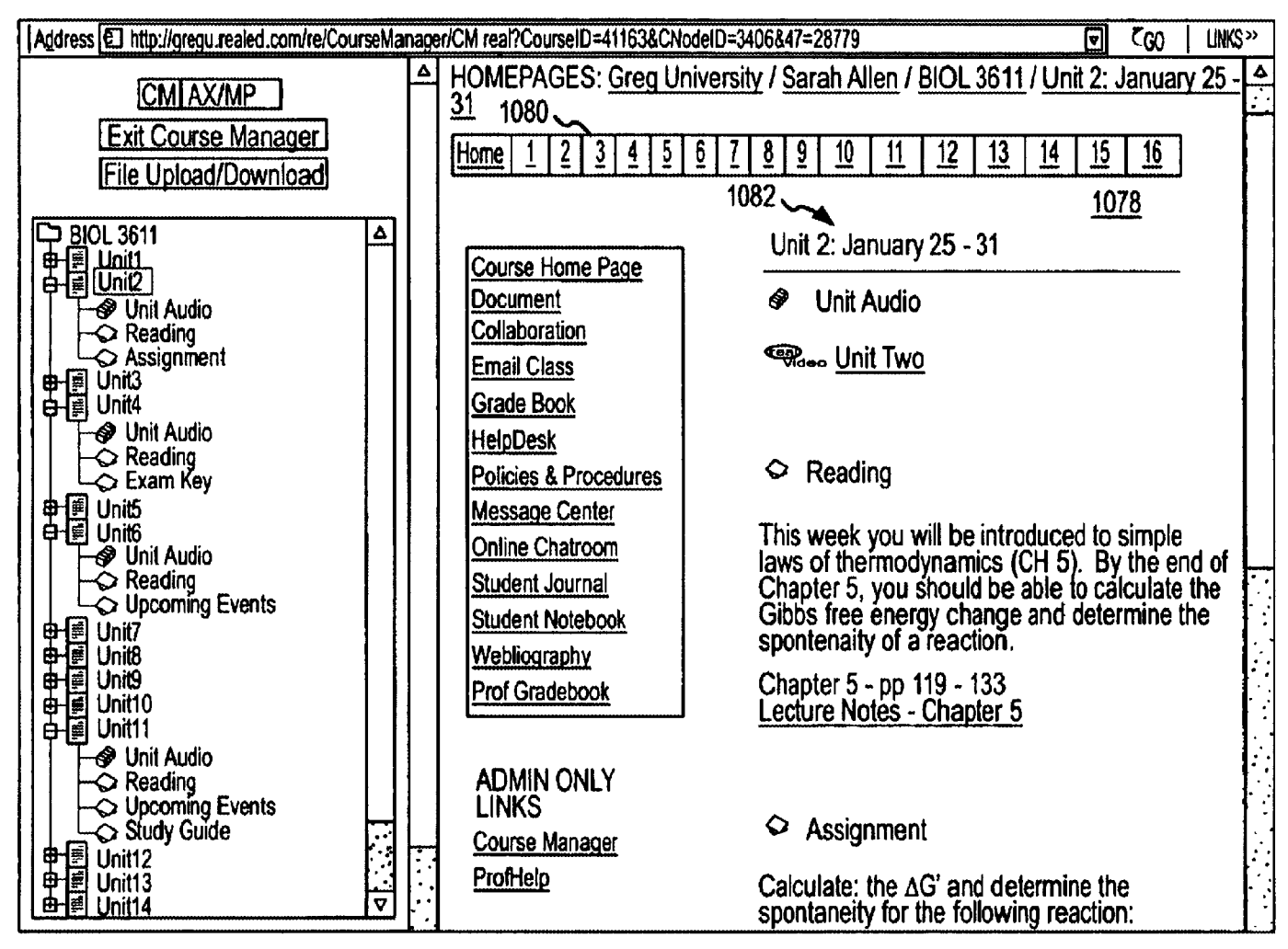
Figure 3X:
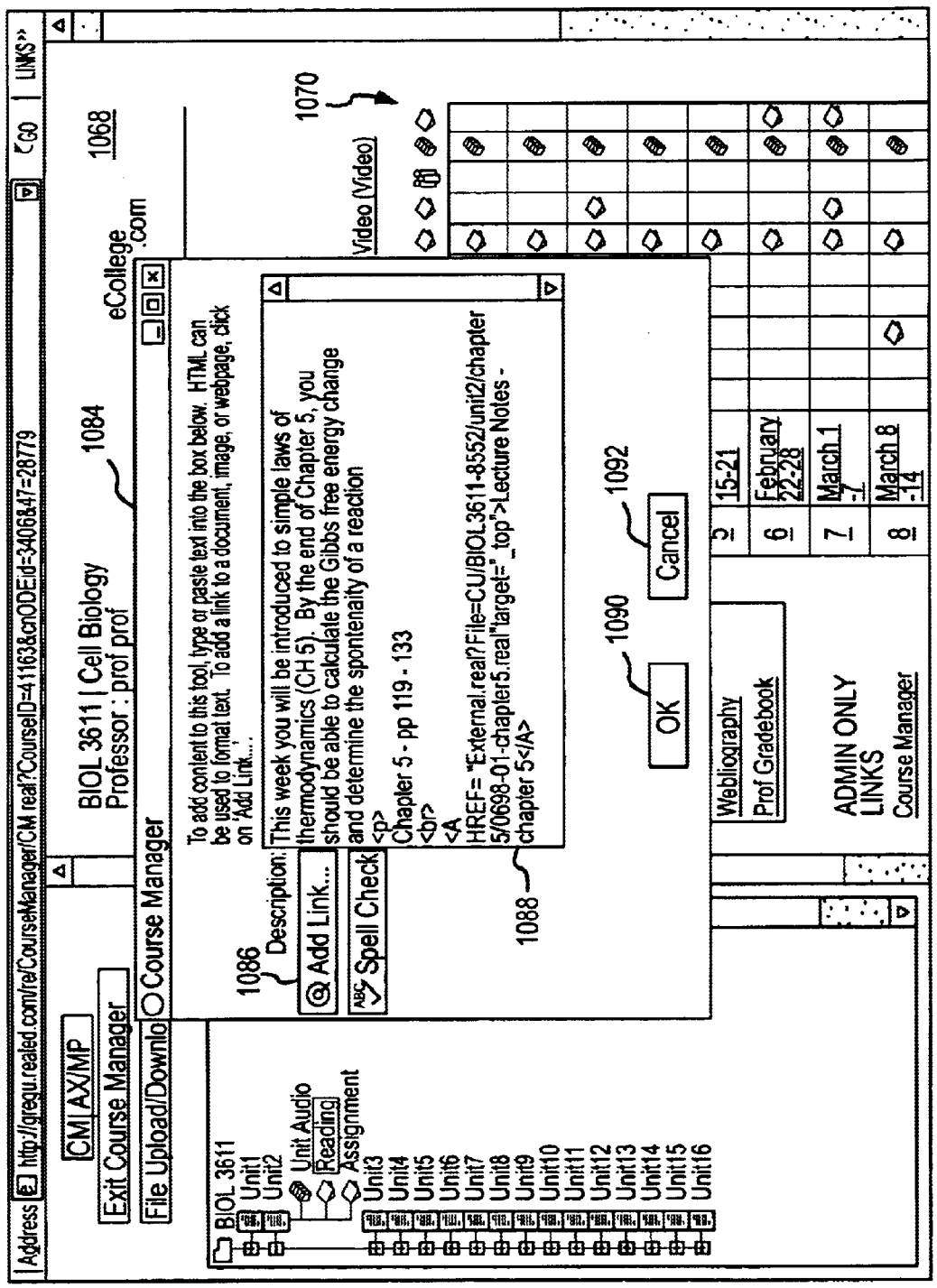

FIGS. 3V–3X are diagrams providing examples of screens for supporting a course manager. In particular, FIG. 3V is a diagram of a course manager screen 1068. An instructor may use course manager screen 1068 in order to build an electronic syllabus for an on-line educational course. Course manager screen 1068 includes an electronic syllabus 1070 identifying units and assignments for a particular course. A unit section 1072 identifies units for the course; in this example the course is divided into weekly units. A date section 1074 identifies the dates for each unit in unit section 1072. A content or assignment section 1076 identifies educational content and the assignments to be completed for each of the units in unit section 1072. In this example the content and assignments are identified by icons, and course manager screen 1068 may include a key explaining the meanings of the icons such as key section 814 shown in home page screen 800 (FIG. 3A).

Course manager screen 1068 also includes a tree section 1069 illustrating content for the course in a tree-type structure; in particular, the structure identifies the units for the course and shows, linked to the units, the corresponding assignments for each unit identified by icons and textual descriptions. Tree section 1069 thus provides an instructor with an outline for the course.

FIG. 3W is a diagram of a course manager unit screen 1078, providing more detail for the particular units in unit section 1072 in course manager screen 1068. Course manager unit screen 1078 includes a section 1080 for an instructor to select particular units of a course. Upon selecting a unit, a section 1082 displays detail for that unit, in this example unit 2. The detail may include identification of the unit, dates of the unit, and information describing assignments for the unit.

FIG. 3X is a diagram of an add content screen 1084 for a course manager. An instructor uses add unit screen 1084 to add or modify content for particular units of a course and thus build the syllabus for the course. Selection of a unit in syllabus 1070 may produce add content screen 1084 and permit the instructor to modify or create that unit. An add link section 1086 permits the instructor to add a link to a document, image, or web page for the unit. An add section 1088 permits the instructor to add or modify content for the unit such as identification and description of assignments for the unit. Selecting save section 1090 saves the entered information and closes add content screen 1084, and selecting cancel section 1092 closes add content screen 1084 without saving the entered information or modifying the unit.

Building of courses is further explained in the Course Manager Guide included in Appendix C.

Figure 1M:
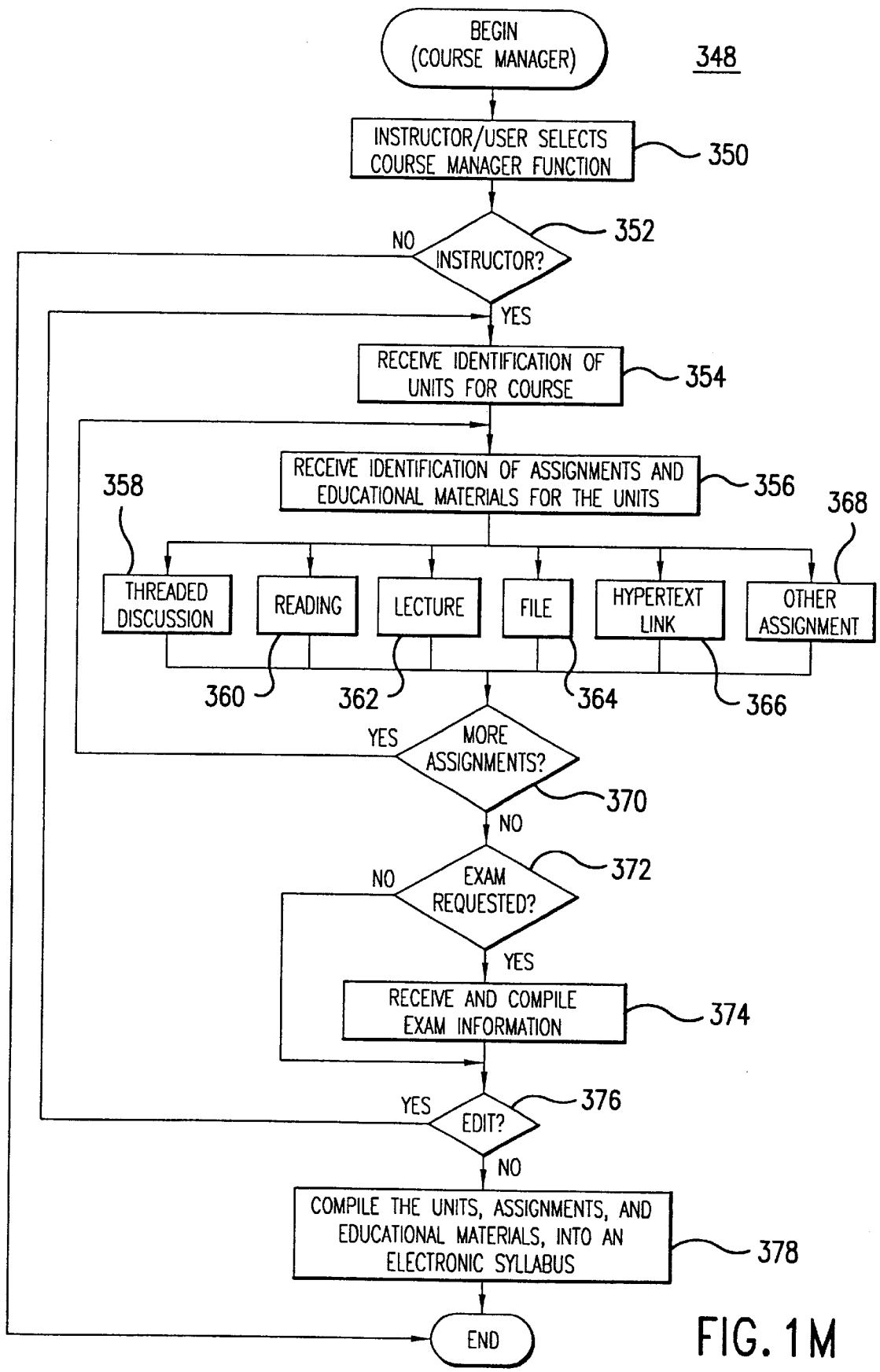
Figure 2A:
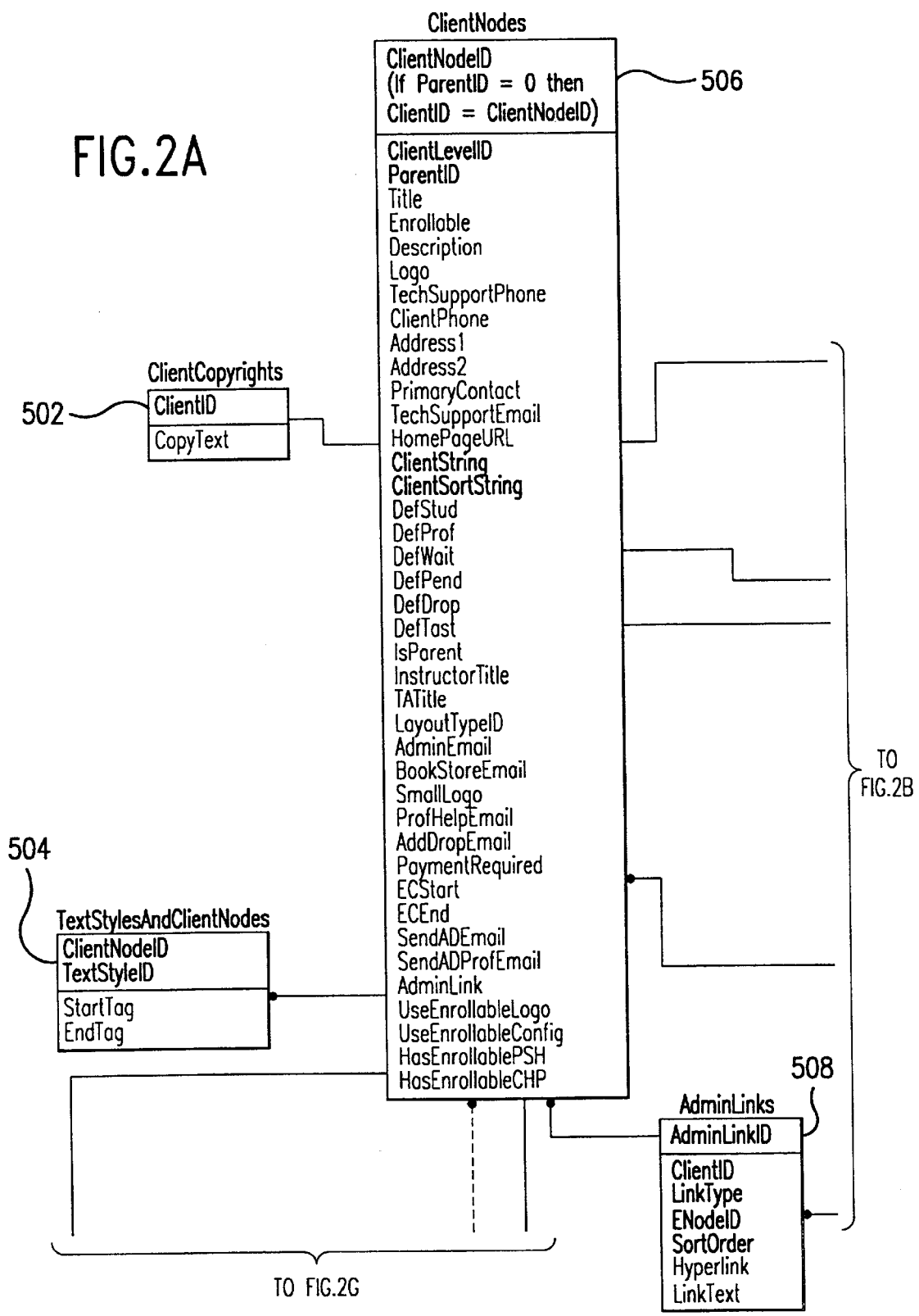
FIGS. 2A–2R are diagrams of a database map illustrating a relational database for an online educational system.
Figure 2B:
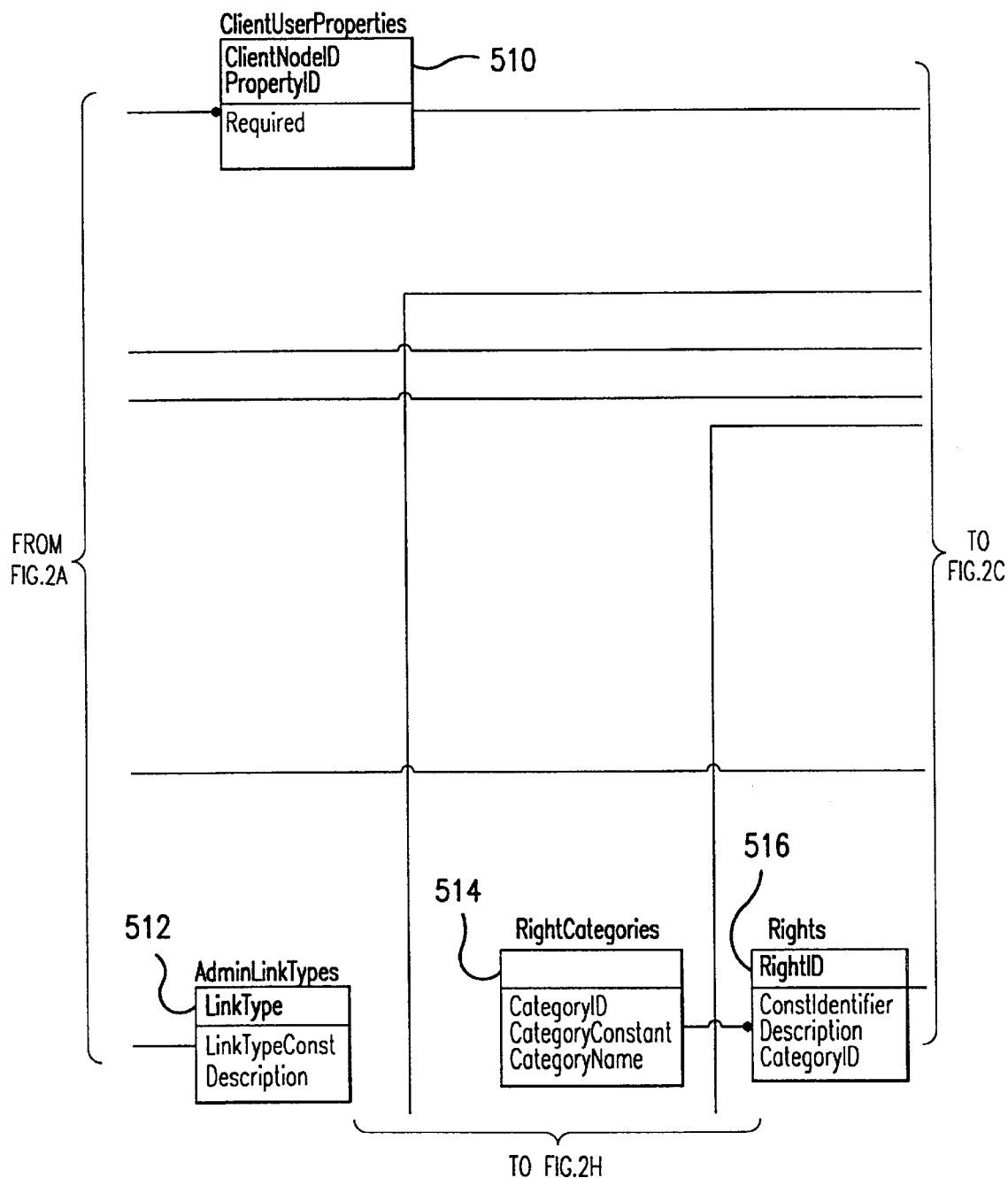
FIG. 2 is a diagram illustrating arrangement of FIGS. 2A–2R for a database map.
Figure 2C:
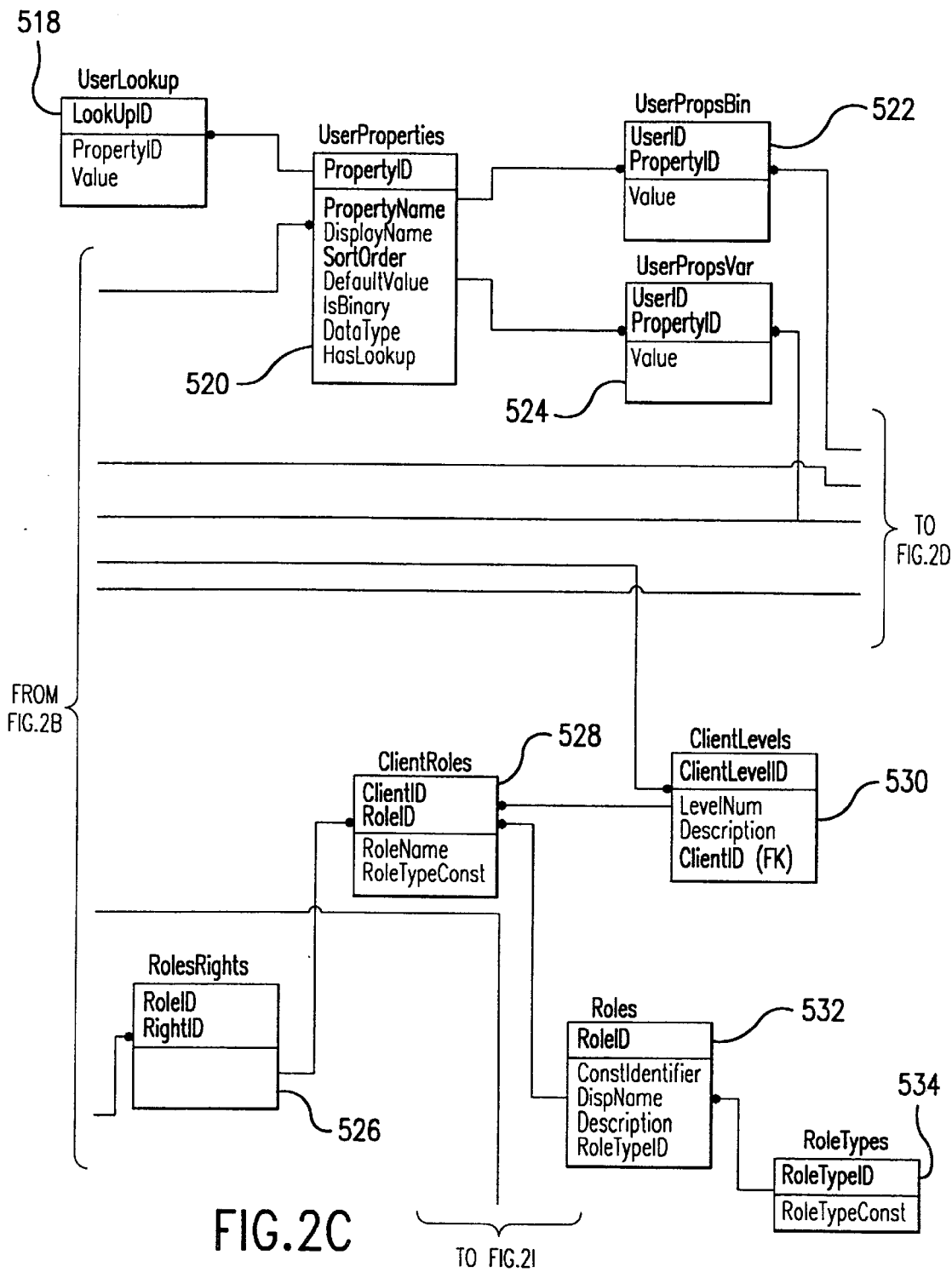
Figure 2D:
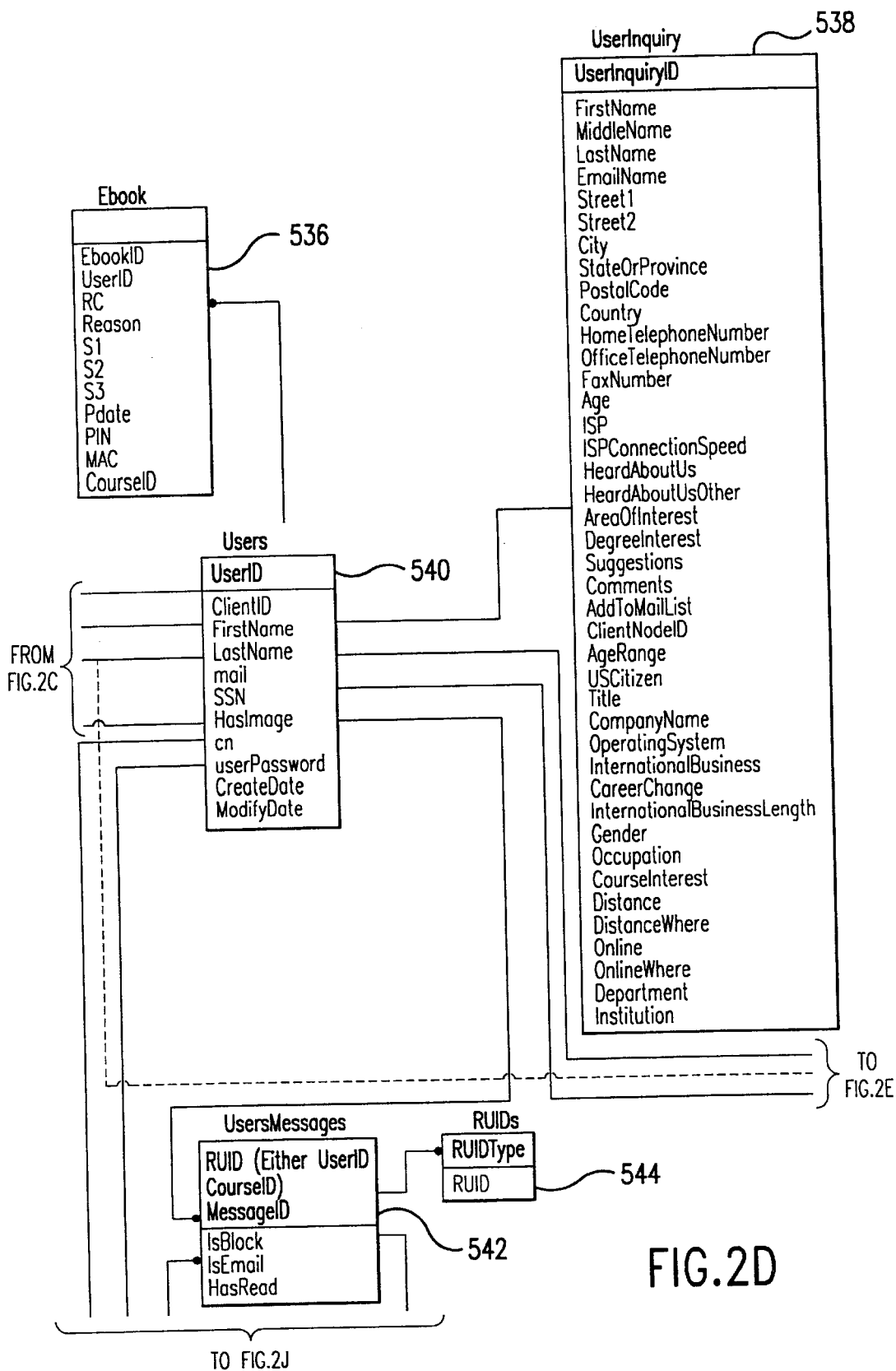
Figure 2E:
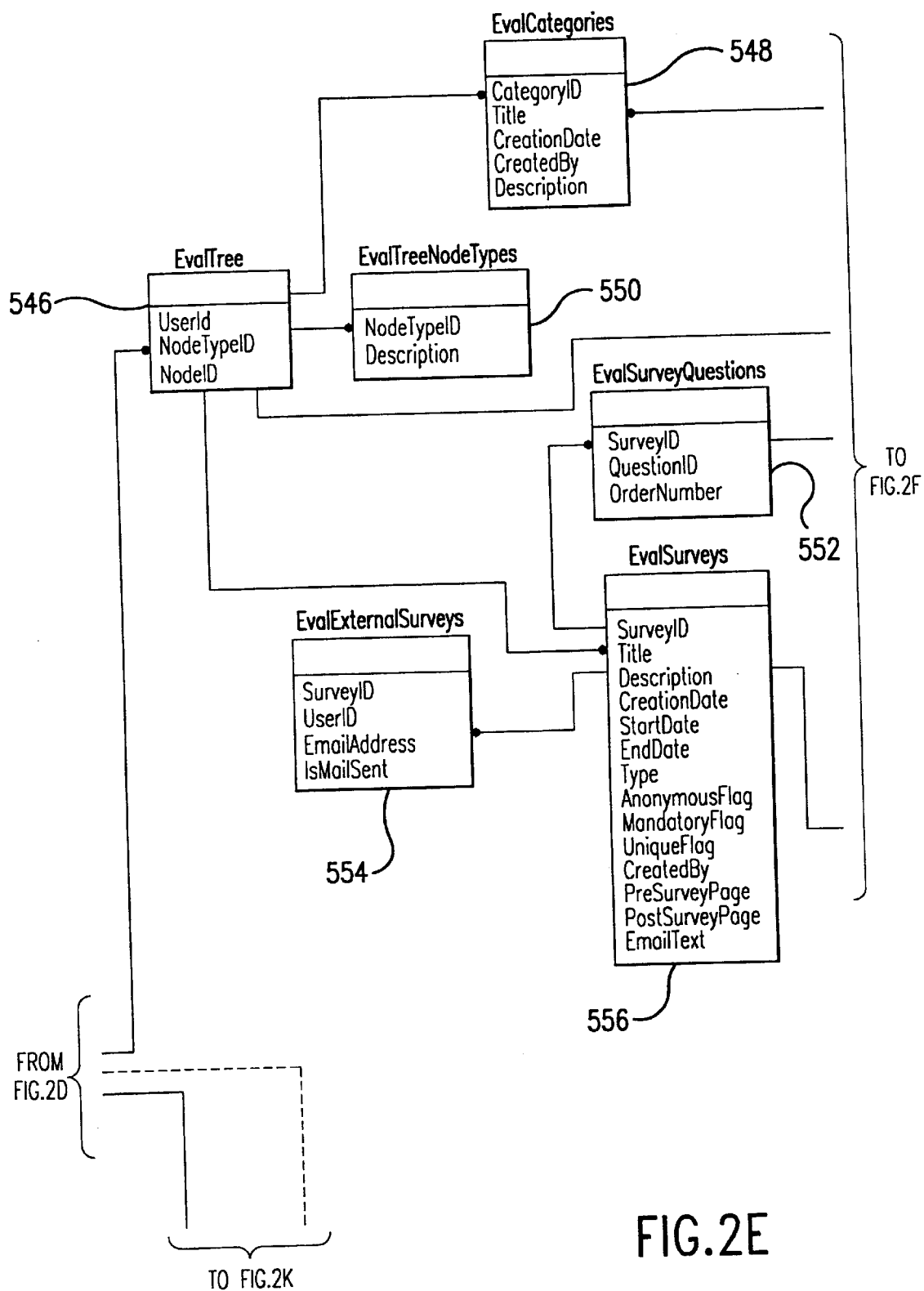
Figure 2F:
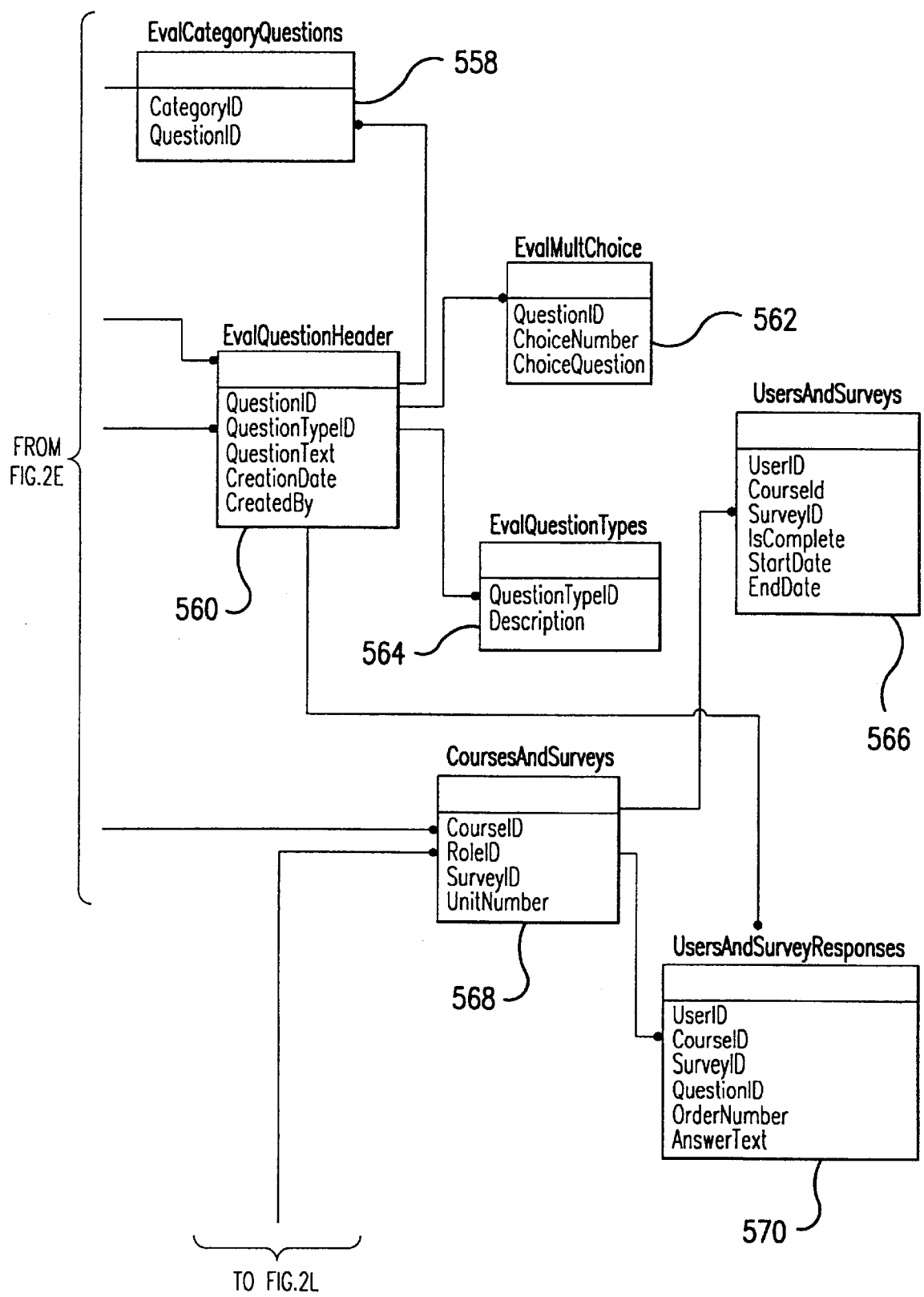
Figure 2G:
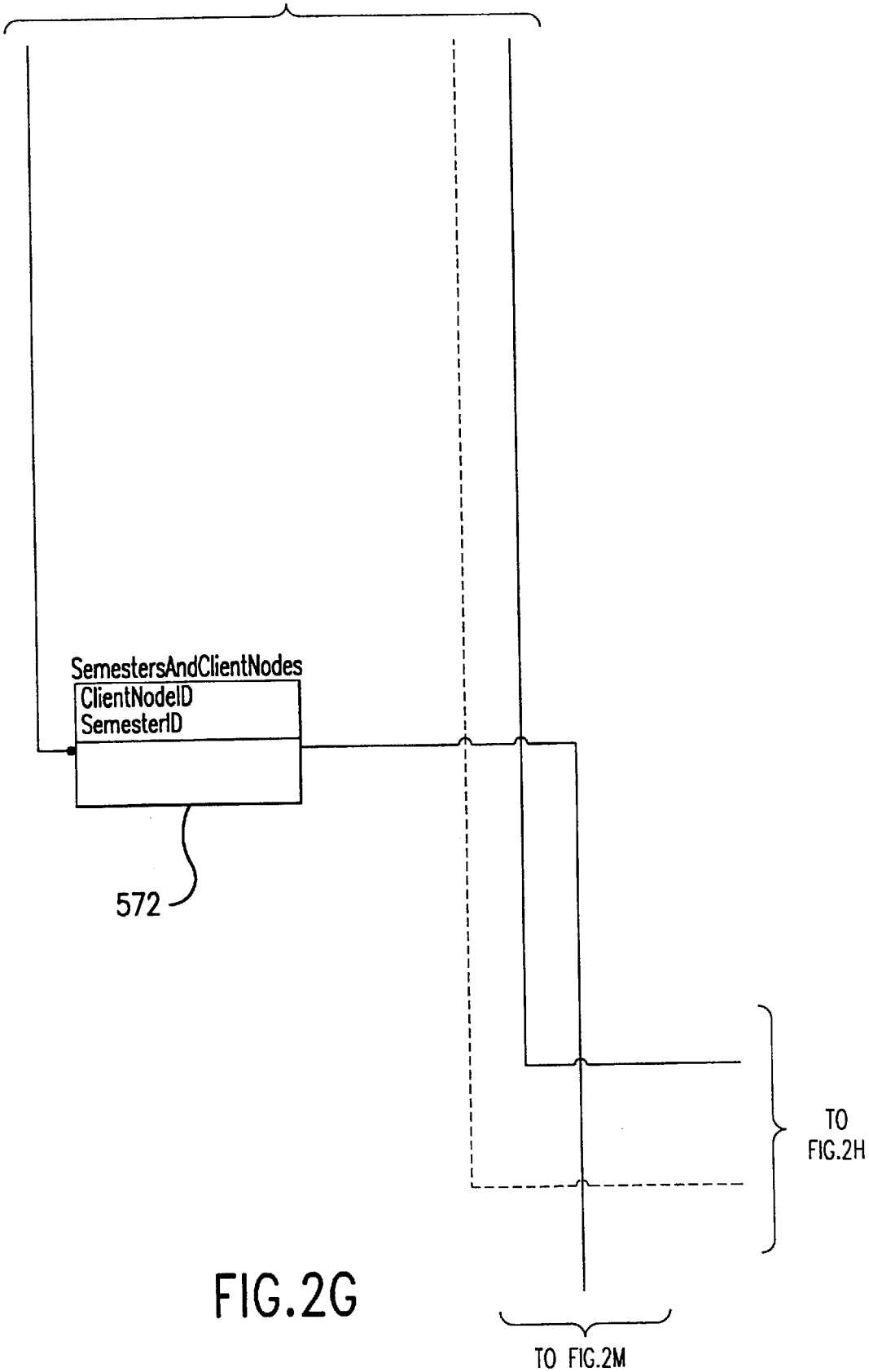
Figure 2I:
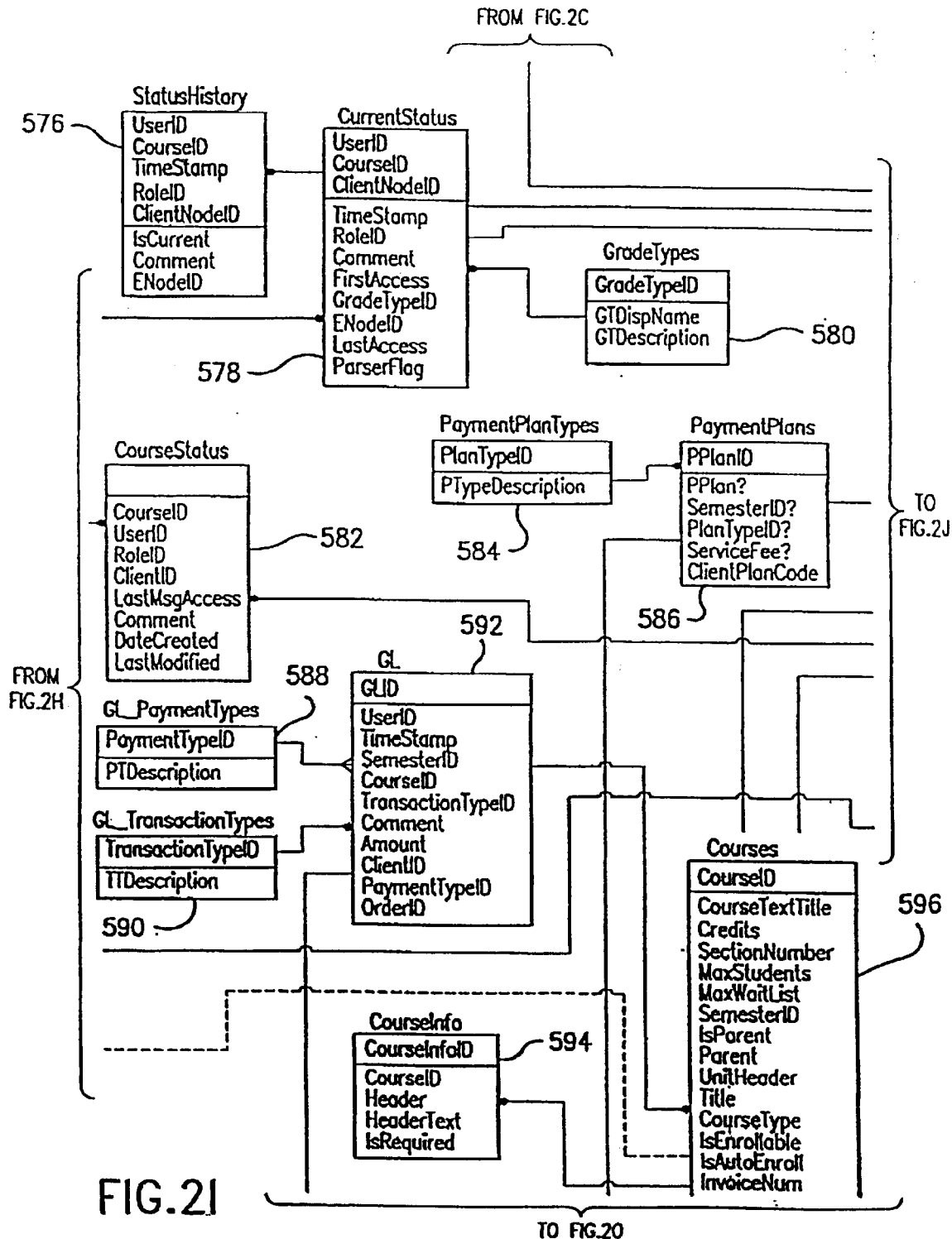
Figure 2J:
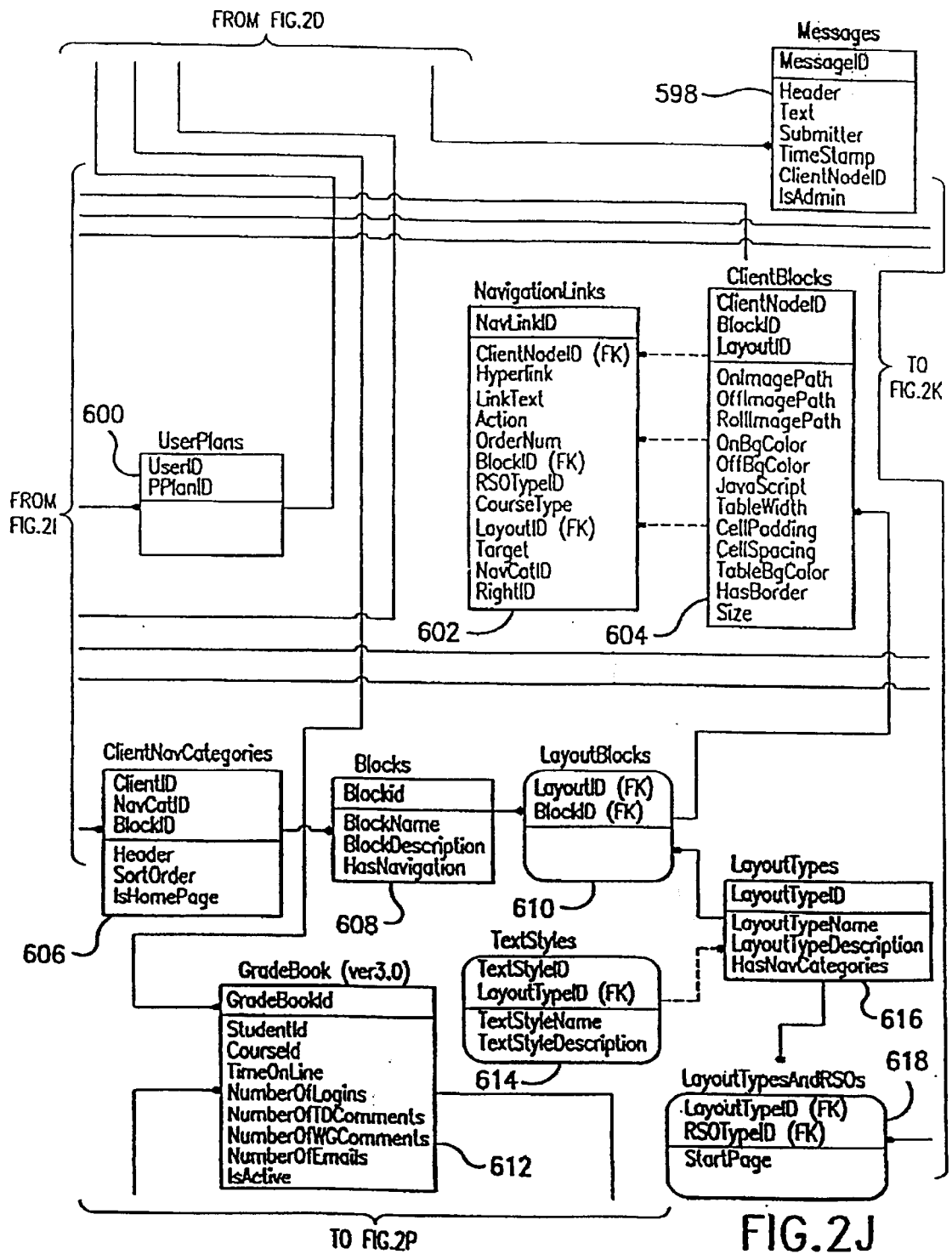
Figure 2K:
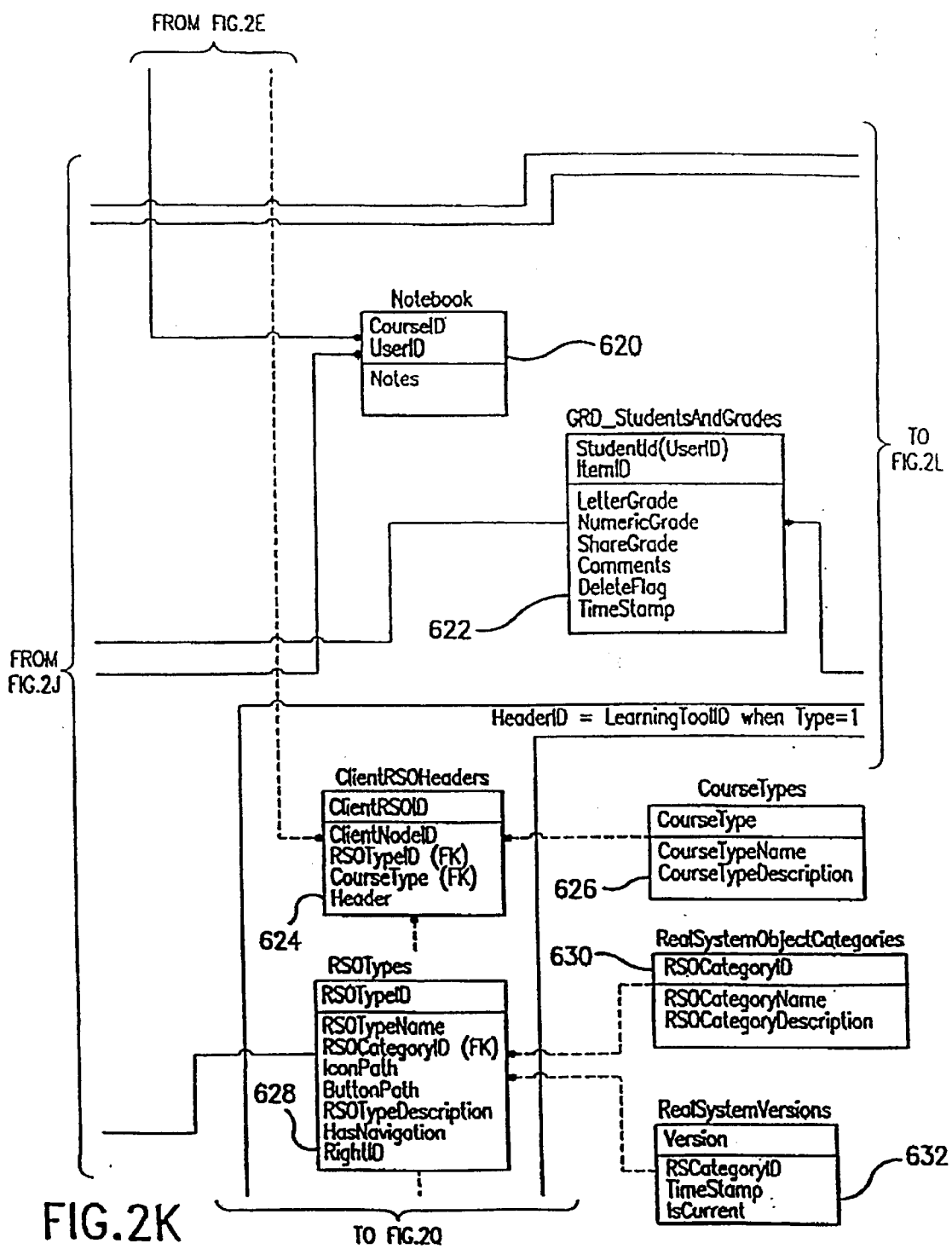
Figure 2L:
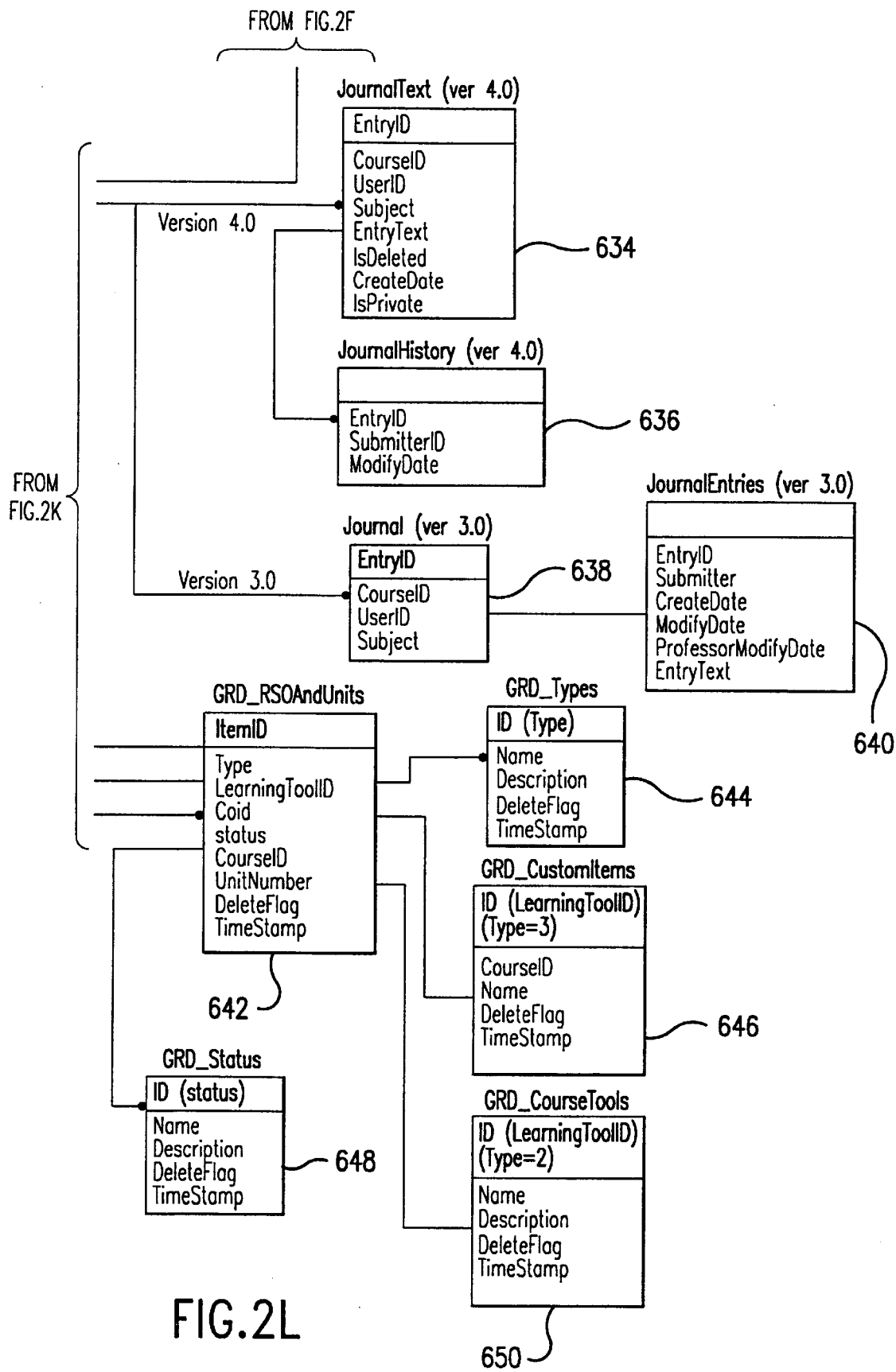
Figure 2M:
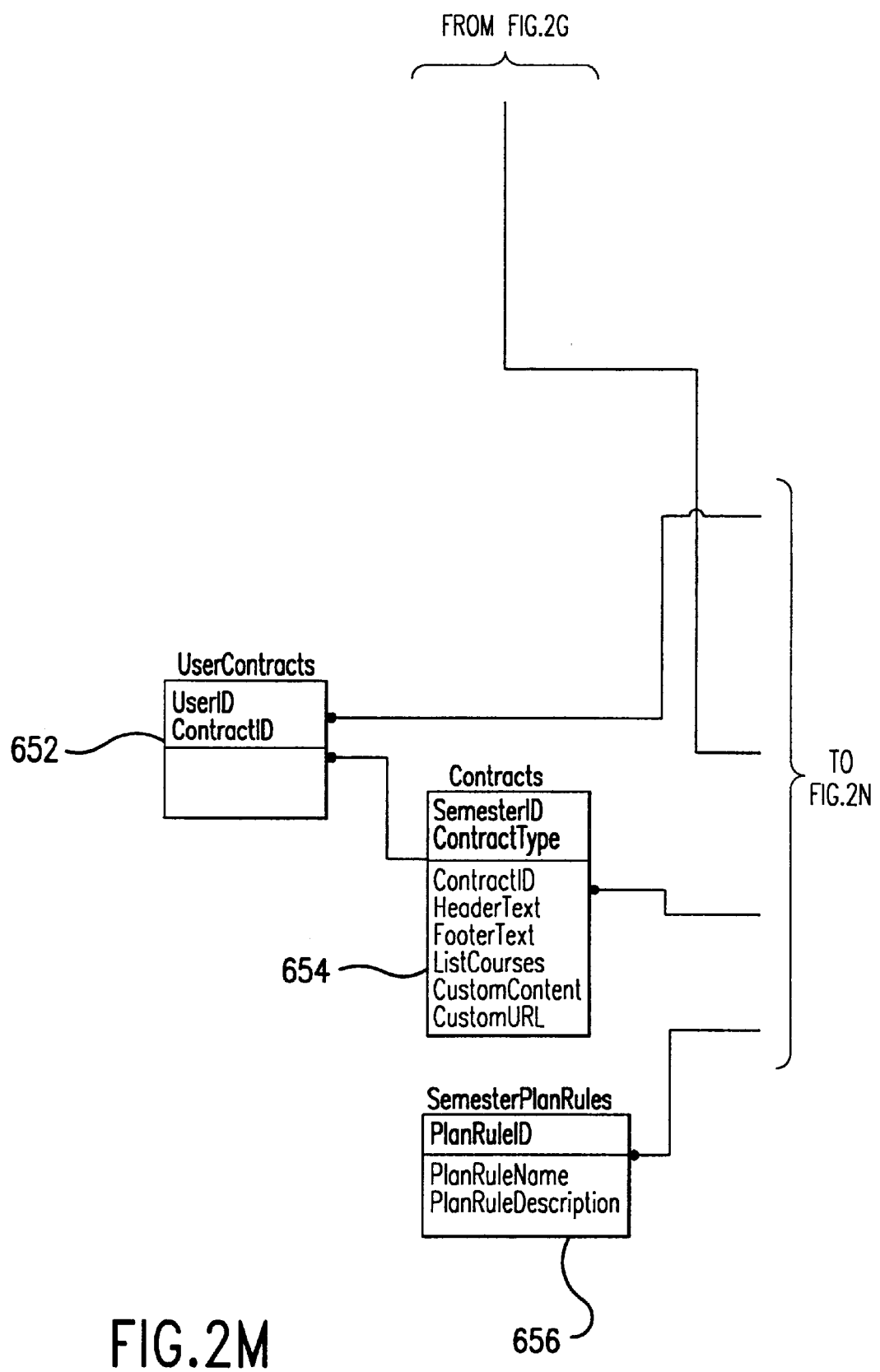
Figure 2N:
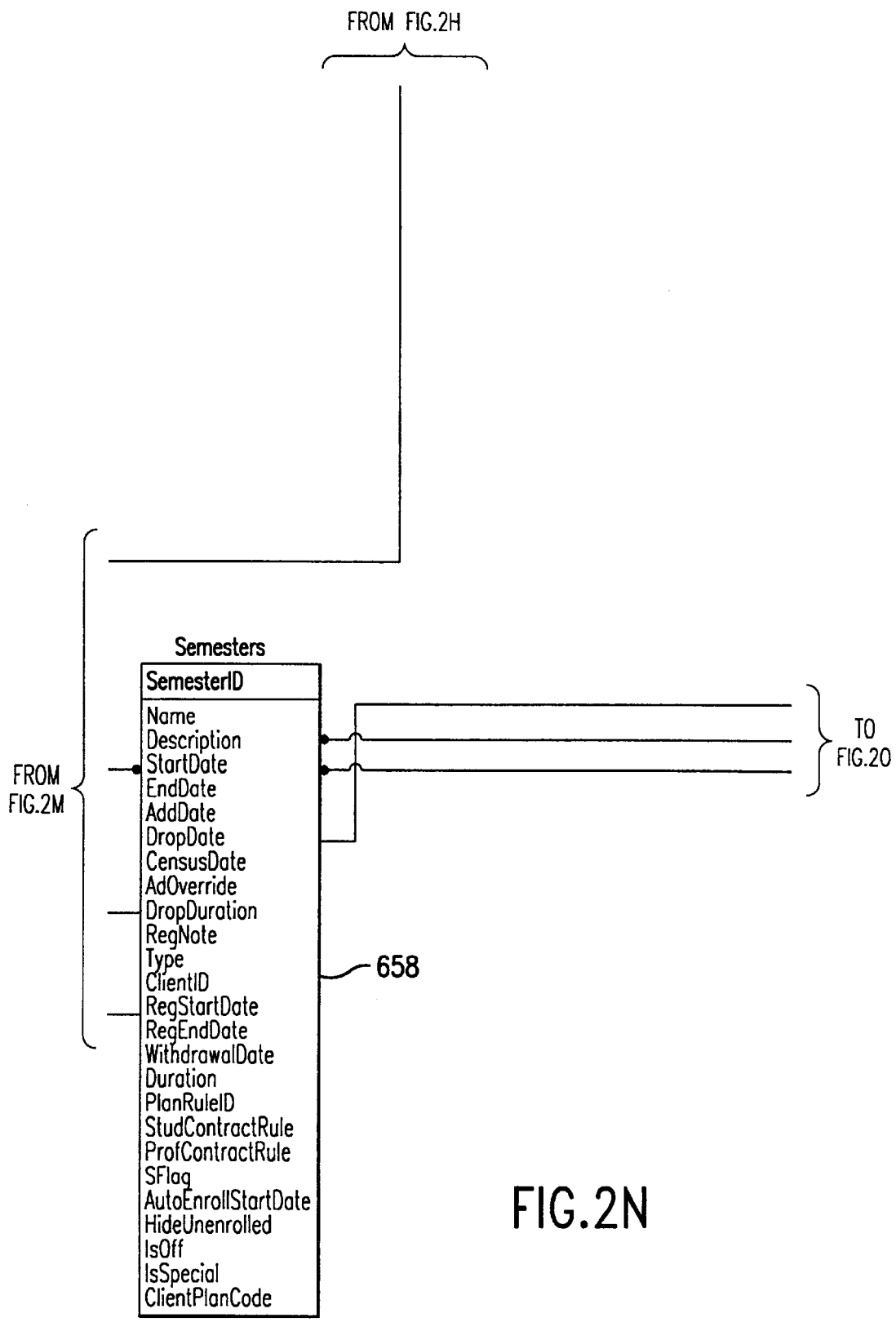
Figure 2O:
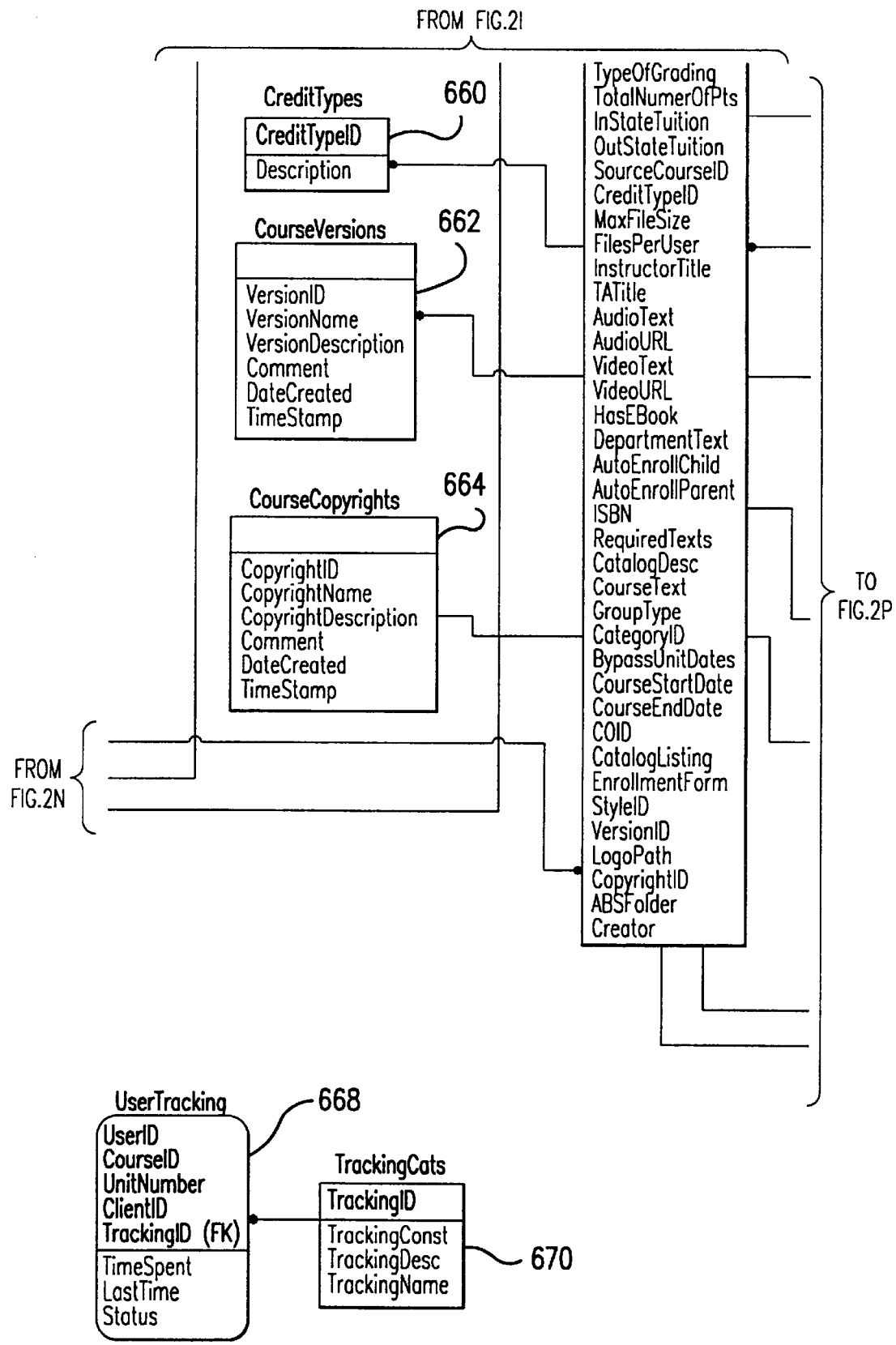
Figure 2P:
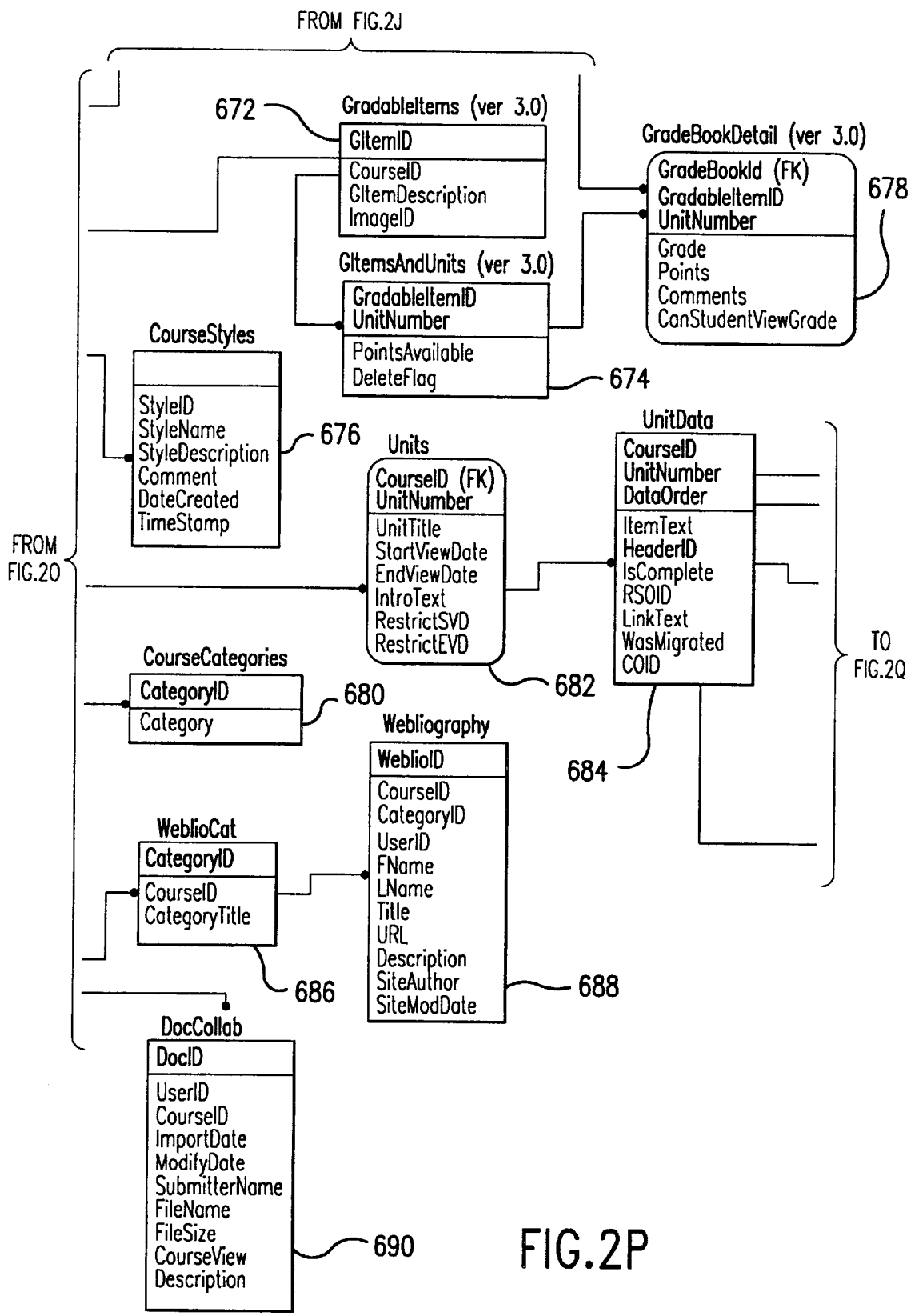
Figure 2Q:
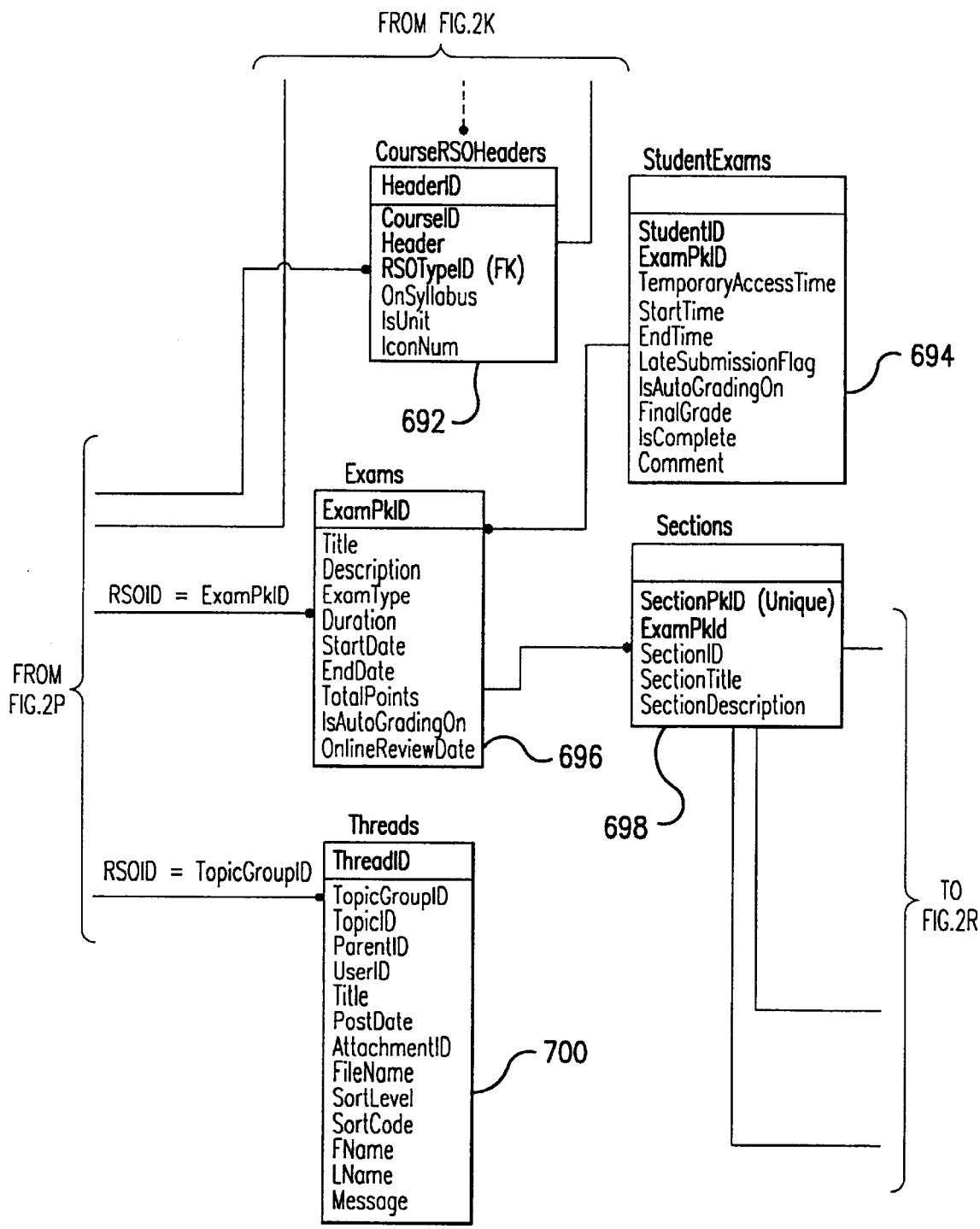
Figure 2R:
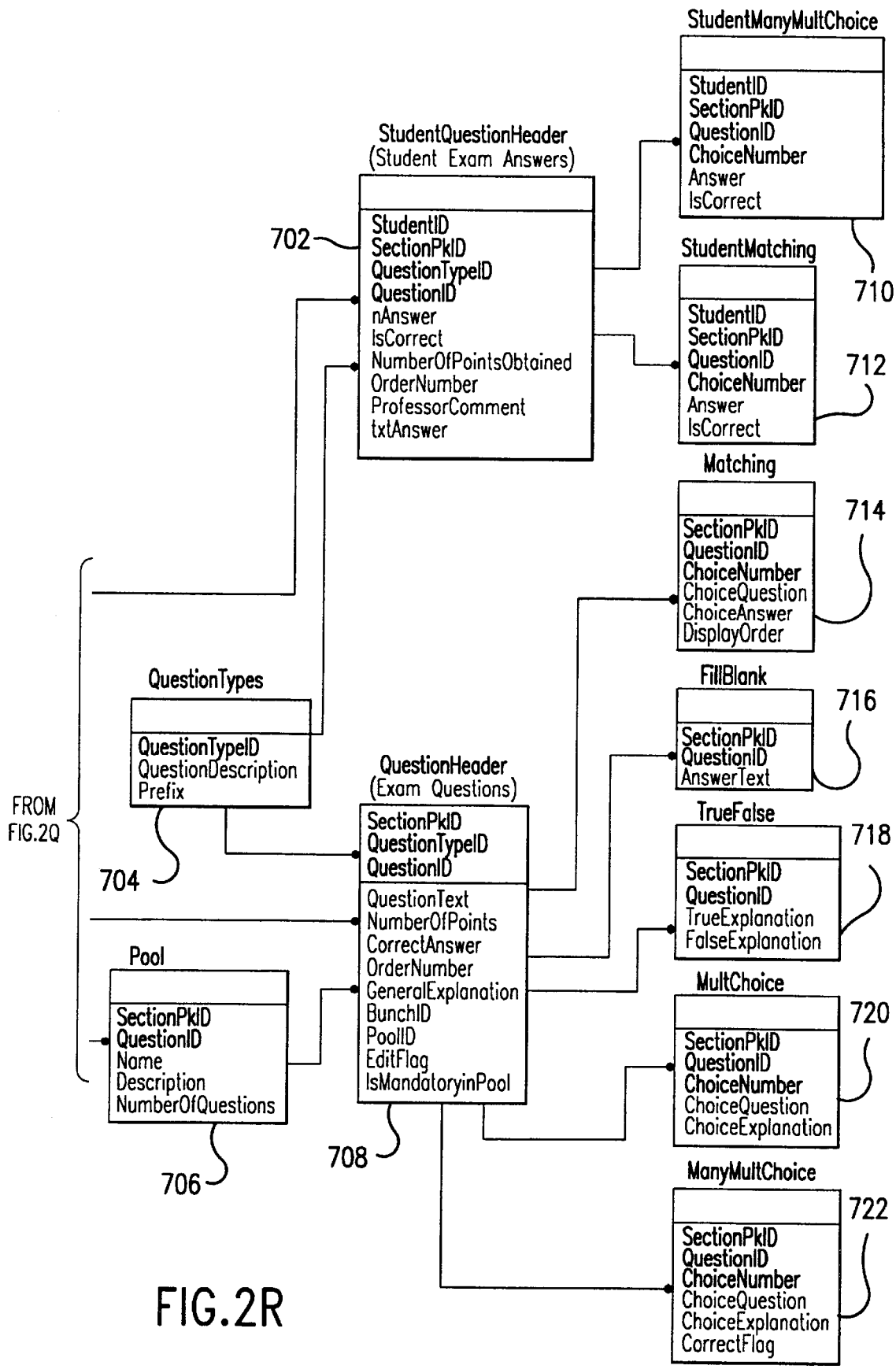

FIG. 1M is a flow chart of a course manager method 348, using the screens shown in FIGS. 3V–3X, for an on-line educational system. Course manager method 348 may use at least the following tables in the database: Tables 582, 594, 596, 602, 626, 662, 682, 684, and 692. In method 348, the instructor or user selects the course manager (step 350). Home page 800 may include a section for selecting the course manager. The system determines if the instructor has selected the function, since the system limits access to the course manager to instructors for building courses (step 352). If an instructor has requested the function, or another person permitted access to it, the system receives identification of units for a particular course as shown in section 1070 (step 354).

The system also receives identification of assignments and educational materials for the course, such as through add content section 1084 (step 356). The assignments and educational content may include one or more of the following: a threaded discussion (step 358); a reading (step 360); a lecture (step 362); a file (step 364); a hyper-text link (step 266); or other assignment information (step 368). The instructor may enter the assignments and educational materials through screen 1084, for example, using add section 1088; the same section may be used for adding both assignments and content. Threaded discussions are explained above. A reading assignment involves textual material, possibly with other information, for reading or viewing by a user. A lecture involves audio or audiovisual information for access by a user; for example, an instructor may record an audio lecture or audiovisual lecture and make the lecture available to users on-line. A file involves a document to be shared with a user. A hyper-text link involves a network address of information to be accessed by the user; for example, it may be a Uniform Resource Locator (URL) for accessing information on the World Wide Web.

The Course Manager Guide in Appendix C further explains adding units, content, and assignments, along with exemplary screens for receiving that information.

The system determines if the instructor enters more assignments (step 370) and, if so, it repeats step 356 to receive identification of additional assignments and educational materials. Otherwise, the system determines if the instructor has requested an exam (step 372). If so, the system receives and compiles exam information (step 374). Exam information may include on-line exams, an example of which is provided above. An instructor or other person may enter information to create an on-line exam as described in the Course Manager Guide in Appendix C.

The system also determines if the instructor wants to edit any of the previously-entered information (step 376). The instructor may repeat various steps in method 348 to edit the information.

When the instructor has finished entering the information for the course, the system compiles the units, assignments and educational materials into an electronic syllabus for the course (step 378). Compiling the information involves placing it in form for storage within an electronic syllabus and for on-line access by users; an examples of such an electronic syllabus is provided above. The system then stores the compiled information on the database for access by users enrolled in the on-line course.

While the present invention has been described in connection with an exemplary embodiment, it will be understood that many modifications will be readily apparent to those skilled in the art, and this application is intended to cover any adaptations or variations thereof. For example, different labels for the various features, screen sections, and methods, and different types of servers, instructor machines, and user machines may be used without departing from the scope of the invention. This invention should be limited only by the claims and equivalents thereof.

Appendix A: Data Element Dictionary for the Database in FIGS. 2A-2R

Table Name  AdminLinks (Table 508)  Version  3.0
Description  This table is used to build links to custom administrative pages.

| Index Name | Index Type | Clustere | Special | | Index Fields |
|---|---|---|---|---|---|
| IX_AdminLinks | Index | Y | | | ClientID LinkType EnodeID SortOrder |
| PK_AdminLinks | Primary | N | | | AdminLinkID |

| Field Name | Field Type | Field Size | Default | Special | Version | Description |
|---|---|---|---|---|---|---|
| AdminLinkID | Integer | 4 | | Identity(1,1) | 3.0 | Used to uniquely identify a row in the AdminLink table |
| ClientID | Integer | 4 | | | 3.0 | Foreign key to the ClientNode table. |
| ENodeID | Integer | 4 | 0 | | 3.0 | Identifier for the enrollable node that is using this administrative link. |
| Hyperlink | Text | 255 | | | 3.0 | The link to go to when this page is clicked on. |
| LinkText | Text | 255 | | | 3.0 | The text used to describe the link that will be clicked on. |
| LinkType | Integer | 4 | | | 3.0 | Specifies whether the link should be shown on the Administrative Pages. |
| SortOrder | Small Integer | 2 | | | 3.0 | The order in which the links should be displayed on the page. |

| Table Name | AdminLinkTypes (Table 512) | | Version | 3.0 | |
|---|---|---|---|---|---|
| Description | This table is used to describe the types of Links used int the AdminLinks table. There are currently only two types of Links used (1) Edit Course and (2) AdminReports. | | | | |

| Index Name | Index Type | Clustered | Special | | Index Fields |
|---|---|---|---|---|---|
| PK_AdminLinkTypes | Primary | Y | | | LinkType |

| Field Name | Field Type | Field Size | Default | Special | Version | Description |
|---|---|---|---|---|---|---|
| Description | Text | 255 | | | 3.0 | Full Description of the LinkType |
| LinkType | Integer | 4 | | | 3.0 | Numeric value stored in the AdminLink table to identify the type of link. |
| LinkTypeConst | Text | 30 | | | 3.0 | Short Description of the LinkType |

| Table Name | Blocks (Table 608) | | Version | 3.0 | |
|---|---|---|---|---|---|
| Description | This table is used to provide descriptions for page design elements. | | | | |

| Index Name | Index Type | Clustered | Special | | Index Fields |
|---|---|---|---|---|---|
| PK_Blocks | Primary | N | | | BlockID |

| Field Name | Field Type | Field Size | Default | Special | Version | Description |
|---|---|---|---|---|---|---|
| BlockDescription | Text | 255 | | | 3.0 | Long description of the the design element on the page |
| BlockId | Text | 20 | | | 3.0 | Unique identifier for the design element on a page. |
| BlockName | Text | 30 | | | 3.0 | Short description of the design element on the page(title) |
| HasNavigation | Bit | 1 | 0 | | 3.0 | Specifies whether this design element contains a navigation bar. |

| Table Name | ClientBlocks (Table 604) | | Version | 3.0 | |
|---|---|---|---|---|---|
| Description | This table is used to describe the characteristics of pages that are used by specific Educational Partners. | | | | |

| Index Name | Index Type | Clustered | Special | Index Fields | |
|---|---|---|---|---|---|
| FK_NavigationB_LayoutBlock | Foreign Key | N | LayoutBlocks | LayoutID BlockID | |
| PK_NavigationBlocks | Primary | Y | | ClientNodeID BlockID LayoutID | |

| Field Name | Field Type | Field Size | Default | Special | Version | Description |
|---|---|---|---|---|---|---|
| BlockID | Text | 20 | | | 3.0 | Unique identifier for the design element on a page. |
| CellPadding | Integer | 4 | | | 3.0 | The value of the cellpadding attribut of a table tag used during display of the design element. |
| CellSpacing | Integer | 4 | | | 3.0 | The value of the cellspacing attribut of a table tag used during display of the design element. |
| ClientNodeID | Integer | 4 | | | 3.0 | Foreign key to the ClientNode table. |
| HasBorder | Bit | 1 | 0 | | 3.0 | The values of the border attribute of a table tag used during display of the design element. |
| JavaScript | Bit | 1 | 0 | | 3.0 | Indicates whether this design element uses javascript functions. Only used with navigation item. |
| LayoutID | Text | 1 | | | 3.0 | Unique identifier for the overall page layout design. |
| OffBgColor | Text | 20 | | | 3.0 | The value of the bgcolor attribute of a table tag used during display of the design element when it is currently active. |
| OffImagePath | Text | 50 | | | 3.0 | The image to be used during navigation when the item is not currently selected. |
| OnBgColor | Text | 20 | | | 3.0 | The value of the bgcolor attribute of a table tag used during display of the design element when it is inactive. |
| OnImagePath | Text | 50 | | | 3.0 | The image to be used during navigation when the item is currently selected. |
| RollImagePath | Text | 50 | | | 3.0 | The image to be used during navigation when the item is moused over. |
| Size | Integer | 4 | | | 3.0 | The value of the size attribute of a table tag used during display of the design element. |

| Field Name | Field Type | Field Size | Default | Clustered | Special | Description |
|---|---|---|---|---|---|---|
| TableBgColor | Text | 20 | | | | The value of the bgcolor attribute of a table tag used during display of the design element. |
| TableWidth | Text | 4 | | | | The value of the width attribute of a table tag used during display of the design element. |

Table Name ClientCopyrights (Table 502)　　Version 3.0

Description This table contains the location, text, image, characteristics and screen placement of copyright information, if required, for an Educational Partner. If used, there will only be an entry for the Parent Level of the Educational Partner.

| Index Name | Index Type | Clustered | Special | Index Fields | | Version |
|---|---|---|---|---|---|---|
| PK_ClientCopyRights | Primary | Y | | ClientID | | 3.0 |

| Field Name | Field Type | Field Size | Default | Clustered | Special | Description | Version |
|---|---|---|---|---|---|---|---|
| ClientID | Integer | 4 | | | | Foreign key to the ClientNode table. | 3.0 |
| CopyText | Memo | | | | | The actual copy right text that is displayed to the users of the system. | 3.0 |

| Table Name | ClientLevels (Table 530) | | | Version | 3.0 | | |
|---|---|---|---|---|---|---|---|
| Description | This table is used to identify the relationship between an educational partner (EP) or client, providers of courses, and any sublevels that it uses. Sublevel 1 is the Parent organization for an EP. ClientID is equal to the ClientNodeID in the ClientNode table. It always matches to the Parent organization. ClientLevelID makes each row in this table unique. | | | | | | |

| Index Name | | Index Type | Clustere | Special | | Index Fields | |
|---|---|---|---|---|---|---|---|
| IX_ClientLevels | | Index | Y | Unique | | ClientID LevelNum | |
| PK_ClientLevel_1_12 | | Primary | N | | | ClientLevelID | |
| RootNodeLevelNum | | Index | N | Unique | | LevelNum ClientID | |

| Field Name | Field Type | Field Size | Default | Special | Version | Description |
|---|---|---|---|---|---|---|
| ClientID | Integer | 4 | | | 3.0 | The unique identifier for the highest level of an Educational Partner's organization (parent node). ClientID is the same as ClientNodeID in the ClientNode table when the ParentID in that table is equal to 0. |
| ClientLevelID | Integer | 4 | | | 3.0 | Unique ID for a level (PK) |
| Description | Text | 50 | | | 3.0 | description of the level |
| LevelNum | Byte | 1 | | | 3.0 | depth of the level in the tree |

| Table Name | ClientNavCategories (Table 606) | | Version | 3.0 | | | |
|---|---|---|---|---|---|---|---|
| Description | This table is used to link the ClientNode table to the Blocks table. | | | | | | |

| Index Name | Index Type | Clustere | Special | | Index Fields | | |
|---|---|---|---|---|---|---|---|
| IX_NavCatCluster | Index | Y | | | ClientID BlockID SortOrder | | |
| PK_ClientNavCategories | Primary | N | | | ClientID NavCatID BlockID | | |

| Field Name | Field Type | Field Size | Default | Special | Version | Description |
|---|---|---|---|---|---|---|
| BlockID | Text | 20 | | | 3.0 | Unique identifier for the design element on a page. |
| ClientID | Integer | 4 | | | 3.0 | Foreign key to the ClientNode table. |
| Header | Text | 100 | Features | | 3.0 | The text that will be displayed for this navigation category. |
| IsHomePage | Bit | 1 | 0 | | 3.0 | Determines whether this is a link to either a Course, Unit or Personal Home Page. |
| NavCatID | Integer | 4 | | | 3.0 | Uniquely identifies the navigation category. |
| SortOrder | Integer | 4 | | | 3.0 | The order in which the navigation categories will be displayed. |

| Table Name | ClientNodes (Table 506) | | Version | 3.0 | |
|---|---|---|---|---|---|
| Description | This table contains entries for all Educational Partners (Eps) and their identified organizational sublevels. It supports up to five sublevels per EP. Sublevels are not always used and the description for each sublevel may be different. An example of an EP with all five sublevels would be (1) University, (2) College, (3) Campus, (4) Department, and (5) Subdepartment. The highest level for an EP is identified by setting the ParentID field to 0. Each sublevel has the parent level identified in the ParentID field. The ClientNodeID field makes up the primary index for this table and when ParentID is equal to 0, the ClientNodeID field is equal to the ClientID which is used in other related tables. | | | | |

| Index Name | Index Type | Clustere | Special | | Index Fields |
|---|---|---|---|---|---|
| IX_ClientNodes | Index | N | | | ClientString |
| IX_ClientNodes_1 | Index | N | | | ParentID Title |
| IX_ClientNodes_2 | Index | N | | | ClientLevelID |
| IX_ClientSortString_Clust | Index | Y | Unique | | ClientSortString |
| PK_ClientNodeID | Primary | N | | | ClientNodeID |

| Field Name | Field Type | Field Size | Default | Special | Version | Description |
|---|---|---|---|---|---|---|
| AddDropEmail | Text | 50 | | | 3.0 | email address to send add/drop notification |
| Address1 | Text | 255 | | | 3.0 | primary contact address |
| Address2 | Text | 255 | | | 3.0 | primary contact address |
| AdminEmail | Text | 50 | | | 3.0 | Administrator email address |
| AdminLink | Bit | 1 | 1 | | 3.0 | Display link to admin reports on PSH or not, only for users with correct right |
| BookStoreEmail | Text | 50 | | | 3.0 | email address for emails generated from the standard book store |
| ClientLevelID | Integer | 4 | 0 | | 3.0 | points to client levels table |
| ClientNodeID | Integer | 4 | | | 3.0 | The unique identifier for whole or a portion of an Educational Partner's organization. This may be used to identify a university, a campus of a university, or the math department of a college. |
| ClientPhone | Text | 20 | | | 3.0 | Primay Phone number for Client |
| ClientSortString | Text | 50 | | | 3.0 | Stores sorting algorithm used to return nodes in order of EP heirarchy and used to navigate nodes easily (levelonenodestring.levelrwonodestring.levelthreenodestring, etc |

| Field | Type | Size | | Version | Description |
|---|---|---|---|---|---|
| ClientString | Text | 100 | | 3.0 | A unique string identifier for each client (parent ID 0) used for folder names, web site virtual roots, etc |
| DefDrop | Integer | 4 | 0 | 3.0 | Default role assigned when user is dropped (not in use) |
| DefPend | Integer | 4 | 0 | 3.0 | the default role used in registration if no other is provided |
| DefProf | Integer | 4 | 0 | 3.0 | Defualt role for prof (probably not in use) |
| DefStud | Integer | 4 | d | 3.0 | the default role used in Add/Drop if no other is provided |
| DefTast | Integer | 4 | 0 | 3.0 | default TA role (probably not in use) |
| DefWait | Integer | 4 | 0 | 3.0 | Default role for waitlisted students |
| Description | Text | 255 | | 3.0 | description of the client node |
| ECEnd | Byte | 1 | 5 | 3.0 | |
| ECStart | Byte | 1 | 1 | 3.0 | |
| Enrollable | Bit | 1 | 0 | 3.0 | Can users enroll in at this node. Only one enrollable node per branch of client tree |
| HasEnrollableCHP | Bit | 1 | 0 | 3.0 | allow custom navigation on Course Home Page for this node, enrollable nodes only |
| HasEnrollablePSH | Bit | 1 | 0 | 3.0 | allow custom navigation on PSH for this node, enrollable nodes only |
| HomePageURL | Text | 50 | | 3.0 | Client URL |
| InstructorTitle | Text | 30 | | 3.0 | default instructor title |
| IsParent | Bit | 1 | 0 | 3.0 | Child nodes exist for this node |
| LayoutTypeID | Text | 1 | | 3.0 | Layout Type for this Client, top level nodes only |
| Logo | Text | 255 | | 3.0 | path to logo |
| ParentID | Integer | 4 | 0 | 3.0 | ID of parent node. Value of 0 indicates top level or Client |
| PaymentRequired | Bit | 1 | 0 | 3.0 | not in use |
| PrimaryContact | Text | 50 | | 3.0 | unk |
| ProfHelpEmail | Text | 50 | | 3.0 | email address for prof help |

| Field Name | Field Type | Field Size | Default | Description |
|---|---|---|---|---|
| SendADEmail | Bit | 1 | 0 | should automatic add drop email be sent or not (to admin email) |
| SendADProfEmail | Bit | 1 | 0 | should automatic email be sent to prof on Add Drop |
| SmallLogo | Text | 255 | | path to small logo |
| TATitle | Text | 30 | | Default TA Title (prob not in use) |
| TechSupportEmail | Text | 50 | | tech support email address |
| TechSupportPhone | Text | 50 | | tech support phone |
| Title | Text | 100 | | title / name of node |
| UseEnrollableConfig | Bit | 1 | 0 | Turns on or off enrollable specific configurations |
| UseEnrollableLogo | Bit | 1 | 0 | Turns on or off enrollable node specific logos |

Table Name ClientRoles (Table 528)  Version 3.0

Description This table defines the roles that are available for each users assigned to a course of an Educational Partner. These roles are assigned to the Parent Level of the Educational Partner (ParentID equals 0 in the ClientNode table). Examples of roles would be student, professor, or teaching assistance. These roles would also include dropped, admin, withdraw, and denied.

| Index Name | Index Type | Clustered | Special | Index Fields |
|---|---|---|---|---|
| PK_ClientRoles | Primary | Y | | ClientID RoleID |

| Field Name | Field Type | Field Size | Default | Special | Version | Description |
|---|---|---|---|---|---|---|
| ClientID | Integer | 4 | | | 3.0 | Foreign key to the ClientLevels table. |
| RoleID | Integer | 4 | | | 3.0 | links to roles.roleid |
| RoleName | Text | 100 | | | 3.0 | specific role name used for the client. Mainly refered to in the university reports. |
| RoleTypeConst | Text | 4 | | | 3.0 | redundant data from roles.roletypeid to roletypes.toletypeid |

| Table Name | ClientRSOHeaders (Table 624) | | | Version | 3.0 | |
|---|---|---|---|---|---|---|
| Description | This table is used to link the ClientNode table to the system that the Educational Provider uses. | | | | | |

| Index Name | Index Type | Clustere | Special | | | Index Fields |
|---|---|---|---|---|---|---|
| FK_ClientRSOHe_CourseTypes | Foreign Key | N | CourseTypes | | | CourseType |
| FK_ClientRSOHeaders_RSOTypes | Foreign Key | N | RSOTypes | | | RSOTypeID |
| IX_ClientRSOHeaders | Index | Y | Unique | | | ClientNodeID CourseType RSOTypeID |
| PK_ClientRSOHeaders | Primary | N | | | | ClientRSOID |

| Field Name | Field Type | Field Size | Default | Special | Version | Description |
|---|---|---|---|---|---|---|
| ClientNodeID | Integer | 4 | | | 3.0 | Foreign key to the ClientNode table. |
| ClientRSOID | Integer | 4 | | | 3.0 | Unique identifier for the Learning Tool, Client Node and Course Type combination. |
| CourseType | Text | 20 | | | 3.0 | The type of course that may use the Learning tools associated with this node in the client hierarchy. |
| Header | Text | 50 | | | 3.0 | The name that the client would like to reference this Learning Tool by. |
| RSOTypeID | Text | 20 | | Identity(1,1) | 3.0 | The Learning tool that may be associated with this particular node in the client hierarchy. |

| Table Name | ClientUserProperties (Table 510) | | | Version | 3.0 | |
|---|---|---|---|---|---|---|
| Description | This table is used to identify user information that an Educational Partner wants to capture. It also identifies whether the information is required. There are entries for Parent Levels and sublevels. | | | | | |

| Index Name | Index Type | Clustere | Special | | | Index Fields |
|---|---|---|---|---|---|---|
| PK_ClientUserProperties | Primary | Y | | | | ClientNodeID PropertyID |

| Field Name | Field Type | Field Size | Default | Special | Version | Description |
|---|---|---|---|---|---|---|
| ClientNodeID | Integer | 4 | | | 3.0 | Foreign key to the ClientNode table. |
| PropertyID | Integer | 4 | | | 3.0 | links to userproperties.propertyid |
| Required | Bit | 1 | | | 3.0 | is this a required field |

Table Name Contracts (Table 654) Version 3.0

Description This table contains student and/or professor contract HTML text for each semester for each Educational Partner that requires contracts. The acknowledgements are stored in the UserContracts table.

| Index Name | Index Type | Clustered | | | | Index Fields | |
|---|---|---|---|---|---|---|---|
| PK_UserContracts | Primary | N | | | | SemesterID ContractType | |

| Field Name | Field Type | Field Size | Default | Special | Version | Description |
|---|---|---|---|---|---|---|
| ContractID | Integer | 4 | | Identity(1,1) | 3.0 | Identity column for contracts. Not a 4.0 table. |
| ContractType | Text | 4 | | | 3.0 | Professor or Student contract. PROF or STUD values. |
| CustomContent | Bit | 1 | | | 3.0 | this contract points to a custom html file |
| CustomURL | Text | 255 | | | 3.0 | the URL to the custom html file |
| FooterText | Memo | | | | 3.0 | text that shows above the list of courses |
| HeaderText | Memo | | | | 3.0 | text that shows below the list of courses |
| ListCourses | Bit | 1 | | | 3.0 | list courses the user has applied for between the headertext and footertext |
| SemesterID | Integer | 4 | | | 3.0 | foreign key to the semesters table. Semester that the contract is valid for. |

Table Name CourseCategories (Table 680) Version 3.0

Description This table contains the description for CategoryID found in the Course table. There are currently only two entries (1) Normal and (2) Instructional Design.

| Index Name | Index Type | Clustered | | | | Index Fields |
|---|---|---|---|---|---|---|
| PK_CourseCategories | Primary | N | | | | CategoryID |

| Field Name | Field Type | Field Size | Default | Special | Version | Description |
|---|---|---|---|---|---|---|
| Category | Text | 100 | | | 3.0 | Description of the Course category. |
| CategoryID | Integer | 4 | | | 3.0 | Unique identifier for the Category that the course is in. |

| Table Name | CourseCopyrights (Table 664) | | | Version | 4.0 | | |
| --- | --- | --- | --- | --- | --- | --- | --- |
| Description | This table contains course copyright information, if required. There can be one entry for each course. | | | | | | |

| Index Name | Index Type | Field Size | Default | Clustere | Special | Version | Index Fields |
| --- | --- | --- | --- | --- | --- | --- | --- |
| No Indexes | | | | | | | |

| Field Name | Field Type | Field Size | Default | | | Version | Description |
| --- | --- | --- | --- | --- | --- | --- | --- |
| Comment | Text | 255 | | | | 4.0 | Optional comment used to describe the copyright at time of creation. |
| CopyrightDescription | Memo | | | | | 4.0 | Long description of the copyright for this course. |
| CopyrightID | Integer | 4 | | | | 4.0 | Unique identifier for the Copyright for this course. |
| CopyrightName | Text | 255 | | | | 4.0 | Short description of the copyright for this course. |
| DateCreated | Date/Time | 8 | | | | 4.0 | The date and time that this Copyright was created. |
| TimeStamp | Date/Time | 8 | Current Date | | | 4.0 | The date and time that this copyright was last modified. |

| Table Name | CourseInfo (Table 594) | | Version | 3.0 | | | |
|---|---|---|---|---|---|---|---|
| Description | This table contains descriptive information about a course. Examples of information contained per course are Course Overview, Course Objectives, Course Policies, Grading Polices, Required Texts, etc. | | | | | | |

| Index Name | | Index Type | Clustere | Special | | | Index Fields |
|---|---|---|---|---|---|---|---|
| IX_CourseInfo | | Index | Y | Ignore_Dup_Row | | | CourseID |
| PK_CourseInfo | | Primary | N | | | | CourseInfoID |

| Field Name | Field Type | Field Size | Default | Special | Version | Description |
|---|---|---|---|---|---|---|
| CourseID | Integer | 4 | | | 3.0 | Foreign key to Courses.CourseId |
| CourseInfoID | Integer | 4 | | Identity(1,1) | 3.0 | Identity column for CourseInfo. |
| Header | Text | 255 | | | 3.0 | Course Info heading text |
| HeaderText | Memo | | | | 3.0 | Course Info HTML content |
| IsRequired | Bit | 1 | 0 | | 3.0 | Flag for "Required Text" type syllabus item. Cannot be deleted from Course. |

| Table Name | CourseRSOHeaders (Table 692) | | Version | 3.0 | | |
|---|---|---|---|---|---|---|
| Description | This table is used to link the course material and exams to the system objects used by the course. | | | | | |

| Index Name | Index Type | Clustered | Special | | | Index Fields |
|---|---|---|---|---|---|---|
| FK_CourseRSOHeaders_RSOTypes | Foreign Key | N | RSOTypes | | | RSOTypeID |
| IX_LOHeaders | Index | Y | Unique | | | CourseID Header RSOTypeID |
| PK_LOHeaders | Primary | N | | | | HeaderID |

| Field Name | Field Type | Field Size | Default | Special | Version | Description |
|---|---|---|---|---|---|---|
| CourseID | Integer | 4 | | | 3.0 | Unique identifier for the course that will be using this RSO. |
| Header | Text | 50 | | | 3.0 | The text that will be used to describe the RSO |
| HeaderID | Integer | 4 | | Identity(1,1) | 3.0 | Unique identifier for the RSO description text. |
| IconNum | Integer | 4 | | | 3.0 | The number corresponding to the color of icon that will be used to symbolize the RSO. |
| IsUnit | Bit | 1 | | | 3.0 | Determines whether the RSO will be used in a Unit only. |
| OnSyllabus | Bit | 1 | | | 3.0 | Indicates whether the RSO will be displayed as a link on the interactive syllabus. |
| RSOTypeID | Text | 20 | | | 3.0 | The type of RSO the this is. |

| Table Name | Courses (Table 596) | | Version | 3.0 | | | |
|---|---|---|---|---|---|---|---|
| Description | This table contains one entry for each course per semester for each Educational Partner. The entries for each course contain a wealth of information. The CoursesAndClientNodes table is required to link a course to an Educational Partner. | | | | | | |

| Index Name | Index Type | | Clustere | Special | | Index Fields | |
|---|---|---|---|---|---|---|---|
| INDEX_COURSES_1 | Index | | N | | | Parent | |
| PK_Courses | Primary | | Y | | | CourseID | |

| Field Name | Field Type | Field Size | Default | Special | Version | Description |
|---|---|---|---|---|---|---|
| ABSFolder | Text | 200 | | | 3.0 | The folder that will be used to store files for courses that are related(crosslisted) |
| AudioText | Text | 200 | | | 3.0 | The text that will be used to describe the audio link on the Course Home Page. |
| AudioURL | Text | 200 | | | 3.0 | The audio link that will display on the course Home Page. |
| AutoEnrollChild | Bit | 1 | 0 | | 3.0 | Determines whether all users will be enrolled in the parent course for this course group. |
| AutoEnrollParent | Bit | 1 | 0 | | 3.0 | Determines whether all users will be enrolled in the course groups for this course. |
| BypassUnitDates | Bit | 1 | 0 | | 3.0 | Indicates whether the user hitting this course will be able to bypass all unit date checking. |
| CatalogDesc | Memo | | | | 3.0 | The full text of the Educational Partner's catalog description of a specific course. |
| CatalogListing | Bit | 1 | 1 | | 3.0 | Indicates whether this course will be listed in the course catalog. |
| CategoryID | Integer | 4 | 0 | | 3.0 | The category that this course belongs to. |
| COID | Integer | 4 | 1 | | 3.0 | Course Object Identifier - Unique identifier for a particular Course Object within this course. |
| CopyrightID | Integer | 4 | | | 3.0 | Specifies which copyright to display at the bottom of the course home page. |
| CourseEndDate | Date/Time | 8 | | | 3.0 | The last date that the Course may be accessed. |
| CourseID | Integer | 4 | | | 3.0 | Unique identifier for this course. |
| CourseStartDate | Date/Time | 8 | | | 3.0 | The first date that this course may be accessed. |

| Field | Type | Size | Default | Description |
|---|---|---|---|---|
| CourseText | Memo | | | Misc. text that can be displayed on the Course Home Page. |
| CourseTextTitle | Text | 75 | | Heading that is displayed above the CourseText |
| CourseType | Text | 15 | Standard | The type of course that this is. |
| Creator | Integer | 4 | d | UserID of the person who created this course. |
| Credits | Integer | 4 | | The number of credits that this course is worth. |
| CreditTypeID | Integer | 4 | | The type of credits that may be earned when this course is taken |
| DepartmentText | Text | 255 | | Unused column that was used when upgrading from version 2.7 to 3.0 |
| EnrollmentForm | Bit | 1 | 1 | Indicates whether an enrollment form must be sent to the instructor when the course is created. |
| FilesPerUser | Integer | 4 | 5 | The number of files that may be uploaded for any one particular user. |
| GroupType | Integer | 4 | 0 | The type of group this course is. |
| HasEBook | Bit | 1 | 0 | Indicates whether this course will be using the eBook feature. |
| InStateTuition | Currency | 8 | 0.00 | Determines the amount that the user must pay to take this course when they are deemed to be in-state by the hosting institution. |
| InstructorTitle | Text | 30 | Professor | The title that the instructor would like to be refered by. |
| InvoiceNum | Integer | 4 | | A number used to keep track of the course for internal account purposes. |
| IsAutoEnroll | Bit | 1 | 0 | Indicates whether all students will be enrolled in this course when they enroll in any other course. |
| ISBN | Text | 13 | None Required | Used to indicate the eBook that will be used in this course. |
| IsEnrollable | Bit | 1 | 1 | Indicates whether this course may be enrolled in by students. |
| IsParent | Bit | 1 | 0 | Indicates whether this course contains any course groups. |
| LogoPath | Text | 200 | | The path to the image that is displayed on most pages. |
| MaxFileSize | Integer | 4 | 8000000 | The maximum amount in bytes that any one file uploaded by a user. |
| MaxStudents | Integer | 4 | 20 | The maximum amount of users that may enroll in this course. |

| | | | |
|---|---|---|---|
| MaxWaitList | Integer | 4 | 20 | 3.0 | The maximum amount of user that may be on the waitlist for this course at any given time. |
| OutStateTuition | Currency | 8 | 0.00 | 3.0 | Determines the amount that the user must pay to take this course when they are deemed to be out-of-state by the hosting institution. |
| Parent | Integer | 4 | | 3.0 | The parent course that this course group is associated with. Only valid for course groups. |
| RequiredTexts | Memo | | None Required | 3.0 | The texts that are required to take this course as displayed on the course catalog. |
| SectionNumber | Byte | 1 | | 3.0 | Used to identify courses when they have the same code/title. |
| SemesterID | Integer | 4 | | 3.0 | The semester that this course is associated with. |
| SourceCourseID | Integer | 4 | | 3.0 | The original course that this course was copied from. |
| StyleID | Text | 4 | | 3.0 | Indicates which style sheet directory to look in for display purposes. |
| TATitle | Text | 30 | Teaching Assistant | 3.0 | The title that the teaching assistant would like to be refered by. |
| Title | Text | 100 | | 3.0 | Short description on the course. |
| TotalNumerOfPts | Integer | 4 | 0 | 3.0 | The number of points that is course is worth as used in the gradebook. |
| TypeOfGrading | Integer | 4 | 0 | 3.0 | The type of grading that will be used in the gradebook. Either letter of number |
| UnitHeader | Text | 50 | Unit | 3.0 | The name that the instructor would like the units in this course to be refered by. |
| VersionID | Integer | 4 | | 3.0 | The system version that this course will be hosted in. |
| VideoText | Text | 200 | | 3.0 | Header used to describe the video link on the Course home Page. |
| VideoURL | Text | 200 | | 3.0 | Link to a video file on the Course Home Page. |

| Table Name | CoursesAndClientNodes (Table 574) | | Version | 3.0 | | | |
|---|---|---|---|---|---|---|---|
| Description | This table is used to link a course to an Educational Partner. It only contains link information. | | | | | | |

| Index Name | Index Type | | | | | | |
|---|---|---|---|---|---|---|---|
| PK_CoursesAndClientNodes | Primary | | | | | | |

| Field Name | Field Type | Field Size | Clustered | Default | Special | Version | Index Fields | Description |
|---|---|---|---|---|---|---|---|---|
| CCNID | Integer | 4 | N | | | 3.0 | CCNID | Unique identifier for the Course and Client Node association |
| ClientNodeID | Integer | 4 | | | | 3.0 | | Foreign key to the ClientNode table. |
| CourseCode | Text | 50 | | | | 3.0 | | The code that the hosting institution would like to reference this course by. |
| CourseID | Integer | 4 | | | | 3.0 | | The course that is associated with this node in the client hierarchy. |
| DispCourseCode | Text | 50 | | | | 3.0 | | The code that is displayed to the user to identify this course. |
| IsOwner | Bit | 1 | | | | 3.0 | | Indicates whether this node has ownership rights to this course. |
| LogoPath | Text | 200 | | | | 3.0 | | The path of the logo to display on course pages. |

| Table Name | CoursesAndSurveys (Table 568) | | Version | 3.0 | | | |
|---|---|---|---|---|---|---|---|
| Description | This table is used to link courses and surveys for those courses. It also makes use of the RoleID so that surveys can be developed for students and professors. | | | | | | |

| Index Name | Index Type | | | | | | |
|---|---|---|---|---|---|---|---|
| Index_CoursesAndSurveys_1 | Index | | | | | | |
| Index_CoursesAndSurveys_2 | Index | | | | | | |

| Field Name | Field Type | Field Size | Clustered | Default | Special | Version | Index Fields | Description |
|---|---|---|---|---|---|---|---|---|
| CourseID | Integer | 4 | N | | | 3.0 | SurveyID | ID of the Course for which the survey is defined. |
| RoleID | Integer | 4 | N | | | 3.0 | CourseID RoleID | Determines the type of users the survey is administered to. |
| SurveyID | Integer | 4 | | | | 3.0 | | ID of the Survey. |
| UnitNumber | Integer | 4 | | -1 | | 3.0 | | Identifies the Unit, the survey gets triggered on. |

| Table Name | CourseStatus (Table 582) | | | Version | 4.0 | | |
|---|---|---|---|---|---|---|---|
| Description | This table is used to link users, roles, educational partners, and courses. It provides comments and dates to show active between these entities. | | | | | | |

| Index Name | Index Type | | | | | | |
|---|---|---|---|---|---|---|---|
| No Indexes | | | | | | | |

| Field Name | Field Type | Field Size | Default | Clustere | Special | Version | Index Fields Description |
|---|---|---|---|---|---|---|---|
| ClientID | Integer | 4 | | | | 4.0 | Foreign key to the ClientNode table. |
| Comment | Text | 255 | | | | 4.0 | Optional comment used when creating the course status entry. |
| CourseID | Integer | 4 | | | | 4.0 | The course that this user's status is associated with. |
| DateCreated | Date/Time | 8 | Current Date | | | 4.0 | The date and time this course status entry was created. |
| LastModified | Date/Time | 8 | Current Date | | | 4.0 | The date and time this course status entry was created. |
| LastMsgAccess | Date/Time | 8 | Current Date | | | 4.0 | The date and time the Announcements feature was last accessed. |
| RoleID | Integer | 4 | | | | 4.0 | The status of this user in this course. |
| UserID | Integer | 4 | | | | 4.0 | The user that this course's status is associated with. |

Table Name: CourseStyles (Table 676)    Version 4.0

Description: This table is used to supply system data about what a style looks like.

| Index Name | Index Type | Field Size | Default | Clustere | Special | Version | Index Fields Description |
|---|---|---|---|---|---|---|---|
| No Indexes | | | | | | | |

| Field Name | Field Type | Field Size | Default | | | Version | Description |
|---|---|---|---|---|---|---|---|
| Comment | Text | 255 | | | | 4.0 | Optional comment used when creating this Course Styles entry. |
| DateCreated | Date/Time | 8 | | | | 4.0 | The date and time that this Course Styles entry was created. |
| StyleDescription | Memo | | | | | 4.0 | Long description of the style used for this course. |
| StyleID | Text | 4 | | | | 4.0 | The style folder that will be used with course. |
| StyleName | Text | 255 | | | | 4.0 | Short description for this course (title) |
| TimeStamp | Date/Time | 8 | Current Date | | | 4.0 | Date and time that the Style was created. |

Table Name: CourseTypes (Table 626)    Version 3.0

Description: This table is used to describe the type of course being offered. It links to the Course table and only contains three entries (1) Course Supplement, (2) Self-Paced, and (3) Standard.

| Index Name | Index Type | Field Size | Default | Clustere | Special | Version | Index Fields Description |
|---|---|---|---|---|---|---|---|
| PK_CourseTypes | Primary | | | N | | | CourseType |

| Field Name | Field Type | Field Size | Default | | Special | Version | Description |
|---|---|---|---|---|---|---|---|
| CourseType | Text | 20 | | | Misspelled | 3.0 | Unique identifier for the a particular type of course. |
| CourseTypeDescription | Memo | | | | | 3.0 | Long description of the type of course. |
| CourseTypeName | Text | 30 | | | | 3.0 | Short description of the type of course. |

| Table Name | CourseVersions (Table 662) | | | Version | 4.0 | |
|---|---|---|---|---|---|---|
| Description | This table is used to define the version of the course. At this time there are only two entries (1) RES 3.0 and (2) ECS 4.0 | | | | | |

| Index Name | Index Type | Field Size | Default | Clustere | Special | Version | Index Fields |
|---|---|---|---|---|---|---|---|
| No Indexes | | | | | | | |

| Field Name | Field Type | Field Size | Default | Clustere | Special | Version | Description |
|---|---|---|---|---|---|---|---|
| Comment | Text | 255 | | | | 4.0 | Optional comment to describe the version of the course. |
| DateCreated | Date/Time | 8 | | | | 4.0 | Date and time that the course version was created. |
| TimeStamp | Date/Time | 8 | Current Date | | | 4.0 | Date and time of the last modification to the course version. |
| VersionDescription | Memo | | | | | 4.0 | Long description of the Course Version. |
| VersionID | Integer | 4 | | | | 4.0 | Unique identifier for the Course Version. |
| VersionName | Text | 255 | | | | 4.0 | Short description of the Course Version. |

| Table Name | CreditTypes (Table 660) | | | Version | 3.0 | |
|---|---|---|---|---|---|---|
| Description | This table is used to describe the CreditTypeID field used in Courses table. There are currently four entries (1) Pass/Fail, (2) Grade, (3) Credit, and (4) Non-Credit. | | | | | |

| Index Name | Index Type | Field Size | Default | Clustere | Special | Version | Index Fields |
|---|---|---|---|---|---|---|---|
| PK_CreditTypes | Primary | | | N | | | CreditTypeID |

| Field Name | Field Type | Field Size | Default | Clustere | Special | Version | Description |
|---|---|---|---|---|---|---|---|
| CreditTypeID | Integer | 4 | | | | 3.0 | Unique identifier for the type of credit being used. |
| Description | Text | 20 | | | | 3.0 | Short description of the type of credit to be used. |

| Table Name | CurrentStatus (Table 578) | | Version | 3.0 | | | |
|---|---|---|---|---|---|---|---|
| Description | This table is used to link users, roles, educational partners, and courses. It provides comments and dates to show active between these entities. | | | | | | |

| Index Name | Index Type | | Clustered | | Special | Index Fields | |
|---|---|---|---|---|---|---|---|
| PK_CurrentStatus_1_16 | Primary | | Y | | | UserID CourseID ClientNodeID | |

| Field Name | Field Type | Field Size | Default | Special | Version | Description |
|---|---|---|---|---|---|---|
| ClientNodeID | Integer | 4 | | | 3.0 | Foreign key to the ClientNode table. |
| Comment | Text | 255 | | | 3.0 | Status comment - why the user was set to this status. |
| CourseID | Integer | 4 | | | 3.0 | Foreign key to Courses.CourseId. Value of 0 represents an enrollable client node status |
| ENodeID | Integer | 4 | 0 | | 3.0 | Enrollable node id. link to clientNodes where clientNodes.IsEnrollable = true. |
| FirstAccess | Date/Time | 8 | | | 3.0 | Date of first access to course or client. |
| GradeTypeID | Integer | 4 | 0 | | 3.0 | Pass/fail vs. graded. |
| LastAccess | Date/Time | 8 | | | 3.0 | Last time accessed this course or client |
| ParserFlag | Byte | 1 | | | 3.0 | Used for cron job status parsers. |
| RoleID | Integer | 4 | | | 3.0 | Links to Roles.roleid |
| TimeStamp | Date/Time | 8 | Current Date | | 3.0 | Timestamp |
| UserID | Integer | 4 | | | 3.0 | Links to users.userid |

| Table Name | DocCollab (Table 690) | | Version | 3.0 | | |
|---|---|---|---|---|---|---|
| Description | This table is used to assign documents for user sharing. The physical documents are stored in the database. Documents are assigned to courses. | | | | | |

| Index Name | Index Type | Clustere | Special | | Index Fields | |
|---|---|---|---|---|---|---|
| IX_DocCollab | Index | Y | Allow_Dup_Row | | CourseID ImportDate | |
| PK_DocCollab | Primary | N | | | DocID | |

| Field Name | Field Type | Field Size | Default | Special | Version | Description |
|---|---|---|---|---|---|---|
| CourseID | Integer | 4 | | | 3.0 | The unique identifier for a specific course. |
| CourseView | Bit | 1 | | | 3.0 | 1 = Viewable : This file is viewable ("shared") with the entire class. 0 = Not Viewable : This file is not viewable ("shared") with the class, but only visible to the owner and the professor. |
| Description | Memo | | | | 3.0 | A brief description of the document. |
| DocID | Integer | 4 | | | 3.0 | The unique identifier for a specific document |
| FileName | Text | 255 | | | 3.0 | The file name of the document. |
| FileSize | Integer | 4 | | | 3.0 | The file size of the document. |
| ImportDate | Date/Time | 8 | | | 3.0 | The date this file was imported into the database by the submitter. |
| ModifyDate | Date/Time | 8 | | | 3.0 | The date this file was last modified by the submitter. |
| SubmitterName | Text | 100 | | | 3.0 | The FirstName and LastName of the person making the modification to the entry in the database. (See ModifyDate) |
| UserID | Integer | 4 | | | 3.0 | The unique identifier for a specific student. The "owner" of this document. |

| Table Name | Ebook (Table 536) | | | Version | 3.0 | | |
|---|---|---|---|---|---|---|---|
| Description | This table is used to allow for electronic books on line for a course. | | | | | | |
| Index Name | Index Type | Clustered | Default | Special | | Version | Index Fields |
| No Indexes | | | | | | | |
| Field Name | Field Type | Field Size | Default | Special | | Version | Description |
| CourseID | Integer | 4 | | | | 3.0 | The course that will contain the ebook feature. |
| EbookID | Integer | 4 | | Identity(1,1) | | 3.0 | unique identifier for the Ebook that will be used in the course. |
| MAC | Text | 32 | | | | 3.0 | Encrypted key that is used when sending a pin for verification to the ebook application. |
| Pdate | Date/Time | 8 | | | | 3.0 | The date and time that a PIN was created for a user accessing the ebook feature. |
| PIN | Text | 30 | | | | 3.0 | The PIN number entered by the user when accessing the Ebook. |
| RC | Text | 2 | | | | 3.0 | Reason Code returned by the server when a PIN is entered by the user. |
| Reason | Text | 2 | | | | 3.0 | Long description of the Reason Code that is returned by the server when a PIN is entered by the user. |
| S1 | Text | 2 | | | | 3.0 | First sorting number returned from the server. |
| S2 | Text | 2 | | | | 3.0 | Second sorting number returned from the server. |
| S3 | Text | 2 | | | | 3.0 | Third sorting number returned from the server. |
| UserID | Integer | 4 | | | | 3.0 | Unique identifier for the user who is accessing the Ebook for a particular course. |

| Table Name | EvalCategories (Table 548) | | | Version | 3.0 | | |
|---|---|---|---|---|---|---|---|
| Description | This table is used to facilate the building of user surveys. | | | | | | |
| | | | | | | | |
| Index Name | | Index Type | Clustered | Special | | Index Fields | |
| Index_EvalCategoies_1 | | Index | N | | | CategoryID | |
| | | | | | | | |
| Field Name | Field Type | Field Size | Default | Special | Version | Description | |
| CategoryID | Integer | 4 | | Identity(1,1) | 3.0 | Unique Identifier that identifies a category defined to group Survey Questions. Categories are used to quicly build surveys. | |
| CreatedBy | Text | 50 | | | 3.0 | Person who created the Category. | |
| CreationDate | Date/Time | 8 | | | 3.0 | Date of Creation. | |
| Description | Memo | | | | 3.0 | Category Description | |
| Title | Text | 255 | | | 3.0 | Category Title. | |

| Table Name | EvalCategoryQuestions (Table 558) | | | Version | 3.0 | | |
|---|---|---|---|---|---|---|---|
| Description | This table is used to link an evaluation survey question to a category. | | | | | | |
| | | | | | | | |
| Index Name | | Index Type | Clustered | Special | | Index Fields | |
| Index_EvalCategoryQuestions_1 | | Index | N | | | CategoryID | |
| Index_EvalCategoryQuestions_2 | | Index | N | | | CategoryID  QuestionID | |
| | | | | | | | |
| Field Name | Field Type | Field Size | Default | Special | Version | Description | |
| CategoryID | Integer | 4 | | | 3.0 | Unique Identifier that identifies a category defined to group Survey Questions. Categories are used to quicly build surveys. | |
| QuestionID | Integer | 4 | | | 3.0 | ID of the Question that has been defined in the Eval Question Header table which is part of the Category. | |

| Table Name | EvalExternalSurveys (Table 554) | | | Version | 3.0 | |
|---|---|---|---|---|---|---|
| Description | This table is used to link a user to an evaluation survey. | | | | | |

| Index Name | Index Type | Clustere | | Special | | Index Fields |
|---|---|---|---|---|---|---|
| No Indexes | | | | | | |

| Field Name | Field Type | Field Size | Default | Special | Version | Description |
|---|---|---|---|---|---|---|
| EmailAddress | Text | 255 | | | 3.0 | Email Address of the user. |
| IsMailSent | Integer | 4 | 0 | | 3.0 | A flag that tells whether an Email has been sent to the user or not. |
| SurveyID | Integer | 4 | | | 3.0 | ID of the external survey. |
| UserID | Integer | 4 | | | 3.0 | User ID that is generated by the system. Unique for every External Survey. This has no relation to the UserID in the Users table. |

| Table Name | EvalMultChoice (Table 562) | | | Version | 3.0 | |
|---|---|---|---|---|---|---|
| Description | This table holds the user's responses to evaluation multiple choice questions. | | | | | |

| Index Name | Index Type | Clustere | | Special | | Index Fields |
|---|---|---|---|---|---|---|
| Index_EvalMultChoice_1 | Index | N | | | | QuestionID |

| Field Name | Field Type | Field Size | Default | Special | Version | Description |
|---|---|---|---|---|---|---|
| ChoiceNumber | Integer | 4 | | | 3.0 | Choice Number |
| ChoiceQuestion | Memo | 32000 | | | 3.0 | The text of the Choice. |
| QuestionID | Integer | 4 | | | 3.0 | ID of the MultChoice Question. Points to EvalQuestion Header. |

| Table Name | EvalQuestionHeader (Table 560) | | | Version | 3.0 | |
|---|---|---|---|---|---|---|
| Description | This table holds the actual question text for evaluation surverys. | | | | | |

| Index Name | | Index Type | Clustere | | | Index Fields |
|---|---|---|---|---|---|---|
| Index_EvalQuestionHeader_1 | | Index | N | | | QuestionID |
| Index_EvalQuestionHeader_2 | | Index | N | | | QuestionID QuestionTypeID |

| Field Name | Field Type | Field Size | Default | Special | Version | Description |
|---|---|---|---|---|---|---|
| CreatedBy | Text | 50 | | | 3.0 | Person Who created the question |
| CreationDate | Date/Time | 8 | | | 3.0 | Date of Creation. |
| QuestionID | Integer | 4 | | Identity(1,1) | 3.0 | Unique identifier that identifies a Question defined in the Survey Manager. |
| QuestionText | Memo | | | | 3.0 | The text of the Question. |
| QuestionTypeID | Integer | 4 | | | 3.0 | Type of the Question, True False, Multiple Choice etc. |

| Table Name | EvalQuestionTypes (Table 564) | | | Version | 3.0 | |
|---|---|---|---|---|---|---|
| Description | This table is used to store the types of questions that can be found on a evaluation survey. | | | | | |

| Index Name | | Index Type | Clustere | | | Index Fields |
|---|---|---|---|---|---|---|
| Index_Question_Types_1 | | Index | N | | | QuestionTypeID |

| Field Name | Field Type | Field Size | Default | Special | Version | Description |
|---|---|---|---|---|---|---|
| Description | Text | 255 | | | 3.0 | Description of the Question Type. |
| QuestionTypeID | Integer | 4 | | | 3.0 | Unique identifier that identifies a Question Type. All Question Types are defined in this table. |

| Table Name | EvalSurveyQuestions (Table 552) | | Version | 3.0 | | |
|---|---|---|---|---|---|---|
| Description | This table is used to link a specific evaluation survey with the questions that it contains and the order in which the questions are displayed. | | | | | |

| Index Name | Index Type | Clustere | Special | | | Index Fields |
|---|---|---|---|---|---|---|
| Index_EvalSurveyQuestions_1 | Index | N | | | | SurveyID |
| Index_EvalSurveyQuestions_2 | Index | N | | | | SurveyID QuestionID |

| Field Name | Field Type | Field Size | Default | Special | Version | Description |
|---|---|---|---|---|---|---|
| OrderNumber | Integer | 4 | | | 3.0 | Order in which a question appears in a Survey. |
| QuestionID | Integer | 4 | | | 3.0 | ID of the Question that is in the Survey.Links to EvalQuestionHeader. |
| SurveyID | Integer | 4 | | | 3.0 | Id of the Survey(External and Internal).Defined in the EvalSurveys Table. |

| Table Name | EvalSurveys (Table 556) | | Version | 3.0 | | |
| --- | --- | --- | --- | --- | --- | --- |
| Description | This table is used to store specific information about a survey. This is the parent table for all evaluation and user surveys. | | | | | |

| Index Name | Index Type | Clustered | | | Index Fields | |
| --- | --- | --- | --- | --- | --- | --- |
| Index_EvalSurveys_1 | Index | N | | | SurveyID | |

| Field Name | Field Type | Field Size | Default | Special | Version | Description |
| --- | --- | --- | --- | --- | --- | --- |
| AnonymousFlag | Integer | 4 | | | 3.0 | |
| CreatedBy | Text | 50 | | | 3.0 | Person who created the Survey |
| CreationDate | Date/Time | 8 | | | 3.0 | Date of Creation. |
| Description | Memo | | | | 3.0 | Description of the Survey. |
| EmailText | Memo | | | | 3.0 | Email Text that would go to the User in case of an External Survey. |
| EndDate | Date/Time | 8 | | | 3.0 | Date on Which the Survey is supposed to end. |
| MandatoryFlag | Integer | 4 | | | 3.0 | Determines whether the survey is mandatory or not. |
| PostSurveyPage | Memo | | | | 3.0 | The text that appears after the survey has been taken. |
| PreSurveyPage | Memo | | | | 3.0 | The text that appears prior to taking the survey. |
| StartDate | Date/Time | 8 | | | 3.0 | Date on which the Survey Starts. |
| SurveyID | Integer | 4 | | Identity(1,1) | 3.0 | Unique ID that identifies a Survey. |
| Title | Text | 255 | | | 3.0 | Title of the Survey. |
| Type | Integer | 4 | | | 3.0 | Type of Survey External/Internal |
| UniqueFlag | Integer | 4 | 1 | | 3.0 | A Flag that tells whether a Survey is General or Course Specific. |

Table Name EvalTree (Table 546) Version 3.0

Description This table links the creator of a question / category / survey to the actual question / category / survey.

| Index Name | Index Type | Clustere | Special | Index Fields |
|---|---|---|---|---|
| Index_EvalTree_1 | Index | N | | UserID |
| Index_EvalTree_2 | Index | N | | UserID NodeTypeID |

| Field Name | Field Type | Field Size | Default | Special | Version | Description |
|---|---|---|---|---|---|---|
| NodeID | Integer | 4 | | | 3.0 | Node ID Could be QuestionID, Category ID or Survey ID Depending on the Node Type ID. |
| NodeTypeID | Integer | 4 | | | 3.0 | Determines the type of node --- Question, Category, Survey. |
| UserId | Integer | 4 | | | 3.0 | ID of the Survey Manager Administrator, Links to UserID in Users Table. |

Table Name EvalTreeNodeTypes (Table 550) Version 3.0

Description This table describes the different types of nodes that can be used in the Evaluation Tree.

| Index Name | Index Type | Clustere | Special | Index Fields |
|---|---|---|---|---|
| Index_EvalTreeNodeTypes_1 | Index | N | | NodeTypeID |

| Field Name | Field Type | Field Size | Default | Special | Version | Description |
|---|---|---|---|---|---|---|
| Description | Text | 255 | | | 3.0 | Description of the Node Type. |
| NodeTypeID | Integer | 4 | | | 3.0 | ID of the Node Type (QuestionID, CategoryID, SurveyID) |

| Table Name | Exams (Table 696) | | | | | | |
|---|---|---|---|---|---|---|---|
| Description | This table is used to describe exams for a specific course. It is tied to course through the UnitData table. The link is ExamPkID which is equal to RSOID. | | | | | | |
| | | | | | | | |
| Index Name | | Index Type | Clustere | | Special | | Index Fields |
| PK_Exams_1_28 | | Primary | Y | | | | ExamPkID |
| | | | | | | | |
| Field Name | Field Type | Field Size | Default | Special | Version | Description | |
| Description | Memo | | Spaces | | 3.0 | Description of an Exam. | |
| Duration | Integer | 4 | 0 | | 3.0 | The Total duration of the Exam in Minutes. | |
| EndDate | Date/Time | 8 | Current Date + 3 Months | | 3.0 | Date on which the Exam Ends. | |
| ExamPkID | Integer | 4 | | | 3.0 | Unique ID that identifes an Exam. | |
| ExamType | Integer | 4 | 0 | | 3.0 | Type of the Exam, Normal or Exercise. | |
| IsAutoGradingOn | Integer | 4 | 1 | | 3.0 | A Flag That tells whether Autograding is enabled for the Exam or not. | |
| OnlineReviewDate | Date/Time | 8 | Current Date + 3 Months | | 3.0 | Date beyond which Graded Exams can be reviewed by students. | |
| StartDate | Date/Time | 8 | Current Date | | 3.0 | Date on Which the Exam Starts. | |
| Title | Text | 255 | Spaces | | 3.0 | Title of the Exam. | |
| TotalPoints | Integer | 4 | -1 | | 3.0 | Total Points the Exam Carries. | |

| Table Name | FillBlank (Table 716) | | | Version | 3.0 | |
|---|---|---|---|---|---|---|
| Description | This table holds the correct answer to fill in the blank questions. It is tied to the QuestionHeader table which stores the actual questions. | | | | | |
| | | | | | | |
| Index Name | Index Type | Clustere | Special | | Index Fields | |
| INDEX_FILL_BLANK_2 | Index | N | | | SectionPkID | |
| INDEX_FILL_BLANK_1 | Index | N | | | SectionPkID QuestionID | |
| | | | | | | |
| Field Name | Field Type | Field Size | Default | Special | Version | Description |
| AnswerText | Text | 255 | | | 3.0 | Used to capture the respondents answer to a fill in the blank question. |
| QuestionID | Integer | 4 | | | 3.0 | ID of the Fill in the Blank Question. |
| SectionPkID | Integer | 4 | | | 3.0 | ID of the Section the fill in the blank question is in. |

| Table Name | GItemsAndUnits (Table 674) | | | Version | 3.0 | |
|---|---|---|---|---|---|---|
| Description | This table is used to tie the gradable items for a specific course to the gradebook. The link to the GradableItems table is GradableItemsID is equal to GItemsID. | | | | | |
| | | | | | | |
| Index Name | Index Type | Clustere | Special | | Index Fields | |
| INDEX_GItemAndUnits_1 | Index | Y | Unique | | GradableItemID UnitNumber | |
| | | | | | | |
| Field Name | Field Type | Field Size | Default | Special | Version | Description |
| DeleteFlag | Integer | 4 | 0 | | 3.0 | A Flag used to mark items for delete. |
| GradableItemID | Integer | 4 | | | 3.0 | Unique ID of the Item that is graded. |
| PointsAvailable | Integer | 4 | 0 | | 3.0 | Total Points the Gradable Item Carries. |
| UnitNumber | Integer | 4 | | | 3.0 | UnitNumber in which the Item is marked for grading. |

| Table Name | GL (Table 592) | | Version | 3.0 | | | |
|---|---|---|---|---|---|---|---|
| Description | This table stores student accounting transactions for a specific course for a semester. | | | | | | |
| Index Name | | Index Type | Clustere | Special | | | Index Fields |
| IX_GL | | Index | Y | Ignore_Dup_Row | | | UserID TimeStamp |
| PK_GL | | Primary | N | | | | GLID |
| Field Name | | Field Type | Field Size | Default | Special | Version | Description |
| Amount | | Currency | 8 | 0 | | 3.0 | amount of the transaction |
| ClientID | | Integer | 4 | | | 3.0 | Foreign key to the ClientNode table. |
| Comment | | Text | 255 | | | 3.0 | description of transaction |
| CourseID | | Integer | 4 | 0 | | 3.0 | if is charge is for course tuition non-zero courseid |
| GLID | | Integer | 4 | | Identity(1,1) | 3.0 | Primary Key |
| OrderID | | Text | 30 | | | 3.0 | |
| PaymentTypeID | | Integer | 4 | | | 3.0 | points to payment types table |
| SemesterID | | Integer | 4 | 0 | | 3.0 | points to semesterID |
| TimeStamp | | Date/Time | 8 | Current Date | | 3.0 | date/time of transaction |
| TransactionTypeID | | Integer | 4 | | | 3.0 | points to transactoin types table |
| UserID | | Integer | 4 | | | 3.0 | User who incurred the charge |

| Table Name | GL_PaymentTypes (Table 588) | | Version | 3.0 | | |
|---|---|---|---|---|---|---|
| Description | This table describes the PaymentTypeID used in the GL table. There are currently seven payment types used (1) Online (Credit Card), (2) Online (Other), (3) Other / Unknown, (4) Charge, (5) Drop Credit, (6) Cash, and (7) Online (Check). | | | | | |
| Index Name | Index Type | Clustere | Special | | | Index Fields |
| PK_PaymentTypes | Primary | Y | | | | PaymentTypeID |
| Field Name | Field Type | Field Size | Default | Special | Version | Description |
| PaymentTypeID | Integer | 4 | | Identity(1,1) | 3.0 | Primary Key |
| PTDescription | Text | 255 | | | 3.0 | description of payment type |

| Table Name | GL_TransactionTypes (Table 590) | | Version | 3.0 | | |
|---|---|---|---|---|---|---|
| Description | This table describes the TransactionTypeID field used in the GL table. There are currently three entries (1) Course Tuition, (2) Course Fee (non Tuition), and (3) Other. | | | | | |
| Index Name | Index Type | Clustere | Special | | | Index Fields |
| PK_TransactionTypes | Primary | Y | | | | TransactionTypeID |
| Field Name | Field Type | Field Size | Default | Special | Version | Description |
| TransactionTypeID | Integer | 4 | | Identity(1,1) | 3.0 | Primary Key |
| TTDescription | Text | 255 | | | 3.0 | description of transaction type |

| Table Name | GlobalErrors | | Version | 3.0 | | |
|---|---|---|---|---|---|---|
| Description | This table is used to hold system errors that may occur. | | | | | |
| Index Name | Index Type | Clustere | Special | | | Index Fields |
| PK_GlobalErrors | Primary | Y | | | | ErrorNumber |
| Field Name | Field Type | Field Size | Default | Special | Version | Description |
| ErrorDescription | Text | 255 | | | 3.0 | A plain text description of the error |
| ErrorNumber | Integer | 4 | | | 3.0 | The system assigned error number. |

| Table Name | GradableItems (Table 672) | | Version | 3.0 | |
|---|---|---|---|---|---|
| Description | This table identifies the gradable items for a specific course. | | | | |

| Index Name | Index Type | Clustere | Special | | Index Fields |
|---|---|---|---|---|---|
| INDEX_GradableItems_1 | Index | N | | | CourseID |
| PK_GradableItemsx | Primary | N | | | GItemID |

| Field Name | Field Type | Field Size | Default | Special | Version | Description |
|---|---|---|---|---|---|---|
| CourseID | Integer | 4 | | | 3.0 | Course ID. |
| GItemDescription | Text | 60 | | | 3.0 | Description of the Gradable Item. |
| GItemID | Integer | 4 | | Identity(1,1) | 3.0 | Unique ID of the Item that is graded. |
| ImageID | Integer | 4 | 0 | | 3.0 | The ID of the Image the Item is attached to. |

| Table Name | GradeBook (Table 612) | | | Version | 3.0 | | |
|---|---|---|---|---|---|---|---|
| Description | This table assigns a specific gradebook to a student for a course. The actual grade information is stored in the GradeBookDetail table. | | | | | | |
| Index Name | | Index Type | Clustere | Field Size Default | Special | | Index Fields |
| INDEX_GradeBook_1 | | Index | N | | Unique | | StudentId CourseId |
| INDEX_GradeBook_2 | | Index | N | | | | CourseId |
| PK_GradeBook | | Primary | N | | | | GradeBookID |
| Field Name | | Field Type | | Field Size Default | Special | Version | Description |
| CourseId | | Integer | | 4 | | 3.0 | Course ID. |
| GradeBookId | | Integer | | 4 | | Identity(1,1) | 3.0 | Unique Number that identifies a Student ID, CourseID Combination. |
| IsActive | | Bit | | 1 | 1 | | 3.0 | A Flag that tells whether a Student is still Part of the Course. |
| NumberOfEmails | | Integer | | 4 | | | 3.0 | |
| NumberOfLogins | | Text | | 10 | | | 3.0 | |
| NumberOfTDComments | | Integer | | 4 | | | 3.0 | |
| NumberOfWGComments | | Integer | | 4 | | | 3.0 | |
| StudentId | | Integer | | 4 | | | 3.0 | ID of the Student Links to UserID in the Users Table. |
| TimeOnLine | | Integer | | 4 | | | 3.0 | |

| Table Name | GradeBookDetail (Table 678) | | Version | 3.0 | |
|---|---|---|---|---|---|
| Description | This table stores grading information for a specific student for a course. | | | | |

| Index Name | Index Type | Clustere | Special | | |
|---|---|---|---|---|---|
| FK_GradeBookDetail_GradeBook | Foreign Key | N | GradeBook | | |
| PK_GradeBookDetail | Primary | Y | | | |

| Field Name | Field Type | Field Size | Default | Special | Version | Description |
|---|---|---|---|---|---|---|
| CanStudentViewGrade | Integer | 4 | 0 | | 3.0 | Used by the professor to identify whether a student can view their grades. Value of 1 is yes and 0 is no. |
| Comments | Memo | | Spaces | | 3.0 | Professor Comments. |
| GradableItemID | Integer | 4 | | | 3.0 | Unique ID of the Item that is graded. |
| Grade | Text | 10 | NA | | 3.0 | The grade the student got for a particular item. |
| GradeBookId | Integer | 4 | | | 3.0 | Unique ID that identifies StudentID, CourseID Combination. |
| Points | Integer | 4 | 0 | | 3.0 | Points the student got for a particular Item. |
| UnitNumber | Integer | 4 | | | 3.0 | UnitNumber in which the Item is marked for grading. |

| Table Name | GradeTypes (Table 580) | | Version | 3.0 | |
|---|---|---|---|---|---|
| Description | This table describes the GradeTypeID used in the CurrentStatus table. There are currently two entries (1) Credit and (2) Pass/Fail. | | | | |

| Index Name | Index Type | Clustere | Special | | |
|---|---|---|---|---|---|
| PK_GradeTypes | Primary | N | | | |

| Field Name | Field Type | Field Size | Default | Special | Version | Description |
|---|---|---|---|---|---|---|
| GradeTypeID | Integer | 4 | | Identity(1,1) | 3.0 | A unique ID assigned by the system. Used to uniquely identify a row in the table |
| GTDescription | Text | 250 | | | 3.0 | The plain text description of the grade type. |
| GTDispName | Text | 50 | | | 3.0 | The description that is displayed to the user. |

| Index Fields |
|---|
| GradeBookID |
| GradeBookID GradableItemID UnitNumber |

| Index Fields |
|---|
| GradeTypeID |

| Table Name | GRD_CourseTools (Table 650) | | | Version | 4.0 | | |
|---|---|---|---|---|---|---|---|
| Description | This table describes the types of gradebook course tools that are available. It links to the GRD_RSOAndUnits table through the LearningToolID field found in that table. The link exists if the Type field in the GRD_RSOAndUnits table is equal to 2. | | | | | | |

| Index Name | Index Type | Clustere | | | | Index Fields | |
|---|---|---|---|---|---|---|---|
| PK_GRD_CourseTools | Primary | N | | | | ID | |

| Field Name | Field Type | Field Size | Default | Special | Version | Description |
|---|---|---|---|---|---|---|
| DeleteFlag | Integer | 4 | | | 4.0 | Flag that identifies Unused records. A Value of 1 means Archieved record. |
| Description | Text | 255 | | | 4.0 | Description of the Course Tool. |
| ID | Integer | 4 | | | 4.0 | Unique ID that identifies a Course Tool. |
| Name | Text | 50 | | | 4.0 | Name of the Course Tool. |
| TimeStamp | Date/Time | 8 | | | 4.0 | The Last Time record was updated. |

| Table Name | GRD_CustomItems (Table 646) | | | Version | 4.0 | | |
|---|---|---|---|---|---|---|---|
| Description | This table describes the types of gradebook custom itemss that are available. It links to the GRD_RSOAndUnits table through the LearningToolID field found in that table. The link exists if the Type field in the GRD_RSOAndUnits table is equal to 3. | | | | | | |

| Index Name | Index Type | Clustere | | | | Index Fields | |
|---|---|---|---|---|---|---|---|
| PK_GRD_CustomItems | Primary | N | | | | ID | |

| Field Name | Field Type | Field Size | Default | Special | Version | Description |
|---|---|---|---|---|---|---|
| CourseID | Integer | 4 | | | 4.0 | Course ID. |
| DeleteFlag | Integer | 4 | | | 4.0 | Flag that identifies Unused records. A Value of 1 means Archieved record. |
| ID | Integer | 4 | | Identity(1,1) | 4.0 | Unique ID that Identifiesa Custom Item. |
| Name | Text | 255 | | | 4.0 | Custom Item Name. |
| TimeStamp | Date/Time | 8 | | | 4.0 | The Last Time record was updated. |

| Table Name | GRD_RSOAndUnits (Table 642) | | Version | 4.0 | |
|---|---|---|---|---|---|
| Description | This table is used to link the system objects of a course with the gradebook elements for that course. | | | | |

| Index Name | Index Type | Clustere | Special | Index Fields |
|---|---|---|---|---|
| FK_GRD_RSOAndUnits_GRD_Status | Foreign Key | N | GRD_Status (ID) | ItemID |
| FK_GRD_RSOAndUnits_GRD_Types | Foreign Key | N | GRD_Types (ID) | ItemID |
| INDEX_GRD_RSOAndUnits_1 | Index | N | | Coid CourseID |
| PK_GRD_RSOAndUnits | Primary | N | | ItemID |

| Field Name | Field Type | Field Size | Default | Special | Version | Description |
|---|---|---|---|---|---|---|
| Coid | Integer | 4 | | | 4.0 | Links to Coid in UnitData table. Unique ID within a course for a Learning Item. |
| CourseID | Integer | 4 | | | 4.0 | Course ID. |
| DeleteFlag | Integer | 4 | | | 4.0 | Flag that identifies Unused records. A Value of 1 means Archieved record. |
| ItemID | Integer | 4 | | Identity(1,1) | 4.0 | Unique ID That Identifies a Gradable Item. |
| LearningToolID | Integer | 4 | | | 4.0 | Could be HeaderID or CourseToolID or CustomItem ID |
| status | Integer | 4 | | | 4.0 | Checked or Unchecked for grading. |
| TimeStamp | Date/Time | 8 | | | 4.0 | The Last Time record was updated. |
| Type | Integer | 4 | | | 4.0 | Type of the Gradable Item --- Normal Learning Item or Course Tool or Custom Item |
| UnitNumber | Integer | 4 | | | 4.0 | UnitNumber the Item is in (Course Learning Items only.) |

| Table Name | GRD_Status (Table 648) | | | | | | |
|---|---|---|---|---|---|---|---|
| | | | | Version | 4.0 | | |
| Description | This table describes the status types that are used in the gradebooks. It links to the GRD_RSOAndUnits table with the status field. ID = GRD_RSOAndUnits.status | | | | | | |

| Index Name | Index Type | Clustere | Special | | | Index Fields | |
|---|---|---|---|---|---|---|---|
| PK_GRD_Status | Primary | N | | | | ID | |

| Field Name | Field Type | Field Size | Default | Special | Version | Description |
|---|---|---|---|---|---|---|
| DeleteFlag | Integer | 4 | | | 4.0 | Flag that identifies Unused records. A Value of 1 means Archieved record. |
| Description | Text | 255 | | | 4.0 | Description of the Status Type. |
| ID | Integer | 4 | | | 4.0 | ID of the Status Type. |
| Name | Text | 50 | | | 4.0 | Title of the Status Type. |
| TimeStamp | Date/Time | 8 | | | 4.0 | The Last Time record was updated. |

| Table Name | GRD_StudentsAndGrades (Table 622) | | Version | 4.0 | |
|---|---|---|---|---|---|
| Description | This is the table that stores the grades for a student of a course. | | | | |

| Index Name | Index Type | Clustere | Special | | |
|---|---|---|---|---|---|
| FK_GRD_Student_GRD_RSOAndU | Foreign Key | N | GRD_RSOAndUnits | | |
| PK_GRD_StudentsAndGrades | Primary | N | | | |

| Field Name | Field Type | Field Size | Default | Special | Version | Index Fields Description |
|---|---|---|---|---|---|---|
| | | | | | | Index Fields |
| | | | | | | ItemID |
| | | | | | | StudentID ItemID |
| Comments | Memo | | Spaces | | 4.0 | Professor Comments. |
| DeleteFlag | Integer | 4 | | | 4.0 | Flag that identifies Unused records. A Value of 1 means Archieved record. |
| ItemID | Integer | 4 | | | 4.0 | Unique ID of the Item that is graded. |
| LetterGrade | Text | 50 | | | 4.0 | Used To store Letter Grades. |
| NumericGrade | Text | 50 | | | 4.0 | Used To Store Number Grades. |
| ShareGrade | Integer | 4 | | | 4.0 | Determines Whether a User is Allowed to view the grade or not. |
| StudentId | Integer | 4 | | | 4.0 | ID of the Student Links to UserID in the Users Table. |
| TimeStamp | Date/Time | 8 | | | 4.0 | The Last Time record was updated. |

| Table Name | GRD_Types (Table 644) | | Version | 4.0 | |
|---|---|---|---|---|---|
| Description | This table describes the types of gradeable items that can be used for a course. It links to the GRD_RSOAndUnits table through the Type field. ID = GRD_RSOAndUnits.Type | | | | |

| Index Name | Index Type | Clustere | Special | | Index Fields |
|---|---|---|---|---|---|
| PK_GRD_Types | Primary | N | | | ID |

| Field Name | Field Type | Field Size | Default | Special | Version | Description |
|---|---|---|---|---|---|---|
| DeleteFlag | Integer | 4 | | | 4.0 | Flag that identifies Unused records. A Value of 1 means Archieved record. |
| Description | Text | 255 | | | 4.0 | Description of Gradable Item Types (Learning Item, Course Tool or Custom Item.) |
| ID | Integer | 4 | | | 4.0 | Unique ID That Identifies a Gradable Item Type. |
| Name | Text | 50 | | | 4.0 | Title of the Gradable Item Type. |
| TimeStamp | Date/Time | 8 | | | 4.0 | The Last Time record was updated. |

| Table Name | Journal (Table 638) | | Version | 3.0 | |
|---|---|---|---|---|---|
| Description | This table creates page entries in a journal for a student in a course. The actual information on the page is stored in the JournalEntries table. | | | | |

| Index Name | Index Type | Clustere | Special | | Index Fields |
|---|---|---|---|---|---|
| IX_Journal | Index | Y | Unique | | CourseID UserID EntryID |
| PK_Journal | Primary | N | | | EntryID |

| Field Name | Field Type | Field Size | Default | Special | Version | Description |
|---|---|---|---|---|---|---|
| CourseID | Integer | 4 | | | 3.0 | The unique identifier for a specific course. |
| EntryID | Integer | 4 | | Identity(1,1) | 3.0 | The unique identifier for each journal entry. |
| Subject | Text | 255 | No Subject | | 3.0 | The subject line of the journal entry as it appears to the student. |
| UserID | Integer | 4 | | | 3.0 | The unique identifier for a specific student. The "owner" of the journal to whom this entry belongs. |

| Table Name | JournalEntries (Table 640) | | Version | 3.0 | | | |
|---|---|---|---|---|---|---|---|
| Description | This stores the pages/content of a student's journal for a specific course. The information also includes date/time stamps concerning when the pages were created, modified, and reviewed by the professor. | | | | | | |

| Index Name | Index Type | Field Size | Clustere | Special | | Index Fields | |
|---|---|---|---|---|---|---|---|
| No Indexes | | | | | | | |

| Field Name | Field Type | Field Size | Default | Special | Version | Description |
|---|---|---|---|---|---|---|
| CreateDate | Date/Time | 8 | Current Date | | 3.0 | The date of the specific journal entry's insertion into the database. |
| EntryID | Integer | 4 | | | 3.0 | The unique identifier for each journal entry. |
| EntryText | Memo | | | | 3.0 | The actual text entry for the journal entry. |
| ModifyDate | Date/Time | 8 | | | 3.0 | The date this specific entry's modification was saved to the database by the Student. |
| ProfessorModifyDate | Date/Time | 8 | | | 3.0 | The date this specific entry's modification was saved to the database by the Professor. |
| Submitter | Text | 150 | | | 3.0 | The FirstName and LastName of the professor making the modification to the entry in the database. (See ProfessorModifyDate) |

| Table Name | JournalHistory (Table 636) | | | Version | 4.0 | | |
|---|---|---|---|---|---|---|---|
| Description | This table is new to release 4.0 and stores the date/time stamp information that was held in the JournalEntires table in release 3.0. | | | | | | |
| Index Name | Index Type | Clustere | Special | Version | | Index Fields | |
| No Indexes | | | | | | | |
| Field Name | Field Type | Field Size | Default | Special | Version | Description | |
| EntryID | Integer | 4 | | | 4.0 | The unique identifier for each journal entry. | |
| ModifyDate | Date/Time | 8 | Current Date | | 4.0 | The date this specific entry's modification was made to the database. | |
| SubmitterID | Integer | 4 | | | 4.0 | The unique identifier (UserID) of the person making the entry's modification. Only saves the most recent ModifyDate. There are not multiple ModifyDates per SubmitterID per Entry ID. | |

| Table Name | JournalText (Table 634) | | Version | 4.0 | | |
|---|---|---|---|---|---|---|
| Description | This table stores the pages/content of a student's journal for a specific course. This table also allows the student to mark a page as private. | | | | | |

| Index Name | Index Type | Clustered | | | | Index Fields |
|---|---|---|---|---|---|---|
| PK_JournalText | Primary | N | | | | EntryID |

| Field Name | Field Type | Field Size | Default | Special | Version | Description |
|---|---|---|---|---|---|---|
| CourseID | Integer | 4 | | | 4.0 | The unique identifier for a specific course. |
| CreateDate | Date/Time | 8 | Current Date | | 4.0 | The date of the specific journal entry's insertion into the database. |
| EntryID | Integer | 4 | | Identity(1,1) | 4.0 | The unique identifier for each journal entry. |
| EntryText | Memo | | | | 4.0 | The actual text entry for the journal entry. |
| IsDeleted | Bit | 1 | 0 | | 4.0 | 1 = Is deleted : The entry will no longer be visable to the student and/or professor. 0 = Is not deleted (Default) : The entry is viewable/editable. |
| IsPrivate | Bit | 1 | 0 | | 4.0 | 1 = Private : The entry is only viewable by the owner of the Journal (see UserID below) 2 = Not Private : The entry is "shared" and viewable by the student and professor. |
| Subject | Text | 255 | | | 4.0 | The subject line of the journal entry as it appears to the student. |
| UserID | Integer | 4 | | | 4.0 | The unique identifier for a specific student. The "owner" of the journal to which this entry belongs. |

| Table Name | LayoutBlocks (Table 610) | | | Version | 3.0 | |
|---|---|---|---|---|---|---|
| Description | This table links the Blocks table with the LayoutTypes table. | | | | | |

| Index Name | Index Type | Clustered | Special | | | Index Fields |
|---|---|---|---|---|---|---|
| FK_LayoutBlocks_Blocks1 | Foreign Key | N | Blocks | | | BlockID |
| FK_LayoutBlocks_LayoutTypes | Foreign Key | N | LayoutTypes (LayoutTypeID) | | | LayoutID |
| PK_LayoutBlocks | Primary | N | | | | LayoutID BlockID |

| Field Name | Field Type | Field Size | Default | Special | Version | Description |
|---|---|---|---|---|---|---|
| BlockID | Text | 20 | | | 3.0 | The design element that is associated with a particular page layout. |
| LayoutID | Text | 1 | | | 3.0 | The page layout that is associated with a particular design element. |

| Table Name | LayoutTypes (Table 616) | | | Version | 3.0 | |
|---|---|---|---|---|---|---|
| Description | This table describes the page layout designs that are available. | | | | | |

| Index Name | Index Type | Clustered | Special | | | Index Fields |
|---|---|---|---|---|---|---|
| PK_LayoutTypes | Primary | N | | | | LayoutTypeID |

| Field Name | Field Type | Field Size | Default | Special | Version | Description |
|---|---|---|---|---|---|---|
| HasNavCategories | Bit | 1 | 0 | | 3.0 | Determines whether a particular page layout contains categories in the navigation bar. |
| LayoutTypeDescription | Memo | | | | 3.0 | Long description of the page layout design. |
| LayoutTypeID | Text | 1 | | | 3.0 | Unique identifier for this page layout design. |
| LayoutTypeName | Text | 30 | | | 3.0 | Short description of the page layout design. |

| Table Name | LayoutTypesAndRSOs (Table 618) | | Version | 3.0 | | | |
|---|---|---|---|---|---|---|---|
| Description | This table is used to link the LayoutTypes table with the RSOTypes table. | | | | | | |
| | | | | | | | |
| Index Name | | Index Type | Clustere | | Special | | Index Fields |
| FK_LayoutTypes_LayoutTypes | | Foreign Key | N | | LayoutTypes | | LayoutTypeID |
| FK_LayoutTypesAndRSOs_RSOTypes | | Foreign Key | N | | RSOTypes | | RSOTypeID |
| PK_LayoutTypesAndLearningOb | | Primary | N | | | | LayoutTypeID RSOTypeID |
| Field Name | Field Type | Field Size | Default | Special | Version | Description | |
| LayoutTypeID | Text | 1 | r | | 3.0 | The page layout that a particular Learning Tool may be associated with. | |
| RSOTypeID | Text | 20 | e | | 3.0 | The Learning Tool that will be associated with a page layout design. | |
| StartPage | Text | 50 | | | 3.0 | The page that is used to display the Learning Tool for this particular page layout design. | |

| Table Name | ManyMultChoice (Table 722) | | | Version | 3.0 | | |
|---|---|---|---|---|---|---|---|
| Description | This table holds the correct answers to multiple choice questions where more than one choice can be selected. It is tied to the QuestionHeader table which stores the actual questions. | | | | | | |

| Index Name | Index Type | Clustere | Special | | | Index Fields | |
|---|---|---|---|---|---|---|---|
| INDEX_MMC_1 | Index | N | | | | SectionPkID QuestionID | |
| INDEX_MMC_2 | Index | N | Unique | | | SectionPkID QuestionID ChoiceNumber | |
| INDEX_MMC_3 | Index | N | | | | SectionPkID | |

| Field Name | Field Type | Field Size | Default | Special | Version | Description |
|---|---|---|---|---|---|---|
| ChoiceExplanation | Memo | | | | 3.0 | Explanation for the Choice. |
| ChoiceNumber | Integer | 4 | | | 3.0 | Choice Number. |
| ChoiceQuestion | Memo | | | | 3.0 | Choice Text. |
| CorrectFlag | Integer | 4 | | | 3.0 | Flag that identifies whether the Choice is correct or not. |
| QuestionID | Integer | 4 | | | 3.0 | Id of the Many Multiple Choice Question. |
| SectionPkID | Integer | 4 | | | 3.0 | Id of the Section the Question is in. |

| Table Name | Matching (Table 714) | | Version | 3.0 | | | |
|---|---|---|---|---|---|---|---|
| Description | This table holds the correct answers to matching questions. It is tied to the QuestionHeader table which stores the actual questions. | | | | | | |
| Index Name | Index Type | Clustere | Special | | | | Index Fields |
| INDEX_MT_1 | Index | N | | | | | SectionPkID QuestionID |
| INDEX_MT_2 | Index | N | | | | | SectionPkID QuestionID ChoiceNumber |
| INDEX_MT_3 | Index | N | | | | | SectionPkID |
| Field Name | Field Type | Field Size | Default | Special | Version | Description | |
| ChoiceAnswer | Memo | | | | 3.0 | Answer Text for the Choice. | |
| ChoiceNumber | Integer | 4 | | | 3.0 | Choice Number. | |
| ChoiceQuestion | Memo | | | | 3.0 | Choice Text. | |
| DisplayOrder | Integer | 4 | | | 3.0 | The Order in which the Choice is Displayed Within a Matching Question. | |
| QuestionID | Integer | 4 | | | 3.0 | ID of the Matching Question. | |
| SectionPkID | Integer | 4 | | | 3.0 | ID of the Section the Question is in. | |

| Table Name | Messages (Table 598) | | | Version | 3.0 | | |
|---|---|---|---|---|---|---|---|
| Description | This table stores messages that are to be sent out by the system. | | | | | | |
| | | | | | | | |
| Index Name | | Index Type | Clustere | Default | Special | | Index Fields |
| PK_Messages_1_18 | | Primary | Y | | | | MessageID |
| | | | | | | | |
| Field Name | | Field Type | Field Size | Default | Special | Version | Description |
| ClientNodeID | | Integer | 4 | | | 3.0 | Foreign key to the ClientNode table. |
| Header | | Text | 255 | | | 3.0 | The header for the message |
| IsAdmin | | Bit | 1 | 0 | | 3.0 | Is this a university or course message |
| MessageID | | Integer | 4 | | | 3.0 | Unique identifier |
| Submitter | | Text | 150 | | | 3.0 | Submitter's first and last name |
| Text | | Memo | | | | 3.0 | Message text |
| TimeStamp | | Date/Time | 8 | | | 3.0 | Time the message was sent |

| Table Name | MultChoice (Table 720) | | Version | 3.0 | | | |
|---|---|---|---|---|---|---|---|
| Description | This table holds the correct answers to multiple choice questions. It is tied to the QuestionHeader table which stores the actual questions. | | | | | | |
| Index Name | | Index Type | Clustere | Special | | | Index Fields |
| INDEX_MC_1 | | Index | N | | | | SectionPkID QuestionID |
| INDEX_MC_2 | | Index | N | | | | SectionPkID QuestionID ChoiceNumber |
| INDEX_MC_3 | | Index | N | | | | SectionPkID |
| Field Name | | Field Type | Field Size | Default | Special | Version | Description |
| ChoiceExplanation | | Memo | | | | 3.0 | Explanation for the Choice. |
| ChoiceNumber | | Integer | 4 | | | 3.0 | Choice Number. |
| ChoiceQuestion | | Memo | | | | 3.0 | Choice Text. |
| QuestionID | | Integer | 4 | | | 3.0 | ID of the Mult Choice Question. |
| SectionPkID | | Integer | 4 | | | 3.0 | ID of the Section the Question is in. |

| Table Name | NavigationLinks (Table 602) | | Version | 3.0 | |
|---|---|---|---|---|---|
| Description | This table describes navigation links that a course contains. | | | | |

| Index Name | Index Type | Clustere | Special | | Index Fields |
|---|---|---|---|---|---|
| FK_NavigationL_NavigationB | Foreign Key | N | ClientBlocks | | ClientNodeID BlockID LayoutID |
| IX_NavigationLinks_C | Index | Y | Unique | | ClientNodeID BlockID LayoutID CourseType OrderNum |
| PK_NavigationLinks | Primary | N | | | NavLinkID |

| Field Name | Field Type | Field Size | Default | Special | Version | Description |
|---|---|---|---|---|---|---|
| Action | Text | 30 | | | 3.0 | Determines which item in the navigation bar has been chosen. |
| BlockID | Text | 20 | | | 3.0 | The design element that this navigation item may be associated with. |
| ClientNodeID | Integer | 4 | | | 3.0 | Foreign key to the ClientNode table. |
| CourseType | Text | 20 | | | 3.0 | The type of course that this navigation item may be associated with. |
| Hyperlink | Text | 200 | | | 3.0 | The link that this navigation item will go to when it is chosen. |
| LayoutID | Text | 1 | | | 3.0 | The page layout design that this navigation item may be associated with. |
| LinkText | Text | 200 | | | 3.0 | Text that describes the navigation item. |
| NavCatID | Integer | 4 | | | 3.0 | Category identifier that the link is displayed under. |
| NavLinkID | Integer | 4 | | Identity(1,1) | 3.0 | Unique identifier for this navigation item. |
| OrderNum | Integer | 4 | | | 3.0 | The order that this navigation item will be displayed in. |
| RightID | Integer | 4 | | | 3.0 | The right that a user must have to view or choose this item. |
| RSOTypeID | Text | 20 | | | 3.0 | The Learning Tool that this navigation item will attempt to access. |
| Target | Text | 50 | | | 3.0 | The place on the page that the navigation item will load into. |

Table Name Notebook (Table 620) Version 3.0

Description This table stores a student's notes on a specific course.

| Index Name | Index Type | Clustered | Special | Index Fields |
|---|---|---|---|---|
| PK_Notebook | Primary | N | | CourseID UserID |

| Field Name | Field Type | Field Size | Default | Special | Version | Description |
|---|---|---|---|---|---|---|
| CourseID | Integer | 4 | | | 3.0 | The course that this notebook is associated with. |
| Notes | Memo | | | | 3.0 | The text of the notes for this user in this course. |
| UserID | Integer | 4 | | | 3.0 | Identifier of the user for whose notes these are. |

Table Name PaymentPlans (Table 586) Version 3.0

Description This table stores the semester payment plans that are available to students. It is not tied to a client or student.

| Index Name | Index Type | Clustered | Special | Index Fields |
|---|---|---|---|---|
| PK_PaymentPlans | Primary | N | | PPlanID |

| Field Name | Field Type | Field Size | Default | Special | Version | Description |
|---|---|---|---|---|---|---|
| ClientPlanCode | Text | 25 | | | 3.0 | string that can be used for each payment plan to identify it with a university specific code if applicable |
| PlanTypeID | Integer | 4 | | | 3.0 | points to plan types |
| PPlan | Memo | | | | 3.0 | Text of the payment plan. Displayed to students when they select the plan |
| PPlanID | Integer | 4 | | Identity(1,1) | 3.0 | Primary Key |
| SemesterID | Integer | 4 | | | 3.0 | semesterid, semester for which the plan is to be used |
| ServiceFee | Currency | 8 | 0 | | 3.0 | Fee associated with the plan if any |

| Table Name | PaymentPlanTypes (Table 584) | | | Version | 3.0 | | |
|---|---|---|---|---|---|---|---|
| Description | This table describes the PlanTypeID field used in the PaymentPlans table. There are currently fourteen entries in this table. | | | | | | |
| Index Name | Index Type | Clustere | Special | | | Index Fields | |
| PK_PaymentPlanTypes | Primary | N | | | | PlanTypeID | |
| Field Name | Field Type | Field Size | Default | Special | Version | Description | |
| PlanTypeID | Integer | 4 | | | 3.0 | Primary Key | |
| PTypeDescription | Text | 255 | | | 3.0 | description of type of payment plan | |

| Table Name | Pool (Table 706) | | | Version | 3.0 | | |
|---|---|---|---|---|---|---|---|
| Description | This table is used to store pool questions. | | | | | | |
| Index Name | Index Type | Clustere | Special | | | Index Fields | |
| INDEX_POOL_1 | Index | N | Unique | | | SectionPkID QuestionID | |
| INDEX_POOL_2 | Index | N | | | | SectionPkID | |
| Field Name | Field Type | Field Size | Default | Special | Version | Description | |
| Description | Memo | | | | 3.0 | Decription of the Pool. | |
| Name | Text | 255 | | | 3.0 | Title of the Pool. | |
| NumberOfQuestions | Integer | 4 | | | 3.0 | Number Of Question in the Pool. | |
| QuestionID | Integer | 4 | | | 3.0 | ID of the Pool. | |
| SectionPkID | Integer | 4 | | | 3.0 | ID of the Section the Pool is in. | |

| Table Name | QuestionHeader (Table 708) | | Version | 3.0 | | | |
|---|---|---|---|---|---|---|---|
| Description | This table stores the actual questions that are available for an exam. | | | | | | |
| | | | | | | | |
| Index Name | | Index Type | Clustere | Special | | | Index Fields |
| INDEX_QH_1 | | Index | N | | | | SectionPkID |
| PK_QuestionHeader | | Primary | N | | | | SectionPkID QuestionTypeID QuestionID |
| | | | | | | | |
| Field Name | Field Type | Field Size | Default | Special | | Version | Description |
| BunchID | Integer | 4 | 0 | | | 3.0 | |
| CorrectAnswer | Integer | 4 | | | | 3.0 | Used to store the Correct Answer For a Question. Makes Sense only for some Question Types. |
| EditFlag | Integer | 4 | 0 | | | 3.0 | A Flag that identifies modified Questions. A value of 1 means the record has been modified. |
| GeneralExplanation | Memo | | | | | 3.0 | General Explanation for the Question. |
| IsMandatoryinPool | Integer | 4 | | | | 3.0 | Determines Whether the Question is Mandatory in the Pool or not. |
| NumberOfPoints | Integer | 4 | | | | 3.0 | The Total Number of Points the Question Carries. |
| OrderNumber | Integer | 4 | | | | 3.0 | The Order in which the Question appears in the Section. |
| PoolID | Integer | 4 | 0 | | | 3.0 | Contains the Pool ID if the question is in a pool else 0; |
| QuestionID | Integer | 4 | | | | 3.0 | ID of the Question. |
| QuestionText | Memo | | | | | 3.0 | The Text of the Question. |
| QuestionTypeID | Integer | 4 | | | | 3.0 | ID that identifies a Question Type. |
| SectionPkID | Integer | 4 | | | | 3.0 | ID of the Section the the Question is in. |

| Table Name | QuestionTypes (Table 704) | | Version | 3.0 | | |
|---|---|---|---|---|---|---|
| Description | This table describes the QuestionTypeID field used in the QuestionHeader and StudentQuestionHeader tables. There are currently eight entries (1) True/False, (2) Multiple choice, (3) Many Multiple Choice, (4) Fill in the Blank, (5) Matching, (6) Short, (7) Essay, and (8) Pool. | | | | | |

| Index Name | Index Type | Clustere | Special | | Index Fields | |
|---|---|---|---|---|---|---|
| INDEX_QuestionTypes_1 | Index | N | | | QuestionTypeID | |

| Field Name | Field Type | Field Size | Default | Special | Version | Description |
|---|---|---|---|---|---|---|
| Prefix | Text | 10 | | | 3.0 | Small Name For a Question Type. |
| QuestionDescription | Text | 255 | | | 3.0 | Description of the Question. |
| QuestionTypeID | Integer | 4 | | | 3.0 | ID of the Question Type. |

| Table Name | RealSystemObjectCategories (Table 630) | | Version | 3.0 | | |
|---|---|---|---|---|---|---|
| Description | This table describes the place where a learning tool will be used. | | | | | |

| Index Name | Index Type | Clustere | Special | | Index Fields | |
|---|---|---|---|---|---|---|
| PK_RealSystemObjectCategories | Primary | N | | | RSOCategoryID | |

| Field Name | Field Type | Field Size | Default | Special | Version | Description |
|---|---|---|---|---|---|---|
| RSOCategoryDescription | Memo | | | | 3.0 | Long description of the place where the Learning Tool will be used. |
| RSOCategoryID | Text | 20 | | | 3.0 | Unique identifier for the category or place where the Learning Tool will be used. |
| RSOCategoryName | Text | 30 | | | 3.0 | Short description of the place where the Learning Tool will be used(title). |

Table Name RealSystemVersions (Table 632)   Version 3.0
Description

| Index Name | Index Type | Clustere | Special | | | Index Fields |
|---|---|---|---|---|---|---|
| PK_RealSystemVersions | Primary | N | | | | Version |

| Field Name | Field Type | Field Size | Default | Special | Version | Description |
|---|---|---|---|---|---|---|
| IsCurrent | Bit | 1 | 1 | | 3.0 | used to store information about the builds |
| RSCategoryID | Byte | 1 | 1 | | 3.0 | used to store information about the builds |
| TimeStamp | Date/Time | 8 | Current Date | | 3.0 | used to store information about the builds |
| Version | Text | 100 | | | 3.0 | used to store information about the builds |

Table Name RightCategories (Table 514)   Version 4.0
Description This table describes the CategoryID field used in the Rights table. There are currently twelve entries in this table which deal with a user's access rights to specific portions of the eCollege system.

| Index Name | Index Type | Clustere | Special | | | Index Fields |
|---|---|---|---|---|---|---|
| IX_RightCategories | Index | Y | | | | CategoryID |

| Field Name | Field Type | Field Size | Default | Special | Version | Description |
|---|---|---|---|---|---|---|
| CategoryConstant | Text | 3 | | | 4.0 | String identifier for a right category, used to build the constants in the global.asa |
| CategoryID | Integer | 4 | | | 4.0 | primary key and unique identifier for a category |
| CategoryName | Text | 50 | | | 4.0 | descriptive name of category |

Table Name Rights (Table 516)     Version 3.0

Description This table identifies that rights that can be assigned within the eCollege system. These rights are assigned to specific roles through the RolesRights table and to a specific Educational Partner through the ClientRoles table.

| Index Name | Index Type | Clustere | Special | Index Fields |
|---|---|---|---|---|
| PK_Rights | Primary | Y | | RightID CategoryID |

| Field Name | Field Type | Field Size | Default | Special | Version | Description |
|---|---|---|---|---|---|---|
| CategoryID | Integer | 4 | 0 | | 4.0 | 4.0 only |
| ConstIdentifier | Text | 40 | | | 3.0 | Identifier that is used in the code from an application variable. |
| Description | Text | 255 | | | 3.0 | Description of a right and where it is used in the system code |
| RightID | Integer | 4 | | | 3.0 | Unique identifier |

Table Name Roles (Table 532)     Version 3.0

Description This table identifies the roles that may be assigned to a user in the eCollege system. There are currently forty-three entries in this table.

| Index Name | Index Type | Clustere | Special | Index Fields |
|---|---|---|---|---|
| PK_Roles | Primary | Y | | RoleID |

| Field Name | Field Type | Field Size | Default | Special | Version | Description |
|---|---|---|---|---|---|---|
| ConstIdentifier | Text | 50 | | | 3.0 | |
| Description | Text | 255 | | | 3.0 | Description of role and why it has been configured with certain rights |
| DispName | Text | 150 | | | 3.0 | Display name of role |
| RoleID | Integer | 4 | | Identity(1,1) | 3.0 | Unique identifier |
| RoleTypeID | Integer | 4 | | | 3.0 | Links to roletypes.roletypeid |

| Table Name | RolesRights (Table 526) | | | Version | 3.0 | | |
|---|---|---|---|---|---|---|---|
| Description | This table is used to assign access rights to the eCollege system to specific roles that are assigned users of the system. | | | | | | |
| Index Name | | Index Type | Clustere | Special | | Index Fields | |
| PK_RolesRights | | Primary | Y | | | RoleID RightID | |
| Field Name | Field Type | Field Size | Default | Special | Version | Description | |
| RightID | Integer | 4 | | | 3.0 | Links to Rights.RightID | |
| RoleID | Integer | 4 | | | 3.0 | Links to Roles.roleid | |

| Table Name | RoleTypes (Table 534) | | | Version | 3.0 | | |
|---|---|---|---|---|---|---|---|
| Description | This table describes the RoleTypeID that is used in the Roles table. There are currently eleven types of roles that are available. | | | | | | |
| Index Name | | Index Type | Clustere | Special | | Index Fields | |
| PK_RoleTypes_1_15 | | Primary | Y | | | RoleTypeID | |
| Field Name | Field Type | Field Size | Default | Special | Version | Description | |
| RoleTypeConst | Text | 20 | | | 3.0 | a four character constant. About 8 or 9 constants are used. Refer to the roles rights system documentation | |
| RoleTypeID | Integer | 4 | | | 3.0 | Links to roles.roletypeid | |

| Table Name | RSOTypes (Table 628) | | Version | 3.0 | |
|---|---|---|---|---|---|
| Description | This table is used to describe learning tools. | | | | |

| Index Name | Index Type | Cluster | Special | | Index Fields |
|---|---|---|---|---|---|
| FK_RSOTypes_RealSystem0 | Foreign Key | N | RealSystemObjectCategories | | RSOCategoryID |
| PK_LOTypes | Primary | N | | | RSOTypeID |

| Field Name | Field Type | Field Size | Default | Special | Version | Description |
|---|---|---|---|---|---|---|
| ButtonPath | Text | 100 | | | 3.0 | The path to the button that is displayed to symbolize the learning tool. |
| HasNavigation | Bit | 1 | 0 | | 3.0 | Indicates whether this tool will contain a navigation bar. |
| IconPath | Text | 100 | | | 3.0 | The path to the icon that will display on the interactive syllabus if necessary. |
| RightID | Small Integer | 2 | 0 | | 3.0 | The right that a user must have to view or choose this Learning Tool. |
| RSOCategoryID | Text | 20 | | | 3.0 | The category or place where this learning tool may be used. |
| RSOTypeDescription | Memo | | | | 3.0 | Long description for the Learning Tool. |
| RSOTypeID | Text | 20 | | | 3.0 | Unique identifier for this learning tool. |
| RSOTypeName | Text | 30 | | | 3.0 | Short description of this learning tool. |

| Table Name | RUIDs (Table 544) | | Version | 3.0 | | |
|---|---|---|---|---|---|---|
| Description | This table is used to generate unique Ids that are used in other tables. | | | | | |

| Index Name | Index Type | Clustere | Special | | Index Fields | |
|---|---|---|---|---|---|---|
| PK_RUIDs | Primary | N | | | RUIDType | |

| Field Name | Field Type | Field Size | Default | Special | Version | Description |
|---|---|---|---|---|---|---|
| RUID | Integer | 4 | 0 | | 3.0 | A uniques sequence number |
| RUIDType | Integer | 4 | 1 | | 3.0 | 1: unique number used for userIDs, courseIDs, and ClientNodeIDs, 2: unique id used for threads.topicgroupid linked with unitdata.RSOID, 3: unique id used for doccollab.docid |

| Table Name | Sections (Table 698) | | Version | 3.0 | | |
|---|---|---|---|---|---|---|
| Description | This table stores the sections that an exam can be broken down to. An exam may have one or many sections. An exam may have one section for true/false questins and another section for fill in the blank questions. | | | | | |

| Index Name | Index Type | Clustere | Special | | Index Fields | |
|---|---|---|---|---|---|---|
| INDEX_SECTIONS_1 | Index | N | Unique | | SectionPKID | |
| INDEX_SECTIONS_2 | Index | N | | | ExamPkID | |

| Field Name | Field Type | Field Size | Default | Special | Version | Description |
|---|---|---|---|---|---|---|
| ExamPkId | Integer | 4 | | | 3.0 | ID of the Exam the Section is in. |
| SectionDescription | Memo | | | | 3.0 | Description of the Section. |
| SectionID | Integer | 4 | | | 3.0 | A Unique ID for a section Within an Exam.Usually a running serial Number.Identifies the Order in which the Sections have to be displayed for an exam. |
| SectionPkID | Integer | 4 | | Identity(1,1) | 3.0 | Unique ID for a Section. |
| SectionTitle | Text | 255 | | | 3.0 | Title Of The Section. |

| Table Name | SemesterPlanRules (Table 656) | | Version | 3.0 | | |
|---|---|---|---|---|---|---|
| Description | This table is used to describe semester plans. | | | | | |

| Index Name | Index Type | Clustered | Special | | Index Fields | |
|---|---|---|---|---|---|---|
| PK_SemesterPlanRules | Primary | N | | | PlanRuleID | |

| Field Name | Field Type | Field Size | Default | Special | Version | Description |
|---|---|---|---|---|---|---|
| PlanRuleDescription | Memo | | | | 3.0 | Plan description |
| PlanRuleID | Integer | 4 | | Identity(1,1) | 3.0 | Unique ID for semesterplan rules |
| PlanRuleName | Text | 100 | | | 3.0 | Semester Plan Name |

| Table Name | Semesters (Table 658) | | | | | |
|---|---|---|---|---|---|---|
| Description | This table describes information about semesters that are used for each Educational Partner. Courses are attached to semesters which are attached to the Educational Partner. | | | Version | 3.0 | |

| Index Name | Index Type | Clustere | | | Index Fields | |
|---|---|---|---|---|---|---|
| PK_Semesters_1_13 | Primary | Y | | | SemesterID | |

| Field Name | Field Type | Field Size | Default | Special | Version | Description |
|---|---|---|---|---|---|---|
| AddDate | Date/Time | 8 | | | 3.0 | Last date to add a class in a semester |
| AdOverride | Bit | 1 | 0 | | 3.0 | Used to identify if advertise override is in place. |
| AutoEnrollStartDate | Date/Time | 8 | | | 3.0 | Date of first access to auto enroll courses (Instructional Design and Orientation) |
| CensusDate | Date/Time | 8 | | | 3.0 | Date after which the system bills EP's for enrolled students |
| ClientID | Integer | 4 | | | 3.0 | Foreign key to the ClientNode table. |
| ClientPlanCode | Text | 25 | | | 3.0 | not in use |
| Description | Text | 200 | | | 3.0 | Description of semester |
| DropDate | Date/Time | 8 | | | 3.0 | Last date to drop a class |
| DropDuration | Integer | 4 | 0 | | 3.0 | For a self paced semester only, the duration in days for which a student may drop a course after their first access |
| Duration | Integer | 4 | 0 | | 3.0 | Duration in days of a self paced semester |
| EndDate | Date/Time | 8 | | | 3.0 | End date for a semester (students get access for two weeks after this date) |
| HideUnenrolled | Bit | 1 | 0 | | 3.0 | Indicates whether or not users who have access to no courses in the semester should still see it on the PSH or not |
| IsOff | Bit | 1 | 0 | | 3.0 | Semester which are off are only accessible to the system users |
| IsSpecial | Bit | 1 | 0 | | 3.0 | Special semesters are the location for Instructional Design and Orientation courses. Only one per client. Always display on the top of the PSH |
| Name | Text | 50 | | | 3.0 | Semester Name |

| Field Name | Field Type | Field Size | Default | Special | Version | Description |
|---|---|---|---|---|---|---|
| PlanRuleID | Integer | 4 | | | 3.0 | Payment Plan Rule |
| ProfContractRule | Integer | 4 | 1 | | 3.0 | Contract Rule that applies to profs |
| RegEndDate | Date/Time | 8 | | | 3.0 | Last date for registration |
| RegNote | Text | 255 | d | | 3.0 | note to display to users after registration ends |
| RegStartDate | Date/Time | 8 | | | 3.0 | Beginning date for registrations |
| SemesterID | Integer | 4 | | Identity(1,1) | 3.0 | unique ID for a semester |
| SFlag | Byte | 1 | 0 | | 3.0 | |
| StartDate | Date/Time | 8 | | | 3.0 | Start date of semseter, first access to courses |
| StudContractRule | Integer | 4 | 1 | | 3.0 | Contract Rule that applies to students |
| Type | Text | 10 | Standard | | 3.0 | semester type, self-paced or standard |
| WithdrawalDate | Date/Time | 8 | | | 3.0 | last date to withdraw from courses |

Table Name: SemestersAndClientNodes (Table 572)  Version 3.0

Description: This table is used to link the Semester table with the ClientNode table.

| Index Name | Index Type | Clustere | Special | Version | Index Fields |
|---|---|---|---|---|---|
| PK_SemestersAndClientNodes | Primary | N | | | SemesterID ClientNodeID |

| Field Name | Field Type | Field Size | Default | Special | Version | Description |
|---|---|---|---|---|---|---|
| ClientNodeID | Integer | 4 | | | | Foreign key to the ClientNode table. |
| SemesterID | Integer | 4 | | | 3.0 | points to semesters table |

| Table Name | StatusHistory (Table 576) | | Version | 3.0 | | |
|---|---|---|---|---|---|---|
| Description | This table is used to store historical archive information of the CurrentStatus table. | | | | | |

| Index Name | Index Type | Clustered | Special | Index Fields |
|---|---|---|---|---|
| PK_StatusHistory | Primary | Y | | UserID CourseID TimeStamp RoleID ClientNodeID |

| Field Name | Field Type | Field Size | Default | Special | Version | Description |
|---|---|---|---|---|---|---|
| ClientNodeID | Integer | 4 | | | 3.0 | Foreign key to the ClientNode table. |
| Comment | Text | 255 | | | 3.0 | Status comment - why the user was set to this status. |
| CourseID | Integer | 4 | | | 3.0 | Foreign key to the Courses.CourseID. Value of 0 represents an enrollable client node status. |
| ENodeID | Integer | 4 | | | 3.0 | Enrollavle node id. Link to ClientNodes where ClientNodes.IsEnrollable = true. |
| IsCurrent | Bit | 1 | | | 3.0 | Represents the record that is current in current status. |
| RoleID | Integer | 4 | | | 3.0 | Links to the Roles.roleid field |
| TimeStamp | Date/Time | 8 | | | 3.0 | The date/time that the status history was generated. |
| UserID | Integer | 4 | | | 3.0 | Links to the Users.userid field. |

| Table Name | StudentExams (Table 694) | | | | | | |
|---|---|---|---|---|---|---|---|
| Description | This table links an Exam with a Student. The StudentID field links to UserID in the User table. | | | | | | |

| Index Name | Index Type | Clustered | Special | | | Index Fields | |
|---|---|---|---|---|---|---|---|
| INDEX_StudentExams_1 | Index | N | Unique | | | StudentID ExamPkID | |

| Field Name | Field Type | Field Size | Default | Special | Version | Description |
|---|---|---|---|---|---|---|
| Comment | Memo | | Spaces | | 3.0 | Professor Comment. |
| EndTime | Date/Time | 8 | Current Date + 50 Years | | 3.0 | Time when student Completed the Exam. |
| ExamPkID | Integer | 4 | | | 3.0 | ID of the Exam the Student has taken. |
| FinalGrade | Text | 10 | Spaces | | 3.0 | Final Grade Assigned to the student Exam. |
| IsAutoGradingOn | Integer | 4 | 1 | | 3.0 | Tells whether the StudentExam was Auto Graded or not. |
| IsComplete | Integer | 4 | 0 | | 3.0 | A Flag that tells Whether a Student Exam is Complete. |
| LateSubmissionFlag | Integer | 4 | 1 | | 3.0 | A Flag that tells if Student took more time than allocated. |
| StartTime | Date/Time | 8 | | | 3.0 | Time when student Started the Exam. |
| StudentID | Integer | 4 | | | 3.0 | ID of the student who has taken the Exam. |
| TemporaryAccessTime | Integer | 4 | 0 | | 3.0 | Extra time in minutes that were granted to the Student to complete the Exam. |

| Table Name | StudentManyMultChoice (Table 710) | | Version | 3.0 | | |
|---|---|---|---|---|---|---|
| Description | This table holds the students' answers to multiple choice questions that may require more than one choice being selected. | | | | | |

| Index Name | Index Type | Clustere | Special | Index Fields |
|---|---|---|---|---|
| INDEX_SECTION_3 | Index | N | | StudentID SectionPkID |
| INDEX_StudentMMC_1 | Index | N | | StudentID SectionPkID QuestionID |
| INDEX_StudentMMC_2 | Index | N | Unique | StudentID SectionPkID QuestionID ChoiceNumber |

| Field Name | Field Type | Field Size | Default | Special | Version | Description |
|---|---|---|---|---|---|---|
| Answer | Integer | 4 | | | 3.0 | Used to Capture Answer for a Choice. |
| ChoiceNumber | Integer | 4 | | | 3.0 | Choice Number. |
| IsCorrect | Integer | 4 | | | 3.0 | A Flag that tells if Student got the Choice Correct. |
| QuestionID | Integer | 4 | | | 3.0 | ID of the ManyMultiple Choice Question. |
| SectionPkID | Integer | 4 | | | 3.0 | ID of the Section the Question is in. |
| StudentID | Integer | 4 | | | 3.0 | ID of the Student who Answered the Question.Links to UserID in Users Table. |

| Table Name | StudentMatching (Table 712) | | | Version | 3.0 | | |
|---|---|---|---|---|---|---|---|
| Description | This table holds the students' answers to matching questions. | | | | | | |

| Index Name | Index Type | Clustere | Special | | | Index Fields | |
|---|---|---|---|---|---|---|---|
| INDEX_StudentMT_1 | Index | N | | | | StudentID SectionPkID QuestionID | |
| INDEX_StudentMT_2 | Index | N | Unique | | | StudentID SectionPkID QuestionID ChoiceNumber | |
| INDEX_StudentMT_3 | Index | N | Unique | | | StudentID SectionPkID | |

| Field Name | Field Type | Field Size | Default | Special | Version | Description |
|---|---|---|---|---|---|---|
| Answer | Integer | 4 | 0 | | 3.0 | Used to Capture Answer for a Choice. |
| ChoiceNumber | Integer | 4 | | | 3.0 | Choice Number. |
| IsCorrect | Integer | 4 | | | 3.0 | A Flag that tells if student got the Choice Correct. |
| QuestionID | Integer | 4 | | | 3.0 | ID of the Matching Question. |
| SectionPkID | Integer | 4 | | | 3.0 | ID of the Section the Question is in. |
| StudentID | Integer | 4 | | | 3.0 | ID of the Student who Answered the Question.Links to UserID in Users Table. |

| Table Name | StudentQuestionHeader (Table 702) | | Version | 3.0 | | |
|---|---|---|---|---|---|---|
| Description | This table holds the students' answers to questions that have only one response. | | | | | |

| Index Name | Index Type | Clustere | Special | | | |
|---|---|---|---|---|---|---|
| INDEX_StudentQH_1 | Index | N | | | | |
| INDEX_StudentQH_2 | Index | N | Unique | | | |
| INDEX_StudentQH_3 | Index | N | Unique | | | |

| Field Name | Field Type | Field Size | Default | Special | Version | Description |
|---|---|---|---|---|---|---|
| IsCorrect | Integer | 4 | | | 3.0 | A Flag that tells if the student got the Question Correct. |
| nAnswer | Integer | 4 | | | 3.0 | Used to Capture Answer for some Question Types Whose Answer is an Integer. |
| NumberOfPointsObtained | Double | 8 | -1 | | 3.0 | Number of Points obtained by the student for that question. |
| OrderNumber | Integer | 4 | | | 3.0 | The order in which the question appears in the Section. |
| ProfessorComment | Memo | | Spaces | | 3.0 | Professor Comments. |
| QuestionID | Integer | 4 | | | 3.0 | ID of the Question. |
| QuestionTypeID | Integer | 4 | | | 3.0 | identifies the Question type. |
| SectionPkID | Integer | 4 | | | 3.0 | ID of the Section the Question is in. |
| StudentID | Integer | 4 | | | 3.0 | ID of the Student who Answered the Question. Links to UserID in Users Table. |
| txtAnswer | Memo | | Spaces | | 3.0 | Used to store Answer for some Question Types Who Answer is text. |

| Index Fields |
|---|
| StudentID SectionPkID |
| StudentID SectionPkID QuestionTypeID QuestionID |
| StudentID SectionPkID QuestionTypeID |

| Table Name | TextStyles (Table 614) | | Version | 3.0 | | |
|---|---|---|---|---|---|---|
| Description | This table describes the style of text that may be used. | | | | | |
| | | | | | | |
| Index Name | Index Type | Clustere | Special | | | Index Fields |
| FK_TextStyles_LayoutTypes | Foreign Key | N | LayoutTypes | | | LayoutTypeID |
| PK_TextStyles2 | Primary | N | | | | TextStyleID |
| | | | | | | |
| Field Name | Field Type | Field Size | Default | Special | Version | Description |
| LayoutTypeID | Text | 1 | | | 3.0 | The page layout design that this Text Style may be used with. |
| TextStyleDescription | Memo | | | | 3.0 | Long description of the style of text that is used. |
| TextStyleID | Text | 20 | | | 3.0 | Unique identifier for this style of text. |
| TextStyleName | Text | 30 | | | 3.0 | Short description of the style of text that is used. |

| Table Name | TextStylesAndClientNodes (Table 504) | | Version | 3.0 | | |
|---|---|---|---|---|---|---|
| Description | This table links the TextStyles table with the ClientNodes table. | | | | | |
| | | | | | | |
| Index Name | Index Type | Clustere | Special | | | Index Fields |
| PK_TextStyles | Primary | Y | | | | ClientNodeID TextStyleID |
| | | | | | | |
| Field Name | Field Type | Field Size | Default | Special | Version | Description |
| ClientNodeID | Integer | 4 | | | 3.0 | Foreign key to the ClientNode table. |
| EndTag | Text | 20 | | | 3.0 | The ending "font" tag that will be used to wrap the text for this style. |
| StartTag | Text | 100 | | | 3.0 | The starting "font" tag that will be used to wrap the text for this style. |
| TextStyleID | Text | 20 | | | 3.0 | The text style that is associated with the node in the client's hierarchy. |

| Table Name | Threads (Table 700) | | Version | 3.0 | | |
|---|---|---|---|---|---|---|
| Description | This table provides information and links concerning threaded discussions that pertain to specific courses. | | | | | |

| Index Name | Index Type | Clustere | Special | | Index Fields | |
|---|---|---|---|---|---|---|
| IX_Threads | Index | Y | | | TopicGroupID TopicID SortCode | |
| PK_Threads | Primary | N | | | ThreadID | |

| Field Name | Field Type | Field Size | Default | Special | Version | Description |
|---|---|---|---|---|---|---|
| AttachmentID | Integer | 4 | | | 3.0 | |
| FileName | Text | 255 | | | 3.0 | The name of a file associated with a thread |
| FName | Text | 50 | | | 3.0 | Creator's First Name |
| LName | Text | 50 | | | 3.0 | Creator's Last Name |
| Message | Memo | | | | 3.0 | Message Content |
| ParentID | Integer | 4 | | | 3.0 | ThreadID of it's parent thread. If message is topic, this is 0 |
| PostDate | Date/Time | 8 | | | 3.0 | Posted Date |
| SortCode | Text | 248 | | | 3.0 | Code generated to facilitate sort order. A topic will share common first three digit number of this code |
| SortLevel | Integer | 4 | | | 3.0 | This is number that corresponds to the root thread |
| ThreadID | Integer | 4 | | Identity(1,1) | 3.0 | Unique ID for the message |
| Title | Text | 255 | | | 3.0 | Title of the topic message. This is generally empty for thread message. |
| TopicGroupID | Integer | 4 | | | 3.0 | Unique ID for a entire thread. This joins with RSOID. |
| TopicID | Integer | 4 | | | 3.0 | Unique ID for a topic |
| UserID | Integer | 4 | | | 3.0 | Creator's UserID |

| Table Name | TrackingCats (Table 670) | | Version | 3.0 | | | |
|---|---|---|---|---|---|---|---|
| Description | This table is used to debug the system. | | | | | | |
| | | | | | | | |
| Index Name | | Index Type | Clustere | Special | | | Index Fields |
| PK_TrackingCats | | Primary | Y | | | | TrackingID |
| | | | | | | | |
| Field Name | Field Type | Field Size | Default | Special | Version | Description | |
| TrackingConst | Text | 15 | | | 3.0 | String identifier for a tracking category, used to build the constants in the global.asa | |
| TrackingDesc | Text | 255 | | | 3.0 | description of tracking category | |
| TrackingID | Small Integer | 2 | | | 3.0 | unique ID of category | |
| TrackingName | Text | 40 | | | 3.0 | name of category | |

| Table Name | TrueFalse (Table 718) | | Version | 3.0 | | | |
|---|---|---|---|---|---|---|---|
| Description | This table holds the correct answers to true / false questions. It is tied to the QuestionHeader table which stores the actual questions. | | | | | | |
| | | | | | | | |
| Index Name | | Index Type | Clustere | Special | | | Index Fields |
| INDEX_TF_1 | | Index | N | | | | SectionPkID |
| INDEX_TF_2 | | Index | N | | | | SectionPkID QuestionID |
| | | | | | | | |
| Field Name | Field Type | Field Size | Default | Special | Version | Description | |
| FalseExplanation | Memo | | | | 3.0 | Explanation if false is selected on a true / false question. | |
| QuestionID | Integer | 4 | | | 3.0 | ID of the TrueFalse Question | |
| SectionPkID | Integer | 4 | | | 3.0 | ID of the Section the Question is in. | |
| TrueExplanation | Memo | | | | 3.0 | Explanation if true is selected on a true / false question. | |

| Table Name | UnitData (Table 684) | | | Version | 3.0 | | |
|---|---|---|---|---|---|---|---|
| Description | This table is used to link courses, units, threads, gradebooks, exams, and learning tools. | | | | | | |

| Index Name | Index Type | Cluster | Special | | | | Index Fields |
|---|---|---|---|---|---|---|---|
| FK_UnitData_LOHeaders | Foreign Key | N | CourseRSOHeaders | | | | HeaderID |
| INDEX_UNITDATA_1 | Index | N | | | | | CourseID |
| PK_UnitData | Primary | Y | | | | | CourseID UnitNumber DataOrder |

| Field Name | Field Type | Field Size | Default | Special | Version | Description |
|---|---|---|---|---|---|---|
| COID | Integer | 4 | | | 3.0 | Links to courses.coid. Course Object ID. |
| CourseID | Integer | 4 | | | 3.0 | Links to Courses.CourseID |
| DataOrder | Integer | 4 | | | 3.0 | Sort order within the unit |
| HeaderID | Integer | 4 | | | 3.0 | Links to CourseRSOHeaders |
| IsComplete | Bit | 1 | 0 | | 3.0 | |
| ItemText | Memo | | | | 3.0 | HTML text for course object |
| LinkText | Text | 250 | | | 3.0 | Text for course object link. |
| RSOID | Integer | 4 | | | 3.0 | Links to threads.topicgroupid, exams.exampkid |
| UnitNumber | Integer | 4 | | | 3.0 | Links to units.unitnumber |
| WasMigrated | Byte | 1 | 0 | | 3.0 | Used to identify imgrated data from the previous release |

| Table Name | Units (Table 682) | | Version | 3.0 | | |
|---|---|---|---|---|---|---|
| Description | This table provides information about the different units that a course is broken into. | | | | | |

| Index Name | Index Type | Clustere | Special | | Index Fields | |
|---|---|---|---|---|---|---|
| IX_Units | Index | Y | Unique | | CourseID UnitNumber | |
| PK_Units | Primary | N | | | CourseID UnitNumber | |

| Field Name | Field Type | Field Size | Default | Special | Version | Description |
|---|---|---|---|---|---|---|
| CourseID | Integer | 4 | | | 3.0 | Links to Courses.CourseID |
| EndViewDate | Date/Time | 8 | | | 3.0 | last day to view this unit |
| IntroText | Memo | | | | 3.0 | Introductory text for a unit |
| RestrictEVD | Bit | 1 | 0 | | 3.0 | Restrict end view date. Disallow student access to units after this date. |
| RestrictSVD | Bit | 1 | 0 | | 3.0 | Restrict start view date. |
| StartViewDate | Date/Time | 8 | | | 3.0 | First date to view this unit |
| UnitNumber | Integer | 4 | | | 3.0 | Unitnumber & courseId is the primary key for this table. |
| UnitTitle | Text | 200 | | | 3.0 | Title of the unit |

| Table Name | UserContracts (Table 652) | | Version | 3.0 | | |
|---|---|---|---|---|---|---|
| Description | This table contains student or professor contract acknowledgement for each semester for each Educational Partner that requires contracts. The contract that the user is acknowledging is stored in the Contracts table. | | | | | |

| Index Name | Index Type | Clustere | Special | | Index Fields | |
|---|---|---|---|---|---|---|
| PK_TableUserContracts | Primary | N | | | UserID ContractID | |

| Field Name | Field Type | Field Size | Default | Special | Version | Description |
|---|---|---|---|---|---|---|
| ContractID | Integer | 4 | | | 3.0 | ContractID to join to the Contracts table. A record in this table identifies that the particular user has read and agreed to the particular contract. Not a 4.0 table. |
| UserID | Integer | 4 | | | 3.0 | UserID joins to the Users table. |

| Table Name | UserInquiry (Table 538) | | Version | 3.0 | |
|---|---|---|---|---|---|
| Description | This table stores information that was obtained through user inquiries. | | | | |

| Index Name | Index Type | Clustere | Special | Index Fields | |
|---|---|---|---|---|---|
| PK_1_20 | Primary | Y | | UserInquiryID | |

| Field Name | Field Type | Field Size | Default | Special | Version | Description |
|---|---|---|---|---|---|---|
| AddToMailList | Bit | 1 | | | 3.0 | Should this user be added to the mailing list? |
| Age | Integer | 4 | | | 3.0 | Age of the inquirier. |
| AgeRange | Text | 255 | | | 3.0 | Age range that the inquirier is in. |
| AreaOfInterest | Text | 255 | | | 3.0 | Areas that the inquirier is interested in |
| CareerChange | Text | 255 | | | 3.0 | Is the inquirier interested in a career change and why. |
| City | Text | 255 | | | 3.0 | City that the inquirier is located in. |
| ClientNodeID | Integer | 4 | | | 3.0 | Foreign key to the ClientNode table. |
| Comments | Memo | | | | 3.0 | Any comments that the inquirier may what to make. |
| CompanyName | Text | 255 | | | 3.0 | Name of the company that the inquirier currently work for. |
| Country | Text | 255 | | | 3.0 | Country where the inquirier currently lives. |
| CourseInterest | Memo | | | | 3.0 | Any courses that the inquirier is interested in. |
| DegreeInterest | Text | 255 | | | 3.0 | Any degrees that the inquirier is interested in. |
| Department | Text | 255 | | | 3.0 | Department of the university that the student is currently enrolled in. |
| Distance | Text | 255 | | | 3.0 | |
| DistanceWhere | Text | 255 | | | 3.0 | |
| EmailName | Text | 255 | | | 3.0 | Email name of the inquirier |
| FaxNumber | Text | 255 | | | 3.0 | Fax number of the inquirier |
| FirstName | Text | 255 | | | 3.0 | First name of the inquirier |

| Gender | Text | 255 | | 3.0 | Sex of the inquirer |
|---|---|---|---|---|---|
| HeardAboutUs | Text | 255 | | 3.0 | How the inquirer heard about eCollege.com. |
| HeardAboutUsOther | Text | 255 | | 3.0 | How the inquirer heard about eCollege.com. |
| HomeTelephoneNumber | Text | 255 | | 3.0 | Home telephone number of the inquirer |
| Institution | Text | 255 | | 3.0 | College that the inquirer currently attends. |
| InternationalBusiness | Text | 255 | | 3.0 | |
| InternationalBusinessLength | Text | 255 | | 3.0 | |
| ISP | Text | 255 | | 3.0 | The internet provider that the inquirer currently uses. |
| ISPConnectionSpeed | Text | 255 | | 3.0 | The connect speed that the inquirer has available. |
| LastName | Text | 255 | | 3.0 | Last name of the inquirer |
| MiddleName | Text | 255 | | 3.0 | Middle name of the inquirer |
| Occupation | Text | 255 | | 3.0 | Occupation of the inquirer |
| OfficeTelephoneNumber | Text | 255 | | 3.0 | Office phone number of the inquirer |
| Online | Text | 255 | | 3.0 | |
| OnlineWhere | Text | 255 | | 3.0 | |
| OperatingSystem | Text | 255 | | 3.0 | Operating system that the inquirer uses. |
| PostalCode | Text | 255 | | 3.0 | Postal code (ZIP) of the inquirer |
| StateOrProvince | Text | 255 | | 3.0 | State or Province that the inquirer lives in. |
| Street1 | Text | 255 | | 3.0 | Street mailing address of the inquirer |
| Street2 | Text | 255 | | 3.0 | Street mailing address of the inquirer |
| Suggestions | Memo | | | 3.0 | Any suggestions that the inquirer wishes to make. |
| Title | Text | 255 | | 3.0 | Job title of the inquirer |
| USCitizen | Text | 255 | | 3.0 | Is the inquirer a US Citizen |
| UserInquiryID | Integer | 4 | Identity(1,1) | 3.0 | Unique ID assigned to this record by the system. |

| Table Name | UserLookup (Table 518) | | Version | 3.0 | | | |
|---|---|---|---|---|---|---|---|
| Description | This table contains combo box pull down values for questions that are asked to users. It ties to the UserProperties table. | | | | | | |
| | | | | | | | |
| Index Name | | Index Type | Clustere | Special | | Index Fields | |
| IX_UserLookup | | Index | Y | | | PropertyID | |
| PK_UserLookup | | Primary | N | | | LookUpID | |
| | | | | | | | |
| Field Name | | Field Type | Field Size | Default | Special | Version | Description |
| LookUpID | | Integer | 4 | | Identity(1,1) | 3.0 | A unique ID assigned by the system. |
| PropertyID | | Integer | 4 | | | 3.0 | A link to the UsersProperties table to get the pulldowns for a specific Educational Partner. |
| Value | | Text | 255 | | | 3.0 | The values that are displayed to the users. |

| Table Name | UserPlans (Table 600) | | Version | 3.0 | | | |
|---|---|---|---|---|---|---|---|
| Description | This table links the User table with the PaymentPlans table. | | | | | | |
| | | | | | | | |
| Index Name | | Index Type | Clustere | Special | | Index Fields | |
| PK_UserPlans | | Index | N | | | UserID PPlanID | |
| | | | | | | | |
| Field Name | | Field Type | Field Size | Default | Special | Version | Description |
| PPlanID | | Integer | 4 | | | 3.0 | points to paymentplans table |
| UserID | | Integer | 4 | | | 3.0 | points to users |

| Table Name | UserProperties (Table 520) | | Version | 3.0 | | |
|---|---|---|---|---|---|---|
| Description | This table contains description information about questions that are asked users. The questions that are asked are determined by entries in the ClientUserProperties table. The answers to the questions are stored in the UserPropsBin or UserPropsVar tables depending on where the responses can contain large or small amounts of data. | | | | | |

| Index Name | Index Type | Clustered | Special | Index Fields |
|---|---|---|---|---|
| IX_UserProperties_PropertyName | Index | N | Unique | PropertyName |
| IX_UserProperties_SortOrder | Index | Y | | SortOrder |
| PK_UserProperties | Primary | N | | PropertyID |

| Field Name | Field Type | Field Size | Default | Special | Version | Description |
|---|---|---|---|---|---|---|
| DataType | Text | 4 | | | 3.0 | Data type of this property. Valid values: CHAR, INT, BOOL, TEXT |
| DefaultValue | Text | 255 | | | 3.0 | Default value of the property, if the property has one. |
| DisplayName | Text | 100 | | | 3.0 | what the user sees |
| HasLookup | Bit | 1 | 0 | | 3.0 | does this propery have lookup values |
| IsBinary | Bit | 1 | 0 | | 3.0 | do values assigned to this property link to UserPropsBin or UserPropsVar |
| PropertyID | Integer | 4 | | Identity(1,1) | 3.0 | Unique identifier |
| PropertyName | Text | 50 | | | 3.0 | only here for integration with MCIS |
| SortOrder | Integer | 4 | | | 3.0 | Ordering index used for ORDER BY statements. |

| Table Name | UserPropsBin (Table 522) | | | Version | 3.0 | | |
|---|---|---|---|---|---|---|---|
| Description | This table contains responses to user questions where the length of the response may exceed 255 characters. | | | | | | |
| | | | | | | | |
| Index Name | Index Type | Clustere | | Special | | Index Fields | |
| PK_UserPropsBin | Primary | Y | | | | UserID PropertyID | |
| | | | | | | | |
| Field Name | Field Type | Field Size | Default | Special | Version | Description | |
| PropertyID | Integer | 4 | | | 3.0 | links to userproperties.propertyid | |
| UserID | Integer | 4 | | | 3.0 | links to users.userid | |
| Value | Memo | | | | 3.0 | long text value | |

| Table Name | UserPropsVar (Table 524) | | | Version | 3.0 | | |
|---|---|---|---|---|---|---|---|
| Description | This table contains responses to user questions where the length of the response may not exceed 255 characters. | | | | | | |
| | | | | | | | |
| Index Name | Index Type | Clustere | | Special | | Index Fields | |
| PK_Users | Primary | Y | | | | UserID PropertyID | |
| | | | | | | | |
| Field Name | Field Type | Field Size | Default | Special | Version | Description | |
| PropertyID | Integer | 4 | | | 3.0 | links to userproperties.propertyid | |
| UserID | Integer | 4 | | | 3.0 | links to users.userid | |
| Value | Text | 255 | | | 3.0 | short text value or numerical value | |

| Table Name | Users (Table 540) | | | | Version | 3.0 | |
| --- | --- | --- | --- | --- | --- | --- | --- |
| Description | This table stores information about users of the system. Users may be students, teaching assistants, administrators, or professors. | | | | | | |

| Index Name | Index Type | Clustere | Special | | | | Index Fields |
| --- | --- | --- | --- | --- | --- | --- | --- |
| IX_Users_Client_Last_First | Index | N | | | | | LastName FirstName |
| IX_Users_Client_LastName | Index | N | | | | | ClientID LastName |
| IX_Users_cn | Index | N | | | | | cn |
| IX_Users_Mail | Index | N | | | | | mail |
| IX_Users_SSN | Index | N | | | | | SSN |
| PK2_Users | Primary | Y | | | | | UserID |

| Field Name | Field Type | Field Size | Default | Special | Version | Description |
| --- | --- | --- | --- | --- | --- | --- |
| ClientID | Integer | 4 | | | 3.0 | Foreign key to the ClientLevels table. |
| cn | Text | 255 | | | 3.0 | container name. Legacy from MCIS. Should be called login name. |
| CreateDate | Date/Time | 8 | Current Date | | 3.0 | date the user was created |
| FirstName | Text | 40 | | | 3.0 | users first name |
| HasImage | Bit | 1 | 0 | | 3.0 | does this user have an image stored for display. |
| LastName | Text | 40 | | | 3.0 | users last name |
| mail | Text | 50 | | | 3.0 | email address |
| ModifyDate | Date/Time | 8 | Current Date | | 3.0 | date last modified |
| SSN | Text | 20 | | | 3.0 | social security number |
| UserID | Integer | 4 | | | 3.0 | Unique identifier that is assigned by the system. |
| userPassword | Text | 50 | | | 3.0 | password that corresponds to the login name |

Table Name UsersAndSurveyResponses (Table 570) Version 3.0

Description This table is used to store responses to course surveys.

| Index Name | Index Type | Clustere | Special | Version | Index Fields Description |
|---|---|---|---|---|---|
| No Indexes | | | | | |

| Field Name | Field Type | Field Size | Default | Special | Version | Description |
|---|---|---|---|---|---|---|
| AnswerText | Memo | | | | 3.0 | Used to capture the respondents full text answer to a survey / evaluation question. |
| CourseID | Integer | 4 | | | 3.0 | ID of the Course the User took the survey in. |
| OrderNumber | Integer | 4 | | | 3.0 | Order in which the Question appeared in the Survey. |
| QuestionID | Integer | 4 | | | 3.0 | ID of the Question.Links to QuestionID in EvalQuestionHeader table. |
| SurveyID | Integer | 4 | | | 3.0 | ID of the Survey the Question is in. |
| UserID | Integer | 4 | | | 3.0 | ID of the User Who took the Survey. |

Table Name UsersAndSurveys (Table 566) Version 3.0

Description This table stores date time information concerning when a specific student filled out a course survey.

| Index Name | Index Type | Clustere | Special | Version | Index Fields Description |
|---|---|---|---|---|---|
| No Indexes | | | | | |

| Field Name | Field Type | Field Size | Default | Special | Version | Description |
|---|---|---|---|---|---|---|
| CourseId | Integer | 4 | | | 3.0 | ID of the Course the User took the survey in. |
| EndDate | Date/Time | 8 | Current Date | | 3.0 | Time When Student Completed the Survey. |
| IsComplete | Integer | 4 | | | 3.0 | A Flag that tells if the student survey is complete. |
| StartDate | Date/Time | 8 | Current Date | | 3.0 | Time When Student Started the Survey. |
| SurveyID | Integer | 4 | | | 3.0 | ID of the Survey. |
| UserID | Integer | 4 | | | 3.0 | ID of the User Who took the Survey. |

| Table Name | UsersMessages (Table 542) | | | Version | 3.0 | | |
|---|---|---|---|---|---|---|---|
| Description | This table is used to link a message to a user or a course. | | | | | | |

| Index Name | Index Type | Clustered | Special | | | Index Fields | |
|---|---|---|---|---|---|---|---|
| PK_UsersMessages_1_18 | Primary | Y | | | | RUID MessageID | |

| Field Name | Field Type | Field Size | Default | Special | Version | Description |
|---|---|---|---|---|---|---|
| HasRead | Bit | 1 | 0 | | 3.0 | has the user read this message. |
| IsBlock | Bit | 1 | 0 | | 3.0 | block the user from their courses? Used only for university messages. |
| IsEmail | Bit | 1 | 0 | | 3.0 | was this message sent as an email also. |
| MessageID | Integer | 4 | | | 3.0 | links to messages.messageid |
| RUID | Integer | 4 | | | 3.0 | links to either users.userid or courses.courseid depending on the message type. |

| Table Name | UserTemp | | | Version | 4.0 | | |
|---|---|---|---|---|---|---|---|
| Description | This is a tempory system table created for each student as they use the system. | | | | | | |

| Index Name | Index Type | Clustere | Special | | | Index Fields | |
|---|---|---|---|---|---|---|---|
| PK_UserTemp | Primary | N | | | | CourseEntryID | |

| Field Name | Field Type | Field Size | Default | Special | Version | Description |
|---|---|---|---|---|---|---|
| CourseEntryID | Text | 50 | | | 4.0 | This generated code for user to register into the system. It looks something like 'crs-art101-DFDSS' |
| CourseID | Integer | 4 | | | 4.0 | Course which this user will enroll when registered |
| CreateDate | Date/Time | 8 | Current Date | | 4.0 | Date and time which record was created |
| FirstName | Text | 40 | | | 4.0 | Firstname of the user |
| IsCreated | Bit | 1 | 0 | | 4.0 | This flag will be 1 when Users record is created. This is to prevent this is from being used again. |
| LastName | Text | 40 | | | 4.0 | Lastname of the user |
| Mail | Text | 50 | | | 4.0 | Email address of the user |
| ModifyDate | Date/Time | 8 | Current Date | | 4.0 | Date and time which record was modified |
| RoleID | Integer | 4 | | | 4.0 | Role of the user being added to the system |

| Table Name | UserTracking (Table 668) | | Version | 3.0 | |
|---|---|---|---|---|---|
| Description | This table is used to gather statistical information about student uses of the system. | | | | |

| Index Name | Index Type | Clustere | Special | Index Fields |
|---|---|---|---|---|
| FK_UserTracking_TrackingCats | Foreign Key | N | TrackingCat | TrackingID |
| PK_UserTracking | Primary | Y | | UserID CourseID UnitNumber ClientID TrackingID |

| Field Name | Field Type | Field Size | Default | Special | Version | Description |
|---|---|---|---|---|---|---|
| ClientID | Integer | 4 | 0 | | 3.0 | Foreign key to the ClientNode table. |
| CourseID | Integer | 4 | 0 | | 3.0 | Course in which user is being tracked, 0 for activity related to PSH |
| LastTime | Date/Time | 8 | Current Date | | 3.0 | Last time an entry was made for this course & tracking category |
| Status | Bit | 1 | 0 | | 3.0 | Indicates if TimeSpent has been calculated or not |
| TimeSpent | Integer | 4 | 0 | | 3.0 | TimeSpent in this course, category and Unit (when applicable), measured in minutes |
| TrackingID | Small Integer | 2 | | | 3.0 | Points to tracking cats |
| UnitNumber | Small Integer | 2 | 0 | | 3.0 | Unit where activity tool place, 0 if on CHP or PSH |
| UserID | Integer | 4 | | | 3.0 | user being tracked |

| Table Name | WeblioCat (Table 686) | | | Version | 3.0 | | |
|---|---|---|---|---|---|---|---|
| Description | This table links a WEB bibliographies with a specific course. | | | | | | |
| Index Name | | Index Type | Clustere | Special | | | Index Fields |
| IX_Webliocat | | Index | Y | Allow_Dup_Row | | | CourseID |
| PK_WeblioCat | | Primary | N | | | | CategoryID CategoryTitle |
| Field Name | | Field Type | Field Size | Default | Special | Version | Description |
| CategoryID | | Integer | 4 | | Identity(1,1) | 3.0 | Unique identifier |
| CategoryTitle | | Text | 100 | Category 1 | | 3.0 | Webliography Category Title. When a user adds a webliography entry they must select a category to put it under. |
| CourseID | | Integer | 4 | | | 3.0 | Links to Courses.CourseID |

| Table Name | Webliography (Table 688) | | | | | |
|---|---|---|---|---|---|---|
| Description | This table is used to establish links to WEB bibliographies | | Version | 3.0 | | |

| Index Name | Index Type | Clustered | Special | | | |
|---|---|---|---|---|---|---|
| IX_Webliography_CourseID | Index | Y | Ignore_Dup_Row | | | |
| PK_Weblog | Primary | N | | | | |

| Field Name | Field Type | Field Size | Default | Special | Version | Index Fields | Description |
|---|---|---|---|---|---|---|---|
| CategoryID | Integer | 4 | | | 3.0 | CourseID | links to webliocat.categoryid |
| CourseID | Integer | 4 | | | 3.0 | WeblioID | Links to Courses.CourseID |
| Description | Memo | | | | 3.0 | | text for weblio |
| FName | Text | 50 | | | 3.0 | | submitter's first name |
| LName | Text | 200 | | | 3.0 | | submitter's last name |
| SiteAuthor | Text | 150 | | | 3.0 | | |
| SiteModDate | Date/Time | 8 | | | 3.0 | | |
| Title | Text | 100 | | | 3.0 | | |
| URL | Text | 255 | | | 3.0 | | |
| UserID | Integer | 4 | | | 3.0 | | submitter's userid |
| WeblioID | Integer | 4 | | Identity(1,1) | 3.0 | | Unique identifier |

APPENDIX B: Administrative Pages Guide

Administrative Pages
12/16/98 4:27:03 PM Mountain Time

HOMEPAGES: ClaremontCols / Mike Mentes / Administrative Pages

User Maintenance
    User Enrollment
    User Status
    Create User
    Enroll User in Another Enrollable Area Administrative Message Center
    Send a message to a group of users
    Remove a Course Block Reports
    User reports
    Course reports
    University reports

Uniform Header
A uniform header may be on all administrative pages that includes:
- the title 'Administrative Pages'
- a time & date
- The institution's logo

Navigation Links
The administrative general navigation links appear below the header as seen in the screen above. At this level, these links include:
- University Homepage Link
- Personal Homepage Link
- Administrative Pages link
    Note: The Administrative Pages link brings the user back to the screen shown above.

These three links remain in place throughout the remaining administrative function pages. Additional links may be added as the user moves deeper into the pages.

Specific function features

The following sections define step-by-step instructions to use the Administrative functions.

User Enrollment

*Navigation:*
The navigation for the series of User Enrollment pages includes the standard header and general navigation links, as well as an additional 'User Enrollment' link in the homepage links section. This link brings the user back to this page throughout the remainder of the User Enrollment process. See below:

Administrative Pages
12/16/98 10:41:29 AM Mountain Time

HOMEPAGES: ClaremontCols / FirstName LastName / Administrative Pages / User Search / User Select / Semester Selection / User Enrollment

User Enrollment

The following defines the steps for User Enrollment and the user help text for each page:

User Enrollment:

Page 1
    Step 1: Search for a user
    Search for a User

Page 2
    Step 2: Select the user from the list
    Select from a list of Users and click "Enroll this User in Courses"

Page 3
    Step 3: Select a semester
    Select a semester

Page 4:
    Step 4: Select from available courses
    Select a course (or multiple courses) from a list of all of the courses that are available to the given user for the semester chosen. Use the 'Ctrl' key to select more than one course.

Step 5: Select the user's status in the course(s)
    Select the user's status in the course(s)

Step 6 (Optional): Enter an enrollment comment
    Enter a comment

Step 7 (Optional): Send an email message to the user
    Option to send an email message to the user to notify of the change Page 5:
    Receive the following "success" message:

The selected user was enrolled successfully in the selected course.
Enroll Another User Clicking on 'Enroll Another User' brings the administrator back to the User Search page for User Enrollment.

User Status

*Navigation:*
The navigation for the series of User Status pages includes the standard header and general navigation links, as well as an additional 'User Status' link in the homepage links section. This link brings the user back to this page throughout the remainder of the User Status process. See below:

The following defines the steps for User Status and the user help text for each page:

Administrative Pages
12/16/98 10:58:06 AM Mountain Time

HOMEPAGES: ClaremontCols / FirstName LastName / Administrative Pages / User Search / User Select / User Status

Enrollment Information for User's Name

User Status

Page 1
    Step 1: Search for a user
    Search for a User

Page 2
    Step 2: Select the user from the list
    Select from a list of Users and click "Set New Status"

Page 3
    Step 3: Change overall enrollment status if necessary
    Ability to change status in status selection box. The user's name appears right below the links in the text "Enrollment Information for (user's name)"

Step 4: Change course status if necessary
    Ability to change status in status selection box/boxes (one for each enrolled course.

Step 5 (Optional): Send a message to the user
    Uses the same email message box

Create Student /Create User

*Navigation:*
The navigation for the series of Create User pages includes the standard header and general navigation links, as well as an additional 'Create User' link in the homepage links section. This link brings the user back to this page throughout the remainder of the Create User process. See below:

Administrative Pages
12/4/98 9:27:54 AM Mountain Time pomona college

Create a User

HOMEPAGES: Claremont Colleges / FirstName LastName / Administrative Pages / Create a User Please fill in all required fields* and any optional fields for the new user.

| Login ID* | |
| Password* | |
| First Name* | |
| Last Name* | |
| EMail Address* | |
| Status* | |
| Social Security | |

The following defines the steps for Create a User and the user help text for each page:

Create a User

Page 1
    Please fill in all required fields* and any optional fields for the new user.

All fields in this form are configurable, except for login id, password, first name, last name, and email address. Social security number is now optional as a required field. There are also two drop down menus for enrollable nodes and role types.

Page 2
    Receive the following "success" message:

"User created successfully"
Create Another User

Clicking on 'Create Another User' brings the administrator back to the 'Create User' page.

Enroll User in Another Level/Enrollable Area

*Navigation:*
The navigation for the series of Enroll User in Another Enrollable Area pages includes the standard header and general navigation links, as well as an additional 'Enroll User in Another Enrollable Area' link in the homepage links section. This link brings the user back to this page throughout the remainder of the Enroll User in Another Enrollable Area process. See below:

Administrative Pages
12/16/98 11:18:27 AM Mountain Time 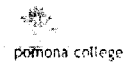 pomona college HOMEPAGES: ClaremontCols / FirstName LastName / Administrative Pages / User Search / User Select / Enroll a User in Another Level

Enroll a User in Another Enrollable Area

The following defines the steps for Enrolling a User in Another Enrollable Area and the user help text for each page:

Enroll User in Another Enrollable Area

Page 1
    Step 1: Search for a user
    Search for a User

Page 2
    Step 2: Select the user from the list
    Select from a list of Users Page 3
    The text has been added at the top of the page to say "User's FirstName & LastName is currently enrolled in the following area(s):

A list of current enrollment areas is shown.

Step 3: Select the new enrollable area(s)
    Select one or more new enrollable areas for the user from areas listed in the selection box. Use the 'Ctrl' key to select more than one area.

Step 4: Select the user's role in the new area(s)
    Select from a drop down box of roles Step 5 (Optional): Move (user's first name & last name) into the selected node(s) only
Check a box if the user should be removed from the currently enrolled area(s).

Step 6 (Optional): Enter an enrollment comment
Option to write an enrollment comment Step 7 (Optional): Send an email message to the user
Option to send an email message to the user Page 4
Receive the following "success" message:
(User's first name & last name) has been successfully enrolled in the new area(s).
Enroll Another User in New Area(s)

Clicking on 'Enroll Another User in New Area(s)' brings the administrator back to the 'Search for a User' page

Send a message to a Group of Users

*Navigation:*
The navigation for the series of Send a message to a Group of Users pages includes the standard header and general navigation links, as well as a 'Send a message to a Group of Users' link in the homepage links section. This link brings the user back to this page throughout the remainder of the Send a message to a Group of Users process. See Administrative Pages
12/16/98 11:32:25 AM Mountain Time 

HOMEPAGES: ClaremontCols / FirstName LastName / Administrative Pages / Enrollable Area Selection / Semester Selection / User Selection / Administrative Message Center Administrative Message Center below:

The following defines the steps for Sending a Message to a Group of Users and the user help text for each page:

Send a Message to a Group of Users

Page 1
Step 1: Select the enrollable area(s) from which to select users
Choose an enrollable area(s) from a selection box. Use the 'Ctrl' key to select more than one area.

Page 2
Step 2: Select a semester(s)
Choose a semester from a multiple selection box.

Page 3
    Step 3: Choose the selection criteria for users
    The same interface is still used for 'Role Types', 'Payment Plans', or 'User Attributes' except the standard navigation and header items have been added.

Page 4
    Step 4: Review user selection list and compose message
    The same interface is still used for this page, except the standard navigation and header items have been added.
    ** Note: An administrator can also block a user from a course in this page.

Page 5
Receive the following "success" message:
The message has been sent.
Send another message Clicking on 'Enroll Another User in New Area(s)' brings the administrator back to the 'Select an Enrollable Area(s)' page

Remove a Course Block

*Navigation:*
The navigation for the series of Remove a Course Block pages includes the standard header and general navigation links, as well as a 'Send a message to a Group of Users' link in the homepage links section. This link brings the user back to this page throughout the remainder of the Remove a Course Block process. See below:

\* Send Message With Unblocking?

Message Header

The following defines the steps for Removing a Course Block and the user help text for each page:

Remove a Course Block

Page 1
    Step 1: Select the enrollable area(s) from which to select users
    Choose an enrollable area(s) from a multiple selection box. Use the 'Ctrl' key to select more than one area.

Page 2
    Step 2: Select a semester(s)
    Choose a semester(s) from a multiple selection box. Use the 'Ctrl' key to select more than one semester.

Page 3
    Step 3: Choose the selection criteria for users
    Uses the same interface as "Sending a Message to a Group of Users" for 'Role Types', 'Payment Plans', or 'User Attributes'

Page 4

Step 4: Review selection list of users
The checkbox on the left hand side, indicating that an email will be sent, is automatically selected for each user. Administrators have to uncheck the box if they do not want the email sent.

Click on the button 'Remove Block' to remove the course block for the users selected.

Step 5: Compose and send message to selected users
A message is sent to the user to inform them that they have been unblocked from their course.

Page 5
Receive the following "success" message:
The message has been sent and the users can now enter their courses
Remove Another Course Block

User Reports

*Navigation:*
The navigation for the series of User Reports pages includes the standard header and general navigation links, as well as a User Reports link in the homepage links section. This link brings the user back to this page throughout the remainder of the User Reports process.

The administrator can click through the available reports, which display on the page below the links. See below:

The following outlines the steps for using User Reports:

User Reports:

Page 1
    Step 1: Search for a user
    Search for a User

Page 2
    Step 2: Select the user from the list
    Select from a list of Users Page 3
    Step 3: Select Report
    This page contains the list of report links specific to the chosen user. The user's name also is listed at the top of the page. There is not a default report listed.
    The user must select the appropriate report each time. Clicking on a report link loads the relevant information at the bottom of the page.

Course Reports

*Navigation:*
The navigation for the series of Course Reports pages includes the standard header and general navigation links, as well as a Course Reports link in the homepage links section.

This link brings the user back to this page throughout the remainder of the Course Reports process.

University Reports

*Navigation:*

Administrative Pages
12/4/98 9:27:54 AM Mountain Time 

University Reports
HOMEPAGES: Claremont Colleges / FirstName LastName / Administrative Pages / University Reports Select a Report Course Count per Enrollable Area | User Count per Enrollable Area The navigation for the series of University Reports pages includes the standard header and general navigation links, as well as a University Reports link in the homepage links section. This link brings the user back to this page throughout the remainder of the University Reports process.

APPENDIX C: Course Manager Guide

| | |
|---|---|
| What is Course Manager? | 3 |
| How Does it Work? | 4 |
| HTML | 5 |
| | |
| General Course Information | |
| Course Setup Information | 6 |
| Course Syllabus Information | 7 |
| | |
| What is a Learning Tool? | 8 |
| Setting Up Your Course | 9 |
| | |
| Learning Tools | |
| Text/HTML | 11 |
| Multimedia | 13 |
| Threaded Discussion | 14 |
| Assessment Tool | 15 |
| | |
| Other Features | |
| Reordering Learning Tools | 16 |
| File Upload/Download | 17 |
| Adding a Link | 20 |
| | |
| Exam Manager | 23 |
| | |
| Appendix: HTML Quick Guide | 27 |
| Appendix: Setting Up Groups | 29 |

© 1998 Real Education
Course Manager Guide

What is Course Manager?

The Course Manager is a feature of the on-line educational system that allows on-line instructors the ability to create, edit and update courses. It is through the Course Manager and its interactive learning tools - Threaded Discussion, Document Sharing, on-line Assessment Tools, Webliography feature, streaming video, and a multitude of other features - that you will deliver your on-line course.

Most of the tools and features you will use in your on-line course already exist in the course structure or "shell." These features are designed to be used by users and instructors easily, with no programming knowledge. However, your course information and a few other learning tools are created through the Course Manager software (see chart below).

It is through the Course Manager that you will be able to add units/weeks to your course, create a course syllabus, add or edit course content, and create a Threaded Discussion or on-line quiz. Because the on-line educational system operates on a relational database, any changes made through the Course Manager appear instantly in your course and live to your on-line users.

| Tools Created by Course Manager | Tools Existing in Course Shell |
|---|---|
| • Course Material<br>• Threaded Discussion<br>• Quiz/Exams<br>• Readings/Assignments<br>• Audio/Video/Multimedia | • Webliography<br>• Message Center<br>• Chat Room<br>• Document Sharing<br>• E-mail Class<br>• Journal<br>• Notebook<br>• Gradebook |

Browser Requirements

The Course Manager is compatible on Macs or PCs with either Netscape (3.01 and higher) or Internet Explorer (3.02 and higher).

How does it work?

Two Frame Layout

When you enter the Course Manager, you will see the screen divided into two segments, or "frames." The right frame is a preview frame that allows you to preview the content added to a course without leaving the Course Manager. The left frame holds a directory "tree" which displays the content of the course. Clicking on the unit/week name will display the features of the unit.

© 1998 Real Education
Course Manager Guide

Top Menus

The Top Menu of links allows you to create or edit information. See the diagram below.

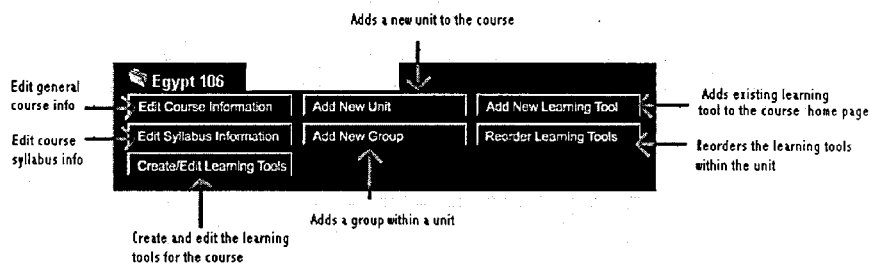

Refresh/Preview

When creating or editing course information, the right side preview frame does not reflect new information until you refresh or reload the page using the Preview function. Click the icon on the top menu icon "Preview" in order to see the changes that have been made.

Likewise you can refresh the left side content frame by clicking anywhere in the left frame. It is useful to preview and refresh often to see your work, this is especially important when moving or deleting objects.

What is HTML?

HTML stands for HyperText Markup Language. It is the programming language used to allow text, images and features to appear on a web page. In a course created through the on-line educational system, the programming used to create the course layout and functionality are already in place. All that you will need is some basic HTML to add formatting to your text. If you are making very minor edits to your course, it is possible that you will not need to know any HTML, but make sure not to delete any programming language from your course material. For more information about using HTML, please see the appendix of this document.

Course Setup Information

Most on-line instructors will not need to edit the information in the "Edit Course Information" window, but you may want to see what is available. To edit your course setup information, click on the top menu link "Edit Course Information"

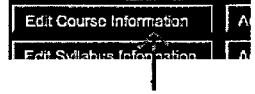

In the screen that appears in the right frame, you can:
- Change the title of the course
- Change the title of the Instructor (Instructor/Professor)
- Change the title of the TA (if applicable)
- Change the titles of the headers (Unit/Week/Module)
- Add a title and text field which appears above the Interactive Syllabus on the course homepage
- Add audio or video to the course homepage (this may done externally through audiovisual equipment and electronically entered into the system)
- Change the allowable upload files per user (this refers to the number of files a user can submit to the Document Sharing area and affects every user in the class)

Edit Course Information

| | |
|---|---|
| Course Code | Egypt 106 |
| Course Title | Pharoh |
| Instructor's Title | Professor & Team |
| TA's Title | Teaching Assistant |
| Unit Header Example: Unit/Week/Module | Week |
| Additional Text Title | |
| Additional Text  This Title and Text will appear above the Interactive Syllabus on the Course Homepage. | |
| Real Audio Title | |
| Real Audio URL | |
| Real Video Title | |
| Real Video URL | |
| Allowable Upload | 1 |

Course Syllabus Information

To add or edit course syllabus information, click on the top menu link "Edit Syllabus Information".

To add a new item to the syllabus, click on "Add New Syllabus Item". This will bring up another screen where you can add and name a syllabus item such as course overview, policies and procedures, grading policies, course description, required text, etc. You can also add content/text to that item in the "Syllabus Item Text" area of the screen, using HTML for any formatting. Click "Update" to save the information and close the window. Click "Cancel" to close the window and not save the new item.

To edit an already existing syllabus item, simply click on the item name, and edit the text in the screen that appears. Click "Update" to save the information and close the window. Click "Cancel" to close the window and not save any changes you made.

To rename the syllabus item, click on the item. Type in the new title for the syllabus item over the default title in "Syllabus Item Header". Click "Update" to save the information and close the window. Click "Cancel" to close the window and not save any changes you made.

To delete a syllabus item, click on the item and choose "Delete" at the bottom of the screen.

Edit Syllabus Item

Syllabus Item Header
Goals

Syllabus Item Text
I hope you learn a lot

What is a Learning Tool?

While you may associate the features and tools of your on-line course with different actions (providing information, assessing user performance, communicating), think of the course tools in terms of their functionality when using the Course Manager to build a course. In this context, you have the ability to use four types of learning tools in your on-line course.

1. Text/HTML
2. Multimedia
3. Threaded Discussion
4. Assessment Tools

You can have as many of these learning tools in the units of your course as necessary, and you can name these learning tools to fit your needs. Just remember that for each name or title you choose you must create a new learning tool to correspond to that name.

Viewing these learning tools by their functionality, Text/HTML tools are essentially empty fields in which you can add text, images, assignment descriptions, links to other pages, or other course information. This tool is commonly used for Unit Introductions, Readings, Assignments, Lecture Notes, Study Tips, Field Trips, Group Project Information, Glossary, etc.

Multimedia tools are much like Text/HTML tools, but hold audio, video or audio slide shows. This tool is commonly used for short audio or video segments, images, computer simulations, or slide show presentations.

The Assessment Tool feature is an interactive quiz or exam feature, allowing users to answer questions, submit their answers for grading, and review answers and feedback through the Gradebook feature. This feature is used not only as a quiz or exam, but also sometimes as a feedback survey or for drill and practice.

The Threaded Discussions are interactive, asynchronous communication tools with a variety of uses beyond classroom discussion. Threaded Discussions are frequently used for group collaboration areas, posting of assignments for peer review, and role-play simulations.

Please refer to your faculty training packet for further use of Learning Tools.

© 1998 Real Education
Course Manager Guide

Setting Up Your Course

To add material to your course, you must follow the these two steps:

1. Define the Course Learning Tools
2. Add Course Units/Weeks

Define Course Learning Tools

In order to add learning tools to any part of your course, you must first define the learning tools of the course. At any time you can return to this area and change the name of a learning tool or to add additional learning tools.

To define your Course Learning Tools, click on top menu link "Create/Edit Learning Tools". The following screen will appear.

Create/Edit Learning Tools

| Available Learning Tools | Selected & Named Learning Tools | On Syllabus | Delete |
|---|---|---|---|
| Text/HTML | Reading | ☑ | ☐ |
| Assessment Tool | Lecture | ☑ | ☐ |
| Multimedia | Text/HTML 1 | ☑ | ☐ |
| Threaded Discussion | Backi Bucchi | ☑ | ☐ |
| | Practice Test | ☑ | ☐ |
| To create a new learning tool for your course, click the tool type you would like to use above. | Threaded Discussion | ☑ | ☐ |

To rename a Learning Tool, click on the tool name above, edit the text, and click 'Update'.

You will see four available Learning Tools in the left column of the screen, and the right column contains those objects that are selected and named for use in your course. When developing a new course, the right column will typically be empty. The example above shows the Learning Tool Editor window for a developed course.

To create a new learning tool for a course, click on the tool type that you would like to use (Assessment Tool, Multimedia, Text/Html or Threaded Discussion) in the left column. A screen will appear displaying the message "Learning Tool Added successfully".

You can rename a learning tool after you have added it to the right column. Click on the learning tool name in the right column, and you are able to delete or type over the name.

Appear on Syllabus

The learning tools you add will automatically appear on the Interactive Syllabus on your course homepage. If you do not want a learning tool to appear on the Interactive Syllabus, click on the top menu link "Create/Edit Learning Tools" and unclick the check box in the right column "On Syllabus" for the item you do not want to appear. You will see the "x" under the "On Syllabus" column disappear. If you decide you do want a learning tool to appear on the Syllabus after all, simply click on the check box again, and the "x" will reappear.

Remember, you can add or edit these learning tools at any time, but you must have the appropriate learning tools created for the course before you can add them to individual units.

Adding Units

To add units to your course, click the link on the top menu link "Add new Unit". The screen below will appear in the right frame. Add the unit title, and if necessary, add or change the dates between which this unit will be available for users. The start date will determine when the user can enter that particular unit in your course.

Week 3 Edit Title/Dates

Week 3

Unit Start Date* 11 / 13 / 98

Unit End Date* 2 / 11 / 99

[Add] [Cancel]

* Dates must be in a mm/dd/yy format. For example, 12/25/98.

NOTE: The dates of your course units will normally default to the dates of the beginning and end of the term in which your course will run. Please check with your institution about editing these view dates as some dates are determined at the administrative level.

Once you have setup this framework for your course, the next steps involve adding Learning Tools, information and materials to the units of your course.

© 1998 Real Education
Course Manager Guide

Adding a Text/HTML Learning Tool

Adding the Learning Tool

To add a Text/HTML learning tool to a unit of your course, click on the chosen unit. Click the top menu link "Add New Learning Tool".

On the screen that appears, you will see all the learning tools of your course. Choose the appropriate Text/HTML learning tool. A screen will appear displaying the message "(Learning tool name) was successfully added to Unit (unit number)".

You can identify the Text/HTML learning tools because they will all have a similar icon, and each will have a different color to distinguish them on the Interactive Syllabus.

Remember, if you are adding a new learning tool, you must first add it to the course itself through the "Create/Edit Learning Tools" menu option.

If you open the unit again by clicking on the name or notebook icon next to it, you will see the added learning tool at the bottom of the list of learning tools. If you wish to change the order of the learning tools, please see the section on Reorder Learning Tools in this document.

Adding Content

To add content to the learning object, click on that particular learning tool in the left frame, and then click on the top menu link "Edit Learning Tool".

On the screen that appears (see below), you can add content to this box by typing in text, or pasting text you have copied from another application. Remember, you must use HTML to allow any formatting to appear in these text fields. When you are satisfied with the content, click "Update" and your changes will be saved. If you click "Cancel," your changes will not be saved.

Edit Lecture - Unit 1

Add content to this description box by typing in text or pasting text you have copied from another application. You must use HTML to allow for any formatting of text.

Click on 'Update' when completed.

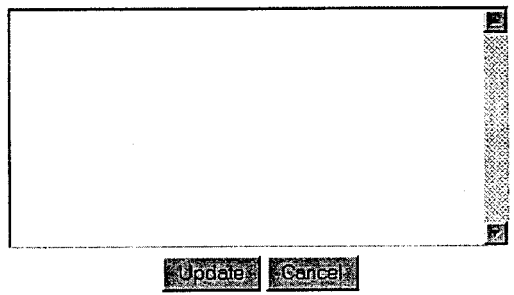

If you wish to add a link to this learning tool, please see the section on Adding Links in this document.

To see your work, click on the top menu icon "Preview". This will cause the right side of the screen to refresh and display the unit.

🔸 Adding a Multimedia Learning Tool

The on-line educational system may use a server designed to hold multimedia material, therefore, most of the time, multimedia (audio, video, audio/PowerPoint slide shows) that are added to your course will be inserted by this server. Occasionally however, you may want to edit the text associated with the Multimedia piece, or add in material yourself with the Multimedia icon. In the latter two instances, you can use the Course Manager. Multimedia files are stored on a special server designated for those file types, and are therefore not accessible through File Upload/Download.

Adding the Learning Tool

To add a Multimedia learning tool to a unit of your course, click on the chosen unit. Click the top menu link "Add New Learning Tool".

You will then see a screen that contains all the learning tools of your course. Choose the appropriate Multimedia learning tool and a screen will appear displaying the message "(Learning tool name) was successfully added to Unit (unit number)". You can identify the Multimedia learning tools because they will all have a similar icon, and each will have a different color to distinguish them on the Interactive Syllabus.

Remember, Multimedia Learning Tools are stored on a distinct server, and therefore cannot be added to your course through File Upload/Download.

Once you have selected the tool, it will appear in the appropriate unit at the bottom of the list of learning tools. If you wish to change the order of the learning tools, please see the section on Reorder Learning Tools in this document.

Adding Content

🗨 Adding a Threaded Discussion

Adding the Learning Tool

To add a Threaded Discussion learning tool to a unit of your course, click on the chosen unit. Click the top menu link "Add New Learning Tool".

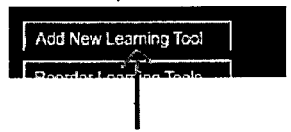

You will then see a screen that contains all the learning tools of your course. Choose the appropriate threaded discussion tool and a screen will appear displaying the message "(Learning tool name) was successfully added to Unit (unit number)". You can identify the Threaded Discussion learning tools because they will all have a similar icon. Remember, if you are adding a new learning tool, you must first add it to the course itself through the "Create/Edit Learning Tools" menu option.

If you would like to put some text on the course unit page, which would appear before a user enters the actual threaded discussion area, you can add or edit this information within the Course Manager. Click on the Threaded Discussion name and click the top menu link "Edit Learning Tool". You will then see a screen with a text box open, and you can add text to this box. This text and link will appear on the unit home page.

You can add text by simply typing in the text field, or pasting text you have copied from another application. Remember, you must use HTML to allow any formatting to appear in these text fields. If you want to add a link to this area as well, please see the section on Adding Links. When you are satisfied with the content, click "OK" and your changes will be saved. If you click "Cancel," your changes will not be saved.

To see your work, click on the "Preview" icon the top menu. This will cause the right side of the screen to refresh and display the unit.

Adding Content

To add content to a threaded discussion, you will have to take one more step. Only course instructors can add topics to a threaded discussion. Topics must be added before users can respond or make comments. To make the threaded discussion areas active, you will have to go into the threaded discussion area itself and add topics. To do this, click on the Threaded Discussion link (you can exit the Course Manager to do this but do not need to) and once you are inside the threaded discussion area, click on "Add A Topic" and fill in the appropriate fields. Please refer to other the ID 1020 course or additional information in your training packet about using and creating Threaded Discussions.

© 1998 Real Education
Course Manager Guide

Adding an Assessment Tool

Adding the Learning Tool

To add an Assessment learning tool to a unit of your course, click on the chosen unit. Click the top menu link "Add New Learning Tool". You will then see a screen that contains all the learning tools of your course. Choose the appropriate Assessment learning tool and a screen will appear displaying the message "(Learning tool name) was successfully added to Unit (unit number)". You can identify the Assessment learning tools because they will all have a similar icon. Remember, if you are adding a new learning tool, you must first add it to the course itself through the "Create/Edit Learning Tools" menu option.

Once you have selected the learning tool, it will appear in the appropriate unit at the bottom of the list of learning tools. If you wish to change the order of the learning tools, please see the section on Reordering Learning Tools in this document.

If you would like to put some text on the course unit page, which would appear before a user enters the assessment, you can add or edit this information within the Course Manager. Click on the Assessment name and click the top menu link "Edit Learning Tool". You will then see a screen with a text box open, and you can add text to this box. This text and link will appear on the unit home page.

You can add text by simply typing in the text field, or pasting text you have copied from another application. Remember, you must use HTML to allow any formatting to appear in these text fields. If you want to add a link to this area as well, please see the section on Adding Links.

When you are satisfied with the content, click "Update" and your changes will be saved. If you click "Cancel," your changes will not be saved. To see your work, click on the "Preview" icon the top menu. This will cause the right side of the screen to refresh and display the unit. This will cause the right side of the screen to refresh and display the unit.

Adding Content

To actually add in questions and content to your assessment tool, you need to use the Exam Manager. Please see the section on Exam Manager in this document for information about adding content to an assessment tool.

© 1998 Real Education
Course Manager Guide

Reordering Learning Tools

Once you have selected the learning tool, it will appear in the appropriate unit at the bottom of the list of learning tools. If you wish to change the order of the learning tools, simply click on the top menu "Reorder Learning Tools". The screen below will appear. Edit the numbers in the boxes to the right of the learning tools to the order you would like them to appear in the unit.

Reorder Course Learning Tools

| Learning Tool | Order |
|---|---|
| Theorem Confab | 1 |
| Assessment Tool 4 | 2 |
| Assignment | 3 |
| Lecture | 4 |
| Exams | 5 |

You can move learning tools within units, but cannot move items from one unit to another.

File Upload/Download

Because you do not want users to have to scroll through too much text on the unit pages of your course, we suggest placing large amounts of text on separate pages which are linked to your course by hyperlinks. Unlike Web sites that already exist on the Internet, these pages reside on the on-line educational system servers. These pages are accessible through File Upload/Download.

If you are simply editing an external page that already exists, you will need to download the page to a local site (your computer), make the necessary changes, and then upload the updated version back to the server. You will need some software that allows you to edit HTML pages to perform this task. (To find the name of the page you wish to edit, go to this page in your course and look at the end of the URL address. The wording beyond the last slash is the name of your file.) If you are adding a new link, you will need to upload the file to the correct folder in your course, and then make the link in the Learning Tool.

To enter File Upload/Download, click on the "File Upload/Download" link in the top left frame in the Course Manager. This will open up a new screen in the right frame.

| File Upload/Download |

Viewing External Pages

The middle of the right screen will contain a folder corresponding to each unit of your course. Within these folders, you can upload files, or you will already have files that are the links from each corresponding unit. Double click on a folder to view the files in that unit of your course. You may also have additional folders for organizational purposes, if you use a large number of external pages. To view any one of these pages, simply click once on the file and it will display.

Download File

Within the Course Manager, click on the "File Upload/Download" link in the top left frame. This will open up a new screen in the right frame. In the middle part of the right screen, double click on the folder for the corresponding unit in which the external page appears. You will then see a list of all the external pages corresponding to that unit. Right click on the file you wish to download, and select "Save Target As..."

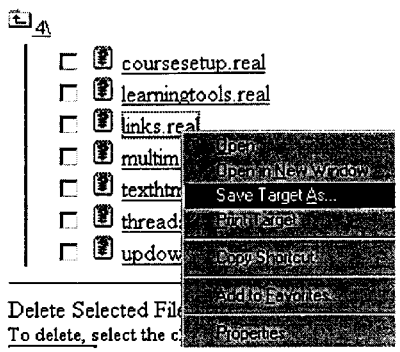

This will open up a box asking you where to save the file. Select the appropriate place (your desktop is always a good choice) and click OK. You can then edit the file as needed, remember to save the file, and upload it back to the server.

Upload File

To upload a file, first make sure that you have selected the correct unit folder from the top section of the page (see above for instructions). You must choose the folder before you upload a file. When you upload a file, it will be sent to that folder on the servers. In the Upload File area, click on Browse and find the correct file on your computer that you wish to upload. Double click on the file name, and the correct path will appear in the text box next to the Browse button. Click on the "Upload File" button and the file will be placed in the appropriate folder.

Delete File

To delete files, click on the box next to the file(s) you wish to delete. Then click on the "Delete" button under Delete Selected Files/Directories and the file will be taken off our server. Please make sure you are only deleting files that you have a copy of, or that you truly wish to delete.

© 1998 Real Education
Course Manager Guide

Create Directory

The Course Manager will automatically create a directory folder for each unit of your course. For organizational purposes, you can create additional directory folders for your course and within the unit directories of your course. To do this, select the unit folder in which you wish to add the new directory if necessary, otherwise the directory will be added to the course as a whole. Type in a name for this directory in the Create Directory area, and click on the "Create Directory" button.

Adding a Link

Through the Course Manager, you can add or edit the information on the course homepage and the unit pages of your course. If users click on anything within these two pages to access material elsewhere, these are considered links. Links from your course fall into three categories.

1. External Link (Internet pages that exist on a server)
2. Image (pictures or graphics on a unit page or on an external page)
3. URL Hyperlink (links that go to an Internet site outside the on-line educational system server)

A link is added to a Learning Tool within a unit. To create a link through the Course Manager, click on that particular learning tool in the left frame, and then click on the top menu link "Edit Learning Tool".

In the text box of the screen that appears (see below), you can type in HTML that add links (blue wording that is clicked on to access the external page) to this learning tool on the unit page.

Example of HTML in the Learning Tool's editing textbox:

```
<a href="fu/eg106-1078/a-v
guidelines1.doc
">Guidelines</a>
<P>
<img src="fu/eg106-1078/2/coke.gif">
<P>
<a href="http://www.yahoo.com">Go to
Yahoo</a>
```

Files available for reference.

- fu/eg106-1078/a-v guidelines1.doc
- fu/eg106-1078/2/coke.gif

Follow the steps below to add various links:

Adding an External Link
1. Make sure you have uploaded the file. (See Upload/Download section above)
2. You should see all available uploaded files under "Files Available for Reference" at the bottom of the screen.
3. To add the file to this learning tool, type the following in the text box:
   **<a href="[the path to the file and filename*]">[the link text to appear]</a>**

For example: *<a href="fu/eg106-1078/a-v guidelines1.doc ">Guidelines</a>*
   Would display on unit page:  <u>Guidelines</u>

4. Go to the next line and type <P> if you want to insert a paragraph separation (insert a line) after the link.

**\* Easy shortcut to get the file name:** Copy & paste the file you want to use from "Files Available for Reference" at the bottom of the page to the line of HTML in the text box. To do this, highlight the file name, press Ctrl & "C" ("Apple" and "C" for Macintosh), click where you want it to go in the HTML, and press Ctrl & "P" ("Apple" and "C" for Macintosh)

Adding an Image
1. Make sure you have uploaded the file. (See Upload/Download section above)
2. You should see all available uploaded files under "Files Available for Reference" at the bottom of the screen.
3. In the text box, type:
   <img src="[the name of the uploaded image]">

For example: *<img src="fu/eg106-1078/2/coke.gif">*

If you want an alt tag (a word to display when the mouse is dragged over the image), Add the following to the line of HTML:
alt = "[word to display]"

For example: *<img src="fu/ eg106-1078/2 /coke.gif" alt="coke" >*

4. Go to the next line and type <P> if you want to insert a paragraph separation (insert a line) after the image.

**\* Easy shortcut to get the file name:** Copy & paste the file you want to use from "Files Available for Reference" at the bottom of the page to the line of HTML in the text box. To do this, highlight the file name, press Ctrl & "C" ("Apple" and "C" for Macintosh), click where you want it to go in the HTML, and press Ctrl & "P" ("Apple" and "C" for Macintosh)

Adding a URL Hyperlink

1. In the text box, type:
   <a href="http://[the website location/address (URL)]">[the link text to appear]</a>

For example: <a href="http://www.yahoo.com">Go to Yahoo</a>
   Would display on unit page:  Go to Yahoo

* Easy shortcut to get the file name:  You can copy a URL from the address in your browser and paste it into the html text.

2. Go to the next line and type <P> if you want to insert a paragraph separation (insert a line) after the link.

The examples given above will create these three links below:

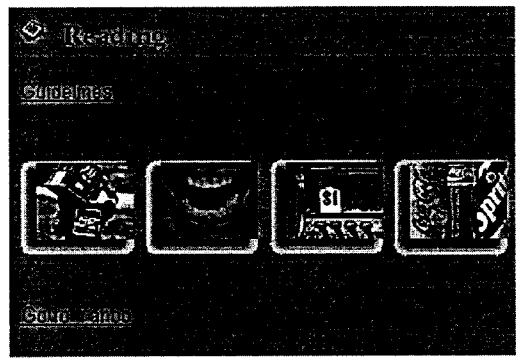

Exam Manager

After you have added an Assessment Tool to a unit of your course, you will need to use Exam Manager to add content to this tool. To enter Exam Manager, click on the Assessment Tool name or notebook icon of the chosen unit, and click the top menu link "Enter Exam Manager".

You will now be inside Exam Manager. Exam Manager has the same two-frame screen as the Course Manager. The left frame is a directory tree of the Assessment tool, instead of the course material, and the right frame will display individual questions. To return to the Course Manager or your course at any time, click "Return to Course Manager" in the top left frame. To return to the interactive syllabus in the course, click on "Return to Course".

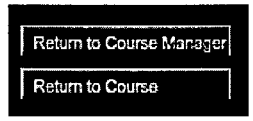

Edit Exam

The first section that will appear in the right frame of your screen (see image below) allows you to edit the following exam information. The (red) asterisk indicates a mandatory field. Click the top menu link "Edit Exam Information".

| Title:* | |
|---|---|
| Instructions/Description: | |
| ExamType | Normal | Duration(minutes) | 0 |
| StartDate* | 10/23/1998 | EndDate* | 01/23/1999 |
| Review Date* | 01/23/1999 | ☐ Disable Auto Grading | |

Fill in or edit the following fields as necessary.

Title: The title of your assessment tool

Instructions/Description: Informational text that will display at the top of the exam

Exam Type: Choose from Normal (one time entry) or Exercise (multiple entry by the user).

Duration: The amount of minutes you will allow for users to complete the exam/quiz.

Start Date/End Date: The dates in between which users can access the exam. Exams are defaulted to the beginning and end dates of the term, meaning users can access the exam at any time between those dates.

Review Date: The date after which the exam will be available for users to review their answers, the correct answers and any explanations you add to the exam. Users view their completed exams through the 'Gradebook' function.

Disable Auto Grading: Check this box if you do not wish the assessment to be computer scored.

Adding Sections and Pools to Exams

Your Assessment Tool can have as many sections and/or pools as needed.

A section is a separate portion of an exam. For example, you may want to break a quiz into different parts, testing different knowledge types or surrounding a separate problem. To create a new section, click on the top menu link "Add Section". You will be asked to enter a name and description for this section.

An exam pool is a group of questions from which the system will randomly pull a set number of questions. For example, you could have 30 questions in a pool, and each user will only receive 10 random questions. To set up a pool within a section, click on the Section name in the left frame, and you will see different top menu links appear. Click on the top menu link "Add Pool".

You can enter a title and description for this pool, and must enter the number of questions you wish each user to receive. For the example given above, you would enter "10."

NOTE: You should create pools and sections before you begin entering questions. Once you have created questions in Exam Manager, you cannot move the questions between pools or sections.

Question Types

There are seven types of questions you can add to an assessment tool. To add a question, first make sure you have clicked on the section or pool in which the question belongs. Then click on the top menu link "Add Question".

Then choose the type of exam question you want to add by clicking on the appropriate top menu link.

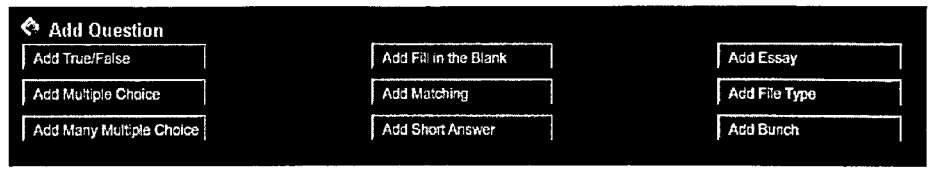

True/False – Enter the question and select from the True or False radio buttons. You may also enter explanations for the true response, the false response or for the entire question.

Multiple Choice – Enter the question and up to 10 possible answers. You must check the box next to the correct answer, and can enter explanations for the entire question, or for each response.

Many Multiple Choice – Enter the question and up to 10 possible responses. You can check a box for each answer that is correct. You can enter explanations for the entire question, or for each response.

Fill in the Blank – Enter the question and an optional explanation. If you do not enter answers, the system will not score the question (this is recommended). You can enter up to five possible answers, and the system will score the question correct if it matches any one of the given answers.

Matching – Enter the question and a possible explanation. You may enter up to 15 matching items. Enter the items so they match the correct answer and the system will automatically scramble the left column.

Short Answer – Enter a question and an optional explanation. There is no answer field because the system does not score short answer type questions.

Essay – Enter a question and an optional explanation. There is no answer field because the system does not score essay type questions. Essay questions are similar to short answer, but they show a larger text box in the on-line exam.

Automatic Scoring

Objective assessment questions are automatically graded by the on-line educational system if you provide an answer. We do not recommend that you supply answers for subjective question types, as our system will only search for exact matches as correct answers. For Fill-in-the-blank questions, the system will search for up to five exact matches and will give the user a correct score if their answer exactly matches one of the five options.

| Objective | Subjective |
|---|---|
| • True/False<br>• Multiple Choice<br>• Many-Multiple Choice<br>• Matching | • Fill in the Blank<br>• Short Answer<br>• Essay |

Assigning Points

You may assign point values to each question of an exam. For objective type questions, the system will assign the full number of points for a correct response. Subjective questions will not be scored, so any points values will not be added and will need to be altered by the instructor in the Gradebook. Be careful however, for many multiple choice and matching questions. The system will try to assign a proportional point value based on the number of correct responses. It is recommended that you only assign point values for clearly objective questions unless you will be manually adjusting the point scale for each user's exam in the Gradebook.

Reordering questions

You may reorder the questions in a section by clicking on the top menu link "Reorder Questions". Renumber the questions in the order you would like them to appear on the exam. When you are finished, click "Update".

Preview

To view the on-line assessment tool as it would appear to the user, click on the top icon link "Preview." Preview Exam will show the exam as it appears to users (without answers).

To view the exam with the correct automatic grading correct answers marked, click on the top icon link "Preview Graded Exam". This is similar to an exam key in the regular classroom.

© 1998 Real Education
Course Manager Guide

Appendix: What is HTML?

HTML stands for HyperText Markup Language. It is the programming language used to allow text, images and features to appear on a web page. If you pasted a word document into the Course Manager without any HTML, everything on the page would appear as one large paragraph in plain text. In a course created through the on-line educational system, the programming used to create the course layout and functionality are already in place. All that you will need is some basic HTML to add formatting to your text.

How does it work?

HTML uses "tags" to alter text in a certain way. Tags do not appear within your browser, but tell your browser what to do. Wherever a tag is inserted, a certain action will be performed. Most basic formatting in HTML will involve adding both a beginning tag and an end tag. In the chart below, the left column shows text that would appear on a Web page, and the right column shows the same text with the necessary HTML tags.

| Text Appearance on Web Page | Text with HTML |
| --- | --- |
| Formatting<br><br>To allow this formatting to appear on a Web page, you must add in the proper *HTML tags*. | \<CENTER>\<B>\<U>Formatting\</U>\</B>\</CENTER>\<P><br>To allow this formatting to appear on a Web page, you must add in the proper \<I>HTML tags.\</I> |

Do I have to memorize all these tags?

The amount of HTML you want to learn depends on your personal preference. You can create and edit your course with very little HTML knowledge, as long as you understand how it works. If you are editing a developed course, make sure not to delete any HTML tags, as one missing tag can alter an entire page. If you decide to add in HTML yourself, you have two choices. To begin using HTML, refer to the HTML Quick Guide at the end of this document.

1. For minor changes or formatting, simply type in HTML tags as needed.
2. Or, use one of the popular HTML editing software programs available. These programs allow you to either create text as you want it to be seen and convert it to HTML automatically, or to add in HTML as you go using more familiar keys and functions. If you use an HTML editor, you can simply copy and paste the text (with the tags included) into the Course Manager.

Copy and Paste Shortcut
To copy material into the Course Manager, highlight the text and tags you need, and hit the "Control" and "C" keys simultaneously ("Apple" and "C" for Macintosh) to copy the text onto your clipboard. Then enter the Course Manager, and once your cursor is in the area where you want the text to appear, hit the "Control" and "V" keys ("Apple" and "V" for Macintosh") to paste.

© 1998 Real Education
Course Manager Guide

HTML Quick Guide

| Purpose | Code | Coded Document Example | Actual Document Example |
|---|---|---|---|
| Line Break | <BR> | A break will simply break your <BR> text and continue on the next line. | A break will simply break your text and continue on the next line. |
| Paragraph Break | <P> | A paragraph break will leave <P> an empty row in between the text. | A paragraph break will leave an empty row in between text. |
| Horizontal Ruling | <HR> | This will draw a <HR> line across a page. | This will draw a line across a page. |
| Underlining | <U> | <U>Begin and end a <U> tag.</U> | <u>Begin and end a <U> tag.</u> |
| Bolding | <B> | <B>Begin and end a <B> tag.</B> | Begin and end a <B> tag. |
| Italicizing | <I> | <I>Begin and end a <I> tag.</I> | *Begin and end a <I> tag.* |
| Centering | <CENTER> | <CENTER>Hello</CENTER> | Hello |
| *Ordered Listing | <OL> | <OL><LI>Clerks<LI> Olaf<LI>Berzerker</OL> | 5. Clerks<br>6. Olaf<br>7. Berzerker |
| *Unordered Listing | <UL> | <UL><LI>Clerks<LI>Olaf<LI>Berzerker</UL> | • Clerks<br>• Olaf<br>• Berzerker |
| *Font Sizing | <FONT SIZE="+2"> | <FONT SIZE="+2">Hello</FONT> | Hello |
| *Font Coloring | <FONT COLOR="RED"> | <FONT COLOR="RED">Hello</FONT> | Hello |

**\*ORDERED LISTS AND UNORDERED LISTS:**
The <LI> tag should be placed where a number (ordered list) or a bullet should appear (unordered list).

**\*FONT SIZING AND COLORING**
Changing the number/color within the quotation marks can vary the size and color.

© 1998 Real Education
Course Manager Guide

Appendix: Setting up Groups

The on-line educational system allows great flexibility for accommodating group collaboration and teaming. This unit will cover the functionality available for group work.

What features can be used by Groups?

Certain features in RES are built into the course shell, and other features are part of the course units (see chart from Page 2). Most features can be organized for group work, but will be viewable by all users. If you are looking for exclusivity in group work, you may want to create separate group area in the units of your course. Every Learning Tool that you have available in a unit can also be made available to only a group of users. Any information that is assigned to a group is only viewable by the users in that group. Users not in the group will not see that information. As the instructor of the course, you will see all group information.

The example below is an instructor's view of the Interactive Syllabus where two groups have been created.

| Unit | Title |  |
|------|-------|---|
| 1 | Introduction |  |
|   | Team A Introduction |  |
|   | Team B Introduction |  |
| 2 | Communication Tools |  |

© 1998 Real Education
Course Manager Guide

What is claimed is:

1. A method for document sharing between users and an instructor and for providing an electronic journal for use with an on-line educational system, comprising:

provifying on-line content concerning educational materials for a particular educational course;

providing on-line an electronic syllabus for the educational course;

receiving an education-related document from a particular one of the users;

associating a message with the document based upon information entered by the particular user;

receiving an identification of one or more intended recipients of the document, the intended recipients being selected from a group including the users and the instructor;

storing the document with the message for accessibility by the intended recipients;

providing an electronic journal for a particular one of the users permitting the particular user to enter information into the electronic journal for participation in the educational course, wherein the electronic journal provides for association of the entered information with the particular user;

permitting the instructor to enter information into the electronic journal for viewing by the particular user, wherein the electronic journal provides for secure access to the instructor's entered information by the particular user;

permitting the user to selectively identify permitted access to the electronic journal by the instructor; and selectively providing access to the electronic journal by the instructor based upon the particular user's identification of permitted access.

2. The method of claim 1, further including notifying the instructor of the document.

3. The method of claim 1, further including displaying an identification of the document.

4. The method of claim 1, further including displaying an indication of a source of the document.

5. The method of claim 1, wherein the receiving step includes receiving text, audio, video, graphics, or multimedia information.

6. The method of claim 1, further including sorting the received document among a plurality of stored documents.

7. The method of claim 1, further including restricting access to the document to the instructor.

8. The method of claim 1, further including:

receiving a command related to manipulation of the document; and executing the command.

9. A method for document sharing between users and an instructor and for providing an electronic journal for use with an on-line educational system, comprising:

providing on-line content concerning educational materials for a particular educational course;

providing on-line an electronic syllabus for the educational course;

receiving an education-related document from the instructor along with an identification of a particular one of the users as an intended recipient of the document; associating a message into the document based upon information entered by the instructor;

storing the document with the message for accessibility by the particular user;

providing an electronic journal for a particular one of the users permitting the particular user to enter information into the electronic journal for participation in the educational course, wherein the electronic journal provides for association of the entered information with the particular user;

permitting the instructor to enter information into the electronic journal for viewing by the particular user, wherein the electronic journal provides for secure access to the instructor's entered information by the particular user;

permitting the user to selectively identify permitted access to the electronic journal by the instructor; and selectively providing access to the electronic journal by the instructor based upon the particular user's identification of permitted access.

10. The method of claim 9, further including notifying the particular user of the document.

11. The method of claim 9, further including displaying an identification of the document.

12. The method of claim 9, further including displaying an indication of a source of the document.

13. The method of claim 9 wherein the receiving step includes receiving text, audio, video, graphics, or multimedia information.

14. The method of claim 9, further including sorting the received document among a plurality of stored documents.

15. The method of claim 9, further including restricting access to the document to the user.

16. The method of claim 15, further including:

receiving a command related to manipulation of the document; and executing the command.

17. An apparatus for document sharing between users and an instructor and for providing an electronic journal for use with an on-line educational system, comprising:

a content module for providing on-line content concerning educational materials for a particular educational course;

a syllabus module for providing on-line an electronic syllabus for the educational course;

a receive module for receiving an education-related document from a particular one of the users;

a message module for associating a message with the document based upon information entered by the particular user;

a recipient module for receiving an identification of one or more intended recipients of the document, the intended recipients being selected from a group including the users and the instructor;

a store module for storing the document with the message for accessibility by the intended recipients;

a journal module for providing an electronic journal for a particular one of the users permitting the particular user to enter information into the electronic journal for participation in the educational course, wherein the electronic journal provides for association of the entered information with the particular user;

an instructor module for permitting the instructor to enter information into the electronic journal for viewing by the particular user, wherein the electronic journal provides for secure access to the instructor's entered information by the particular user;

an access module for permitting the user to selectively identify permitted access to the electronic journal by the instructor; and a module for selectively providing access to the electronic journal by the instructor based upon the particular user's identification of permitted access.

18. The apparatus of claim 17, further including a notify module for notifying the instructor of the document.

19. The apparatus of claim 17, further including a display module for displaying an identification of the document.

20. The apparatus of claim 17, further including a display module for displaying an indication of a source of the document.

21. The apparatus of claim 17 wherein the receive module includes a module for receiving text, audio, video, graphics, or multimedia information.

22. The apparatus of claim 17, further including a sort module for sorting the received document among a plurality of stored documents.

23. The apparatus of claim 17, further including an access module for restricting access to the document to the instructor.

24. The apparatus of claim 17, further including:
   a module for receiving a command related to manipulation of the document; and
   a module for executing the command.

25. An apparatus for document sharing between users and an instructor and for providing an electronic journal for use with an on-line educational system, comprising:
   a content module for providing on-line content concerning educational materials for a particular educational course;
   a syllabus module for providing on-line an electronic syllabus for the educational course;
   a receive module for receiving an education-related document from the instructor along with an identification of a particular one of the users as an intended recipient of the document;
   a message module for associating a message with the document based upon information entered by the instructor;
   a store module for storing the document with the message for accessibility by the particular user;
   a journal module for providing an electronic journal for a particular one of the users permitting the particular user to enter information into the electronic journal for participation in the educational course, wherein the electronic journal provides for association of the entered information with the particular user;
   an instructor module for permitting the instructor to enter information into the electronic journal for viewing by the particular user, wherein the electronic journal provides for secure access to the instructor's entered information by the particular user; an access module for permitting the user to selectively identify permitted access to the electronic journal by the instructor; and a module for selectively providing access to the electronic journal by the instructor based upon the particular user's identification of permitted access.

26. The apparatus of claim 25, further including a notify module for notifying the particular user of the document.

27. The apparatus of claim 25, further including a display module for displaying an identification of the document.

28. The apparatus of claim 25, further including a display module for displaying an indication of a source of the document.

29. The apparatus of claim 25 wherein the receive module includes a module for receiving text, audio, video, graphics, or multimedia information.

30. The apparatus of claim 25, further including a sort module for sorting the received document among a plurality of stored documents.

31. The apparatus of claim 25, further including an access module for restricting access to the document to the user.

32. The apparatus of claim 25, further including:
   a module for receiving a command related to manipulation of the document; and
   a module for executing the command.

33. A computer program product, comprising:
   a computer-readable medium containing instructions for controlling a computer system to perform a method for document sharing between users and an instructor and for providing an electronic journal for use with an on-line educational system, the method including:
   providing on-line content concerning educational materials for a particular educational course;
   providing on-line an electronic syllabus for the educational course;
   receiving an education-related document from a particular one of the users;
   associating a message with the document based upon information entered by the particular user;
   receiving an identification of one or more intended recipients of the document, the intended recipients being selected from a group including the users and the instructor;
   storing the document with the message for accessibility by the intended recipients;
   providing an electronic journal for a particular one of the users permitting the particular user to enter information into the electronic journal for participation in the educational course, wherein the electronic journal provides for association of the entered information with the particular user;
   permitting the instructor to enter information into the electronic journal for viewing by the particular user, wherein the electronic journal provides for secure access to the instructor's entered information by the particular user;
   permitting the user to selectively identify permitted access to the electronic journal by the instructor; and
   selectively providing access to the electronic journal by the instructor based upon the particular user's identification of permitted access.

34. The computer program product of claim 33, further including notifying the instructor of the document.

35. The computer program product of claim 33, further including displaying an identification of the document.

36. The computer program product of claim 33, further including displaying an indication of a source of the document.

37. The computer program product of claim 33, wherein the receiving step includes receiving text, audio, video, graphics, or multimedia information.

38. The computer program product of claim 33, further including sorting the received document among a plurality of stored documents.

39. The computer program product of claim 33, further including restricting access to the document to the instructor.

40. The computer program product of claim 33, further including:
   receiving a command related to manipulation of the document; and executing the command.

41. A computer program product, comprising:

a computer-readable medium containing instructions for controlling a computer system to perform a method for document sharing between users and an instructor and for providing an electronic journal for use with an on-line educational system, the method including:

providing on-line content concerning educational materials for a particular educational course;

providing on-line an electronic syllabus for the educational course;

receiving an education-related document from the instructor along with an identification of a particular one of the users as an intended recipient of the document;

associating a message with the document based upon information entered by the instructor;

storing the document with the message for accessibility by the particular user;

providing an electronic journal for a particular one of the users permitting the particular user to enter information into the electronic journal for participation in the educational course, wherein the electronic journal provides for association of the entered information with the particular user;

permitting the instructor to enter information into the electronic journal for viewing by the particular user, wherein the electronic journal provides for secure access to the instructor's entered information by the particular user;

permitting the user to selectively identify permitted access to the electronic journal by the instructor; and selectively providing access to the electronic journal by the instructor based upon the particular user's identification of permitted access.

42. The computer program product of claim 41, further including notifying the particular user of the document.

43. The computer program product of claim 41, further including displaying an identification of the document.

44. The computer program product of claim 41, further including displaying an indication of a source of the document.

45. The computer program product of claim 41, wherein the receiving step includes receiving text, audio, video, graphics, or multimedia information.

46. The computer program product of claim 41, further including sorting the received document among a plurality of stored documents.

47. The computer program product of claim 41, further including restricting access to the document to the user.

48. The computer program product of claim 41, further including:

receiving a command related to manipulation of the document; and executing the command.

* * * * *